INVENTOR.
ROBERT B. WRIGHT, JR.
BY
Isidore Match
ATTORNEY.

CLOCK PULSE DRIVER

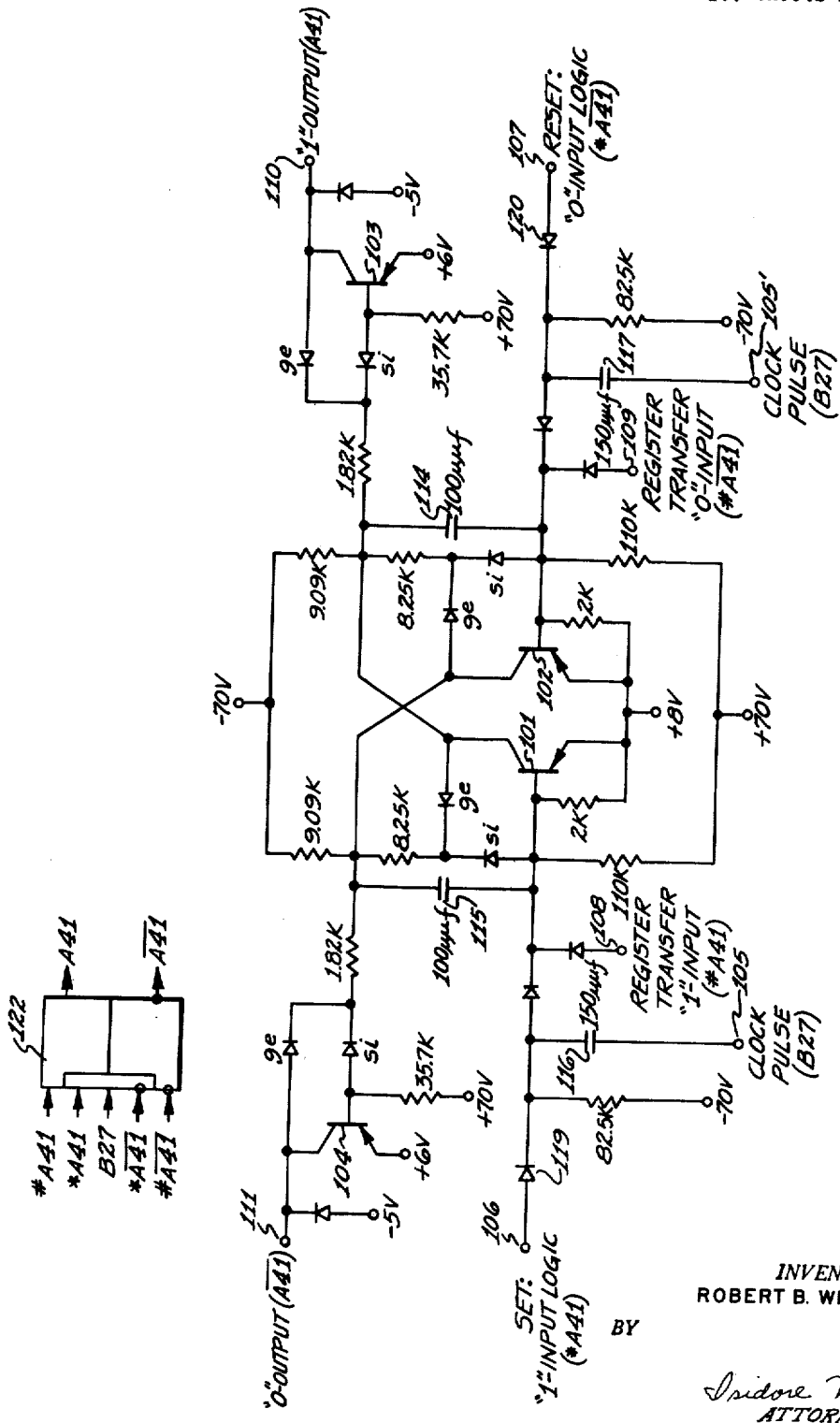
Fig. 4 FLIP-FLOP
INVENTOR.
ROBERT B. WRIGHT, JR.

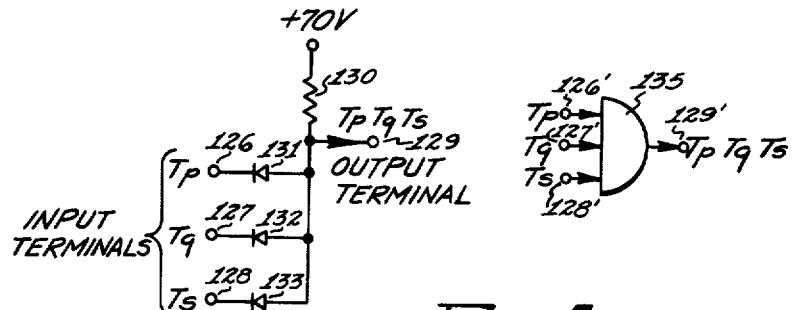
Fig. 5  AND-GATE
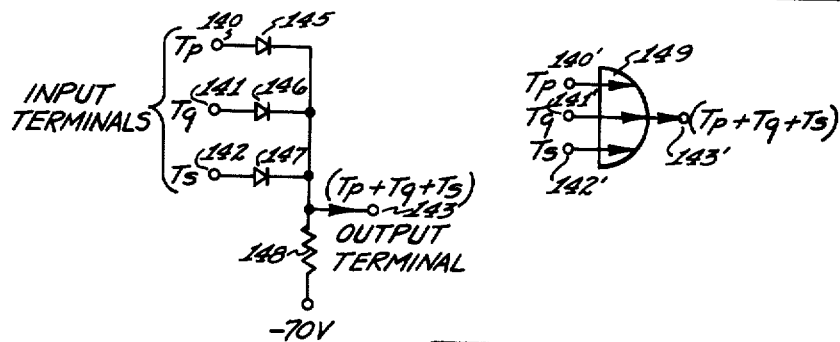
Fig. 6  OR-GATE
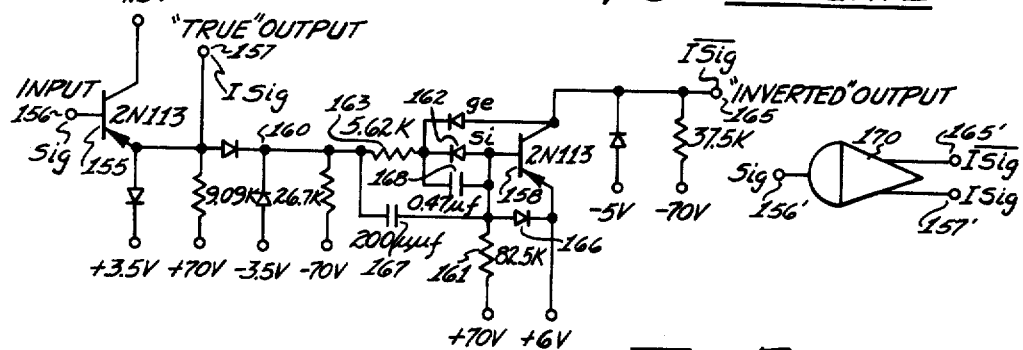
Fig. 7  INVERTER
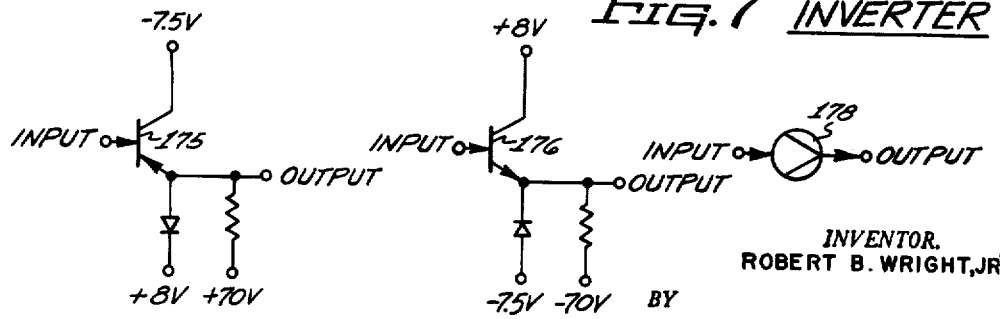
Fig. 8  EMITTER FOLLOWERS Dec. 1, 1964  R. B. WRIGHT, JR  3,159,819
TAPE CONTROL SYSTEM
Filed July 29, 1960  100 Sheets-Sheet 6

REGISTER TRANSFER

INVENTOR.
ROBERT B. WRIGHT, JR.

BY Isidore Match
ATTORNEY

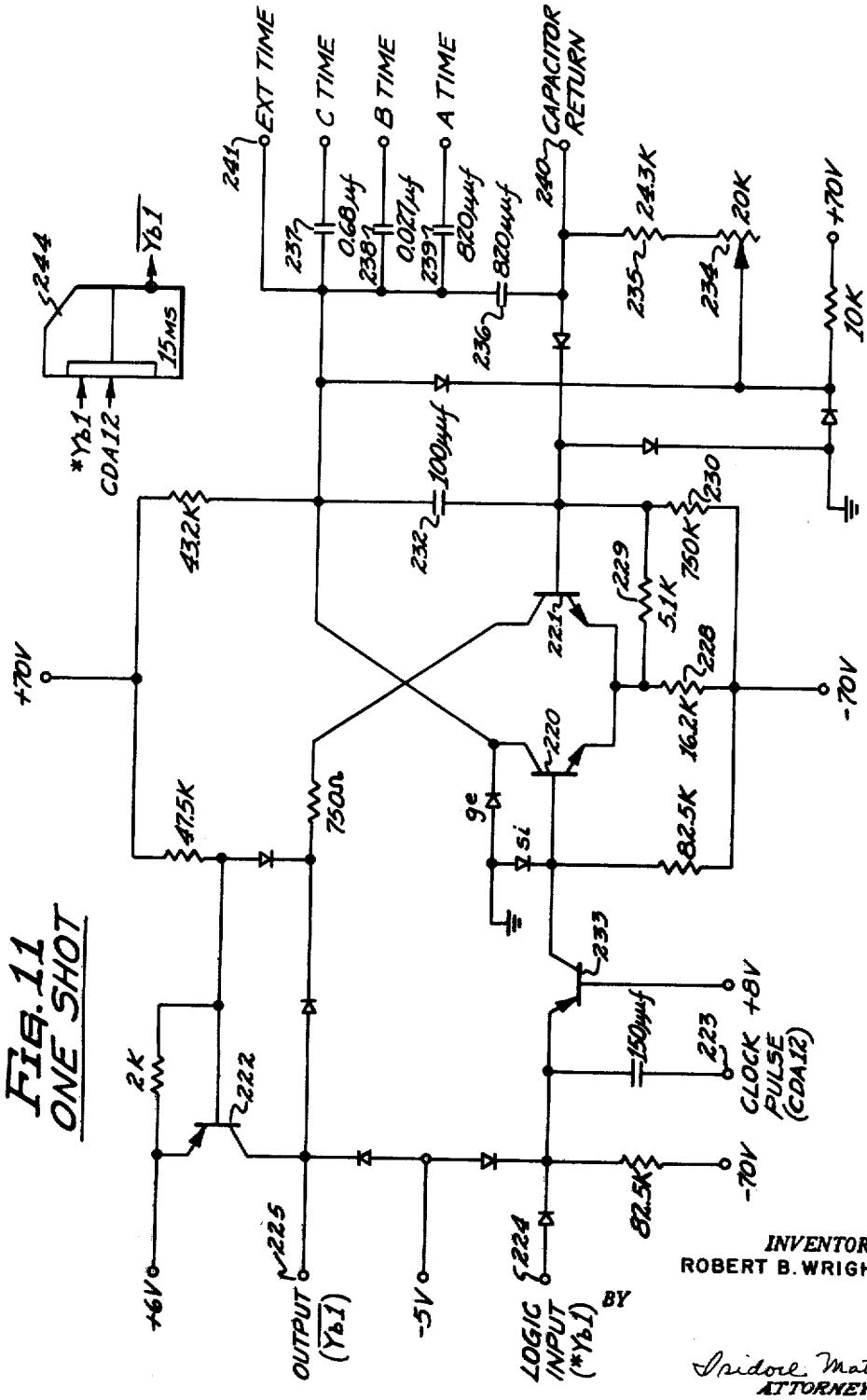
Fig.11 ONE SHOT

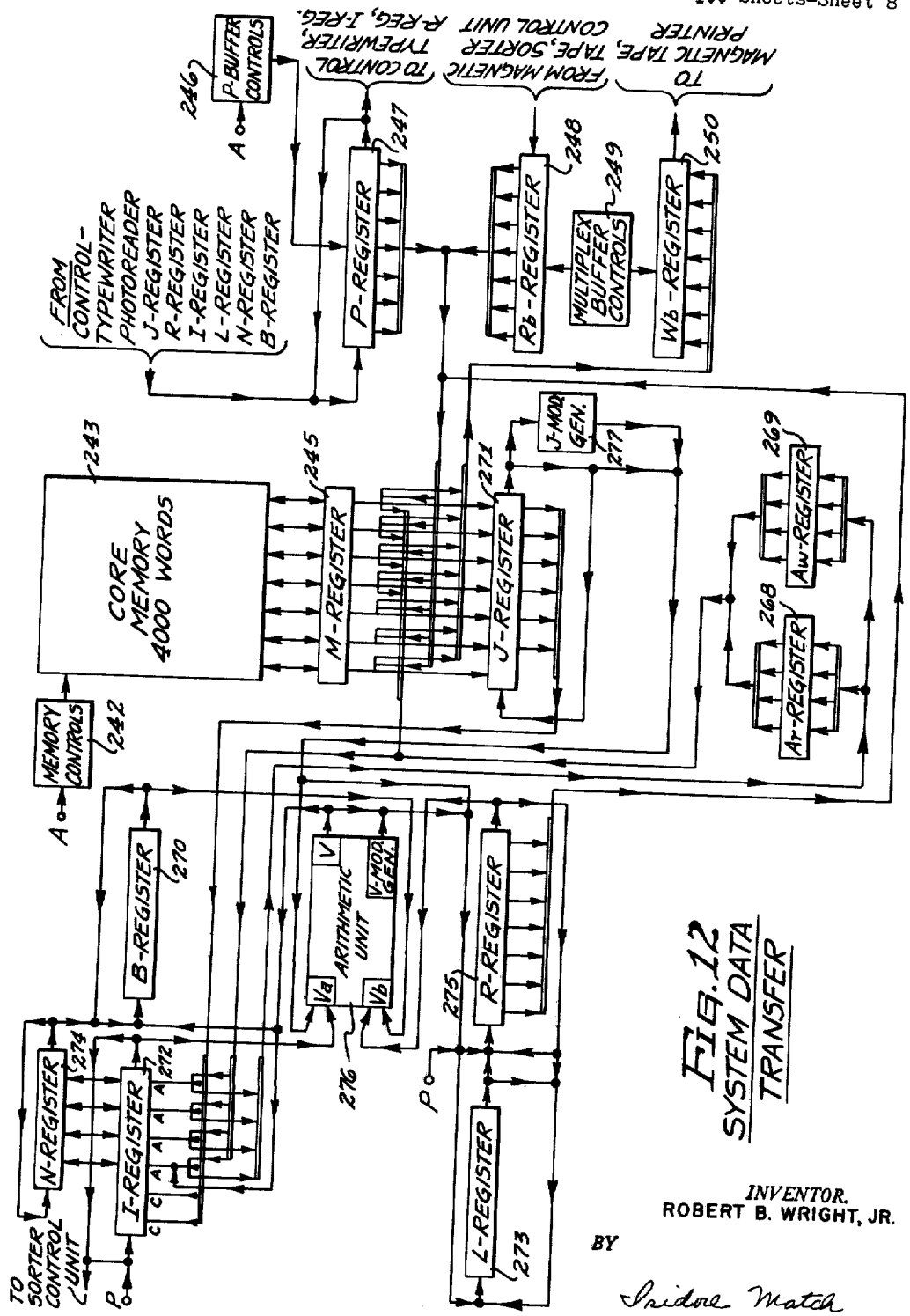

CONTROL CONSOLE SIGNALS

INVENTOR.
ROBERT B. WRIGHT, JR.

CONTROL CONSOLE SIGNALS

INVENTOR.
ROBERT B. WRIGHT, JR.

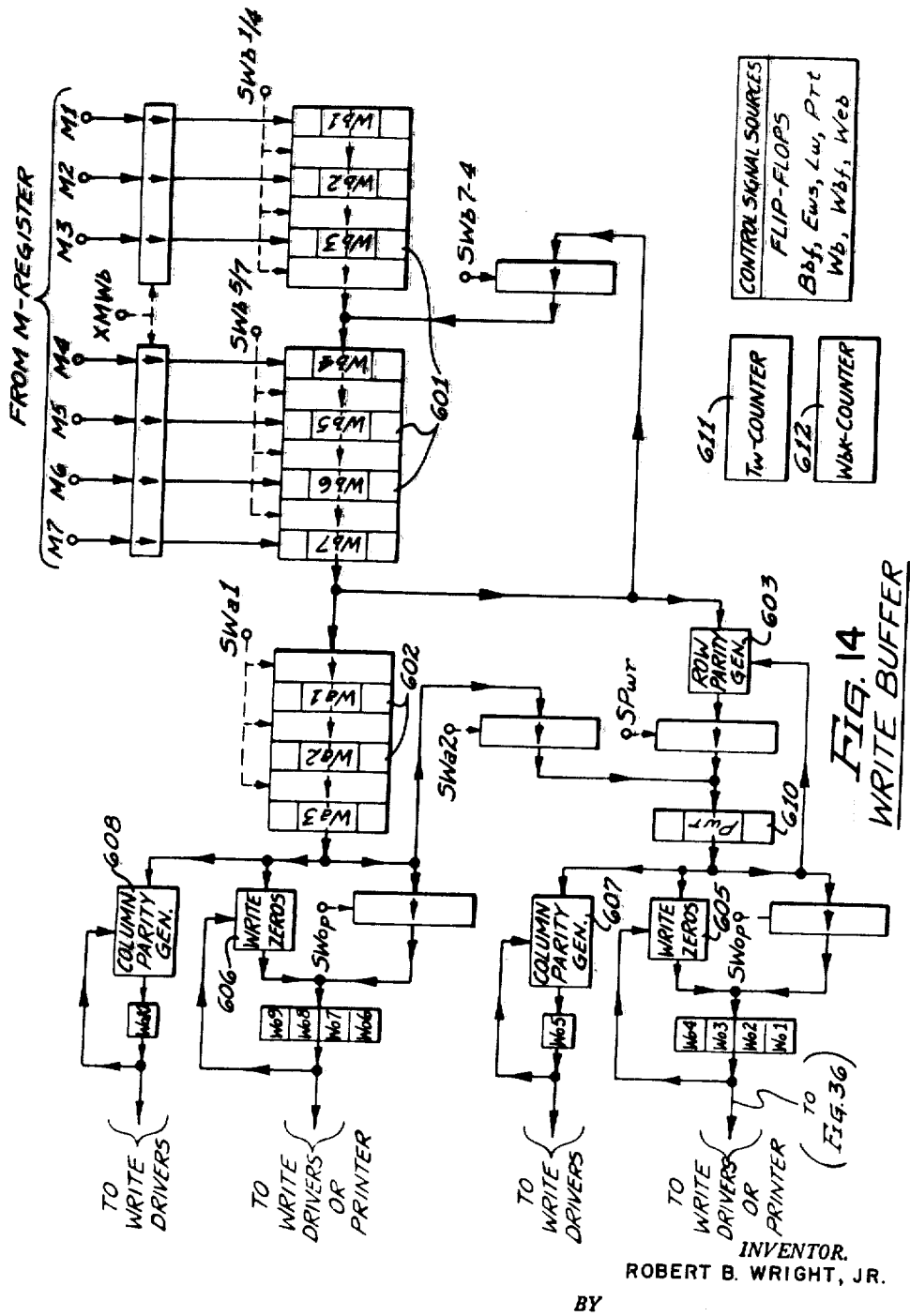

Dec. 1, 1964  R. B. WRIGHT, JR  3,159,819
TAPE CONTROL SYSTEM
Filed July 29, 1960  100 Sheets-Sheet 12

INVENTOR.
ROBERT B. WRIGHT, JR.
BY
Isidore Match
ATTORNEY

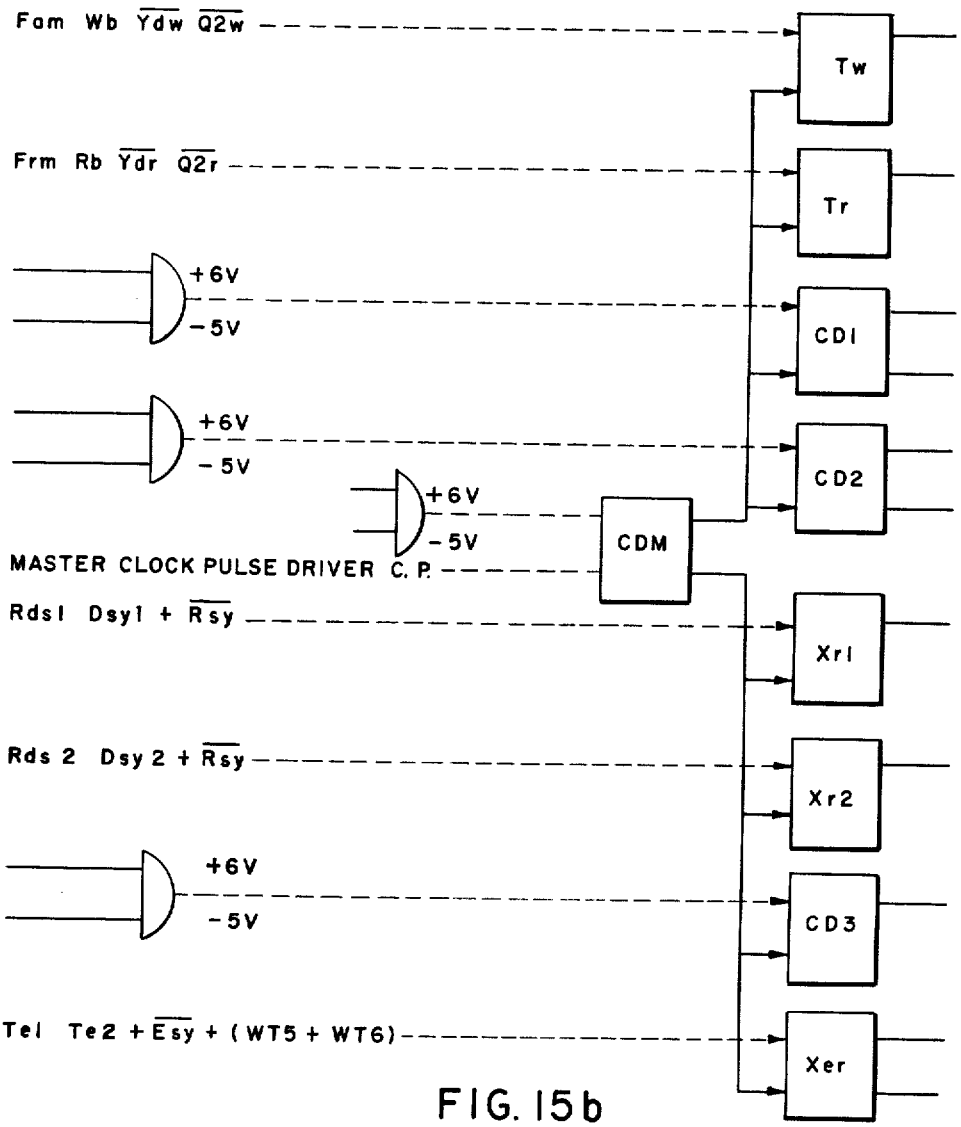
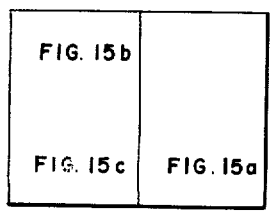
FIG. 15b
FIG. 15c

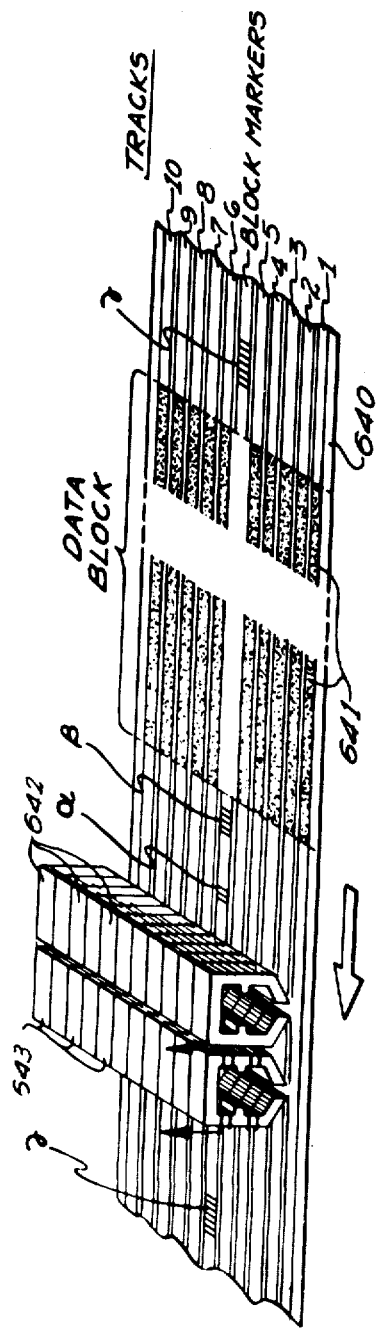
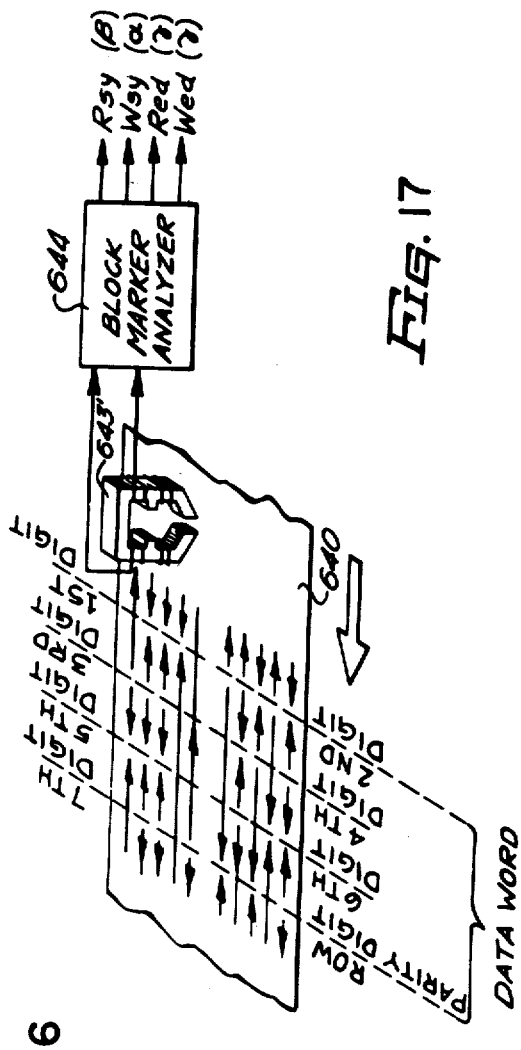

Dec. 1, 1964     R. B. WRIGHT, JR     3,159,819
TAPE CONTROL SYSTEM
Filed July 29, 1960     100 Sheets-Sheet 17

FIG. 21   READ AMPLIFIER

INVENTOR.
ROBERT B. WRIGHT, JR.
BY
Isidore Match
ATTORNEY.

Dec. 1, 1964   R. B. WRIGHT, JR   3,159,819
TAPE CONTROL SYSTEM
Filed July 29, 1960   100 Sheets-Sheet 20

*INVENTOR.*
ROBERT B. WRIGHT, JR.
BY
*Isidore Match*
ATTORNEY

Dec. 1, 1964  R. B. WRIGHT, JR  3,159,819
TAPE CONTROL SYSTEM
Filed July 29, 1960  100 Sheets-Sheet 22

*INVENTOR.*
ROBERT B. WRIGHT, JR.
BY
*Isidore Match*
ATTORNEY

Dec. 1, 1964     R. B. WRIGHT, JR     3,159,819
TAPE CONTROL SYSTEM
Filed July 29, 1960     100 Sheets-Sheet 23

INVENTOR.
ROBERT B. WRIGHT, JR.
BY
Isidore Match
ATTORNEY

Dec. 1, 1964 R. B. WRIGHT, JR 3,159,819
TAPE CONTROL SYSTEM
Filed July 29, 1960 100 Sheets-Sheet 24
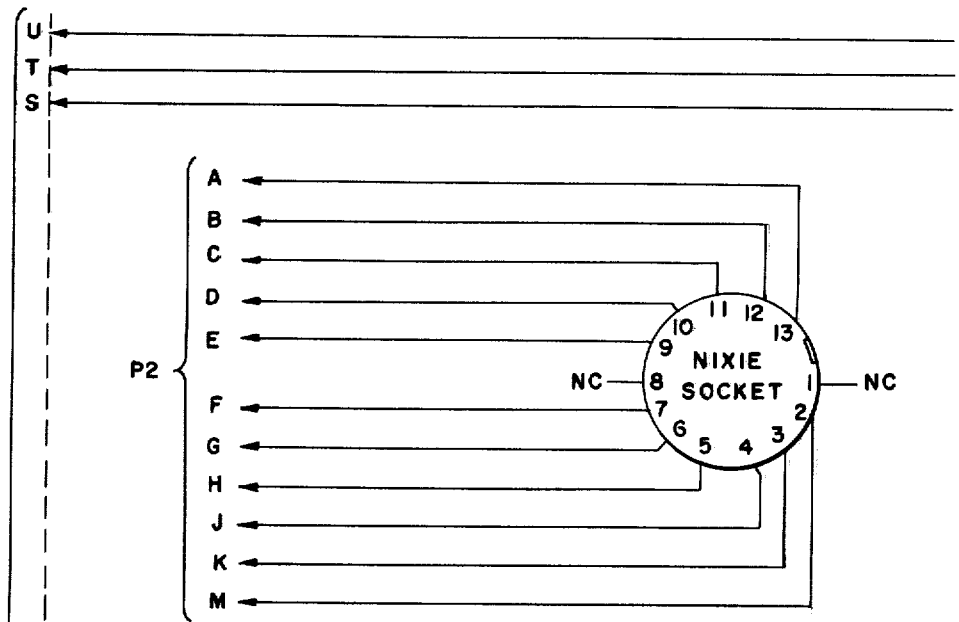
FIG. 29
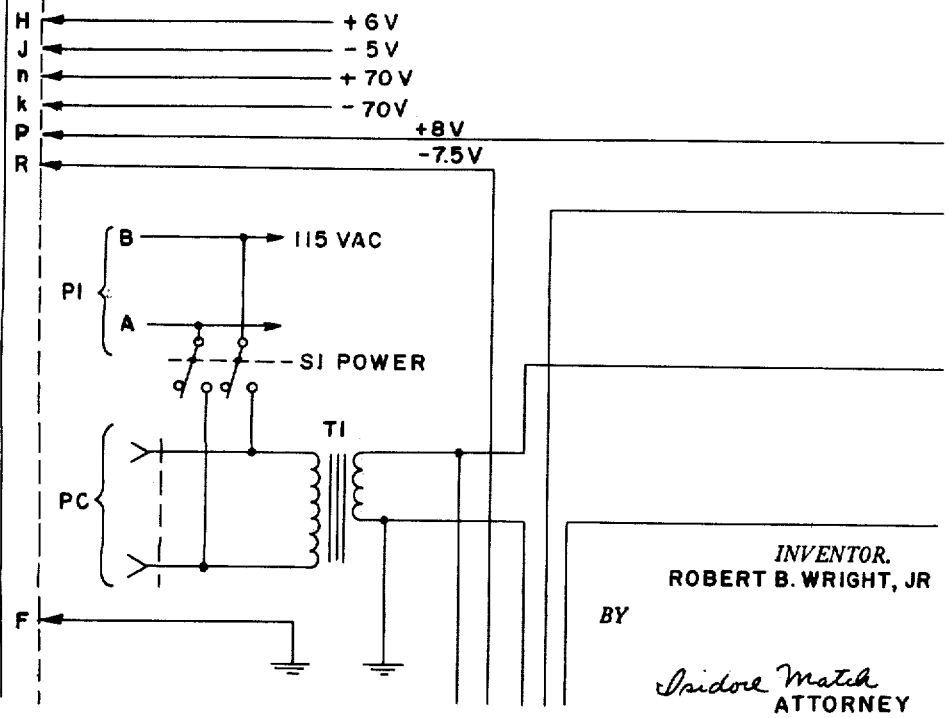
*INVENTOR.*
ROBERT B. WRIGHT, JR
BY
Isidore Match
ATTORNEY Dec. 1, 1964　　　R. B. WRIGHT, JR　　　3,159,819
TAPE CONTROL SYSTEM
Filed July 29, 1960　　　100 Sheets-Sheet 25

INVENTOR.
ROBERT B. WRIGHT, JR.
BY
Isidore Match
ATTORNEY

Dec. 1, 1964  R. B. WRIGHT, JR  3,159,819
TAPE CONTROL SYSTEM
Filed July 29, 1960  100 Sheets-Sheet 27

INVENTOR.
ROBERT B. WRIGHT, JR.
BY
Isidore Match
ATTORNEY

Dec. 1, 1964   R. B. WRIGHT, JR   3,159,819
TAPE CONTROL SYSTEM
Filed July 29, 1960   100 Sheets-Sheet 28

| FIG. 29 | FIG. 30 | FIG. 31 |
| --- | --- | --- |
| FIG. 32 | FIG. 33 | FIG. 34 |
|  | FIG. 35 |  |

*INVENTOR.*
ROBERT B. WRIGHT, JR.

BY

Isidore Match
ATTORNEY

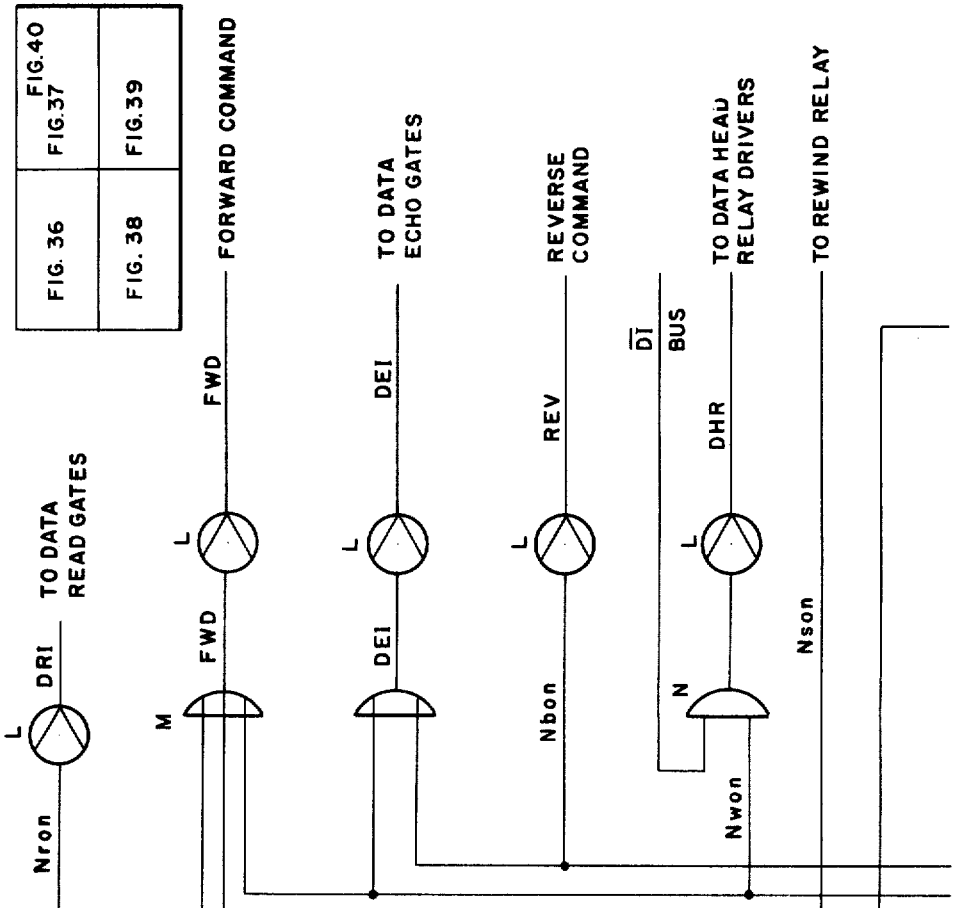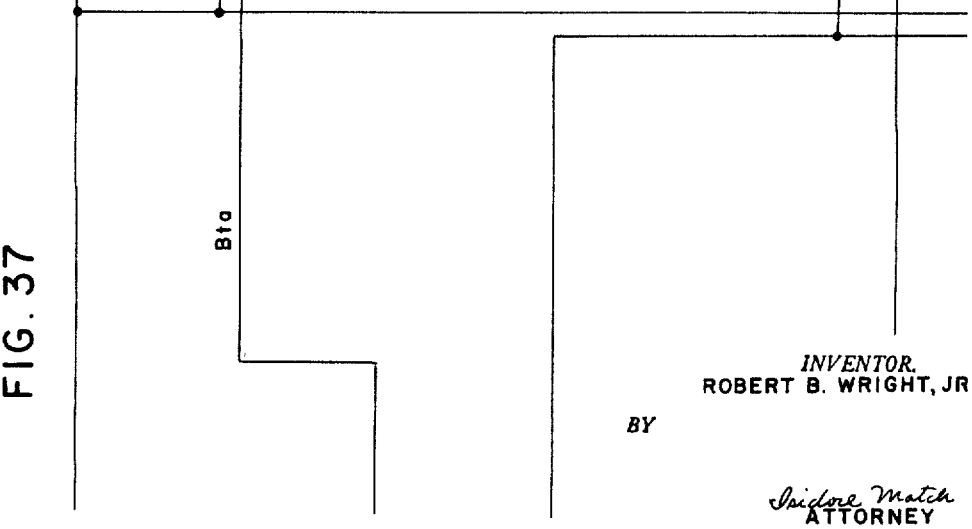

INVENTOR.
ROBERT B. WRIGHT, JR.
BY
Isidore Match
ATTORNEY

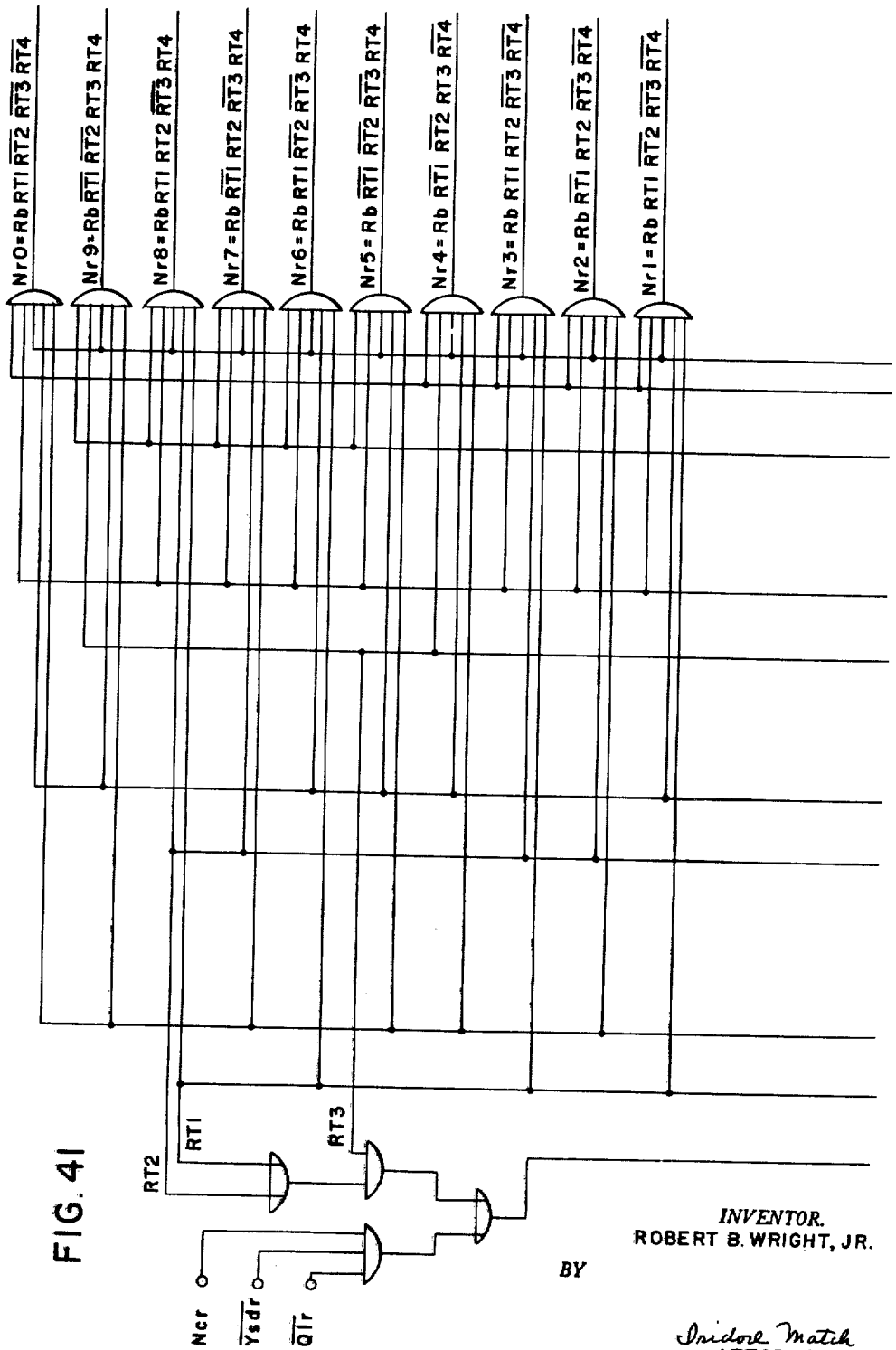

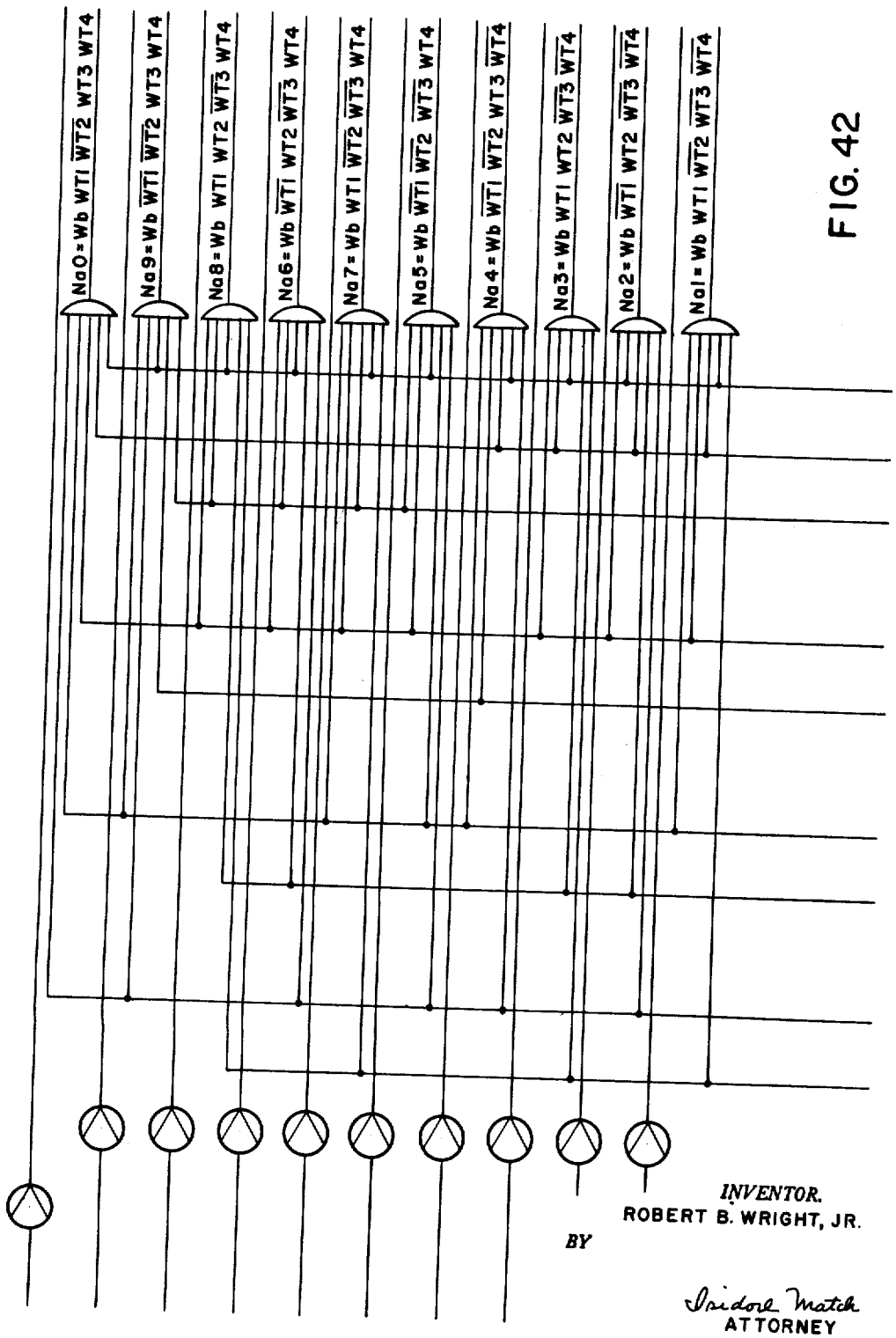

Dec. 1, 1964  R. B. WRIGHT, JR  3,159,819
TAPE CONTROL SYSTEM
Filed July 29, 1960  100 Sheets-Sheet 38

*INVENTOR.*
ROBERT B. WRIGHT, JR.
BY
Isidore Match
ATTORNEY

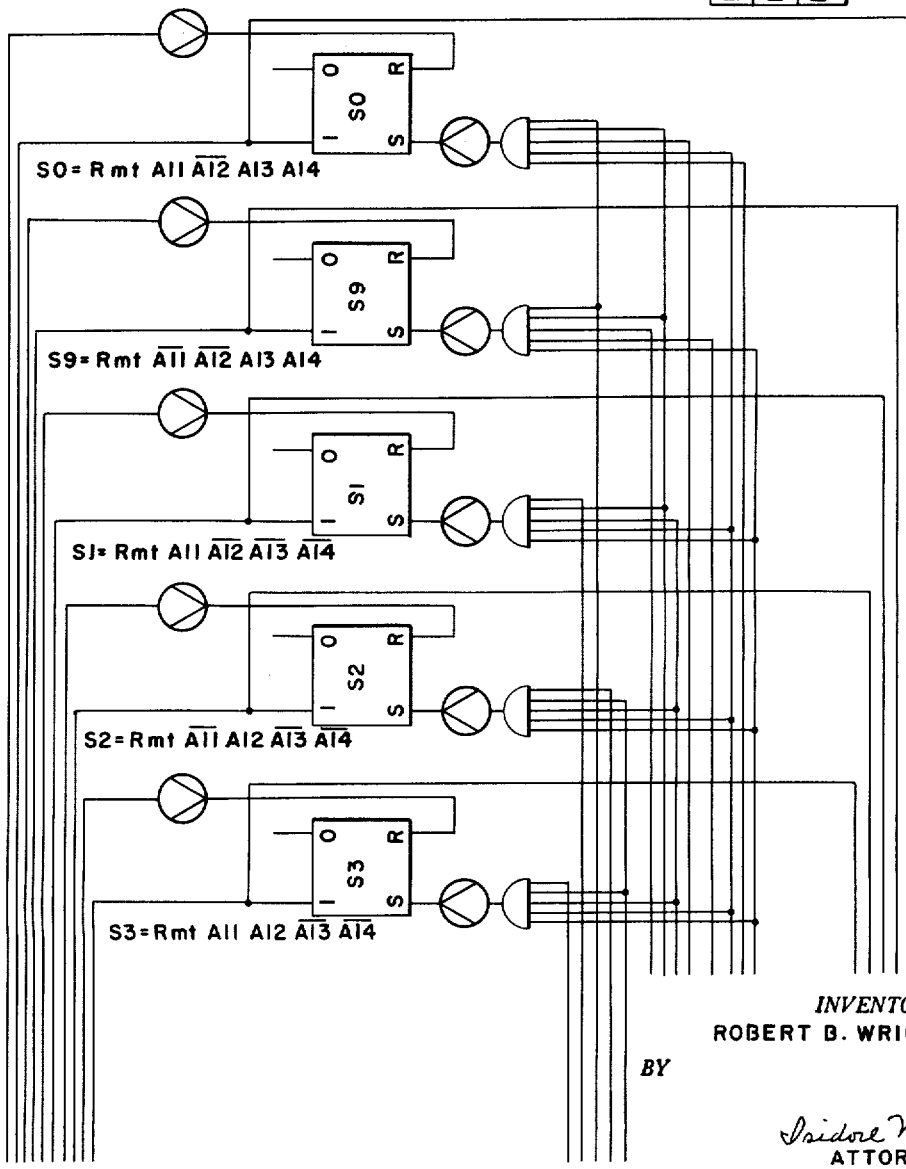

Dec. 1, 1964   R. B. WRIGHT, JR   3,159,819
TAPE CONTROL SYSTEM
Filed July 29, 1960   100 Sheets-Sheet 44

INVENTOR.
ROBERT B. WRIGHT, JR
BY
Isidore Match
ATTORNEY

Dec. 1, 1964    R. B. WRIGHT, JR    3,159,819
TAPE CONTROL SYSTEM
Filed July 29, 1960    100 Sheets-Sheet 47

INVENTOR.
ROBERT B. WRIGHT, JR

Dec. 1, 1964   R. B. WRIGHT, JR   3,159,819
TAPE CONTROL SYSTEM

Filed July 29, 1960   100 Sheets-Sheet 49

*INVENTOR.*
ROBERT B. WRIGHT, JR
BY

Isidore Match
ATTORNEY

Dec. 1, 1964  R. B. WRIGHT, JR  3,159,819
TAPE CONTROL SYSTEM
Filed July 29, 1960  100 Sheets-Sheet 56

INVENTOR.
ROBERT B. WRIGHT, JR.
BY
Isidore Match
ATTORNEY

Dec. 1, 1964  R. B. WRIGHT, JR  3,159,819
TAPE CONTROL SYSTEM
Filed July 29, 1960  100 Sheets-Sheet 59

CONDITIONAL
ON 8 MARKER
PULSES & UNDER WITH
BACK UP (Wt 5)

*INVENTOR.*
ROBERT B. WRIGHT, JR.

BY

*Isidore Match*
ATTORNEY

Dec. 1, 1964  R. B. WRIGHT, JR  3,159,819
TAPE CONTROL SYSTEM

Filed July 29, 1960  100 Sheets-Sheet 60

C = SAMPLE FOR COLUMN ERROR
R = SAMPLE FOR ROW PARITY

INVENTOR.
ROBERT B. WRIGHT, JR.
BY
Isidore Match
ATTORNEY

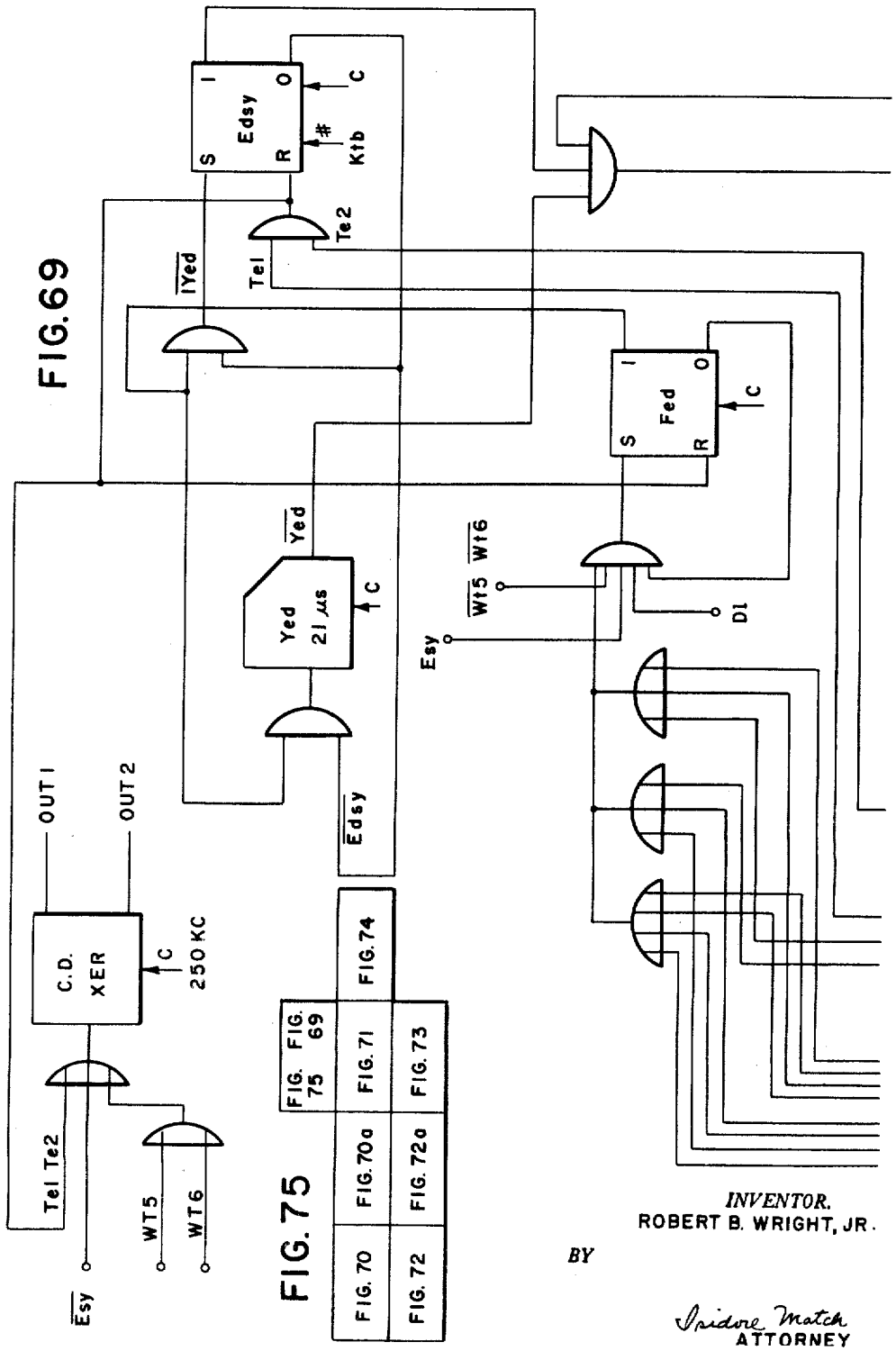

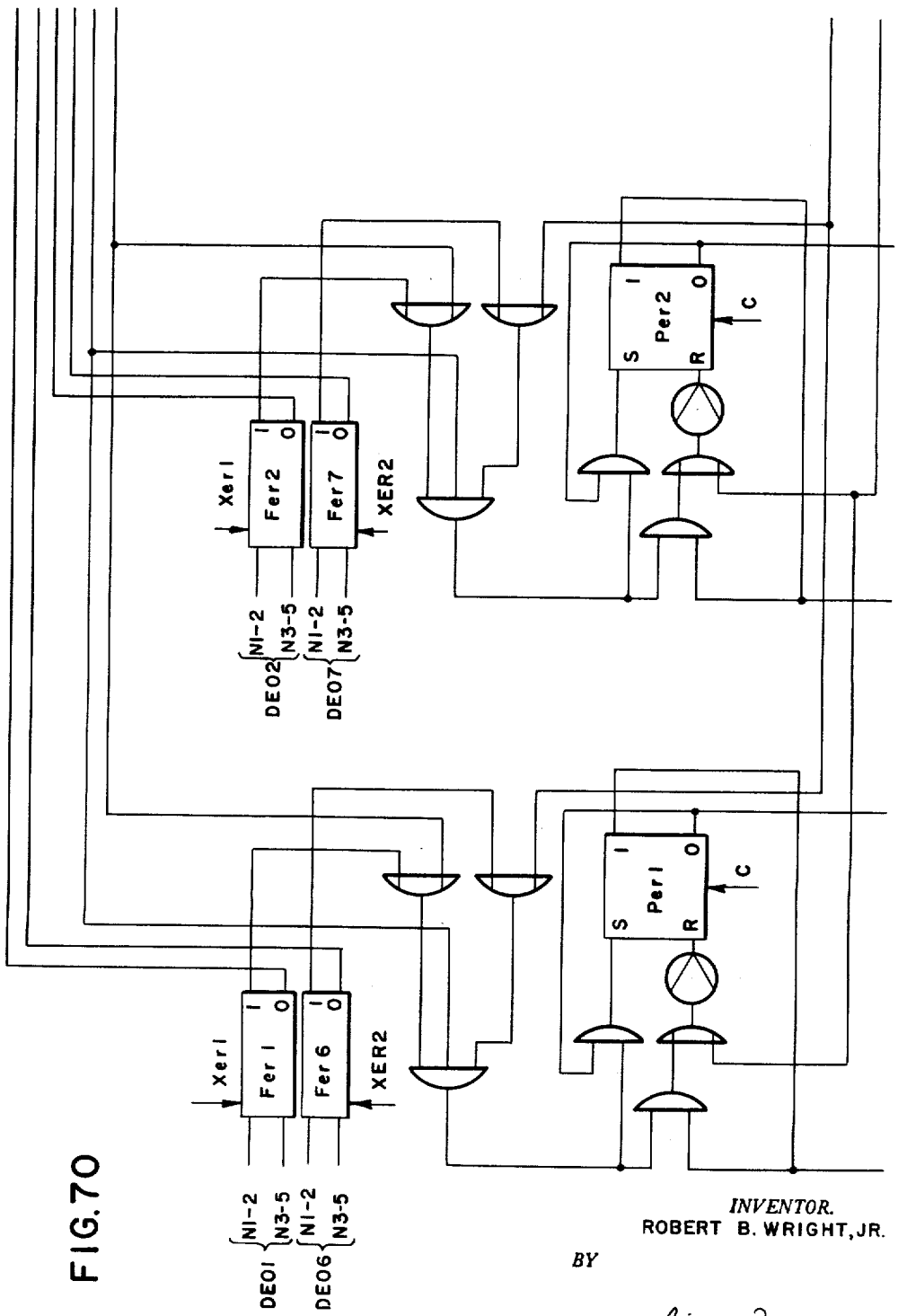

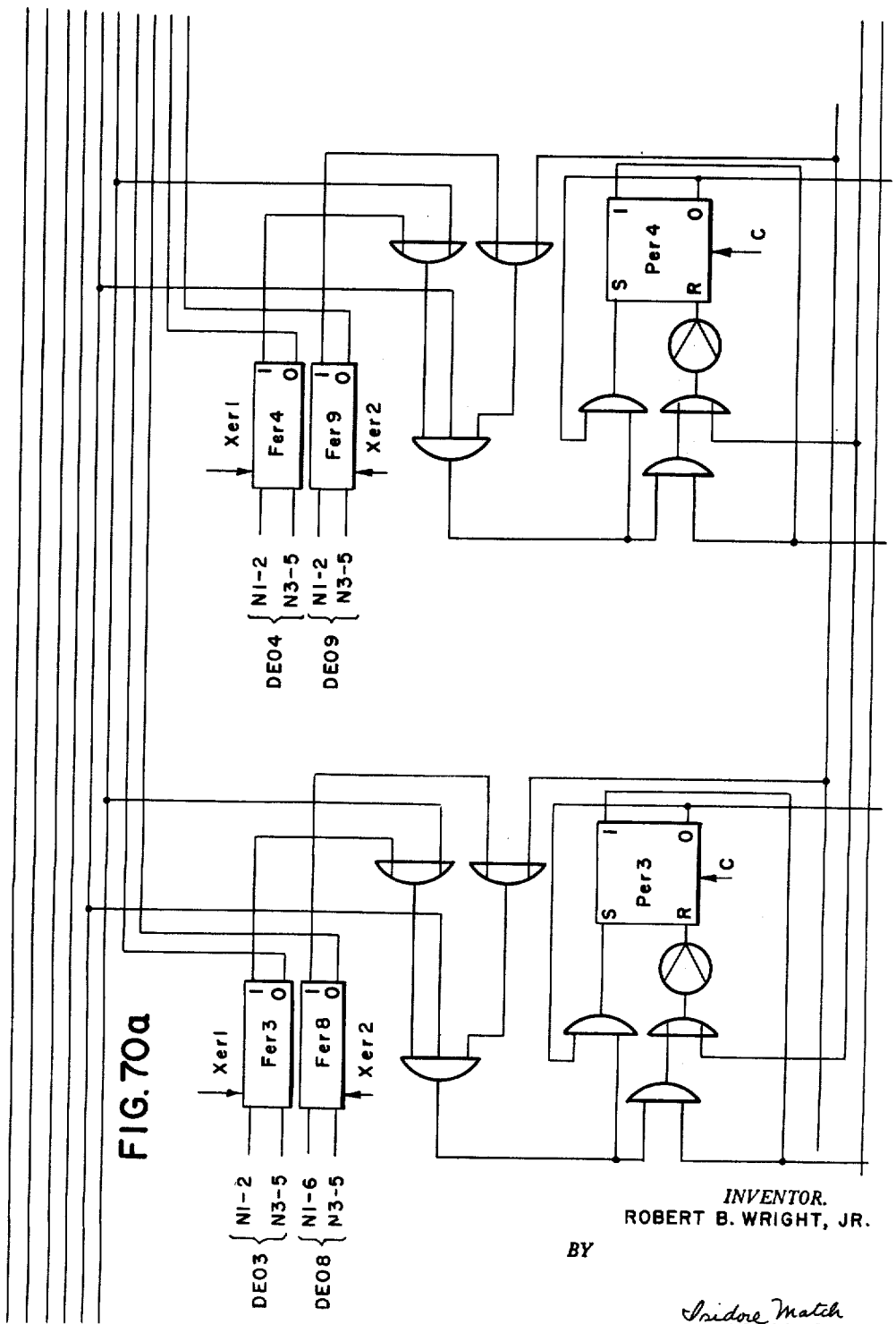

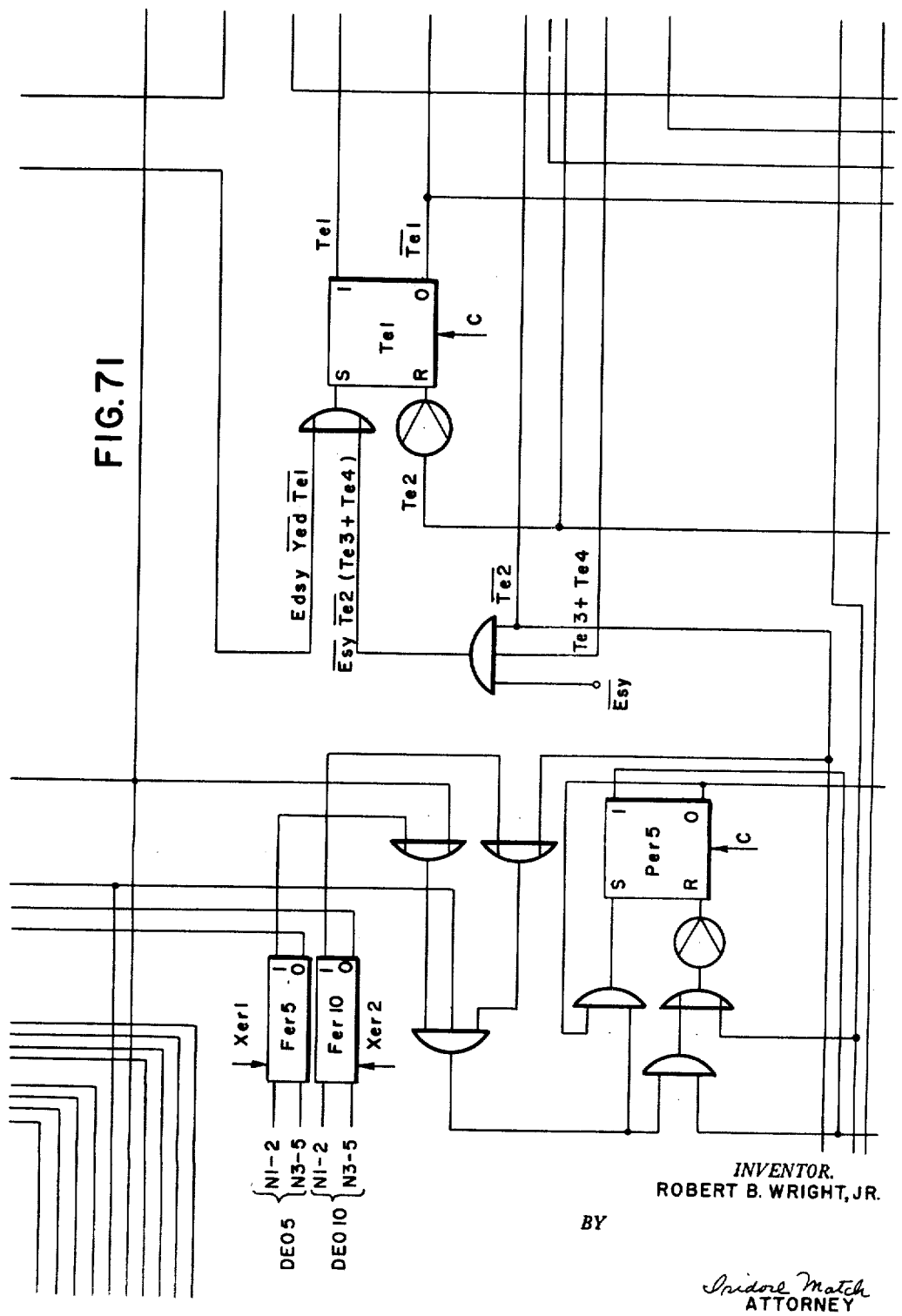

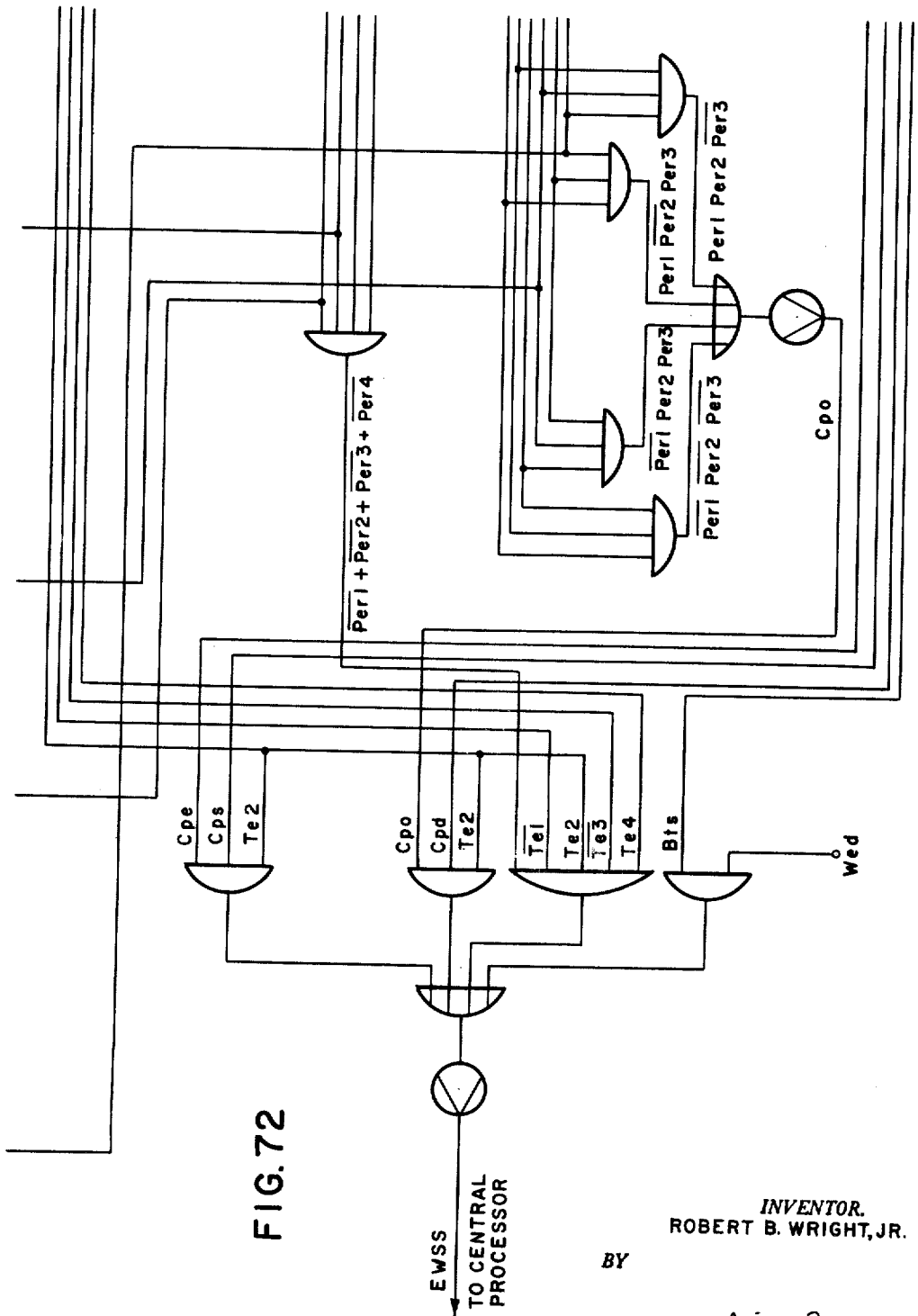

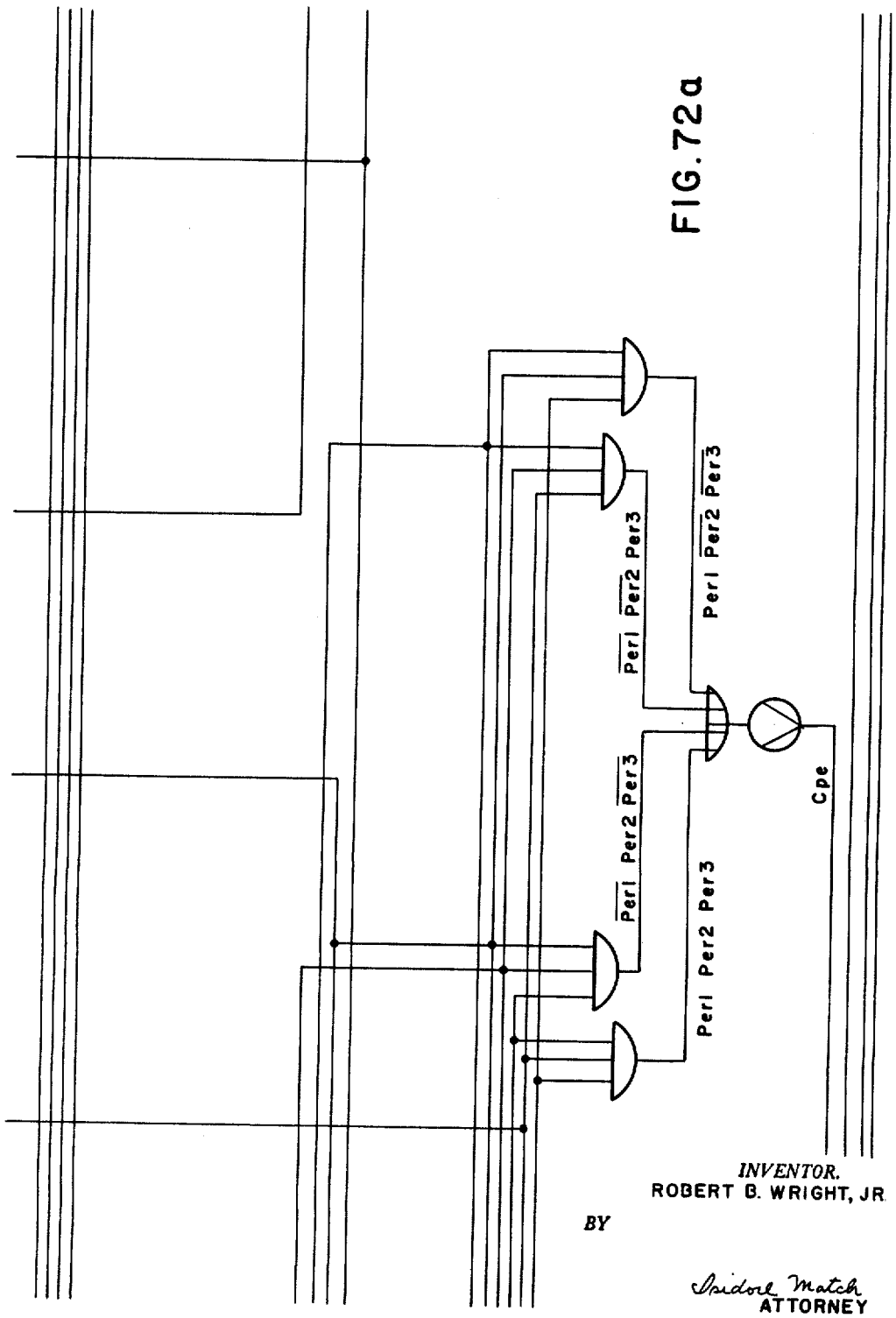

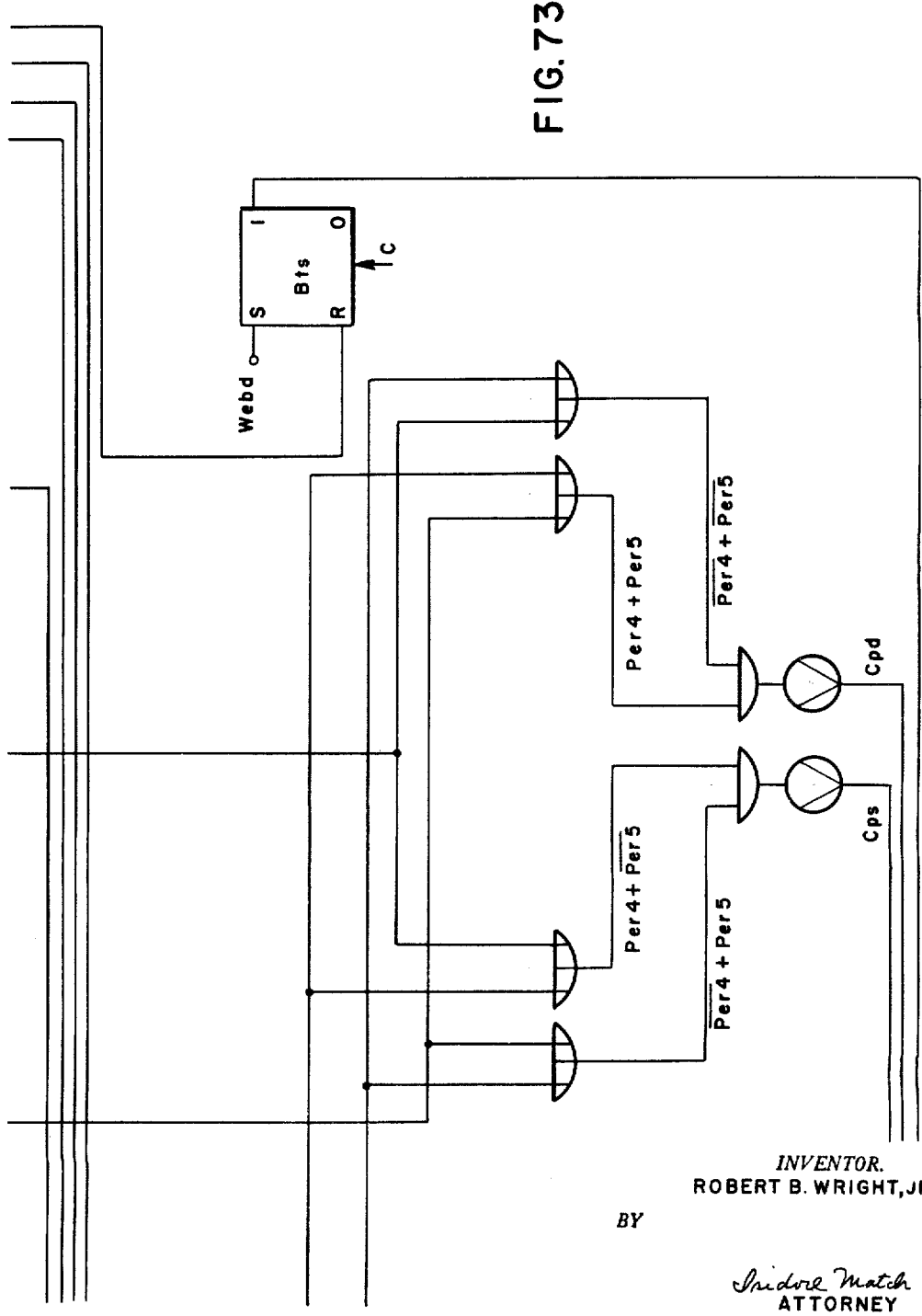

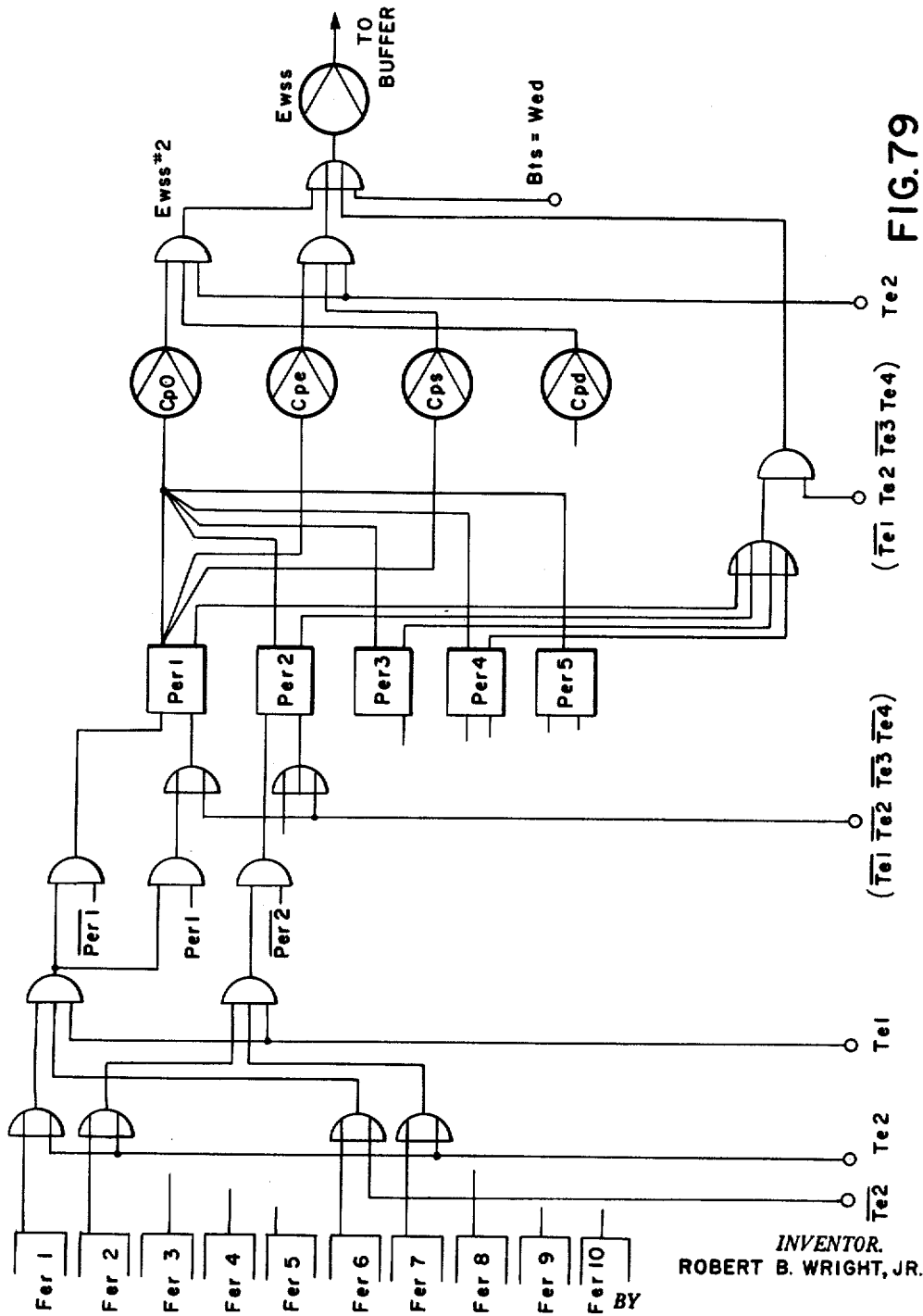

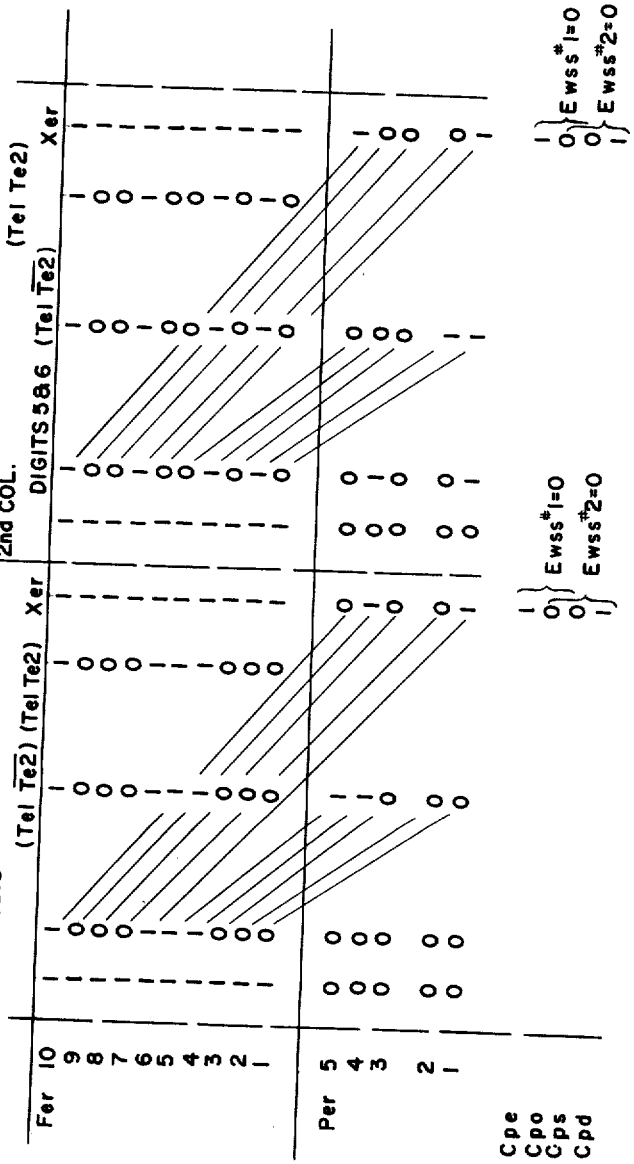

Dec. 1, 1964    R. B. WRIGHT, JR    3,159,819
TAPE CONTROL SYSTEM
Filed July 29, 1960    100 Sheets-Sheet 72

\# A14 = XMA M14 + XNA N14 + XArA Ar14 + XAwA Aw14
        + SA A24 + XJI J14

\* A14 = A13 $\overline{A14}$ Cau + ($\overline{A11}$ $\overline{A12}$ $\overline{A13}$ $\overline{A14}$) Cad \* $\overline{A14}$ = A13 A14 Cau + ($\overline{A11}$ $\overline{A12}$ $\overline{A13}$) A14 Cad
\# $\overline{A14}$ = XMA $\overline{IM14}$ + XNA $\overline{N14}$ + XArA $\overline{Ar14}$ + XAwA $\overline{Aw14}$
        + SA $\overline{A24}$ + XJI $\overline{J14}$ + XAtA + Kcc

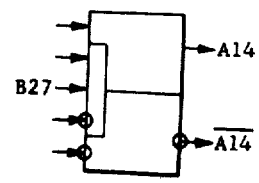

FIG. 83d

\# A13 = XMA M13 + XNA N13 + XArA Ar13 + XAwA Aw13
        + SA A23 + XJI J13 + XAtA Wbk3

\* A13 = A12 A11 Cau + ($\overline{A13}$ $\overline{A12}$ $\overline{A11}$) Cad

\* $\overline{A13}$ = A13 (Cau + Cad)
\# $\overline{A13}$ = XMA $\overline{IM13}$ + XNA $\overline{N13}$ + XArA $\overline{Ar13}$ + XAwA $\overline{Aw13}$
        + SA $\overline{A23}$ + XJI $\overline{J13}$ + XAtA $\overline{Wbk3}$ + Kcc

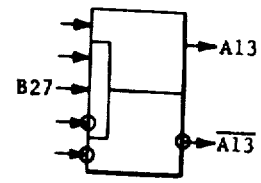

FIG. 83c

\# A12 = XMA M12 + XNA N12 + XArA Ar12 + XAwA Aw12
        + SA A22 + XJI J12 + XAtA Wbk2

\* A12 = $\overline{A12}$ A11 Cau + A13 Cad

\* $\overline{A12}$ = A12 A11 Cau + A12 $\overline{A11}$ Cad
\# $\overline{A12}$ = XMA $\overline{IM12}$ + XNA $\overline{N12}$ + XArA $\overline{Ar12}$ + XAwA $\overline{Aw12}$
        +. SA $\overline{A22}$ + XJI $\overline{J12}$ + XAtA $\overline{Wbk2}$ + Kcc

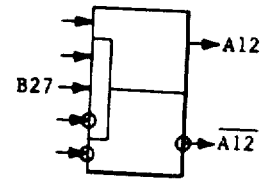

FIG. 83b

\# A11 = XMA M11 + XNA N11 + XArA Ar11 + XAwA Aw11
        + SA A21 + XJI J11 + XAtA Wbk1

\* A11 = $\overline{A13}$ $\overline{A11}$ Cau + (A13 + A12) $\overline{A11}$ Cad \* $\overline{A11}$ = A11 (Cau + Cad)
\# $\overline{A11}$ = XMA $\overline{IM11}$ + XNA $\overline{N11}$ + XArA $\overline{Ar11}$ + XAwA $\overline{Aw11}$
        + SA $\overline{A21}$ + XJI $\overline{J11}$ + XAtA $\overline{Wbk1}$ + Kcc

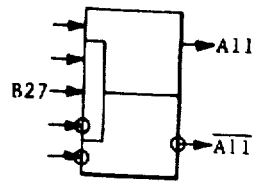

FIG. 83a

INVENTOR.
ROBERT B. WRIGHT, JR.
BY
Isidore Match
ATTORNEY

\# Bts = KSBts
\* Bts = Webd
\* $\overline{Bts}$ = Tel
\# $\overline{Bts}$ = Ktb + KRBts \* Di = [Ncw($\overline{Wt5}$ Wt6)]

\* $\overline{Di}$ = Ncw $\overline{Wt6}$

\# Dtu = KSDtu
\* Dtu = NWL + NSL + NRL

\* $\overline{Dtu}$ = KRA
\# $\overline{Dtu}$ = KRDtu

\# Edsy = KSEdsy
\* Edsy = (Fed $\overline{Edsy}$)

\* $\overline{Edsy}$ = (Tel Te2)
\# $\overline{Edsy}$ = Ktb + KREdsy

Cor = KSCor
* Cor = $\overline{\text{Cor}}$ (Cor + Clr + C2r + C3r) + [$\overline{\text{Ymr}}$ $\overline{\text{Y10r}}$]

* $\overline{\text{Cor}}$ = [Cor (I$\overline{\text{Y10r}}$ + Qlr)]
$\overline{\text{Cor}}$ = Ktb + KRCor

FIG. 85a

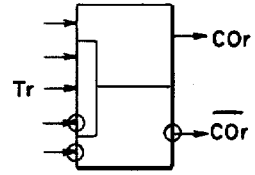

Clr = KSClr
* Clr = [Cor (I$\overline{\text{Y10r}}$ + Qlr)] $\overline{\text{Clr}}$

* $\overline{\text{Clr}}$ = [$\overline{\text{Ymr}}$ $\overline{\text{Y10r}}$] + Cor Clr
$\overline{\text{Clr}}$ = Ktb + KRClr

FIG. 85b

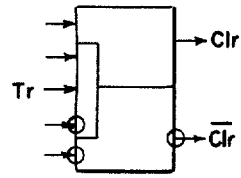

C2r = KSC2r
* C2r = Qlr Cor Clr $\overline{\text{C2r}}$

* $\overline{\text{C2r}}$ = [$\overline{\text{Ymr}}$ $\overline{\text{Y10r}}$] + (Cor Clr C2r)
$\overline{\text{C2r}}$ = Ktb + KRC2r

FIG. 85c

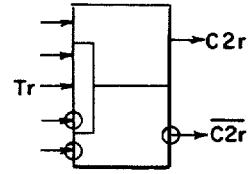

C3r = KSC3r
* C3r = Qlr (Cor Clr C2r) $\overline{\text{C3r}}$

* $\overline{\text{C3r}}$ = [$\overline{\text{Ymr}}$ $\overline{\text{Y10r}}$] + (Cor Clr C2r) C3r
$\overline{\text{C3r}}$ = Ktb + KRC3r

FIG. 85d

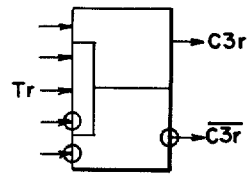

*INVENTOR.*
ROBERT B. WRIGHT, JR.

Dec. 1, 1964   R. B. WRIGHT, JR   3,159,819
TAPE CONTROL SYSTEM
Filed July 29, 1960   100 Sheets-Sheet 75

\# $C0w$ = $KSC0w$
\* $C0w$ = $\overline{C0w}\,(C1w + C2w + C3w) + [\overline{Ymw}\ \overline{Y10w}]$
\* $\overline{C0w}$ = $C0w\,(IY10w + Q1w)$
\# $\overline{C0w}$ = $K1b + KRC0w$

FIG. 86a

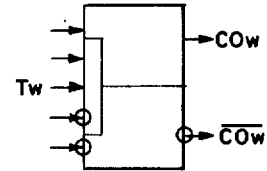

\# $C1w$ = $KSC1w$
\* $C1w$ = $[\overline{C0w\,(IY10w + Q1w)}]\ \overline{C1w}$
\* $\overline{C1w}$ = $[\overline{Ymw}\ \overline{Y10w}] + C0w\ C1w$
\# $\overline{C1w}$ = $K1b + KRC1w$

FIG. 86b

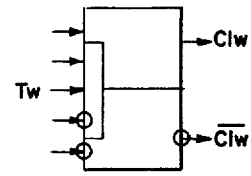

\# $C2w$ = $KSC2w$
\* $C2w$ = $Q1w\ C0w\ C1w\ \overline{C2w}$
\* $\overline{C2w}$ = $[\overline{Ymw}\ \overline{Y10w}] + [(C0w\ C1w)\cdot C2w]$
\# $\overline{C2w}$ = $K1b + KRC2w$

FIG. 86c

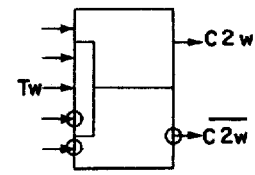

\# $C3w$ = $KSC3w$
\* $C3w$ = $Q1w\ [(C0w\ C1w)\ C2w]\ \overline{C3w}$
\* $\overline{C3w}$ = $[\overline{Ymw}\ \overline{Y10w}] + [(C0w\ C1w)\ C2w]\ C3w$
\# $\overline{C3w}$ = $K1b + KRC3w$

FIG. 86d

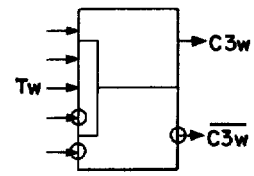

INVENTOR.
ROBERT B. WRIGHT, JR.
BY
Isidore Match
ATTORNEY

Dec. 1, 1964   R. B. WRIGHT, JR   3,159,819
TAPE CONTROL SYSTEM
Filed July 29, 1960   100 Sheets-Sheet 76

\* Dsy2 = Rds2 $\overline{\text{Ytd2}}$ $\overline{\text{Dsy2}}$ Rsy

\* $\overline{\text{Dsy2}}$ = Rds2 Dsy2

\# $\overline{\text{Dsy2}}$ = Ktb

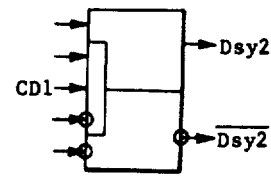

FIG. 88 b

\* Dsy1 = Rds1 $\overline{\text{Ytd1}}$ $\overline{\text{Dsy1}}$ Rsy

\* $\overline{\text{Dsy1}}$ = Rds1 Dsy1

\# $\overline{\text{Dsy1}}$ = Ktb

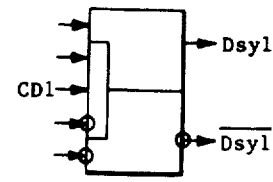

FIG. 88 a

\* Rds2 = ($\overline{\text{Ftr6}}$ + $\overline{\text{Ftr7}}$ + $\overline{\text{Ftr8}}$ + $\overline{\text{Ftr9}}$ + $\overline{\text{Ftr10}}$) $\overline{\text{Dsy2}}$ $\overline{\text{Rds2}}$
  + Dsy2 $\overline{\text{Ytd2}}$ $\overline{\text{Rds2}}$ \* $\overline{\text{Rds2}}$ = Rds2

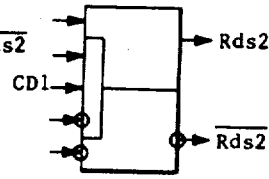

FIG. 89 b

\* Rds1 = ($\overline{\text{Ftr1}}$ + $\overline{\text{Ftr2}}$ + $\overline{\text{Ftr3}}$ + $\overline{\text{Ftr4}}$ + $\overline{\text{Ftr5}}$) $\overline{\text{Dsy1}}$ $\overline{\text{Rds1}}$
  + Dsy1 $\overline{\text{Ytd1}}$ $\overline{\text{Rds1}}$ \* $\overline{\text{Rds1}}$ = Rds1

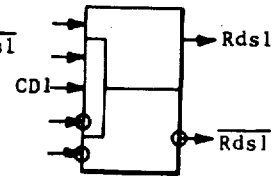

FIG. 89 a

INVENTOR.
ROBERT B. WRIGHT, JR.

BY

Isidore Match
ATTORNEY.

Dec. 1, 1964   R. B. WRIGHT, JR   3,159,819
TAPE CONTROL SYSTEM
Filed July 29, 1960   100 Sheets-Sheet 77

\# Esy = KSEsy
\* Esy = Nbw [Wt5 + (Wt5 $\overline{Wt6}$)]

\* $\overline{Esy}$ = WL + Naw $\overline{Wt6}$ + Ncw $\overline{Wt5}$ Wsy
\# $\overline{Esy}$ = Ktb + KREsy

FIG. 92

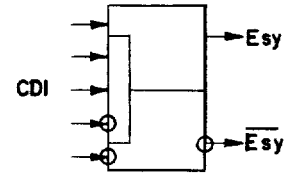

\# Fam = KSFam
\* Fam = Mea $\overline{Fam}$ $\overline{Q2w}$ + Q1w Q2w $\overline{Ysdw}$ \* $\overline{Fam}$ = Fam
\# $\overline{Fam}$ = Ktb + KRFam

FIG. 93

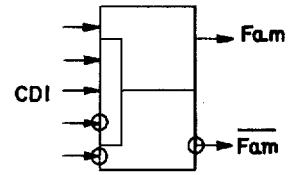

\# Fed = KSFed
\* Fed = ($\overline{Fer1}$ + $\overline{Fer2}$ + $\overline{Fer3}$ + $\overline{Fer4}$ + $\overline{Fer5}$ + $\overline{Fer6}$ + $\overline{Fer7}$ + $\overline{Fer8}$ + $\overline{Fer9}$ + $\overline{Fer10}$) Esy $\overline{Fed}$ ($\overline{Wt5}$ $\overline{Wt6}$) Di \* $\overline{Fed}$ = (Te1 Te2)
\# $\overline{Fed}$ = Ktb + KRFed

FIG. 94

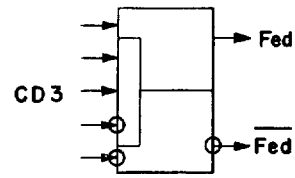

\# Frm = KSFrm
\* Frm = $\overline{Mra}$ $\overline{Frm}$

\* $\overline{Frm}$ = Frm
\# $\overline{Frm}$ = Ktb + KRFrm

FIG. 95

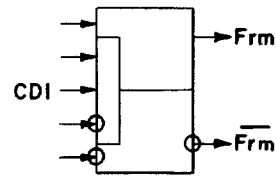

*INVENTOR.*
ROBERT B. WRIGHT, JR.

BY

*Isidore Match*
ATTORNEY

Dec. 1, 1964  R. B. WRIGHT, JR  3,159,819
TAPE CONTROL SYSTEM
Filed July 29, 1960  100 Sheets-Sheet 78

Per1 = KSPer1
*Per1 = [(Fer1 + Te2)(Fer6 + $\overline{Te2}$) Te1] $\overline{Per1}$

*$\overline{Per1}$ = [(Fer1 + Te2)(Fer6 + $\overline{Te2}$) Te1] Per2 + ($\overline{Te1}$ $\overline{Te2}$ $\overline{Te3}$ $\overline{Te4}$)
$\overline{Per1}$ = Ktb + KRPer1

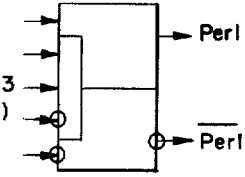

FIG. 96a

Per2 = KSPer2
*Per2 = [(Fer2 + Te2)(Fer7 + $\overline{Te2}$) Te1] $\overline{Per2}$

*$\overline{Per2}$ = [(Fer2 + Te2)(Fer7 + $\overline{Te2}$) Te1] Per2 + ($\overline{Te1}$ $\overline{Te2}$ $\overline{Te3}$ $\overline{Te4}$)
$\overline{Per2}$ = Ktb + KRPer2

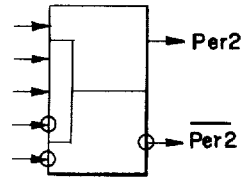

FIG. 96b

Per3 = KSPer3
*Per3 = [(Fer3 + Te2)(Fer8 + $\overline{Te2}$) Te1] $\overline{Per3}$

*$\overline{Per3}$ = [(Fer3 + Te2)(Fer8 + $\overline{Te2}$) Te1] Per3 + ($\overline{Te1}$ $\overline{Te2}$ $\overline{Te3}$ $\overline{Te4}$)
$\overline{Per3}$ = Ktb + KRPer3

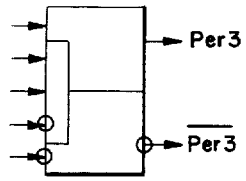

FIG. 96c

Per4 = KSPer4
*Per4 = [(Fer4 + Te2)(Fer9 + $\overline{Te2}$ Te1] $\overline{Per4}$

*$\overline{Per4}$ = [(Fer4 + Te2)(Fer9 + $\overline{Te2}$) Te1] Per4 + ($\overline{Te1}$ $\overline{Te2}$ $\overline{Te3}$ $\overline{Te4}$)
$\overline{Per4}$ = Ktb + KRPer4

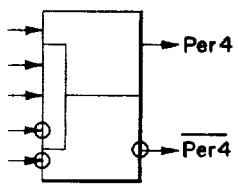

FIG. 96d

*INVENTOR.*
ROBERT B. WRIGHT, JR.

BY

Isidore Match
ATTORNEY

FIG.96e

\# Per5 = KSPer5
\* Per5 = [(Fer5+Te2)(Fer10+$\overline{Te2}$)Te1] $\overline{Per5}$ \* $\overline{Per5}$ = [(Fer5+Te2)(Fer10+$\overline{Te2}$)Te1] Per5+($\overline{Te1}\,\overline{Te2}\,\overline{Te3}\,\overline{Te4}$)
\# $\overline{Per5}$ = Ktb+KRPer5

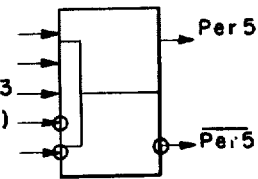

FIG.107a

\# RL = KSRb
\* RL = NrL+Rp[(Nbr Rsy)+(Ncr $\overline{Rsy}$)]

\* $\overline{RL}$ = KRA+KRAR
\# $\overline{RL}$ = Ktb+KRRb

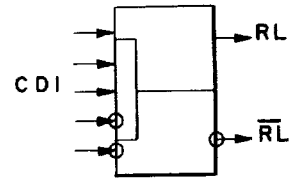

FIG.107b

\# WL = KSWL
\* WL = NWL+WpAA

\* $\overline{WL}$ = KRA+KRAR
\# $\overline{WL}$ = Ktb+KRWL

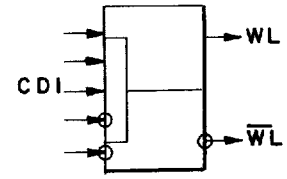

FIG.107c

\# SL = KSSL
\* SL = NSL

\* $\overline{SL}$ = KRA
\# $\overline{SL}$ = Ktb KRSL

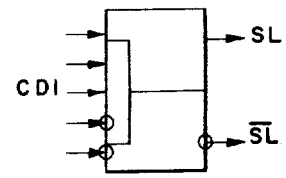

*INVENTOR.*
ROBERT B. WRIGHT, JR.

BY

*Isidore Match*
ATTORNEY

Dec. 1, 1964    R. B. WRIGHT, JR    3,159,819
TAPE CONTROL SYSTEM
Filed July 29, 1960    100 Sheets-Sheet 80

\# Q1r = KSQ1r  
\* Q1r = $\overline{IY1Or}$ Frm $\overline{Q2r}$

\* $\overline{Q1r}$ = Q2r  
\# $\overline{Q1r}$ = Ktb + KRQ1r

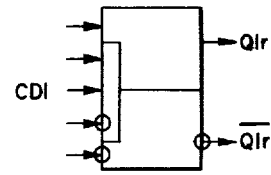

FIG. 97a

\# Q2r = KSQ2r  
\* Q2r = $\overline{Q2r}$ $\overline{Ymr}$ Q1r

\* $\overline{Q2r}$ = Q2r (C0r + C1r + C2r + C3r) + $\overline{Rb}$  
\# $\overline{Q2r}$ = Ktb + KRQ2r

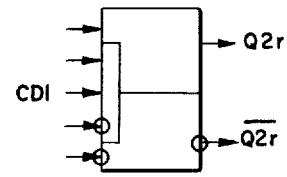

FIG. 97b

\# Q1w = KSQ1w  
\* Q1w = $\overline{IY1Ow}$ Fam $\overline{Q2w}$

\* $\overline{Q1w}$ = Q2w  
\# $\overline{Q1w}$ = Ktb + KRQ1w

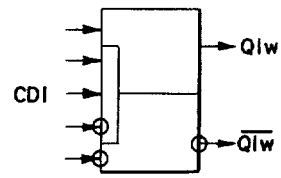

FIG. 98a

\# Q2w = KSQ2w  
\* Q2w = $\overline{Q2w}$ $\overline{Ymw}$ Q1w

\* $\overline{Q2w}$ = (Q2w Fam)  
\# $\overline{Q2w}$ = Ktb + KRQ2w

FIG. 98b

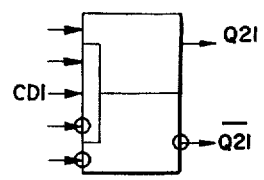

*INVENTOR.*  
ROBERT B. WRIGHT, JR.  
BY  
*Isidore Match*  
ATTORNEY

Dec. 1, 1964   R. B. WRIGHT, JR   3,159,819
TAPE CONTROL SYSTEM

Filed July 29, 1960      100 Sheets-Sheet 81

\# Rin6 = SRin

\* $\overline{\text{Rin6}}$ = (Rds2 Dsy2) $\overline{\text{Ftr6}}$

FIG. 101f

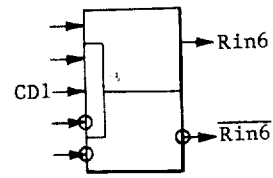

\# Rin5 = SRin Rin10
\* Rin5 = (Rds1 Dsy1) Ftr5

\* $\overline{\text{Rin5}}$ = (Rds1 Dsy1) $\overline{\text{Ftr5}}$
\# $\overline{\text{Rin5}}$ = SRin $\overline{\text{Rin10}}$

FIG. 101e

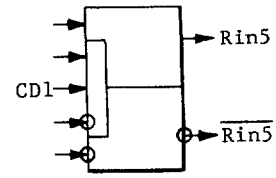

Rb = Ksrb

\*Rb = Nrb

\*$\overline{\text{Rb}}$ = Red + Rt3 (Rt1 + Rt2)
\#$\overline{\text{Rb}}$ = Ktb

FIG. 99

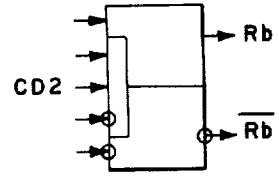

\*Reb = Rebd

\*$\overline{\text{Reb}}$ = Red Reb $\overline{\text{Cha}}$ + Cha Cfs Eoc
\#$\overline{\text{Reb}}$ = Ktb

FIG. 100

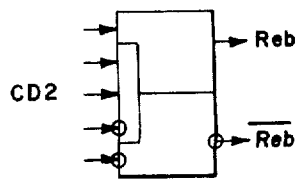

*INVENTOR.*
ROBERT B. WRIGHT, JR.
BY
*Isidore Match*
*ATTORNEY.*

Dec. 1, 1964    R. B. WRIGHT, JR    3,159,819
TAPE CONTROL SYSTEM

Filed July 29, 1960    100 Sheets-Sheet 82

\# $Rin4 = SRin\ Rin9$
\* $Rin4 = Ftr4$

\* $\overline{Rin4} = \overline{Ftr4}$
\# $\overline{Rin4} = SRin\ \overline{Rin9}$

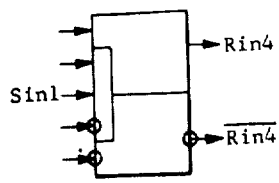

FIG. 101d

\# $Rin3 = SRin\ Rin8$
\* $Rin3 = Ftr3$

\* $\overline{Rin3} = \overline{Ftr3}$
\# $\overline{Rin3} = SRin\ \overline{Rin8}$

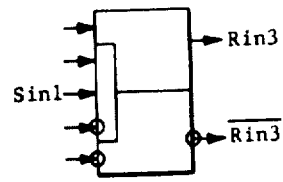

FIG. 101c

\# $Rin2 = SRin\ Rin7$
\* $Rin2 = Ftr2$

\* $\overline{Rin2} = \overline{Ftr2}$
\# $\overline{Rin2} = SRin\ \overline{Rin7}$

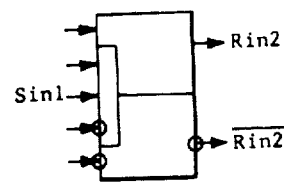

FIG. 101b

\# $Rin1 = SRin\ Rin6$
\* $Rin1 = Ftr1$

\* $\overline{Rin1} = \overline{Ftr1}$
\# $\overline{Rin1} = SRin\ \overline{Rin6}$

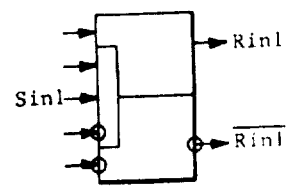

FIG. 101a

*INVENTOR.*
ROBERT B WRIGHT, JR.

BY

*Isidore Match*
*ATTORNEY.*

Dec. 1, 1964   R. B. WRIGHT, JR   3,159,819
TAPE CONTROL SYSTEM
Filed July 29, 1960                      100 Sheets-Sheet 83

\# Rin10 = SRin

\* $\overline{\text{Rin10}}$ = $\overline{\text{Ftr10}}$

\# Rin9 = SRin

\* $\overline{\text{Rin9}}$ = $\overline{\text{Ftr9}}$

\# Rin8 = SRin

\* $\overline{\text{Rin8}}$ = $\overline{\text{Ftr8}}$

\# Rin7 = SRin

\* $\overline{\text{Rin7}}$ = $\overline{\text{Ftr7}}$

*INVENTOR.*
ROBERT B. WRIGHT, JR

BY

*Isidore Match*
*ATTORNEY.*

Dec. 1, 1964   R. B. WRIGHT, JR   3,159,819
TAPE CONTROL SYSTEM
Filed July 29, 1960   100 Sheets-Sheet 84

\* Rt4 = Nrb A14

\* $\overline{Rt4}$ = Nrb $\overline{A14}$

$\overline{Rt4}$ = Ktb

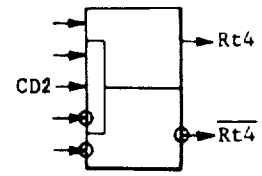

FIG. 102d

\* Rt3 = Nrb A13

\* $\overline{Rt3}$ = Nrb $\overline{A13}$

$\overline{Rt3}$ = Ktb

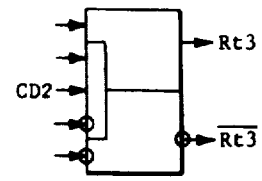

FIG. 102c

\* Rt2 = Nrb A12

\* $\overline{Rt2}$ = Nrb $\overline{A12}$

$\overline{Rt2}$ = Ktb

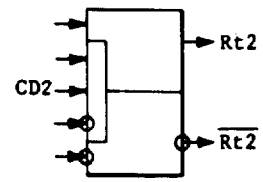

FIG. 102b

\* Rt1 = Nrb A11

\* $\overline{Rt1}$ = Nrb $\overline{A11}$

$\overline{Rt1}$ = Ktb

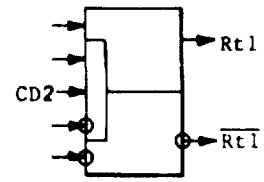

FIG. 102a

*INVENTOR.*
ROBERT B. WRIGHT, JR.

BY

*Isidore Match*
ATTORNEY.

Dec. 1, 1964   R. B. WRIGHT, JR   3,159,819
TAPE CONTROL SYSTEM
Filed July 29, 1960   100 Sheets-Sheet 85

\*S4 = Rmt $\overline{A14}$ A13 $\overline{A12}$ $\overline{A11}$

\*$\overline{S4}$ = NBtd4

$\overline{S4}$ = Ktb

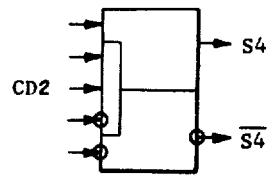

FIG. 103 d

\*S3 = Rmt $\overline{A14}$ $\overline{A13}$ A12 A11

\*$\overline{S3}$ = NBtd3

$\overline{S3}$ = Ktb

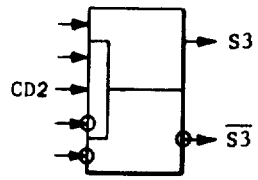

FIG. 103 c

\*S2 = Rmt $\overline{A14}$ $\overline{A13}$ A12 $\overline{A11}$

\*$\overline{S2}$ = NBtd2

$\overline{S2}$ = Ktb

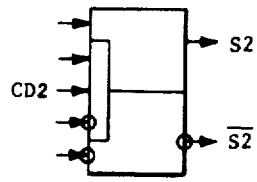

FIG. 103 b

\*S1 = Rmt $\overline{A14}$ $\overline{A13}$ $\overline{A12}$ A11

\*$\overline{S1}$ = NBtd1

$\overline{S1}$ = Ktb

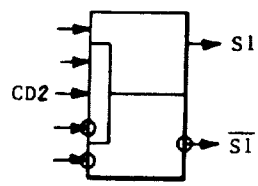

FIG. 103 a

*INVENTOR.*
ROBERT B. WRIGHT, JR.

BY

*Isidore Match*
*ATTORNEY.*

Dec. 1, 1964   R. B. WRIGHT, JR   3,159,819
TAPE CONTROL SYSTEM
Filed July 29, 1960   100 Sheets-Sheet 86

*S8 = Rmt A14 $\overline{A13}$ A12 A11

*$\overline{S8}$ = NBtd8

$\overline{S8}$ = Ktb

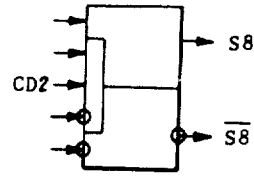

FIG. 103h

*S7 = Rmt A14 $\overline{A13}$ A12 $\overline{A11}$

*$\overline{S7}$ = NBtd7

$\overline{S7}$ = Ktb

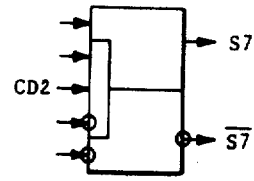

FIG. 103g

*S6 = Rmt A14 $\overline{A13}$ $\overline{A12}$ A11

*$\overline{S6}$ = NBtd6

$\overline{S6}$ = Ktb

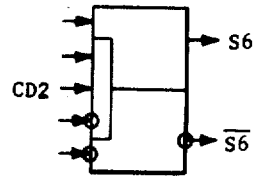

FIG. 103f

*S5 = Rmt A14 $\overline{A13}$ $\overline{A12}$ $\overline{A11}$

*$\overline{S5}$ = NBtd5

$\overline{S5}$ = Ktb

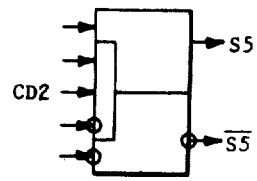

FIG. 103e

*INVENTOR.*
ROBERT B. WRIGHT, JR.
BY
*Isidore Match*
*ATTORNEY.*

Dec. 1, 1964         R. B. WRIGHT, JR         3,159,819
                     TAPE CONTROL SYSTEM
Filed July 29, 1960                          100 Sheets-Sheet 87

$*S0 = \text{Rmt } \overline{A14}\ \overline{A13}\ \overline{A12}\ \overline{A11}$ $*\overline{S0} = \text{NBtd0}$
$\#\overline{S0} = \text{Ktb}$

FIG. 103 j

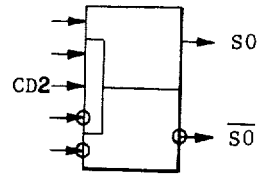

$*S9 = \text{Rmt } A14\ A13\ \overline{A12}\ \overline{A11}$ $*\overline{S9} = \text{NBtd9}$
$\#\overline{S9} = \text{Ktb}$

FIG. 103 i

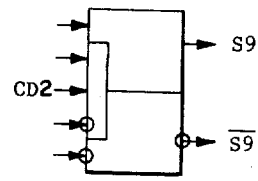

$\#Wb = \text{KSWb}$ $*Wb = \text{Nwb}$ $*\overline{Wb} = \text{Wed} + \text{Wt3 (Wt1 + Wt2)}$
$\#\overline{Wb} = \text{Ktb}$

FIG. 105

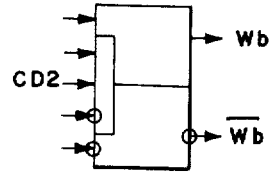

$*\text{Web} = \text{Webd} + \text{Bkt} + \text{Ert}$ $*\overline{\text{Web}} = \text{Web Wed } \overline{\text{Prt}}$
$\quad\quad + (\text{Tw6 Tw5 Tw4 Tw3 Wbk3 } \overline{\text{Wbk2}}\ \text{Wbk1}) \text{Bbf Web}$
$\#\overline{\text{Web}} = \text{Ktb}$

FIG. 106

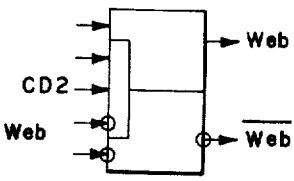

*INVENTOR.*
ROBERT B. WRIGHT, JR.

BY

Isidore Match
*ATTORNEY.*

Dec. 1, 1964  R. B. WRIGHT, JR  3,159,819
TAPE CONTROL SYSTEM

Filed July 29, 1960  100 Sheets-Sheet 88

FIG. 104a

\# Te1 = KSTe1
\* Te1 = $\overline{Edsy}$ $\overline{Yed}$ $\overline{Te1}$ + $\overline{Esy}$ $\overline{Te2}$ (Te3 + Te4)

\* $\overline{Te1}$ = Te2
\# $\overline{Te1}$ = Ktb + KRTe2

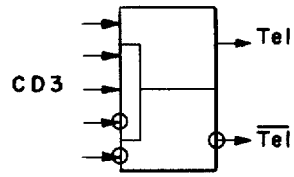

FIG. 104b

\# Te2 = KSTe2
\* Te2 = Te1

\* $\overline{Te2}$ = ($\overline{Te1}$ Te2)
\# $\overline{Te2}$ = Ktb + KRTe2

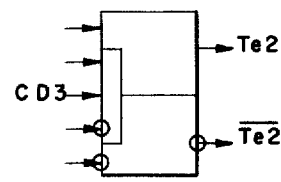

FIG. 104c

\# Te3 = KSTe3
\* Te3 = $\overline{Te4}$ ($\overline{Te1}$ Te2)

\* $\overline{Te3}$ = Te4 ($\overline{Te1}$ Te2)
\# $\overline{Te3}$ = Ktb + KRTe3

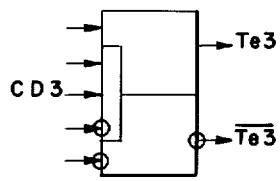

FIG. 104d

\# Te4 = KSTe4
\* Te4 = Te3 ($\overline{Te1}$ Te2)

\* $\overline{Te4}$ = $\overline{Te3}$ ($\overline{Te1}$ Te2)
\# $\overline{Te4}$ = Ktb + KRTe4

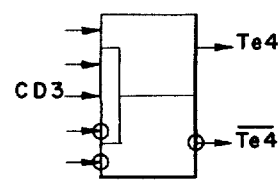

*INVENTOR.*
ROBERT B. WRIGHT, JR.

BY

Isidore Match
ATTORNEY

Dec. 1, 1964   R. B. WRIGHT, JR   3,159,819
TAPE CONTROL SYSTEM
Filed July 29, 1960   100 Sheets-Sheet 89

FIG. 108a

\# Rp = KSRp
\* Rp = INrp

\* $\overline{Rp}$ = $\overline{INrp}$
\# $\overline{Rp}$ = Ktb+KRRp

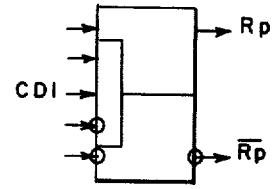

FIG. 108b

\# Wp = KSWp
\* Wp = INwp

\* $\overline{Wp}$ = $\overline{INwp}$
\# $\overline{Wp}$ = Ktb+KRWp

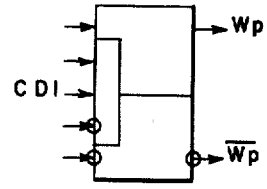

FIG. 109a

\# Rsy = KSRsy
\* Rsy = Nbr

\* $\overline{Rsy}$ = Red
\# $\overline{Rsy}$ = Ktb+KRRsy

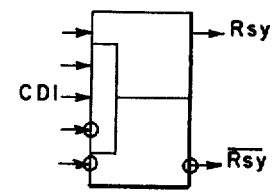

FIG. 109b

\# Wsy = KSWsy
\* Wsy = Naw($\overline{Wt5}$ $\overline{Wt6}$)+ [Ncw($\overline{Wt5}$ Wt6)]

\* $\overline{Wsy}$ = Ncw $\overline{Wt6}$ + WL
\# $\overline{Wsy}$ = Ktb+KRWsy

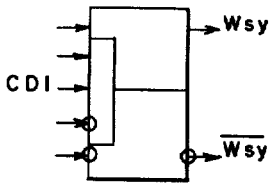

FIG. 110e

\# Wt5 = KSWt5
\* Wt5 = $\overline{Wb}$(Ert+Bkt)

\* $\overline{Wt5}$ = Ncw(Wt5 Wt6)+[Naw(Wt5 $\overline{Wt6}$)]+WL
\# $\overline{Wt5}$ = Ktb+KRWt5

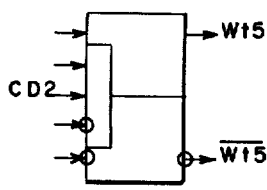

FIG. 110f

\# Wt6 = KSWt6
\* Wt6 = $\overline{Wb}$ Ert

\* $\overline{Wt6}$ = [Ncw($\overline{Wt5}$ Wt6)] +WL
\# $\overline{Wt6}$ = Ktb+KRWt6

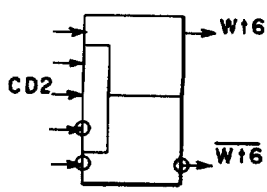

*INVENTOR.*
ROBERT B. WRIGHT, JR.
BY
*Isidore Match*
ATTORNEY

Dec. 1, 1964  R. B. WRIGHT, JR  3,159,819
TAPE CONTROL SYSTEM
Filed July 29, 1960  100 Sheets-Sheet 90
\*Wt4 = Nwb A14
$\overline{*Wt4}$ = Nwb $\overline{A14}$
Wt4 = Ktb
FIG. 110d
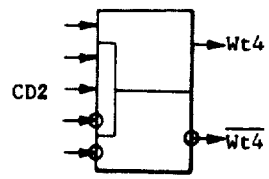
\*Wt3 = Nwb A13
$\overline{*Wt3}$ = Nwb $\overline{A13}$
Wt3 = Ktb
FIG. 110c
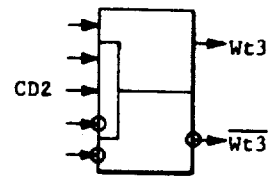
\*Wt2 = Nwb A12
$\overline{*Wt2}$ = Nwb $\overline{A12}$
Wt2 = Ktb
FIG. 110b
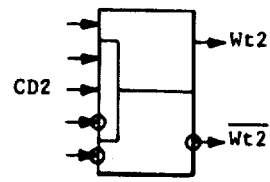
\*Wt1 = Nwb A11
$\overline{*Wt1}$ = Nwb $\overline{A11}$
Wt1 = Ktb
FIG. 110a
*INVENTOR.*
ROBERT B. WRIGHT, JR
BY
*Isidore Match*
*ATTORNEY.*

$*Y10r = [\overline{Y60r}](+6)$ $*Y10w = [\overline{Y60w}](+6)$ $*Y60r = \overline{Ymr}\ \overline{Y10r}$ $*Y60w = \overline{Ymw}\ \overline{Y10w}$ Dec. 1, 1964    R. B. WRIGHT, JR    3,159,819
TAPE CONTROL SYSTEM Filed July 29, 1960

$*Y_{dr} = N_{rp} R_p$ $*Y_{dw} = N_{wp} \overline{W_p} + [N_{cw}(\overline{W_{t5}} W_{t6})]$ $*Y_{ed} = (F_{ed} \overline{E_{sdy}})$ $*Y_{mr} = \overline{IY_{10r}}$ $*Y_{mw} = \overline{IY_{10w}}$

INVENTOR.
ROBERT B. WRIGHT, JR.

BY

Isidore Match
ATTORNEY

Dec. 1, 1964    R. B. WRIGHT, JR    3,159,819
TAPE CONTROL SYSTEM
Filed July 29, 1960    100 Sheets-Sheet 93

\* Ytd1 = Rds1 $\overline{\text{Ytd1}}$ $\overline{\text{Dsy1}}$ Rsy

\* Ytd2 = Rds2 $\overline{\text{Ytd2}}$ $\overline{\text{Dsy2}}$ Rsy

✷ Ysdr = Ncr Q1r

✷ Ysdw = Q1w Q2w($\overline{\text{C3w}}$ $\overline{\text{C2w}}$ $\overline{\text{C1w}}$ $\overline{\text{C0w}}$) $\overline{\text{W15}}$ + Q1w Q2w W15
(C2w C3w)

INVENTOR.
ROBERT B. WRIGHT, JR
BY
Isidore Match
ATTORNEY.

LOGICAL COMBINATION SIGNALS, TAPE CONTROL SYSTEM $AA = (Naw + Nbw)\left[\overline{(Wt5\ Wt6)}\ Esy + (Wt5\ Wt6)\right] +$ $\quad (Nbw + Ncw)\left[\overline{(Wt5\ Wt6)}\overline{Wsy}\right] + (Naw + Ncw)\left[\overline{(Wt5\ Wt6)}\overline{Esy}\ Wsy\right]$ $\quad + Esy\ (Nbw + Ncw\ Wt5)\ \overline{CaL} + Naw\ \overline{Esy}\ (Wt5 + Wt6)\ \overline{CaL}$ $Atd = SL + RL + WL$ $CaL = \overline{CaL}\ (From\ Calibrate\ Switch) + -5\ VOLTS$ $Cpd = (Per4 + Per5)(\overline{Per4} + \overline{Per5})$ $Cpe = Per1\ Per2\ Per3 + \overline{Per1}\ Per2\ \overline{Per3} + \overline{Per1}\ \overline{Per2}\ Per3 +$
$\quad Per1\ \overline{Per2}\ \overline{Per3}$ $Cpo = \overline{Per1}\ \overline{Per2}\ \overline{Per3} + \overline{Per1}\ Per2\ Per3 + Per1\ \overline{Per2}\ Per3 + Per1\ Per2\ \overline{Per3}$ $Cps = (\overline{Per4} + Per5)(Per4 + \overline{Per5})$ $DEI = Nbon + Nwon$ $DHR = \overline{Di}\ Nwon$ $DRI = Nron$ $Ewss = Cpe\ Cps\ Te2 + Cpo\ Cpd\ Te2 + (\overline{Per1} + \overline{Per2} + \overline{Per3} + \overline{Per4})$
$\quad \overline{Te1}\ Te2\ \overline{Te3}\ Te4 + Bts\ Wed$ $INrp = Nrp$ $INwp = Nwp$ $Irn = Nsn + Nwp$ $Isn = Nrp + Nwp + Bt$ $Iwn = Nsn + Nrn$ $IY10r = \overline{Y10r}$ $IY10w = \overline{Y10w}$ $Naw = (Q2w\ Fam)\overline{(C2w\ C3w)}$ $Nbd = Wt5 + \overline{(Wt5\ Wt6)}$ $Nbr = Q2r\ C3r\ (C1r + C2r)(\overline{C1r} + \overline{C2r})$ $Nbw = (Q2w\ Fam)\ C3w\ (C1w + C2w)(\overline{C1w} + \overline{C2w})$ $Ncr = Q2r\ \overline{C3r}\ \overline{C2r}\ \overline{C1r}\ \overline{C0r}$ $Ncw = (Q2w\ Fam)\ (\overline{C3w}\ \overline{C2w}\ \overline{C1w}\ \overline{C0w})$

FIG. 124

Dec. 1, 1964   R. B. WRIGHT, JR   3,159,819
TAPE CONTROL SYSTEM
Filed July 29, 1960   100 Sheets-Sheet 95

FIG. 124a $Ned = (\overline{Wt5\ Wt6})\ \overline{Ysdw}$ $Neon = Ned\ \overline{WL}\ [Wp + \overline{Iwn}]\ Non$ $Nrb = Rebd\ \overline{RL}\ \overline{Rb}$ $NrL = Nron\ (\overline{IBt}\ Et + \overline{Tn})$ $Nron = \overline{RL}\ Nrn\ [Rp + \overline{I(Nsn + Nwp)}]$ $Nrp = Nrn\ [Rp + \overline{I(Nsn + Nwp)}]$ $Nson = Nsn\ \overline{Isn}$ $Nwb = [(Webd + Ert + Bkt)\ \overline{WL}\ \overline{Wb}]$ $Nwd = (\overline{Wt5}\ \overline{Wt6})$ $NwL = Nwon\ (Win + \overline{Tn} + \overline{IBt}\ Et) + Nbon\ (Bt + \overline{Tn}) + Neon\ (Bt + Win)$ $Nwon = Nwd\ Non\ \overline{WL}\ [Wp + \overline{I(Nsn + Nrn)}]$ $Nwp = Non\ [Wp + \overline{I(Nsn + Nrn)}]$ $Rdb = (SL + RL + WL) = Atd$ $Red = \overline{Rb}\ Q2r$ $Rev = \overline{WL}\ Nbd\ Non\ \overline{Iwn}$ $Rwd = S1 + S2 + S3 + S4 + S5 + S6 + S7 + S8 + S9 + S0$ $Wed = Ncw\ (\overline{Wt5}\ \overline{Wt6})\ \overline{CaL} + [Naw\ (Wt5\ \overline{Wt6})]$

WRITE BUSS HEAD DRIVERS

| | |
|---|---|
| $Wb1 = Wo1$ | $Wb6 = Wo6$ |
| $\overline{Wb1} = \overline{Wo1}$ | $\overline{Wb6} = \overline{Wo6}$ |
| $Wb2 = Wo2$ | $Wb7 = Wo7$ |
| $\overline{Wb2} = \overline{Wo2}$ | $\overline{Wb7} = \overline{Wo7}$ |
| $Wb3 = Wo3$ | $Wb8 = Wo8$ |
| $\overline{Wb3} = \overline{Wo3}$ | $\overline{Wb8} = \overline{Wo8}$ |
| $Wb4 = Wo4$ | $Wb9 = Wo9$ |
| $\overline{Wb4} = \overline{Wo4}$ | $\overline{Wb9} = \overline{Wo9}$ |
| $Wb5 = Wo5$ | $Wb0 = Wo0$ |
| $\overline{Wb5} = \overline{Wo5}$ | $\overline{Wb0} = \overline{Wo0}$ |

FIG. 127

*INVENTOR.*
ROBERT B. WRIGHT, JR.

BY
*Isidore Match*
ATTORNEY

Dec. 1, 1964  R. B. WRIGHT, JR  3,159,819
TAPE CONTROL SYSTEM
Filed July 29, 1960  100 Sheets-Sheet 96

MULTIPLEX BUFFER - READ

Designated Logical Combination Signals:

$Nr0 = \overline{Rt1}\ \overline{Rt2}\ \overline{Rt3}\ \overline{Rt4}\ Rb$
$Nr1 = \underline{Rt1}\ Rt2\ \overline{Rt3}\ \overline{Rt4}\ Rb$
$Nr2 = \overline{Rt1}\ Rt2\ \overline{Rt3}\ \overline{Rt4}\ Rb$
$Nr3 = \underline{Rt1}\ Rt2\ Rt3\ \overline{Rt4}\ Rb$
$Nr4 = \overline{Rt1}\ \overline{Rt2}\ \overline{Rt3}\ \overline{Rt4}\ Rb$
$Nr5 = \underline{Rt1}\ \overline{Rt2}\ \overline{Rt3}\ Rt4\ Rb$
$Nr6 = \overline{Rt1}\ Rt2\ \overline{Rt3}\ Rt4\ Rb$
$Nr7 = \overline{Rt1}\ Rt2\ \overline{Rt3}\ Rt4\ Rb$
$Nr8 = \underline{Rt1}\ Rt2\ \overline{Rt3}\ Rt4\ Rb$
$Nr9 = \overline{Rt1}\ \overline{Rt2}\ Rt3\ Rt4\ Rb$

FIG. 125

MULTIPLEX BUFFER - WRITE

Designated Logical Combination Signals:

$Na0 = \overline{Wt1}\ \overline{Wt2}\ \overline{Wt3}\ \overline{Wt4}\ Wb$
$Na1 = \underline{Wt1}\ \overline{Wt2}\ \overline{Wt3}\ \overline{Wt4}\ Wb$
$Na2 = Wt1\ \overline{Wt2}\ \overline{Wt3}\ \overline{Wt4}\ Wb$
$Na3 = \underline{Wt1}\ Wt2\ Wt3\ \overline{Wt4}\ Wb$
$Na4 = \overline{Wt1}\ \overline{Wt2}\ \overline{Wt3}\ \overline{Wt4}\ Wb$
$Na5 = \overline{Wt1}\ \underline{Wt2}\ \overline{Wt3}\ Wt4\ Wb$
$Na6 = Wt1\ \overline{Wt2}\ \overline{Wt3}\ Wt4\ Wb$
$Na7 = \overline{Wt1}\ Wt2\ \overline{Wt3}\ Wt4\ Wb$
$Na8 = \overline{Wt1}\ \overline{Wt2}\ Wt3\ Wt4\ Wb$
$Na9 = \overline{Wt1}\ \overline{Wt2}\ Wt3\ Wt4\ Wb$

FIG. 126

*INVENTOR.*
ROBERT B. WRIGHT, JR.
BY
Isidore Match
ATTORNEY

Dec. 1, 1964  R. B. WRIGHT, JR  3,159,819
TAPE CONTROL SYSTEM
Filed July 29, 1960  100 Sheets—Sheet 97

INSTRUCTION 65: READ MAGNETIC TAPE OR CHARACTER READER

INVENTOR.
ROBERT B. WRIGHT, JR.
BY

Dec. 1, 1964    R. B. WRIGHT, JR    3,159,819
TAPE CONTROL SYSTEM
Filed July 29, 1960    100 Sheets-Sheet 98

INSTRUCTION 66: WRITE MAGNETIC TAPE OR LOAD PRINTER

INVENTOR.
ROBERT B. WRIGHT, JR.
BY
Isidore Match
ATTORNEY

Dec. 1, 1964   R. B. WRIGHT, JR   3,159,819
TAPE CONTROL SYSTEM
Filed July 29, 1960   100 Sheets-Sheet 99

INSTRUCTION 67 - ALTER MAGNETIC TAPE

INVENTOR.
ROBERT B. WRIGHT, JR
BY
Isidore Match
ATTORNEY.

Dec. 1, 1964  R. B. WRIGHT, JR  3,159,819
TAPE CONTROL SYSTEM
Filed July 29, 1960  100 Sheets—Sheet 100

INVENTOR.
ROBERT B. WRIGHT, JR.
BY
*Isidore Match*
ATTORNEY

United States Patent Office 3,159,819
Patented Dec. 1, 1964

3,159,819
TAPE CONTROL SYSTEM
Robert B. Wright, Jr., Saratoga, Calif., assignor to General Electric Company, a corporation of New York
Filed July 29, 1960, Ser. No. 46,166
9 Claims. (Cl. 340—172.5)

This invention relates to tape control systems. More particularly, it relates to a system for controlling a plurality of digital tape handlers adapted for use in a data processing system for example, such as the one described in U.S. patent application, S.N. 8,391 for Data Processing System; inventor R. R. Johnson, filed February 12, 1960, now U.S. Patent No. 3,077,984. In the tape control system, data may be caused to be written on, read from, and erased from magnetic tape in several different modes of operation respectively.

Operation of data processing systems in the on-line mode with input-output devices is generally quite inefficient since a relatively high-speed data processor is utilized with relatively low-speed peripheral equipment. Magnetic tape is therefore quite often used as a means for preparing relatively high-speed input and output from a data processor as well as to provide intermediate storage and auxiliary memory.

Data is generally written on magnetic tape in spaced discrete blocks. To insure that such data is correct as written, there should be present an arrangement for enabling the checking of its correctness. In the event that incorrect material is detected as a result of such checking, means should be included to indicate the presence of the incorrect data. In the event that data is purportedly being written on tape, means have to be included to check whether such data has, in fact, been so written.

In those situations where tape is pre-edited, i.e., block markers are written on blank tape independently prior to the writing of the data thereon, means should be provided for enabling the editing of blank tape during on-line operation in the event that pre-edited tape is not readily available. Also, means should be provided for enabling the erasure of tape block markers.

Accordingly, it is an object of this invention to provide means in a digital tape control system for enabling the erasure from magnetic tape of the block markers thereon.

It is a further object to provide an arrangement for checking the correctness of newly written data substantially concurrently with the writing thereof.

It is another object to provide a unitary control for performing both a row parity check for each word of written data and a column parity check for each column of written data.

It is still another object to provide in the checking arrangement set forth in the preceding object, means for controlling the timing of such checking operation.

It is yet another object to provide means for detecting the presence of written data on tape substantially concurrently with a writing operation.

It is another object to provide means for editing tape to indicate the beginning and end of data blocks during on-line operation of a data processor with which the tape control system is operatively associated.

Generally speaking and in accordance with the invention, there is provided a tape control system operatively associated with data processing apparatus. In this tape control system, data from the data processing apparatus is caused to be written on tape in response to a first chosen signal from the data processing apparatus, the data being written in adjacent columns, a prescribed amount of columns comprising a word, a predetermined amount of words comprising a data block whereby each of the corresponding bits of the columns form a row and wherein the written data is caused to be read substantially concurrently with the writing thereof. There are included means in the system to effect a row parity check for each of the words and a column parity check for each of the columns. There is further provided in the system counting means responsive to signals detected when the written data is read by columns which undergoes a counting cycle for each column of a word, the parity checking means functioning to provide respective row and column parity information for each word in response to the settings of the counting means at chosen times during the counting cycle. There is also provided unitary means for controlling both the row and column parity information and there is included means which is responsive to the absence of any signals when said tape is read concurrently with a writing operation for providing an indication of the absence of written data thereon. Means are provided responsive to a second chosen signal from the data processing apparatus for causing data to be erased from the tape and there is also included means for selectively conditioning the system and responsive to the first chosen signal from the data processing apparatus to cause data to be written on the tape for indicating the beginning and end of tape blocks.

The features of this invention, which are believed to be new, are set forth with particularity in the appended claims. The invention itself, however, may best be understood by reference to the following description when taken in conjunction with the accompanying drawings which disclose embodiments of a system according to the invention.

This invention will be described with reference to the accompanying drawings, wherein:

FIG. 4 is a circuit diagram of a flip-flop useful in the system of FIG. 1, and illustrates a symbol employed to represent the flip-flop;

FIG. 5 is a circuit diagram of an AND-gate useful in the system of FIG. 1, and illustrates a symbol employed to represent the AND-gate;

FIG. 6 is a circuit diagram of an OR-gate useful in the system of FIG. 1, and illustrates a symbol employed to represent the OR-gate;

FIG. 7 is a circuit diagram of an inverter useful in the system of FIG. 1, and illustrates a symbol employed to represent the inverter;

Figure 1:
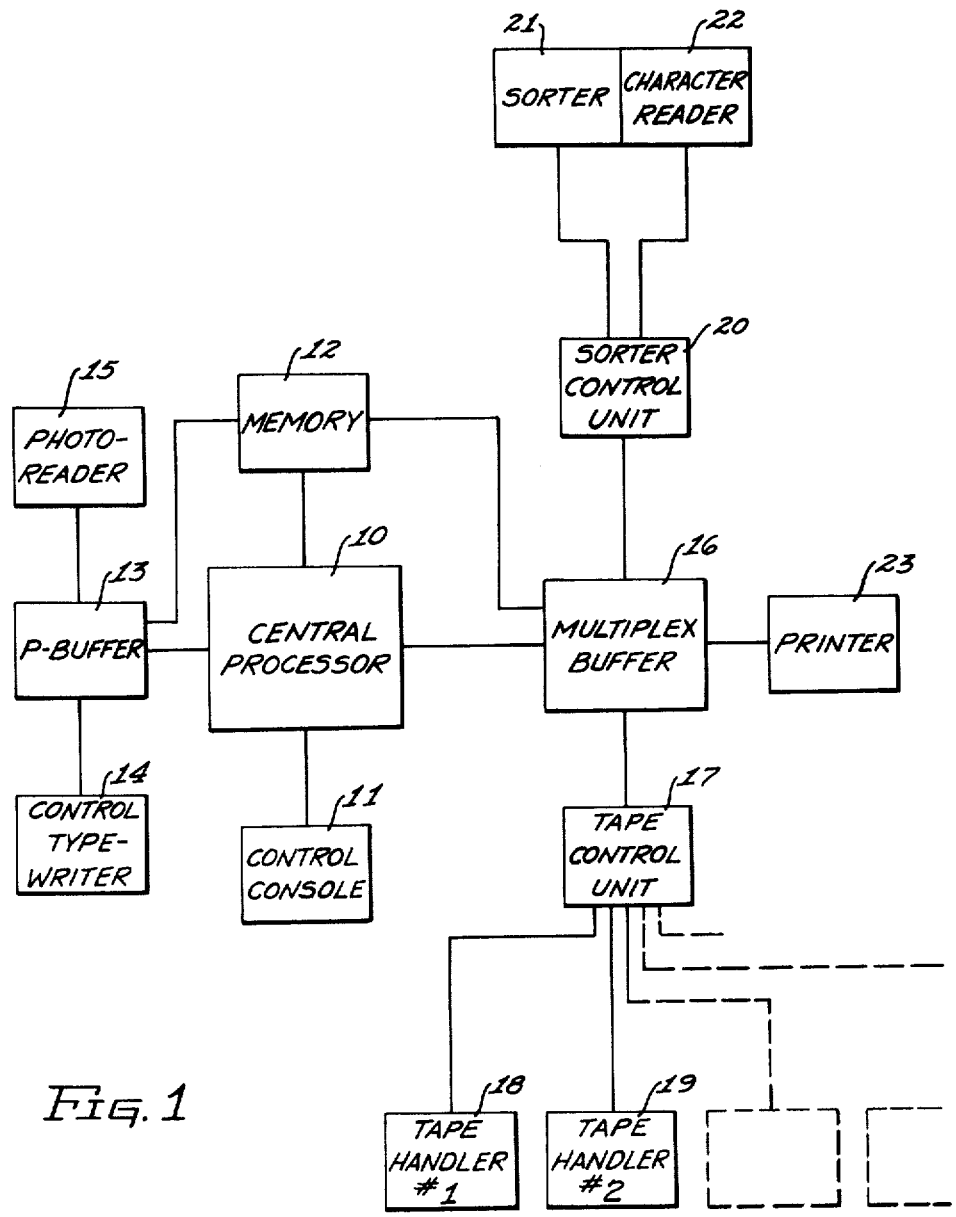
FIG. 1 is a block diagram of a data processing system to which the instant invention is applicable.
Figure 9:
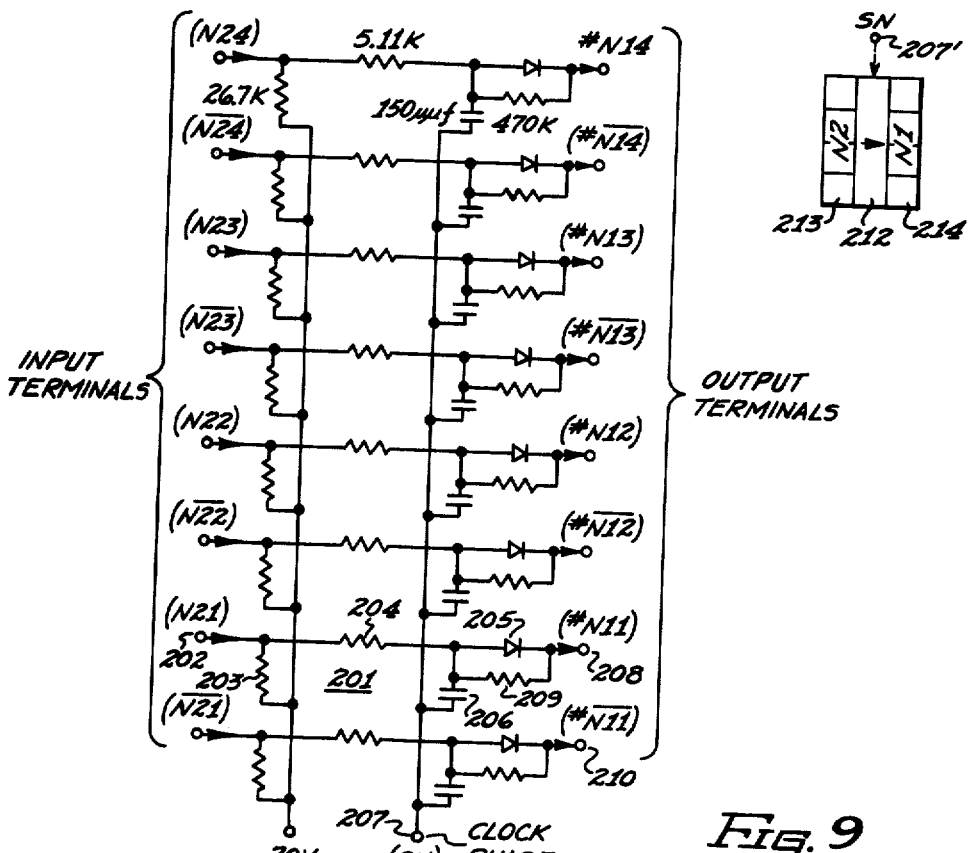
Figure 10:
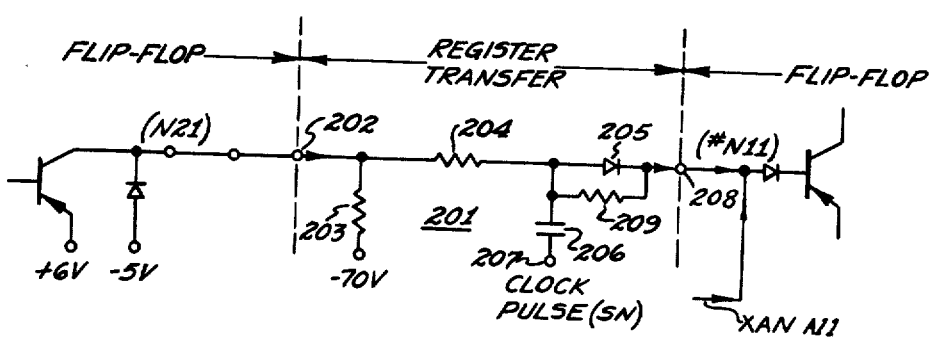
Figure 13A:
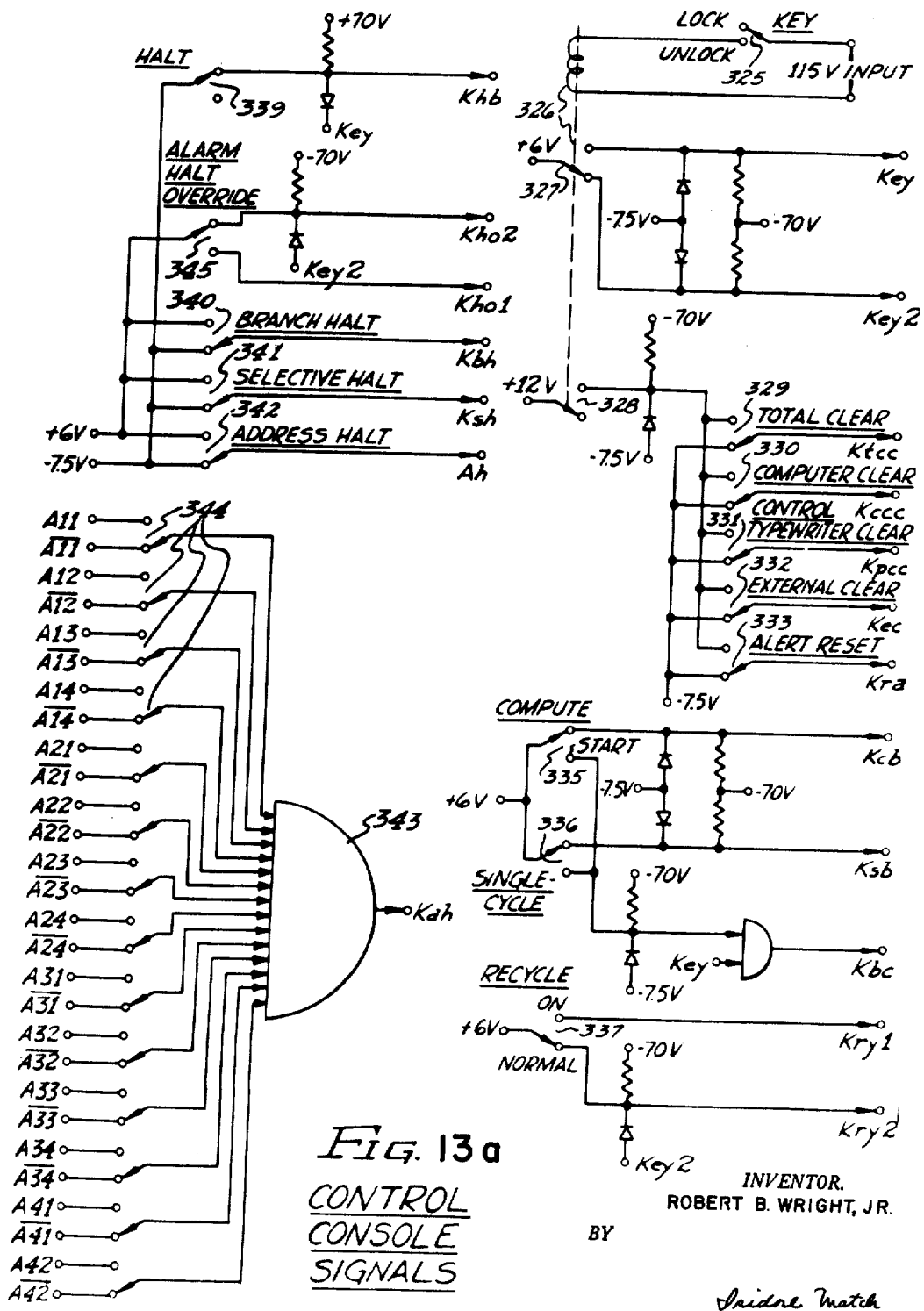
Figure 13B:
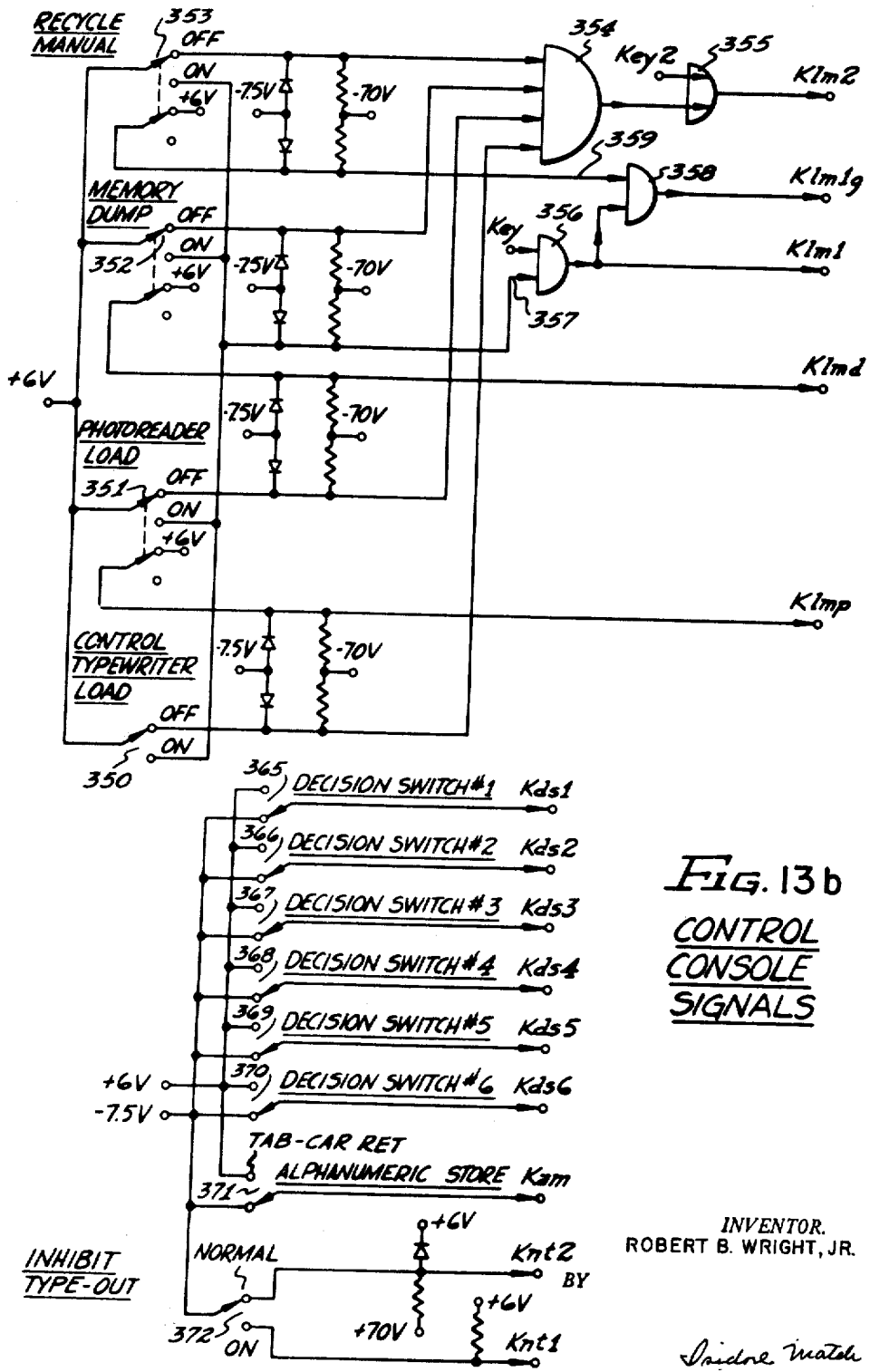
Figure 15A:
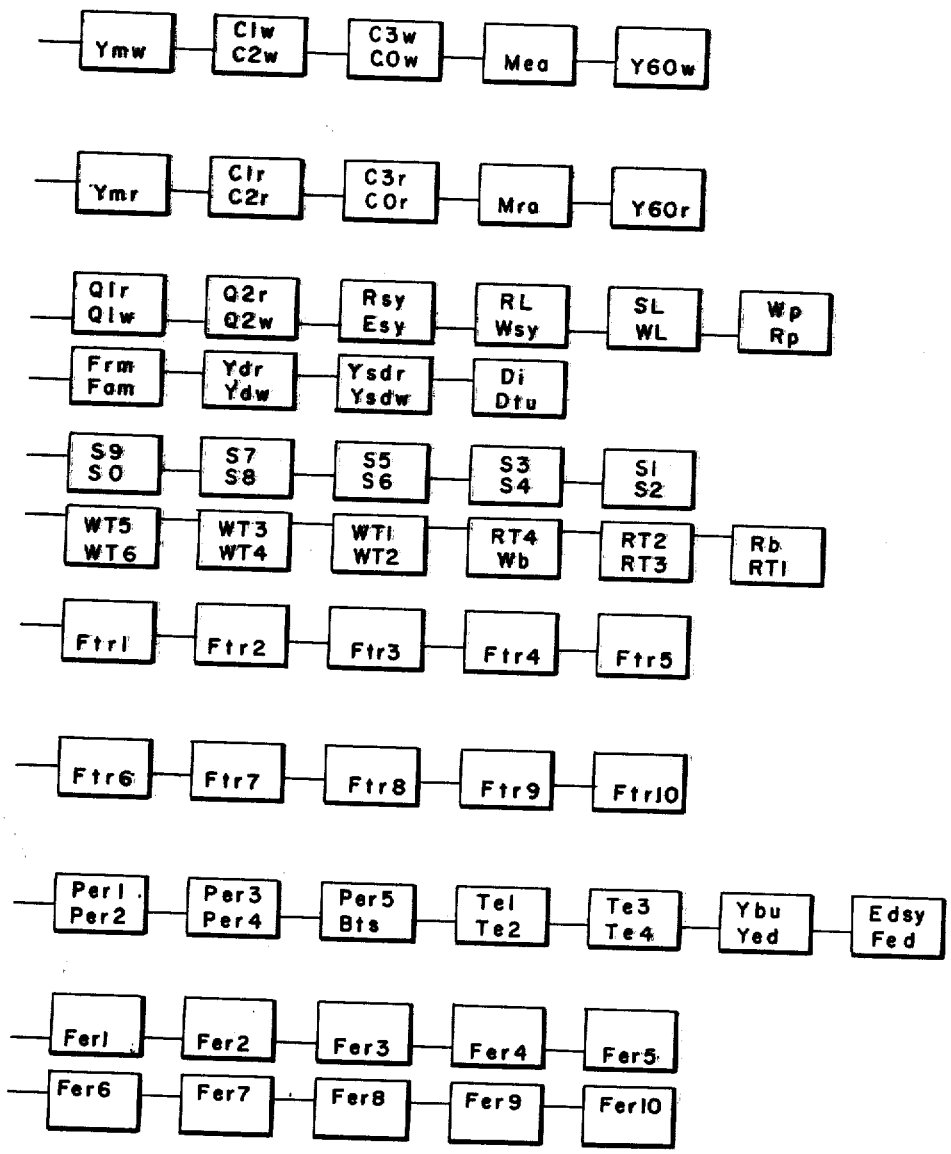
Figure 18:
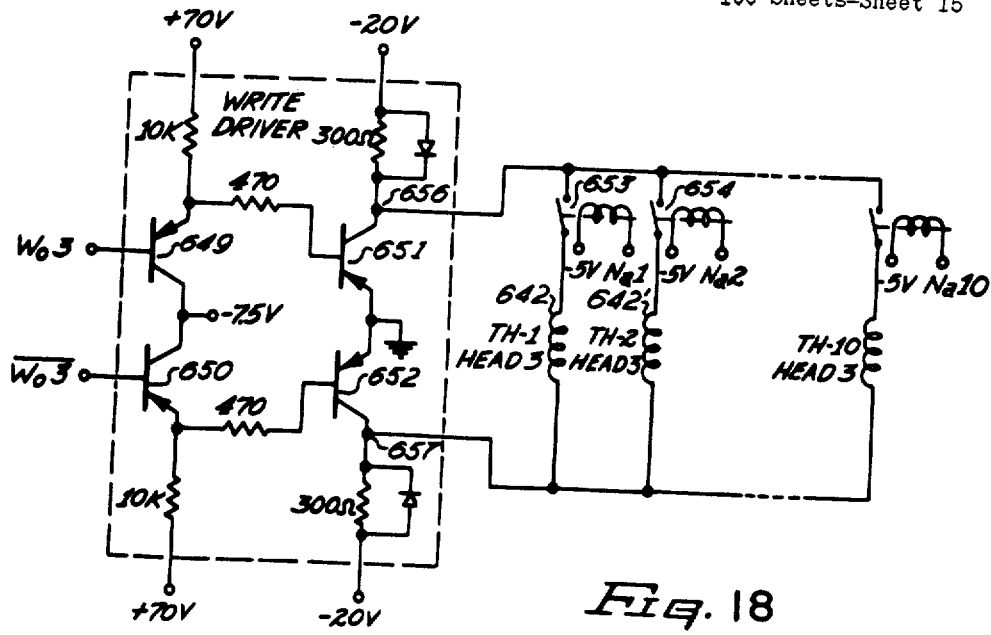
Figure 19:
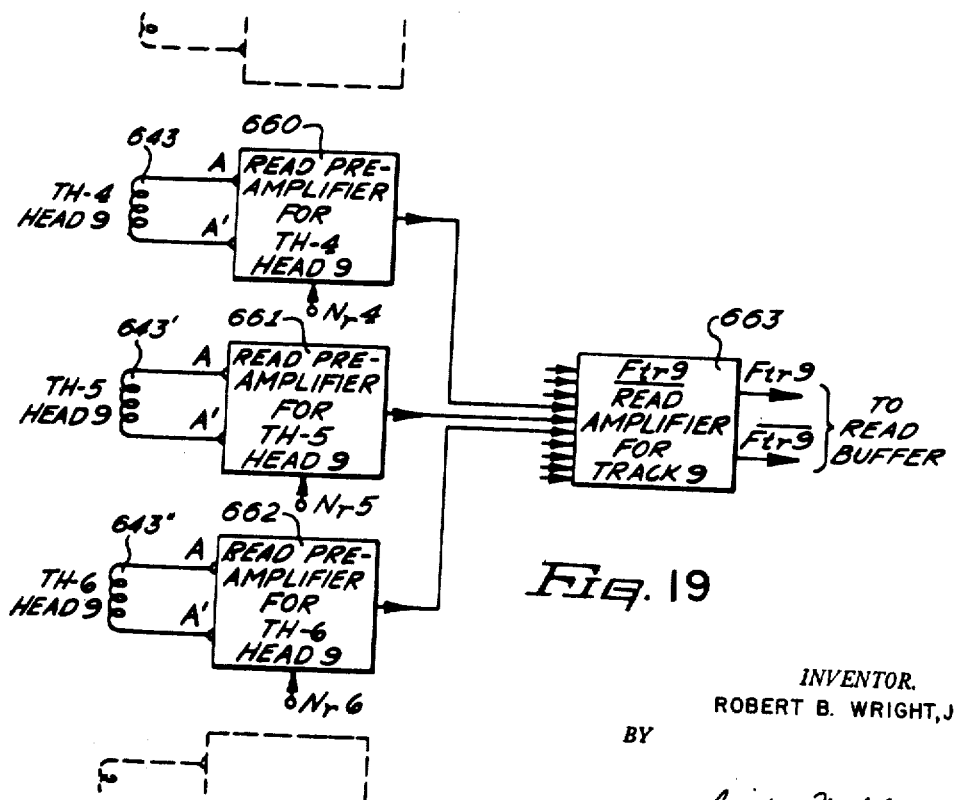
Figure 20:
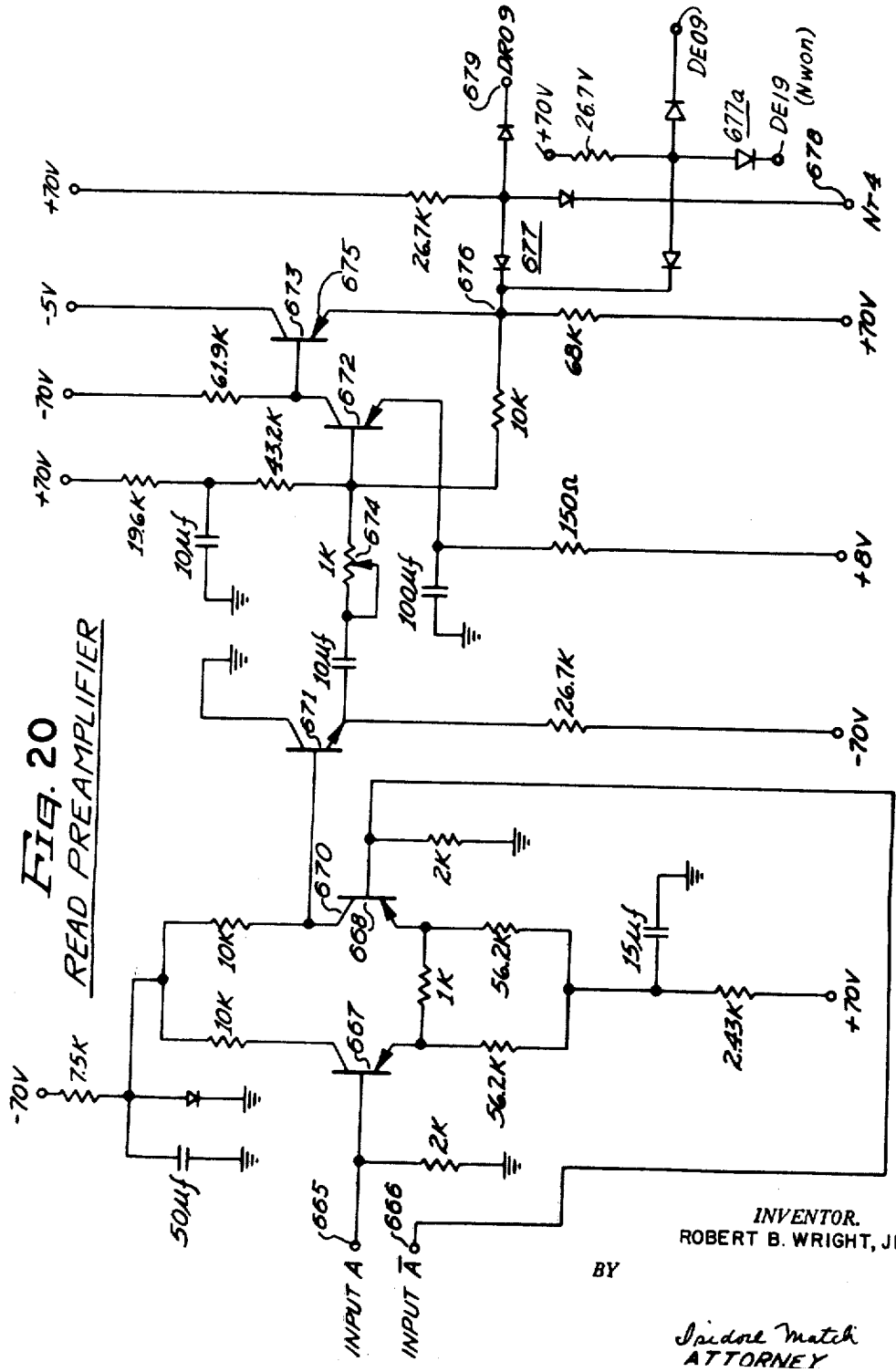
Figure 21:
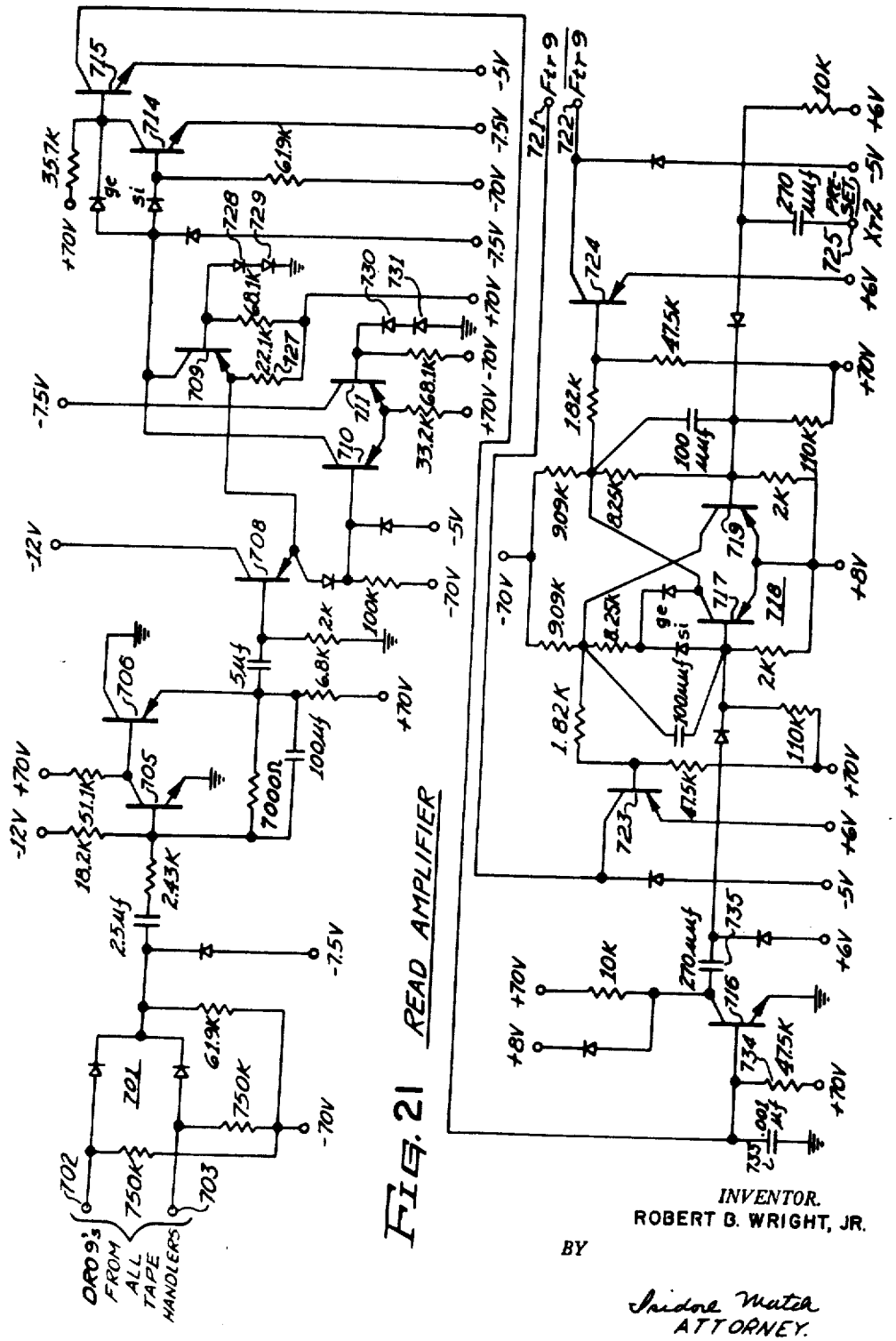
Figure 22:
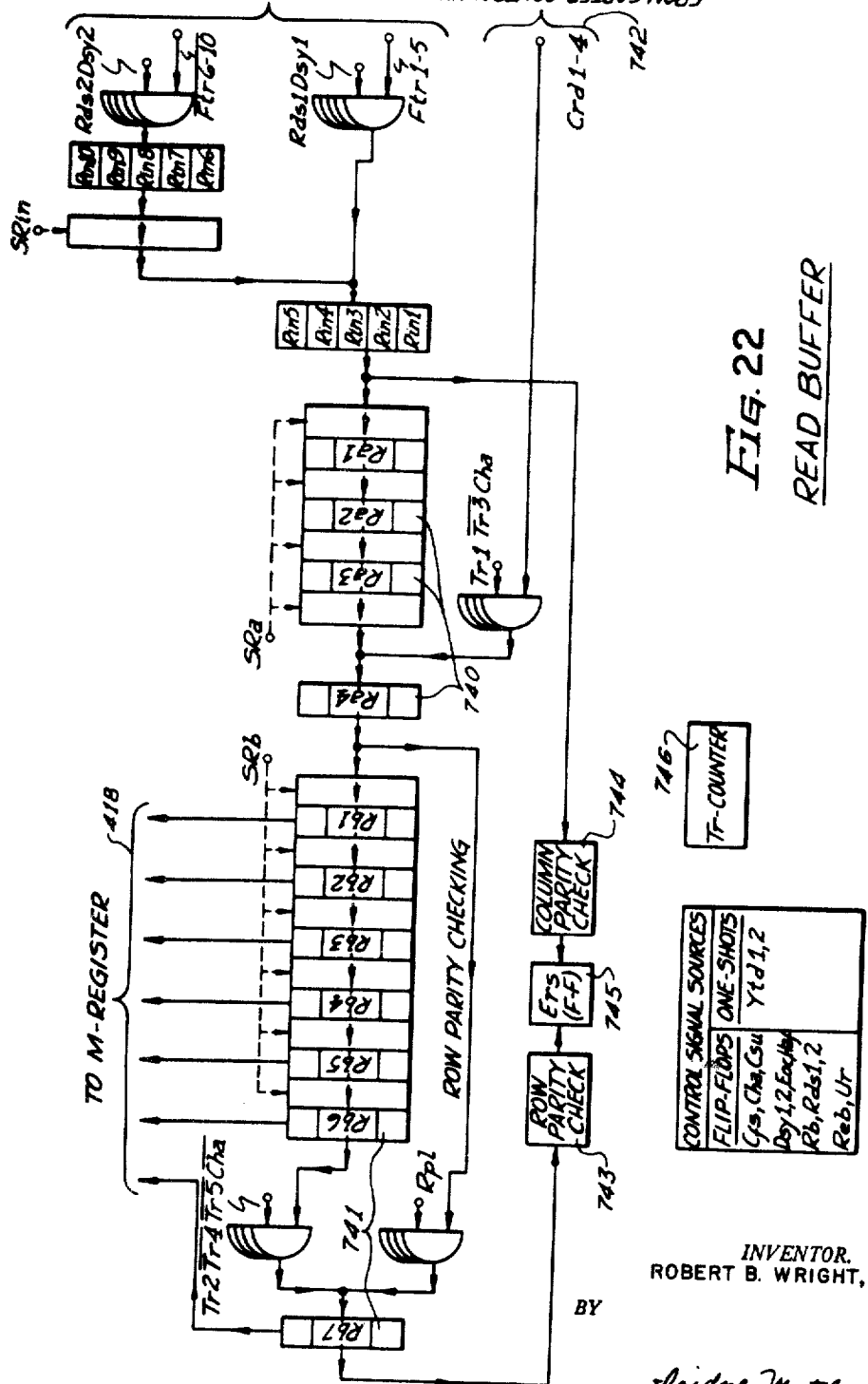
Figure 23:
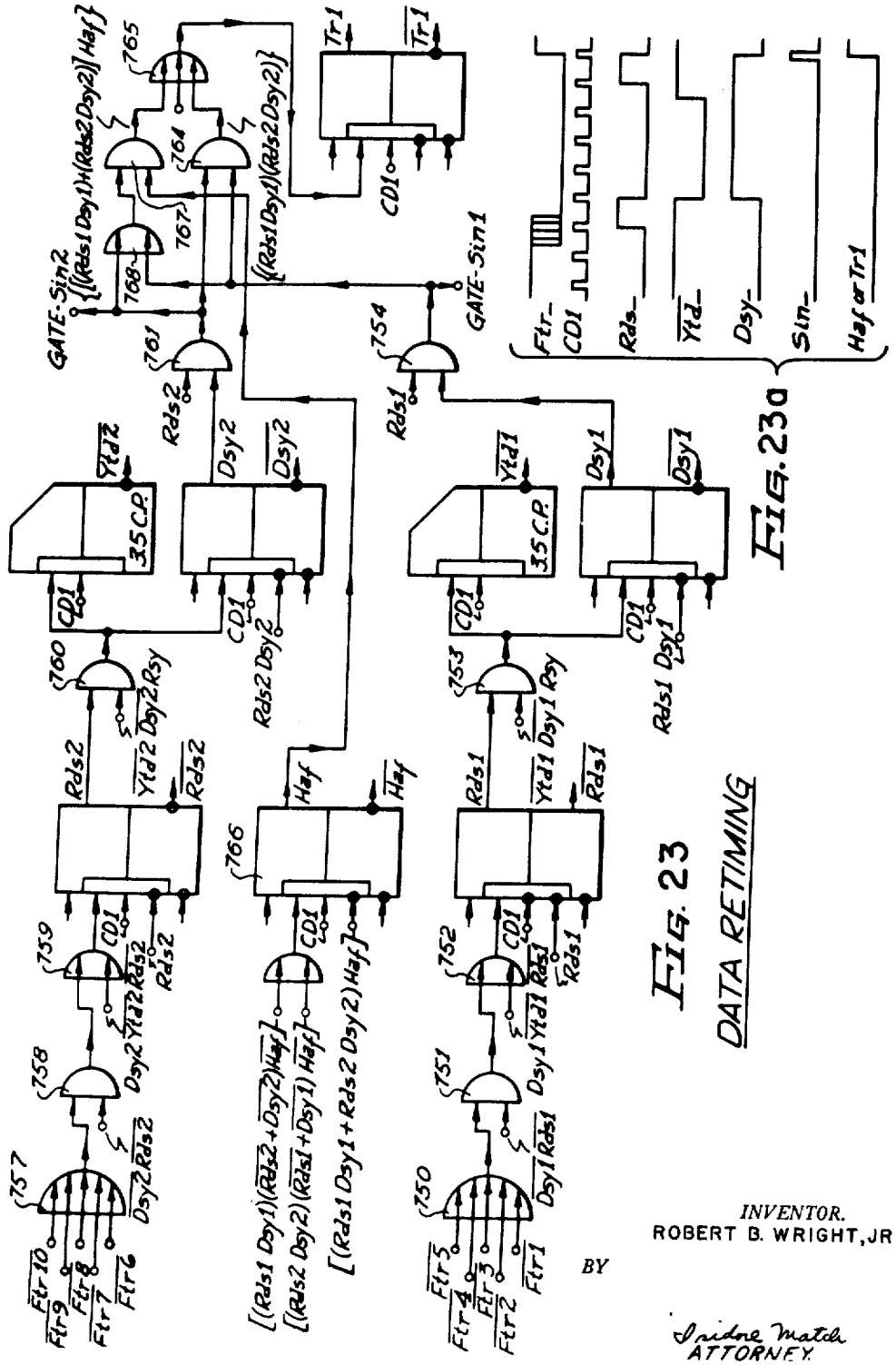
Figure 24:
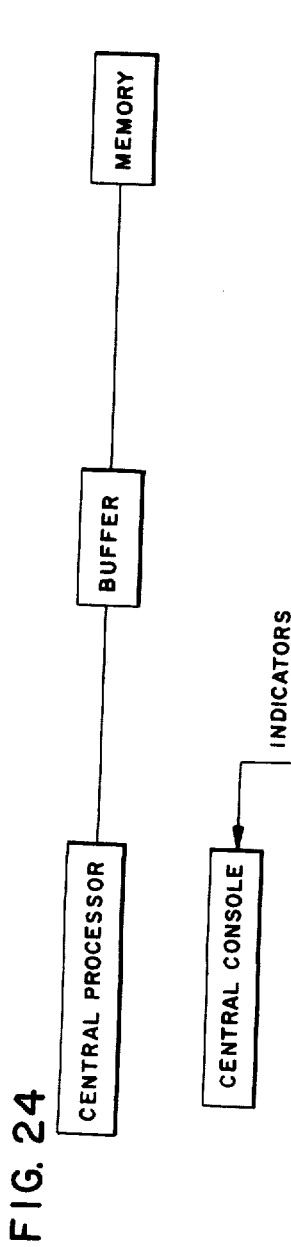
Figure 26:
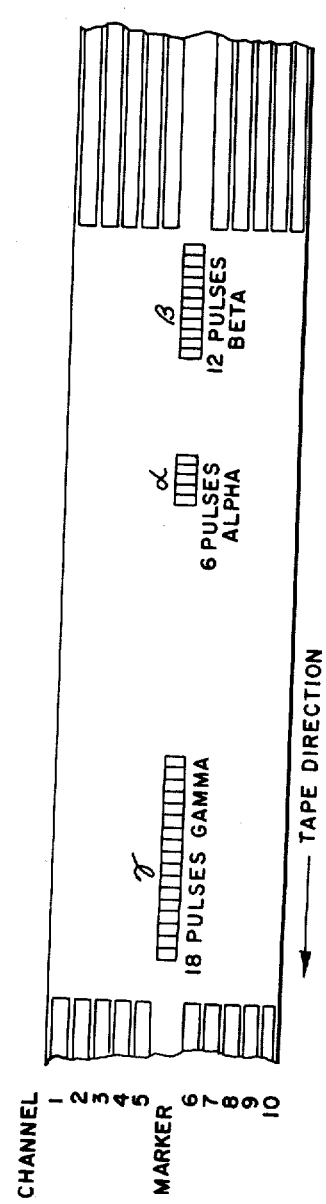
Figure 25:
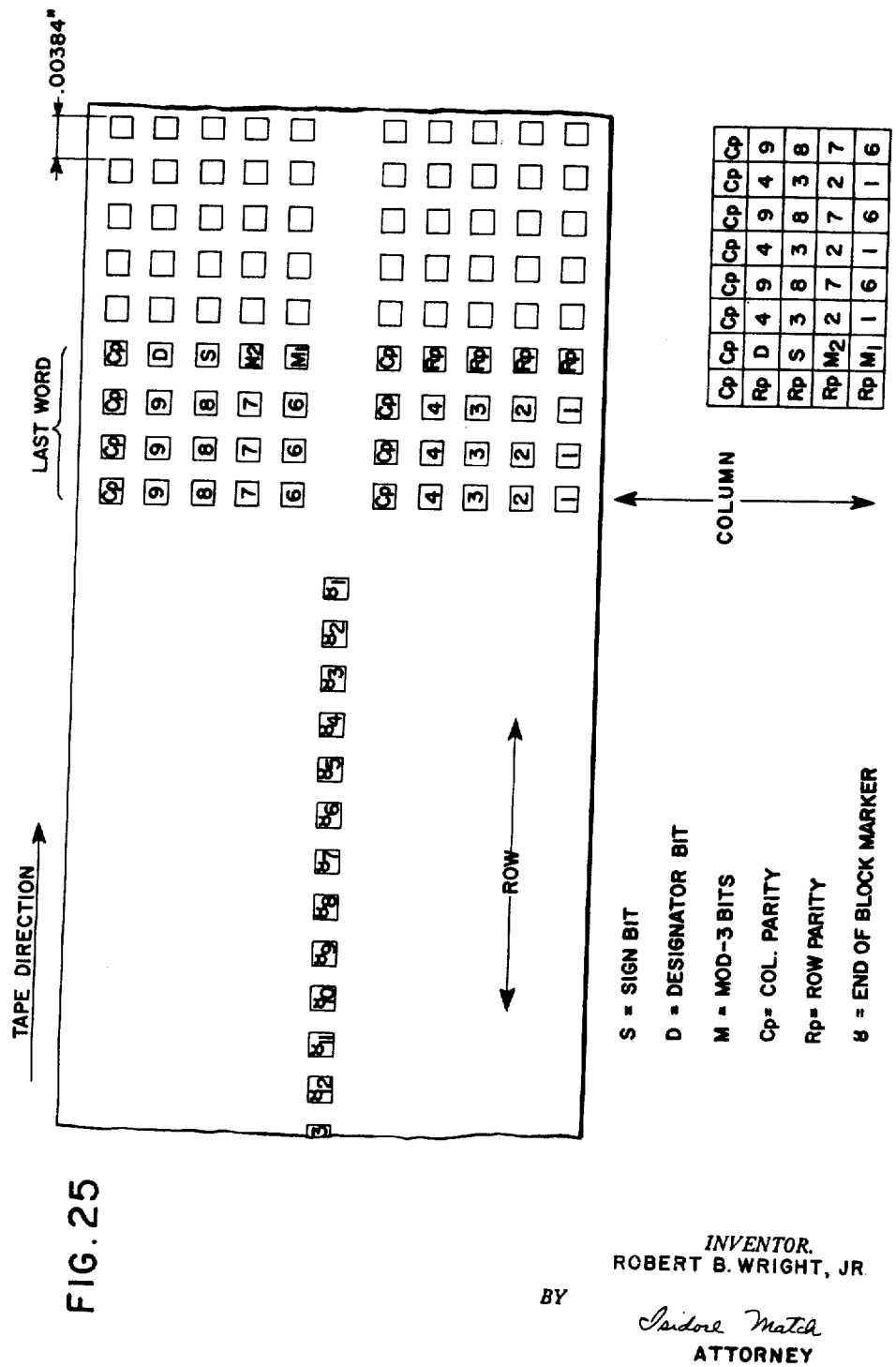
Figure 78:
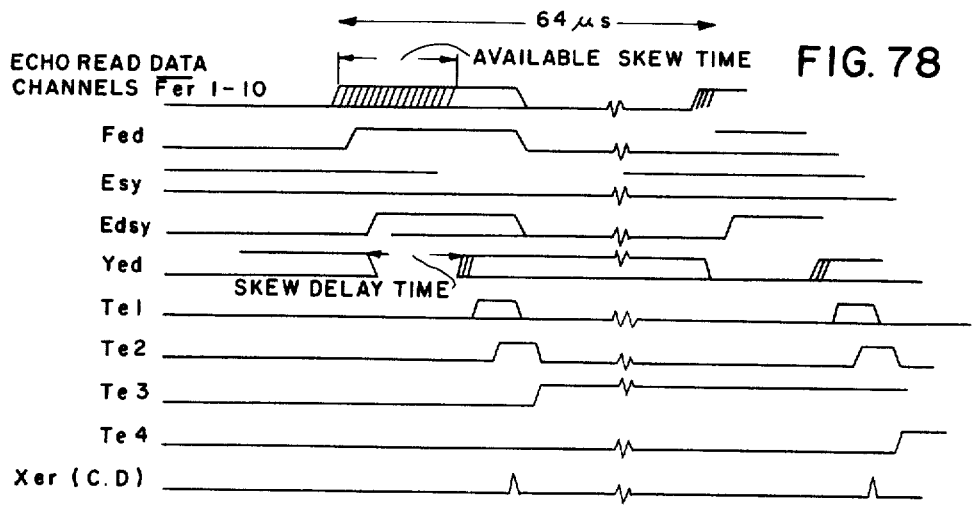
Figure 27:
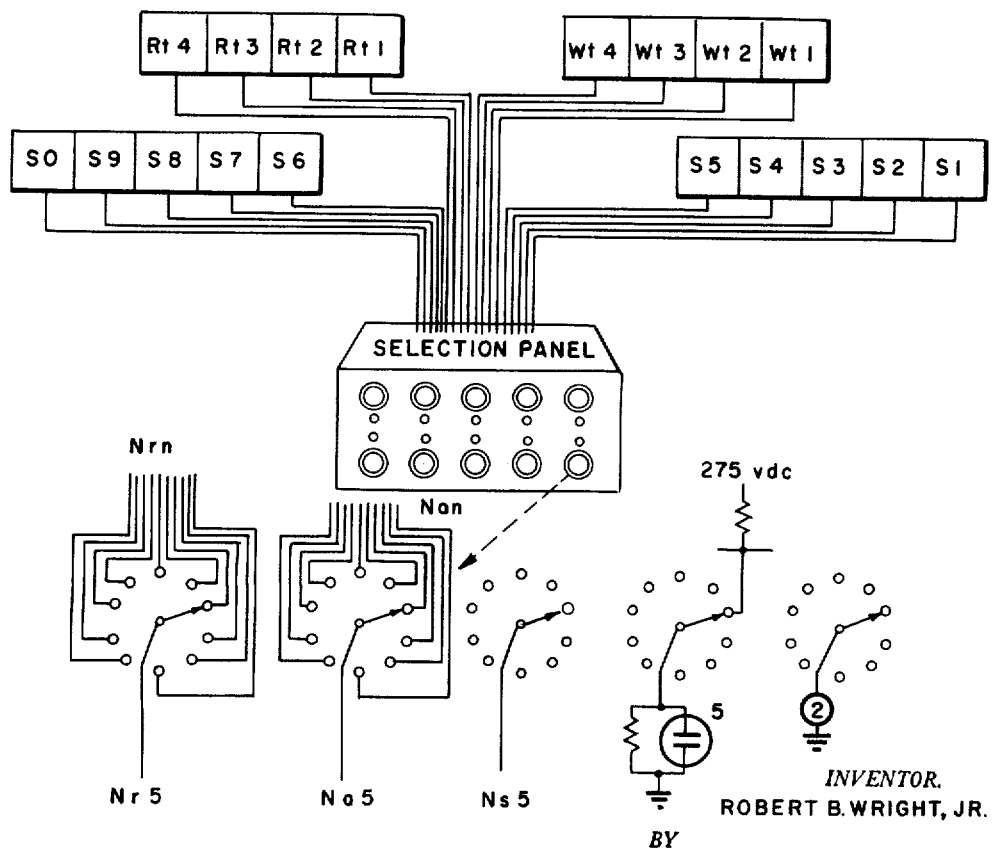
Figure 28:
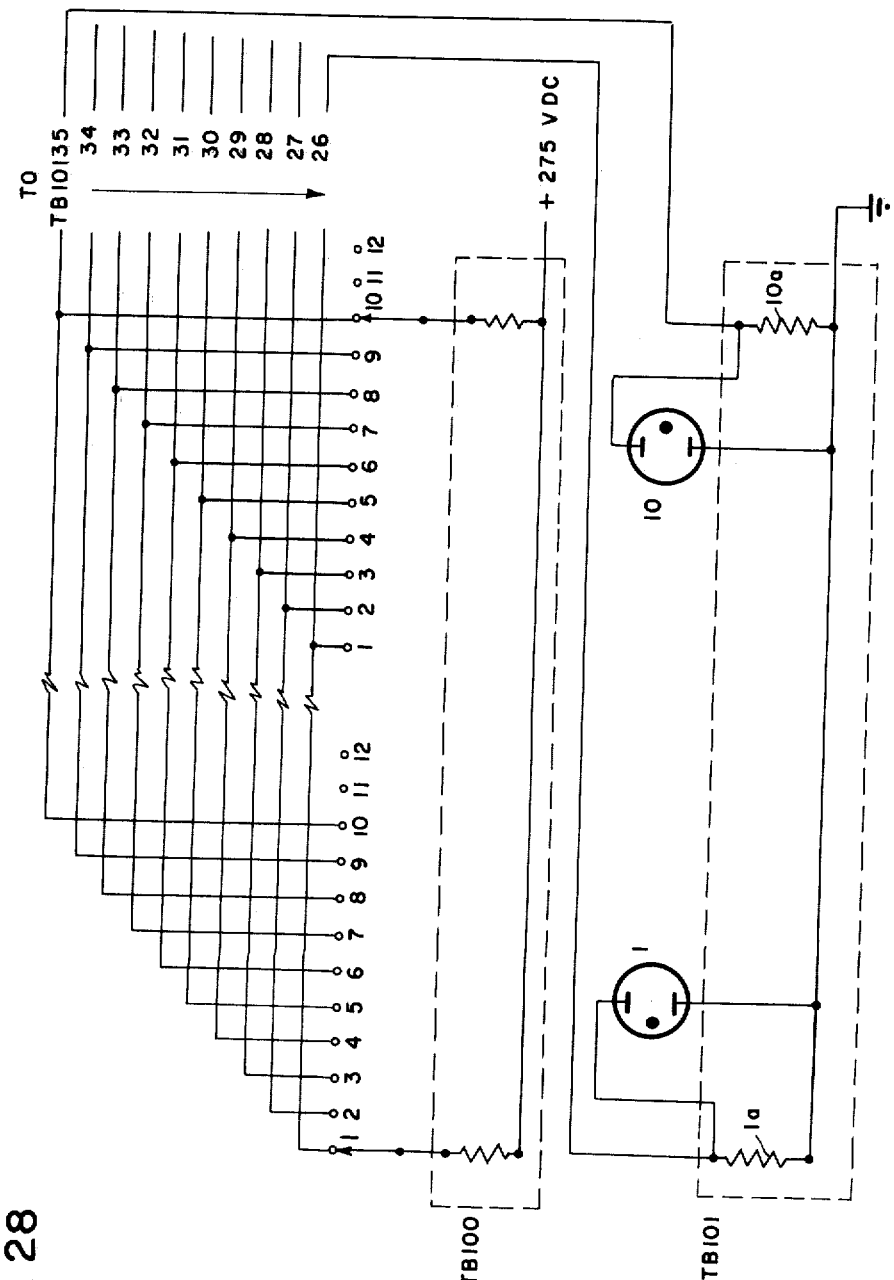
Figure 30:
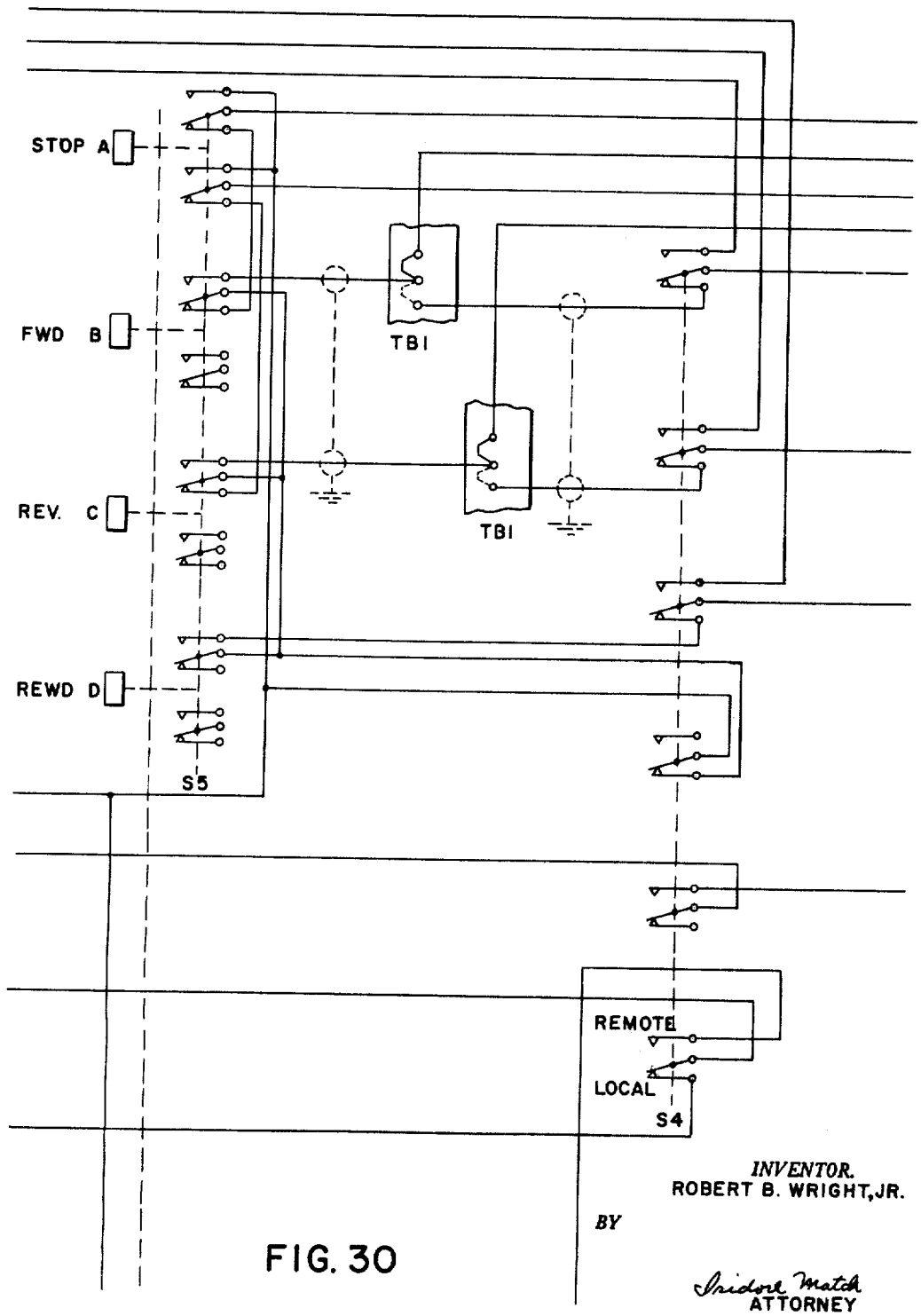
Figure 31:
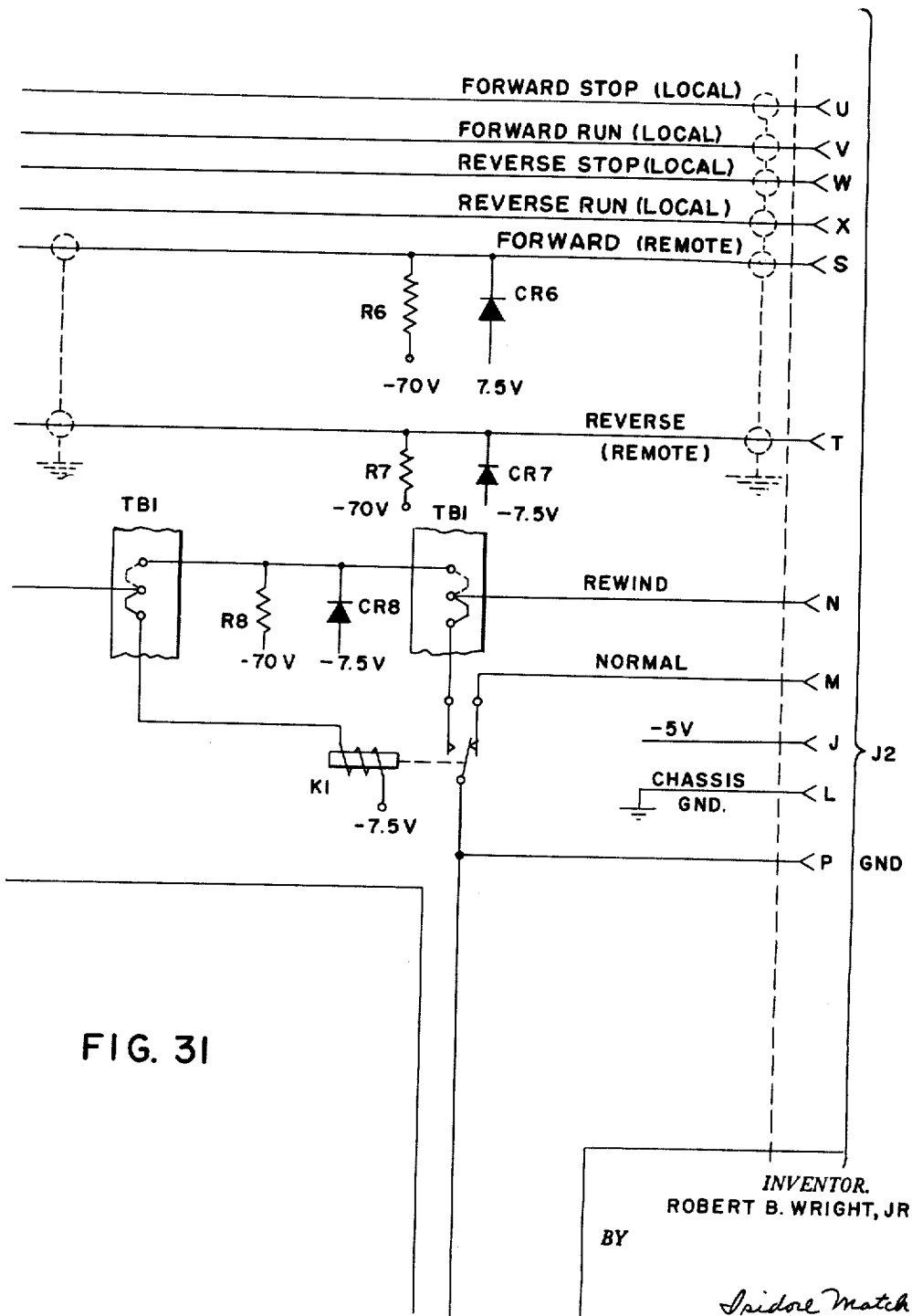
Figure 32:
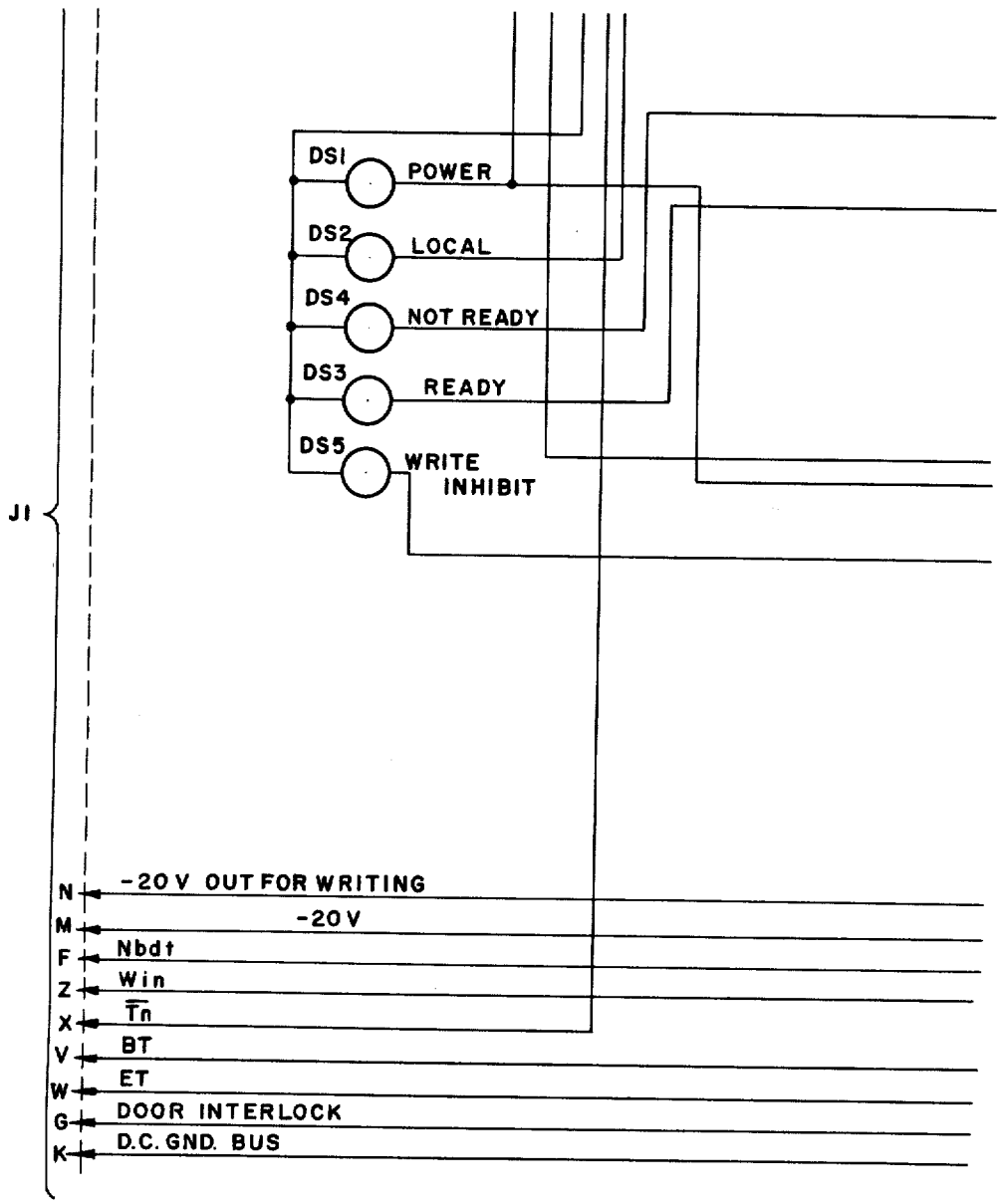
Figures 33, 35:
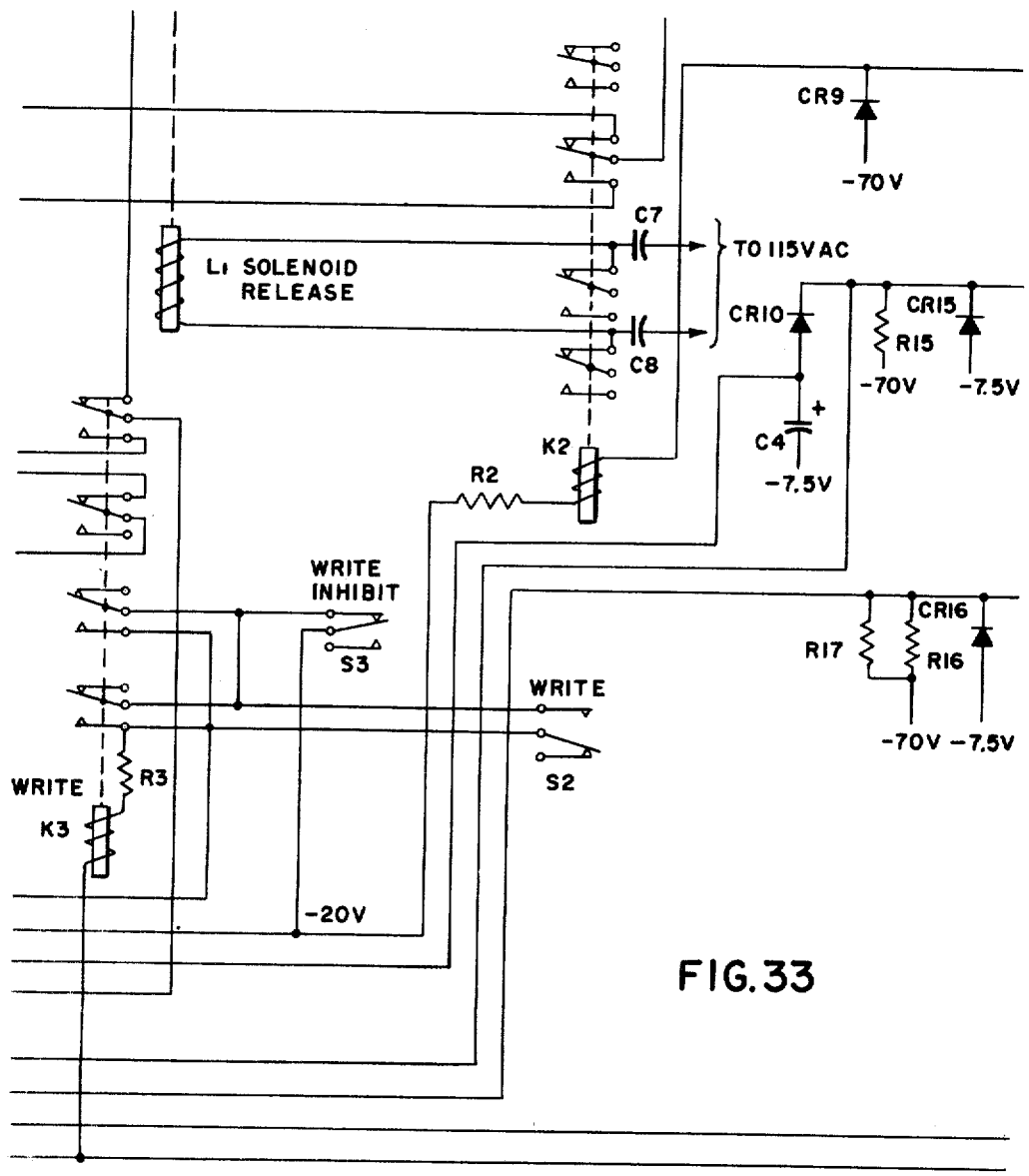
Figure 34:
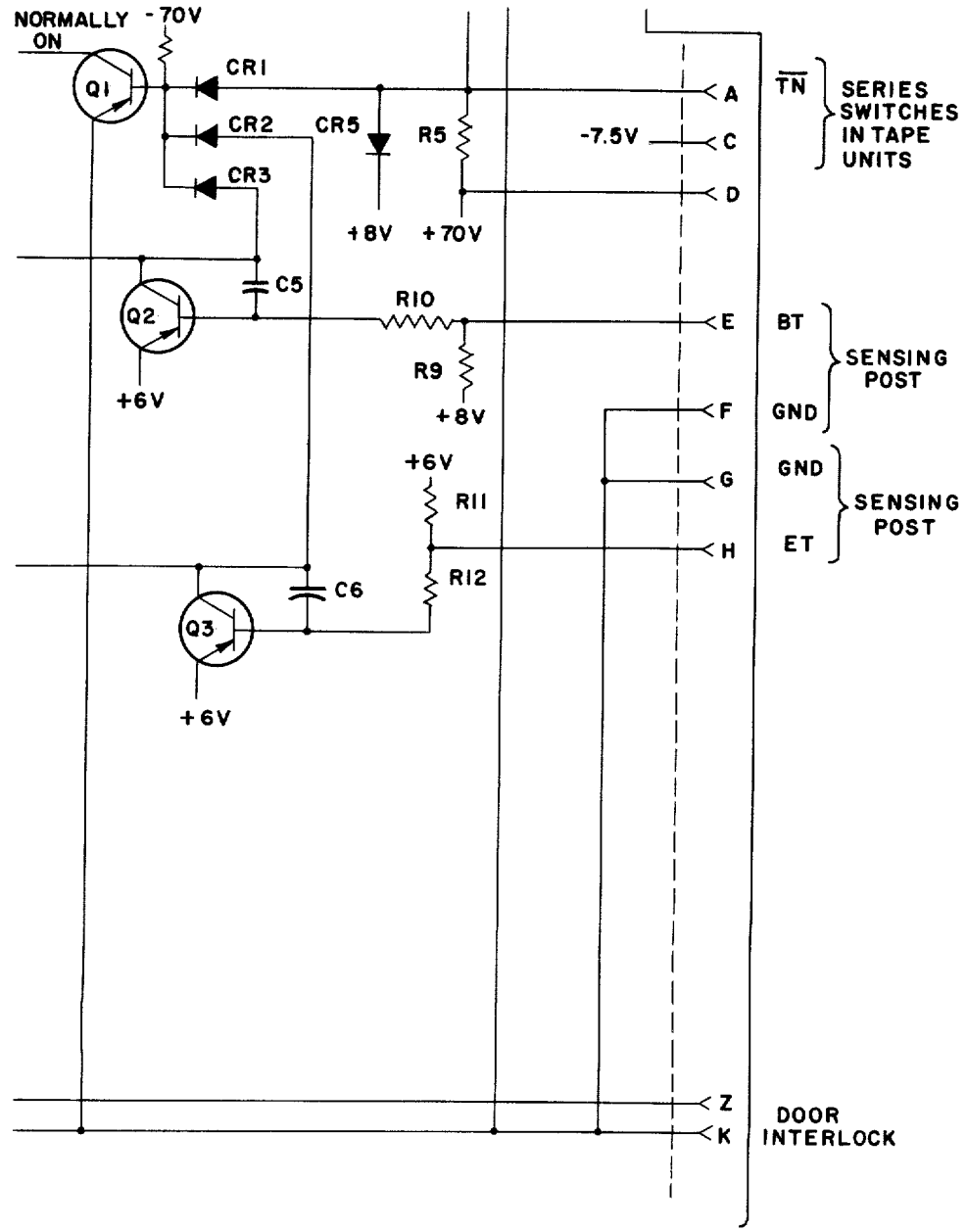
Figure 36:
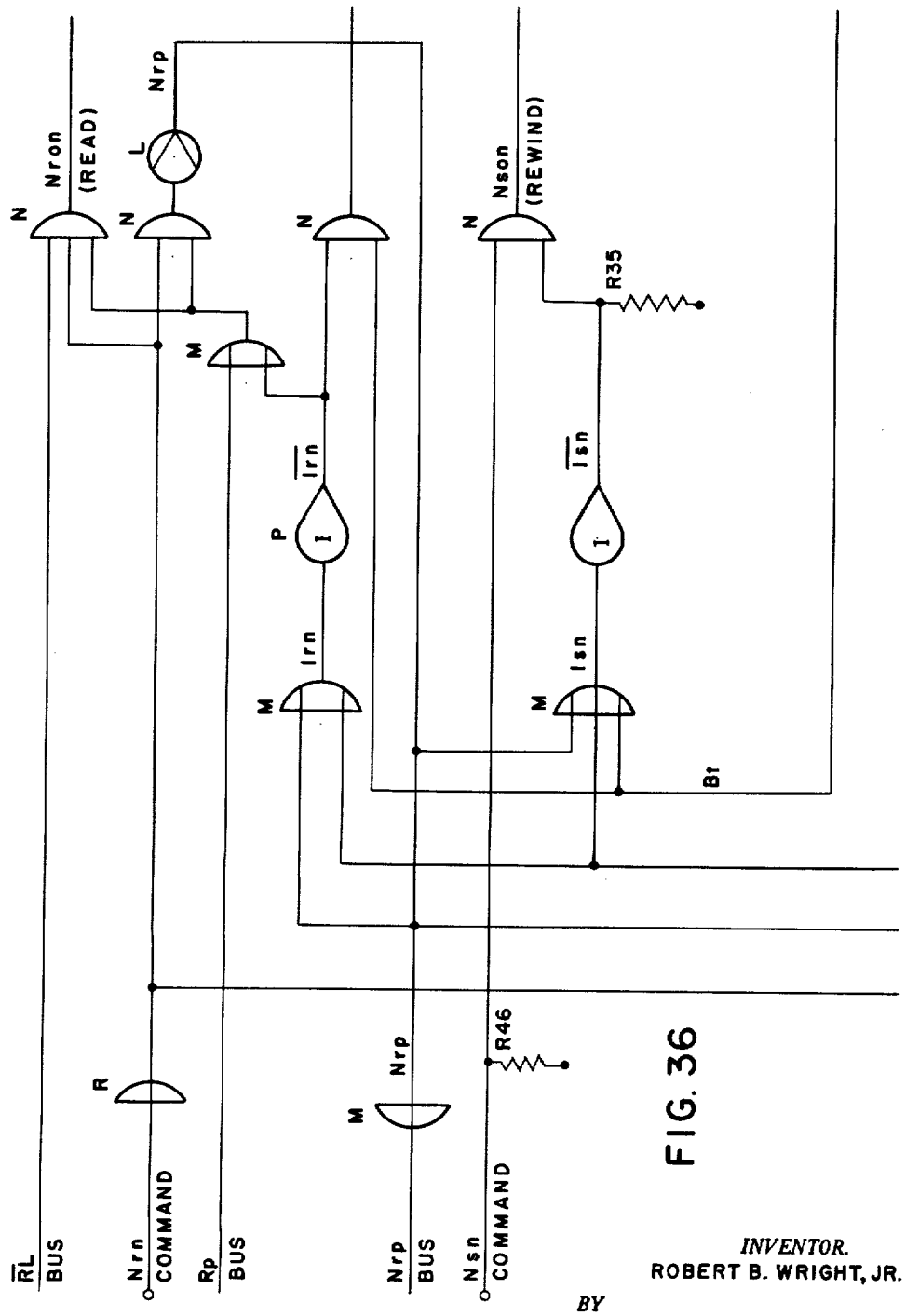
Figure 52:
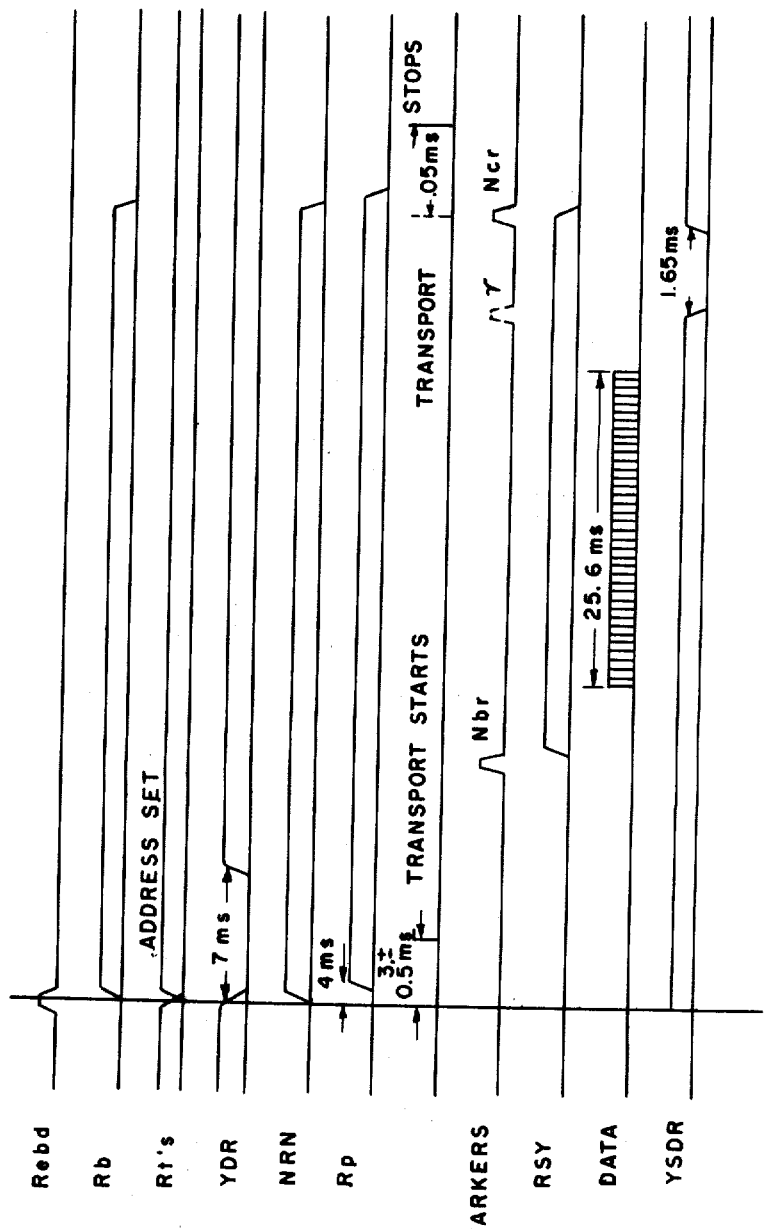
Figure 53:
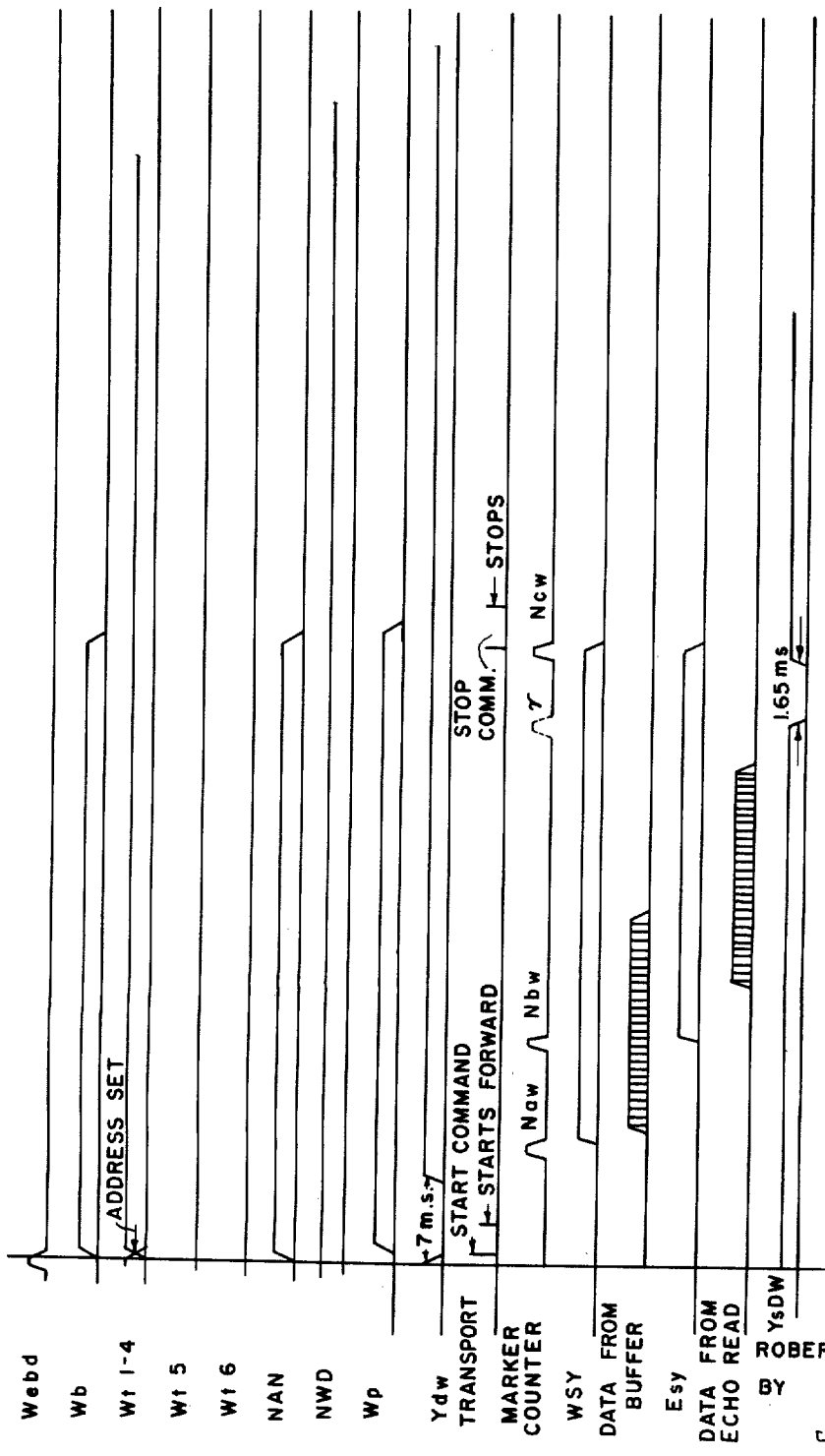
Figure 54:
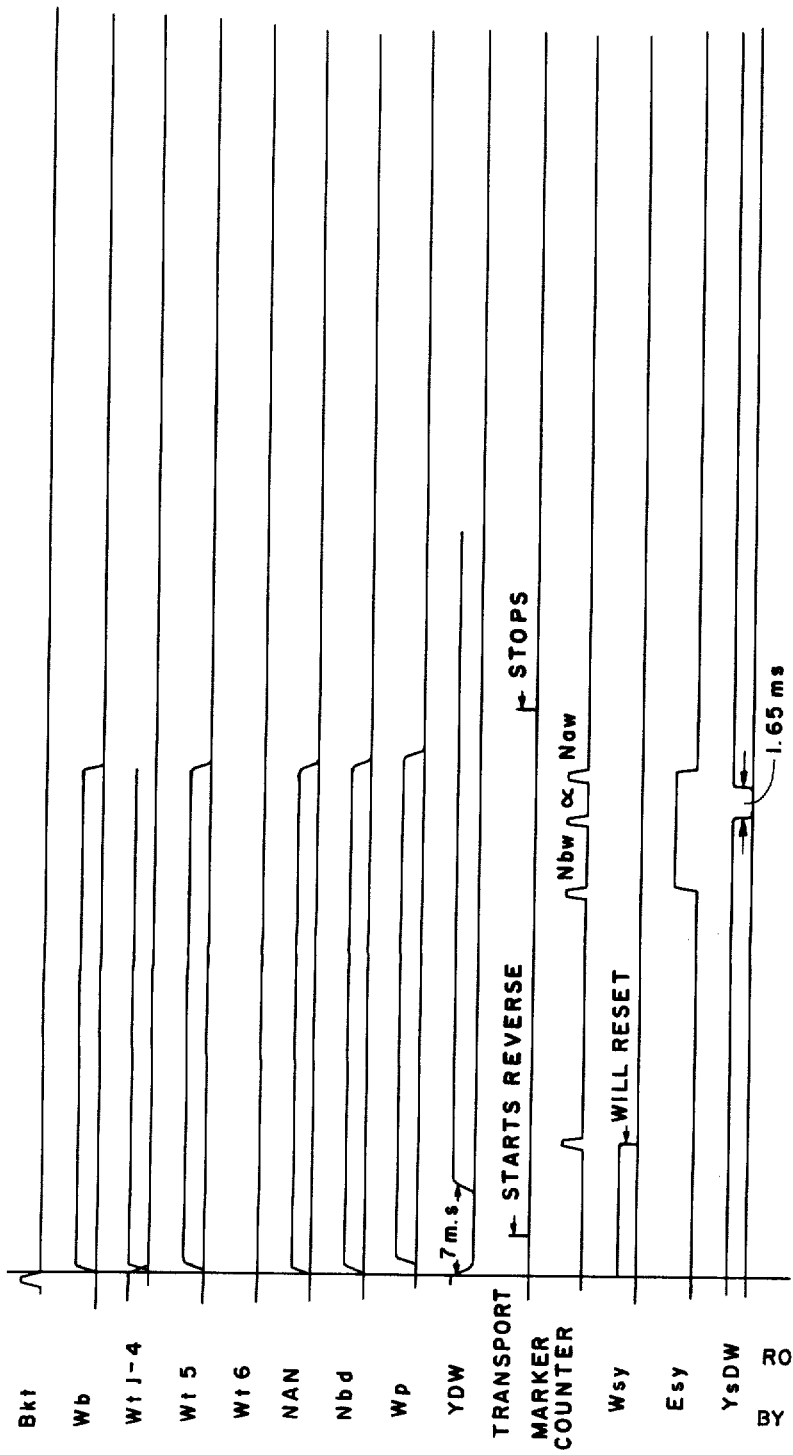
Figure 55:
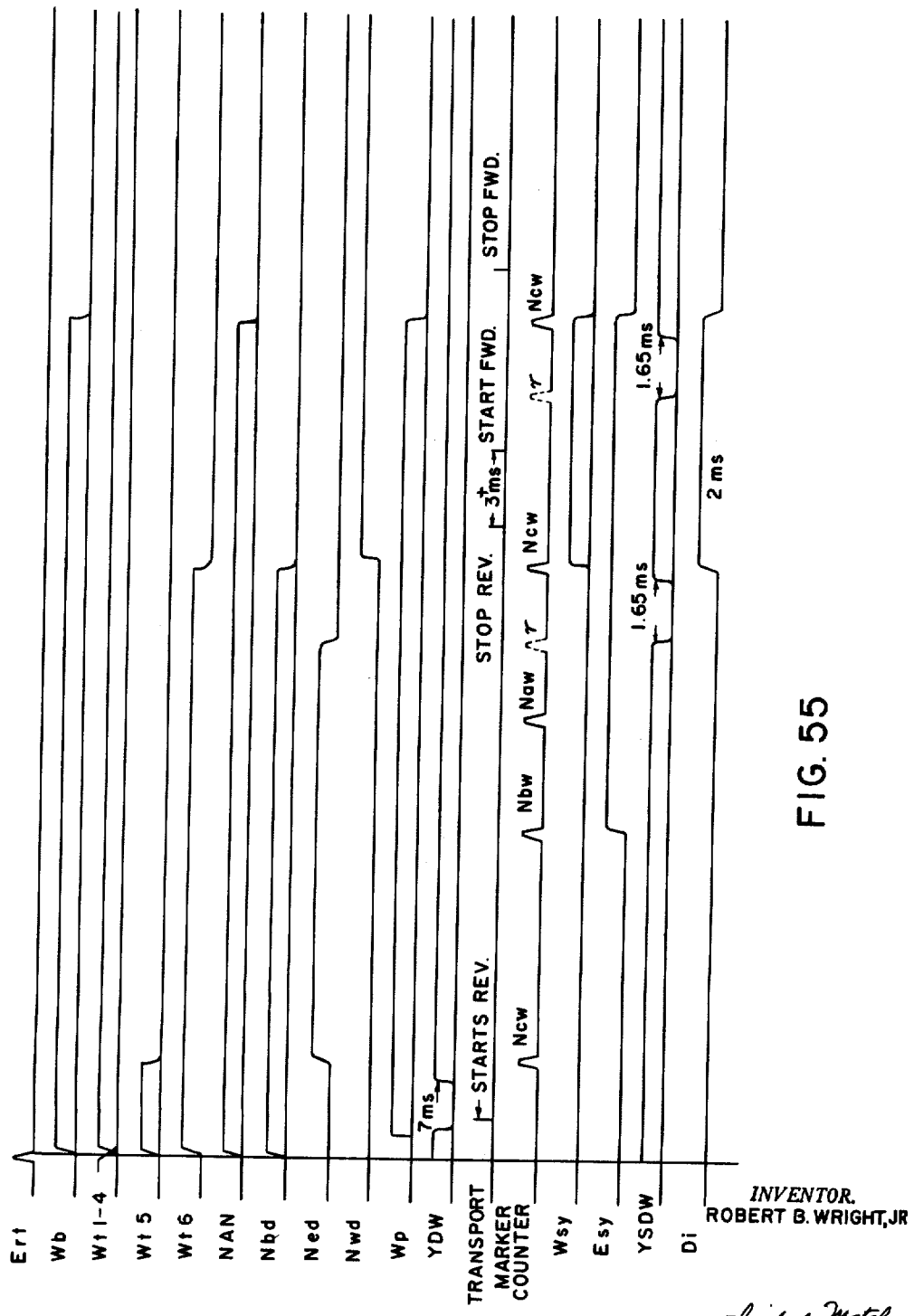
Figure 56:
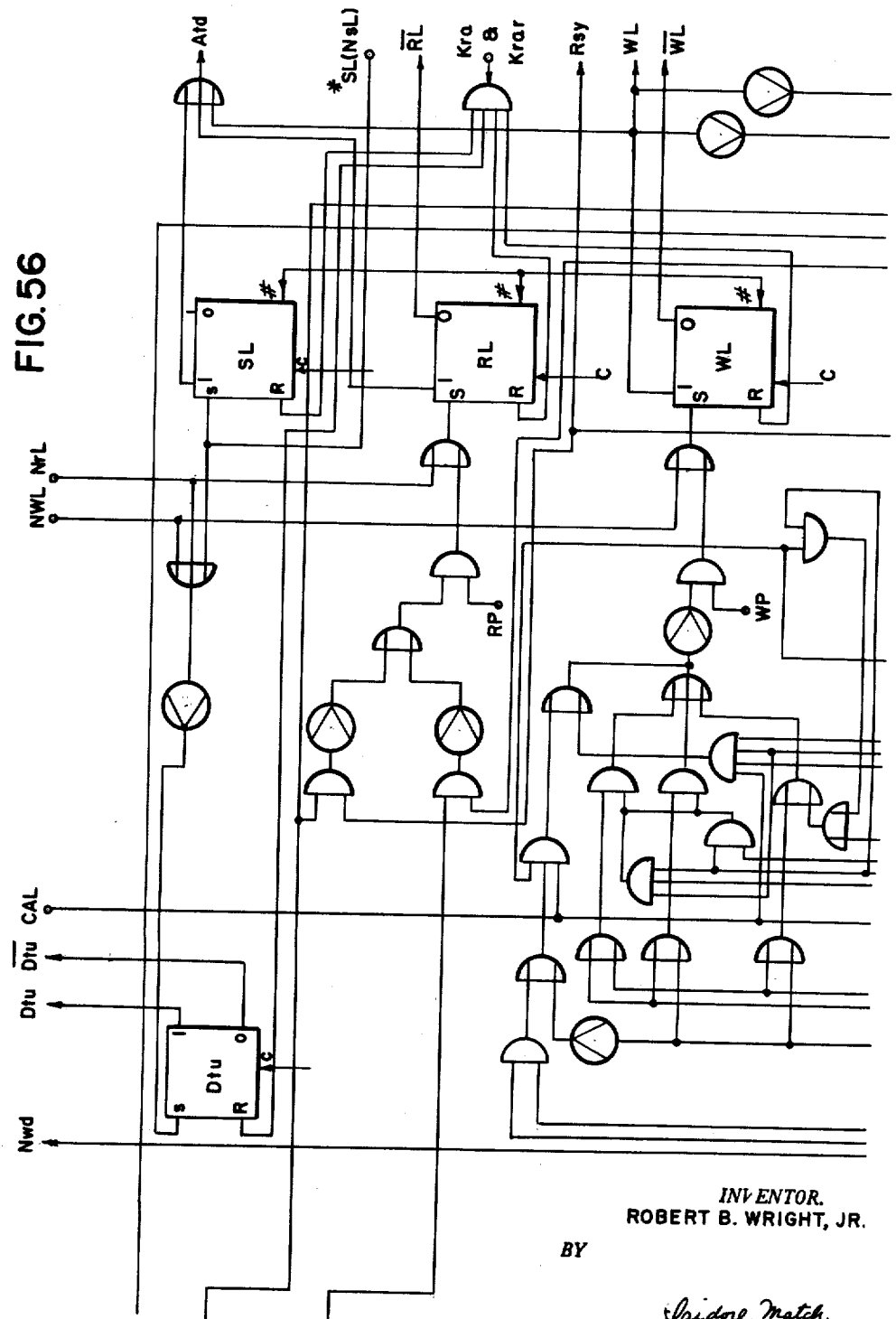
Figure 57:
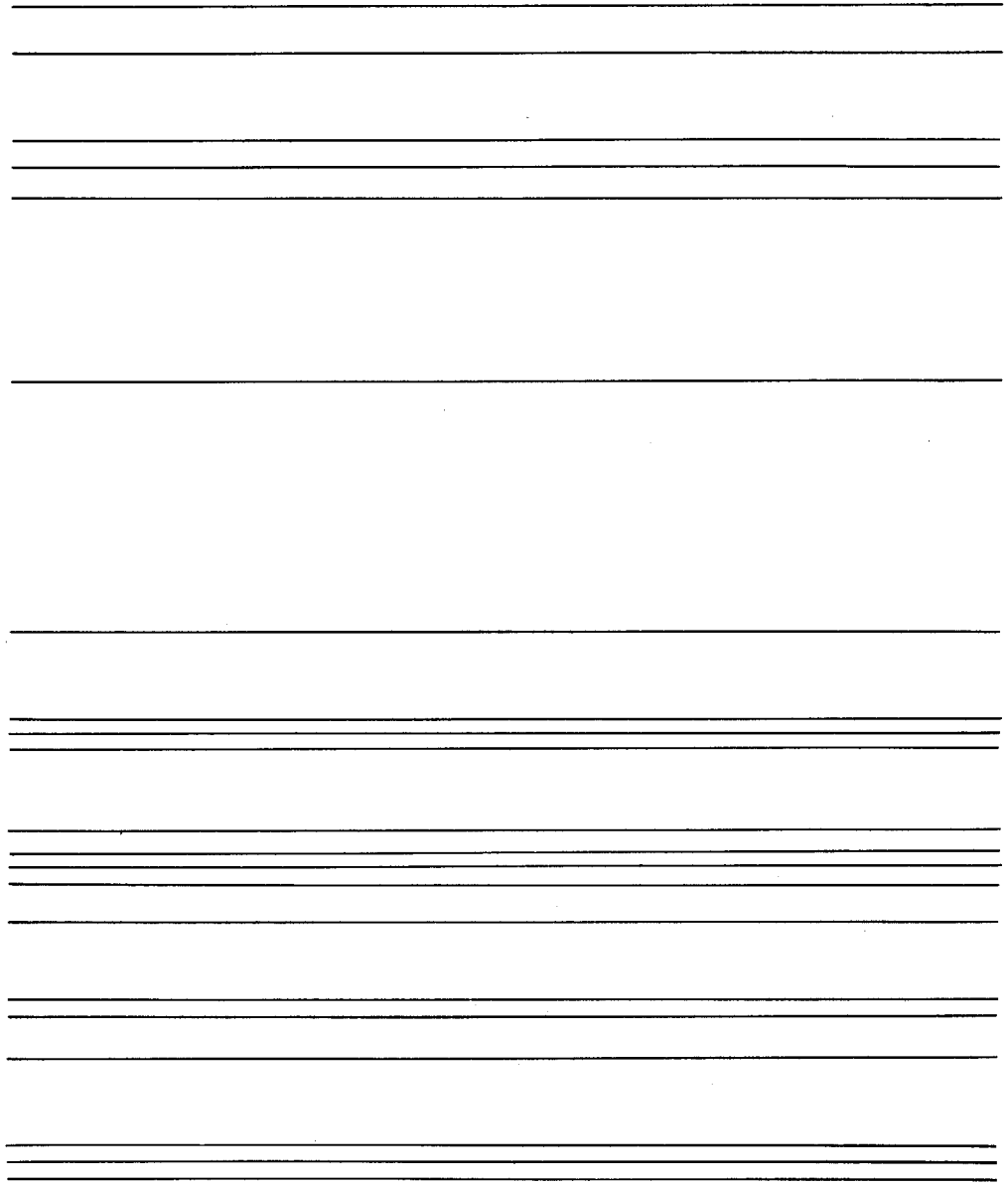
Figure 58:
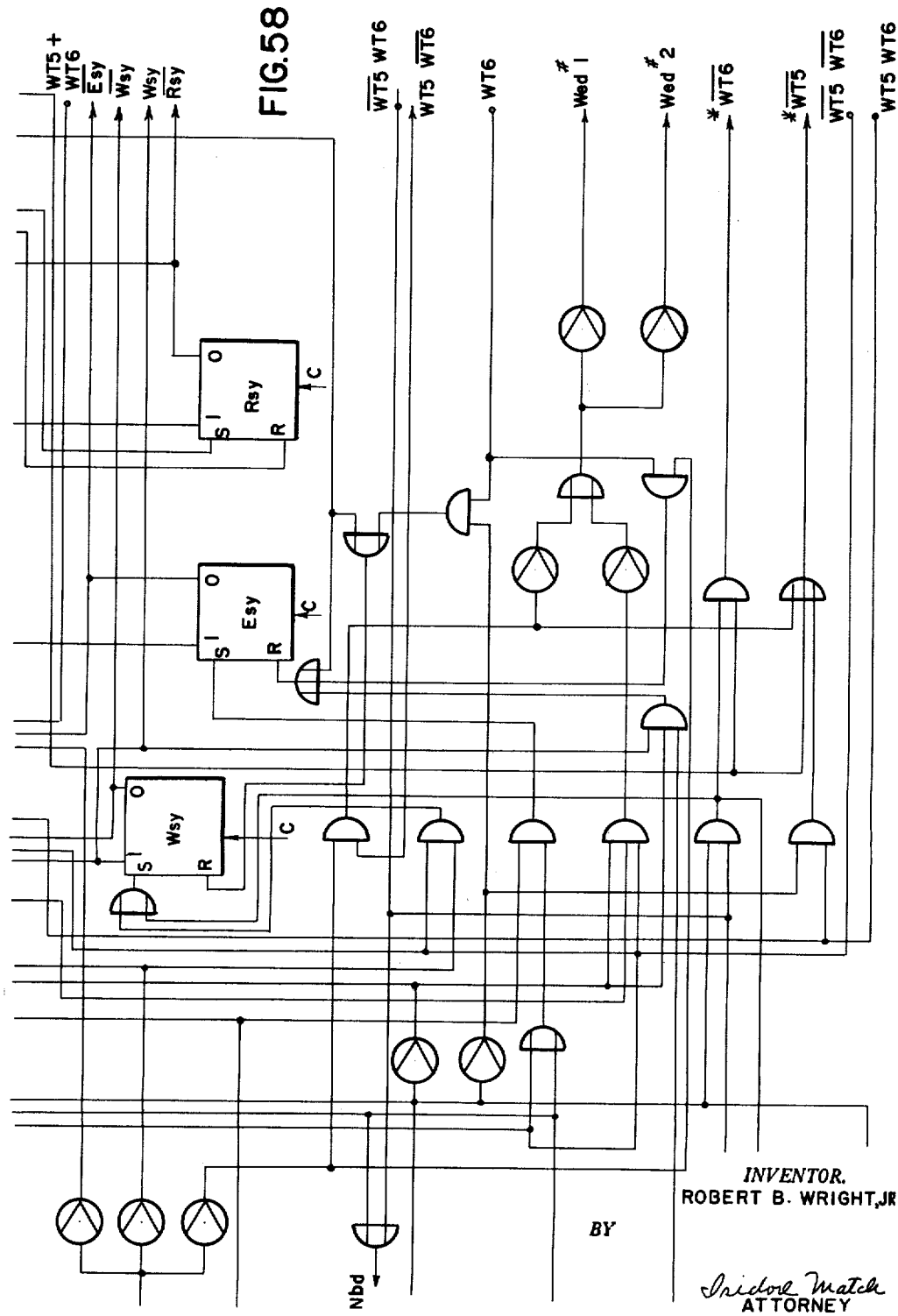
Figure 59:
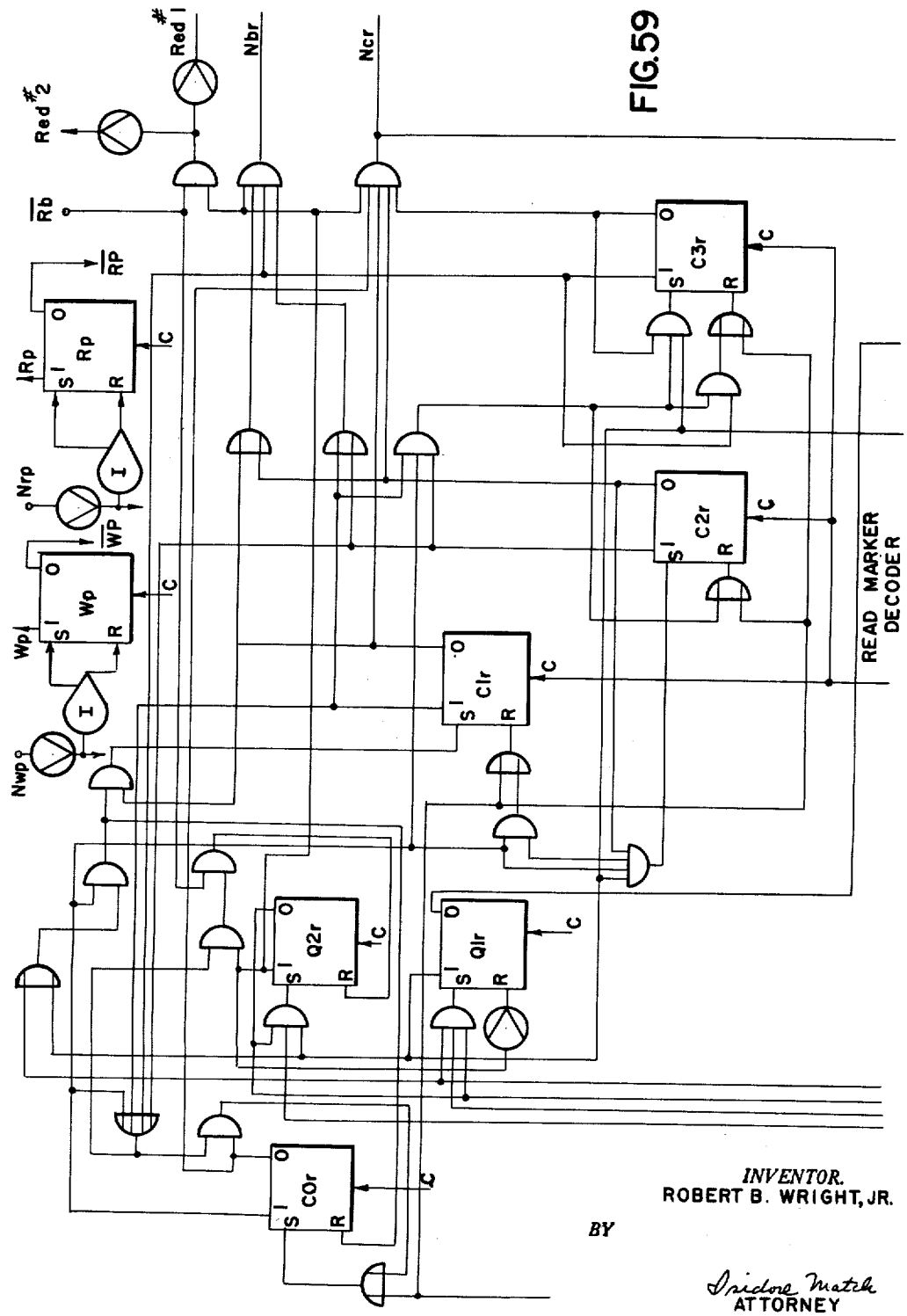
Figure 60:
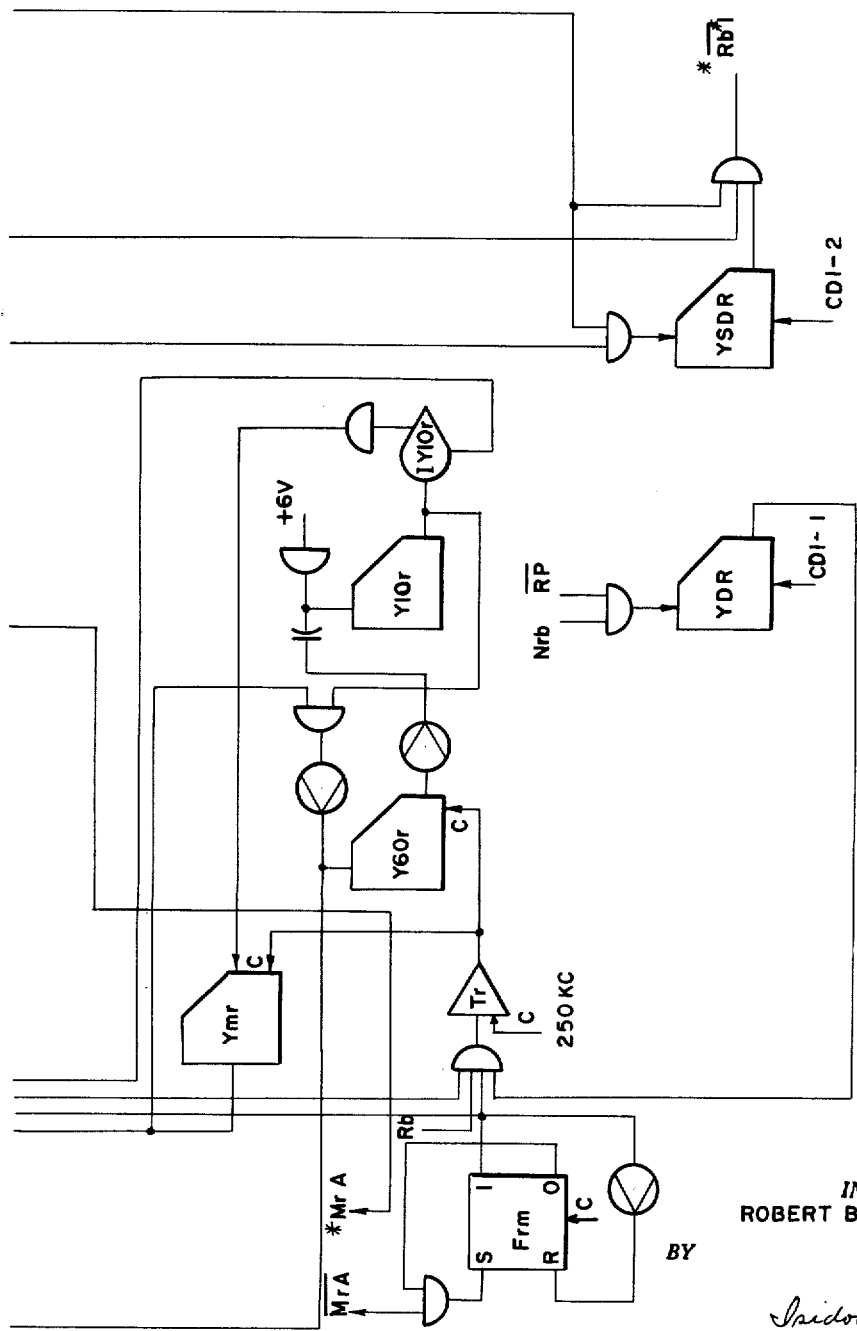
Figure 61:
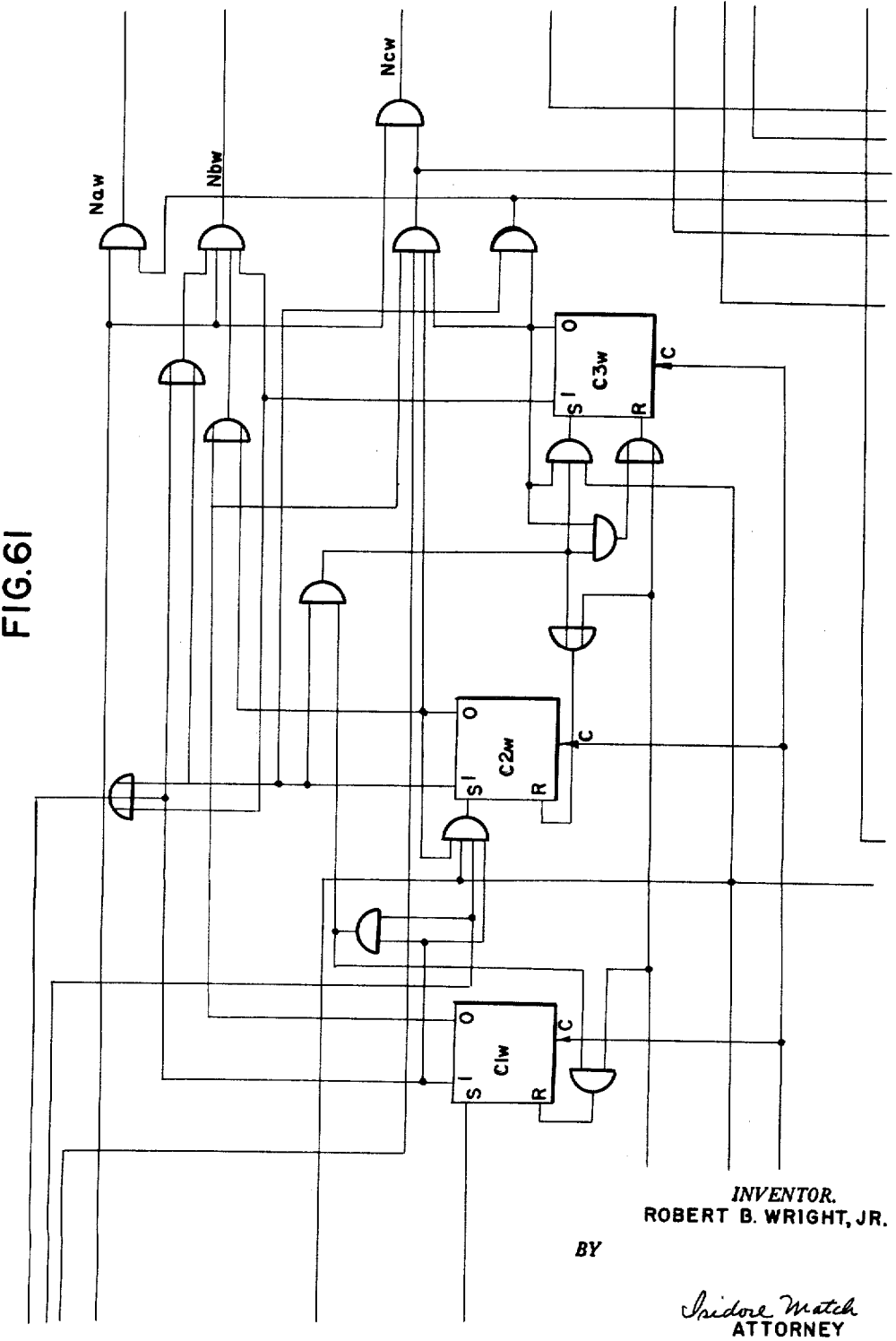
Figure 62:
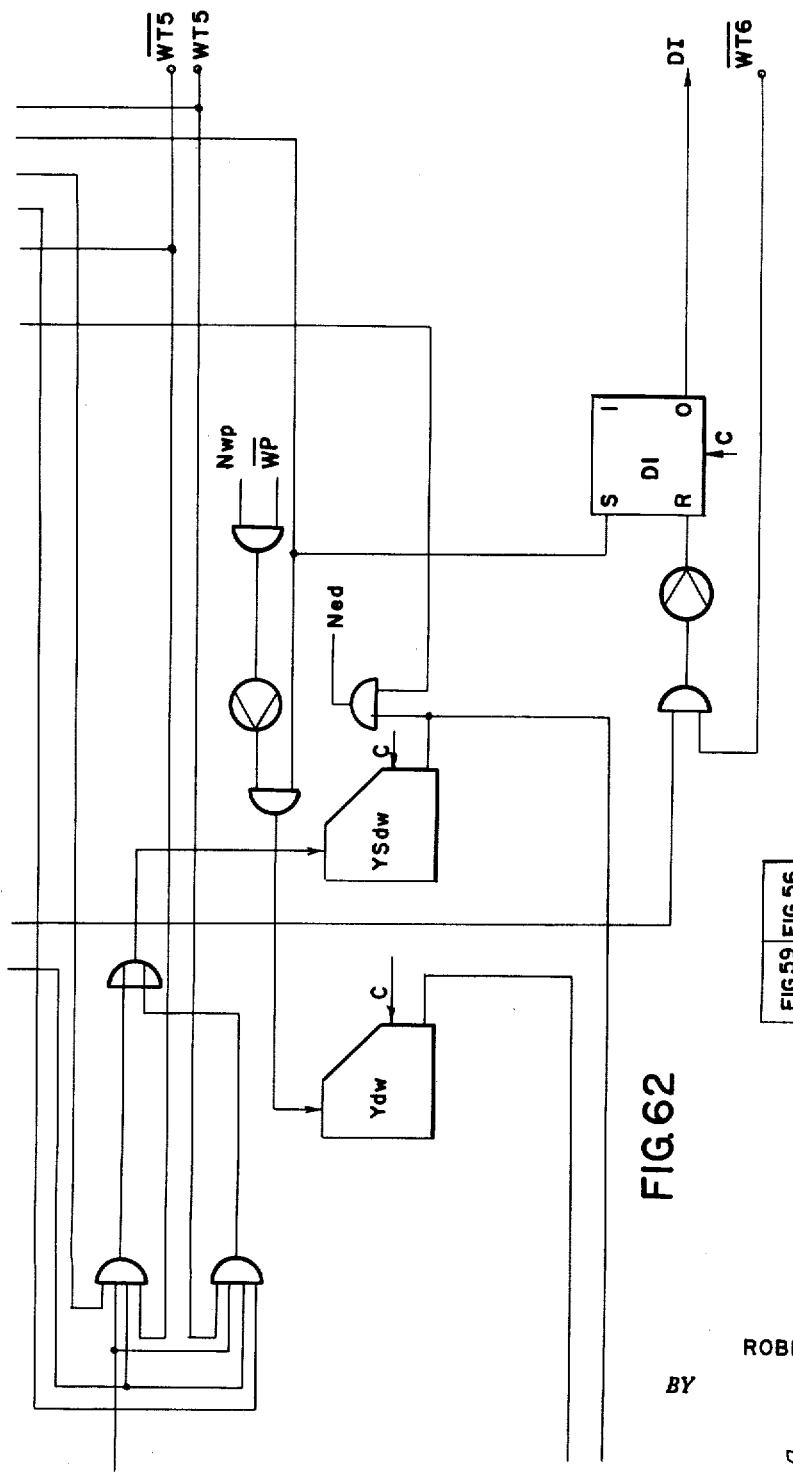
Figure 63:
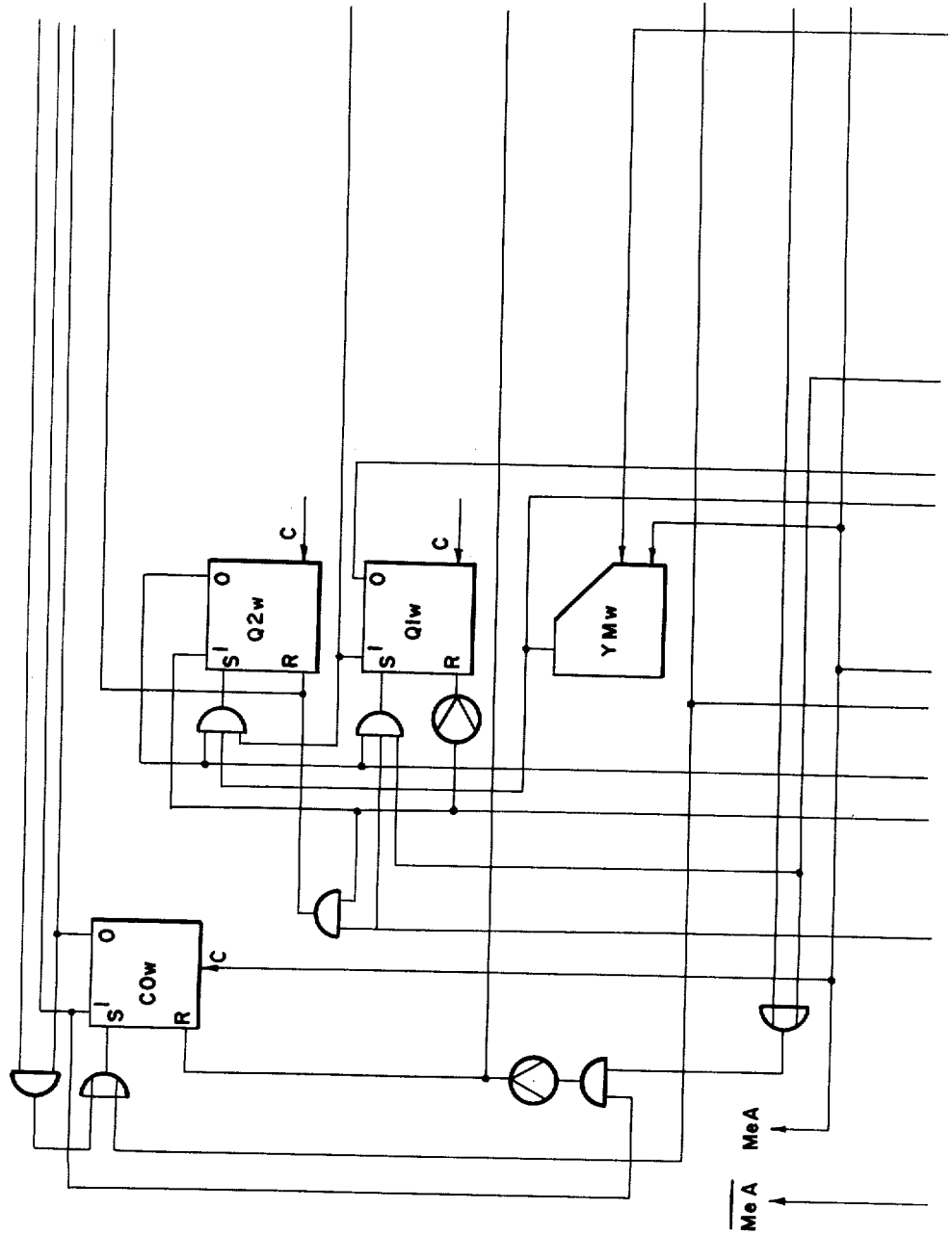
Figure 64:
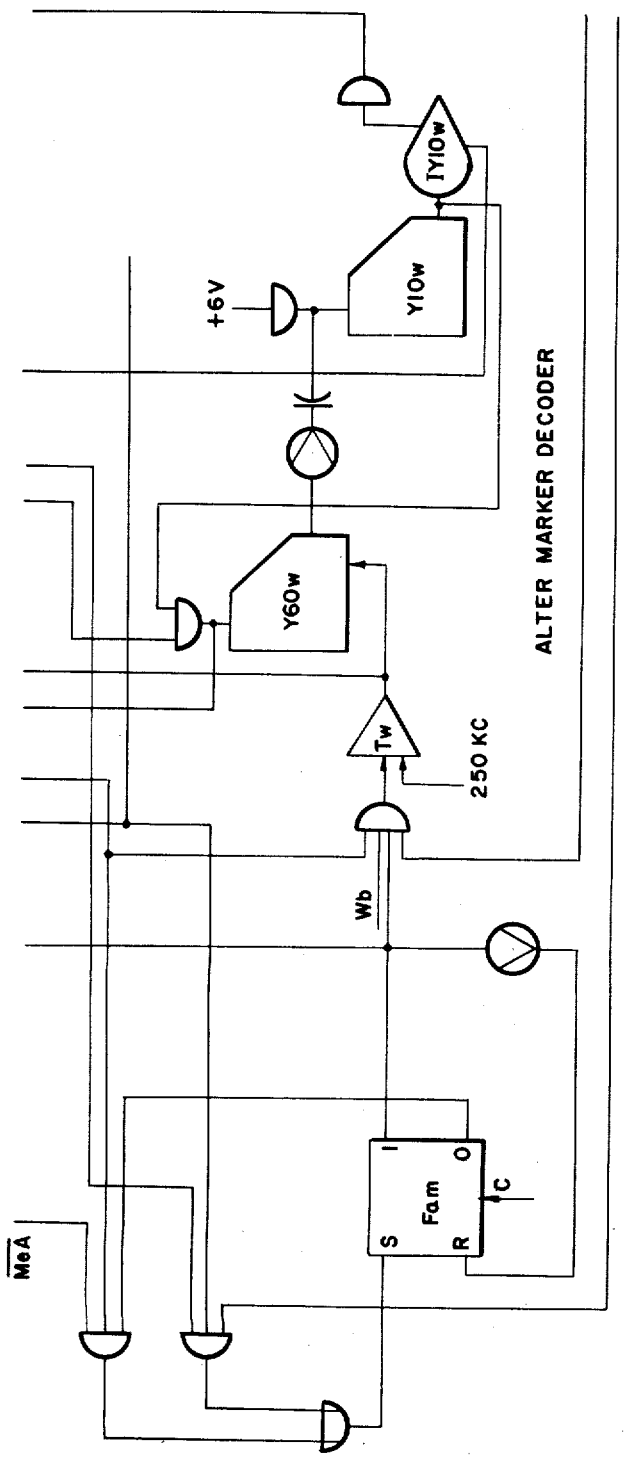
Figure 66:
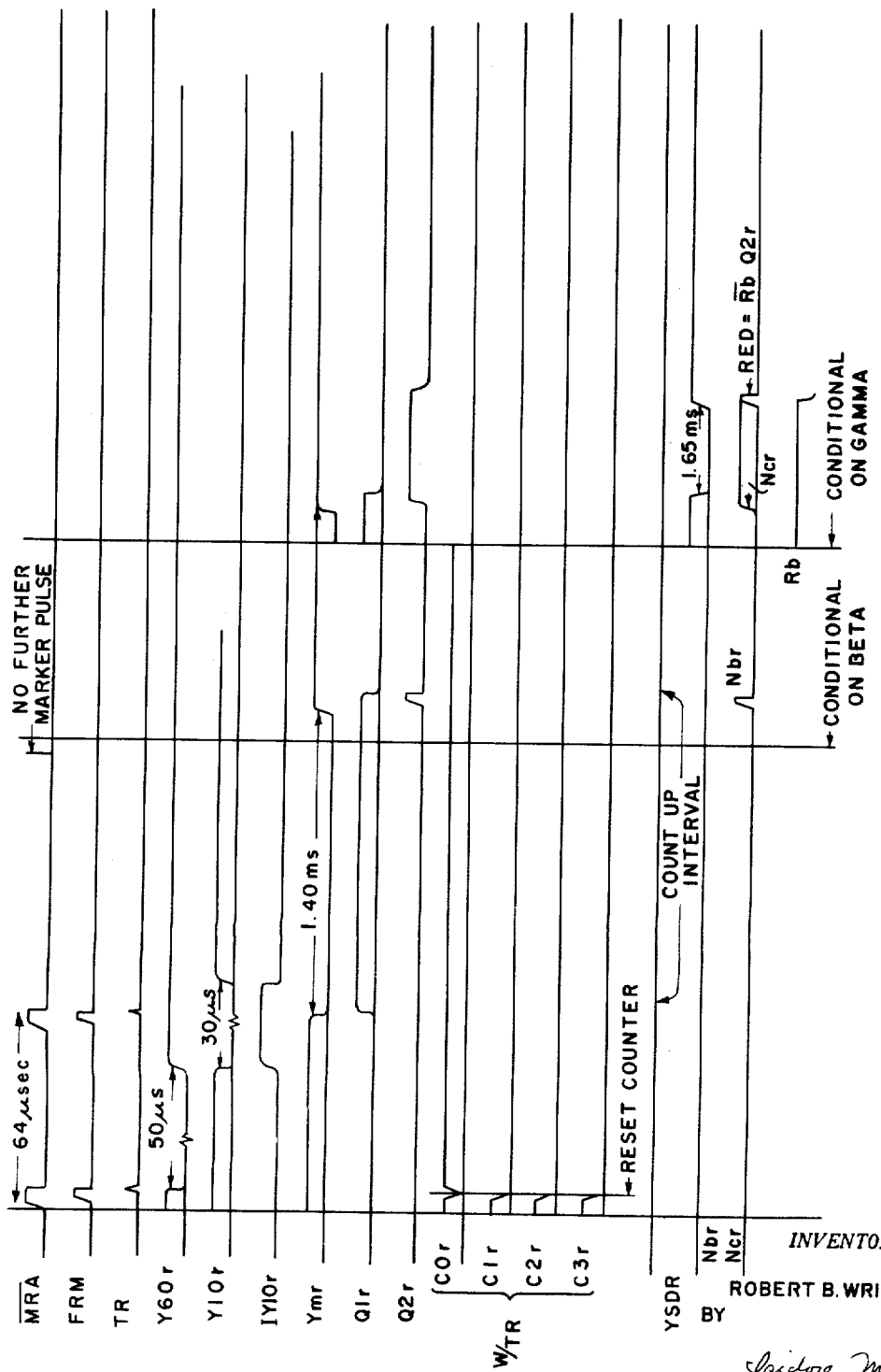
Figure 67A:
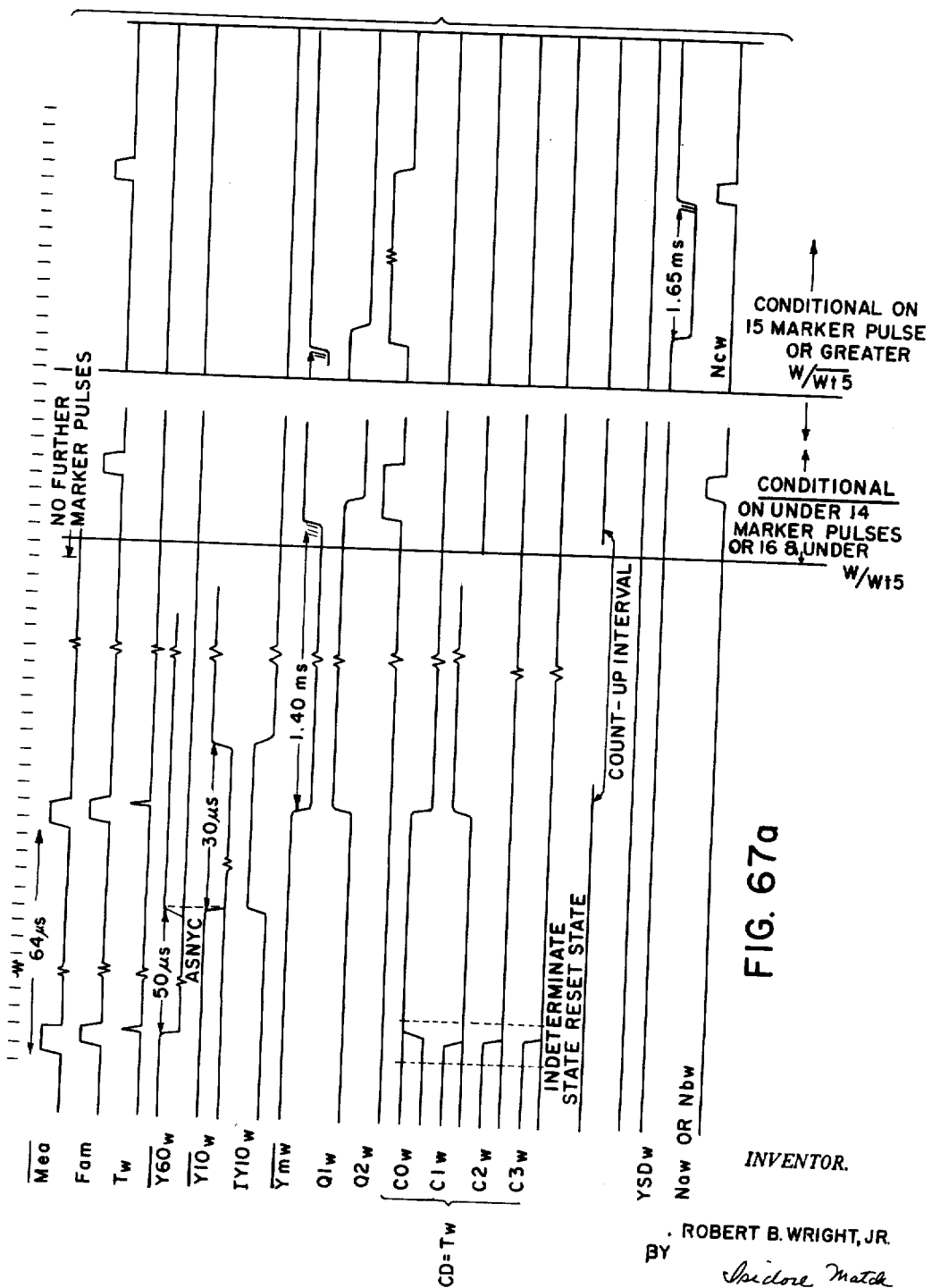
Figure 67B:
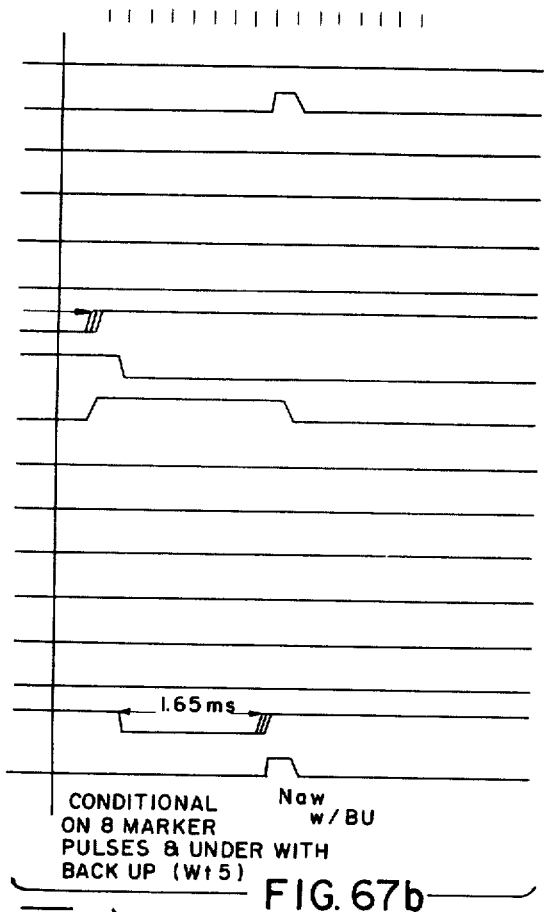
Figure 67C:
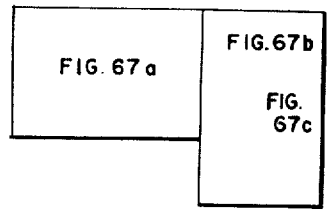
Figure 77:
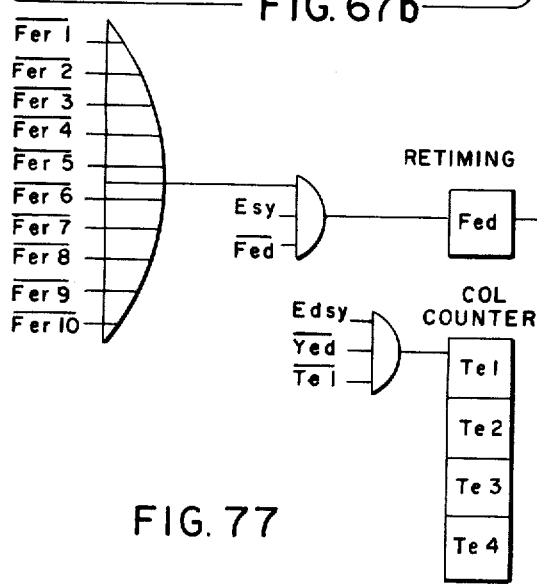
Figure 68:
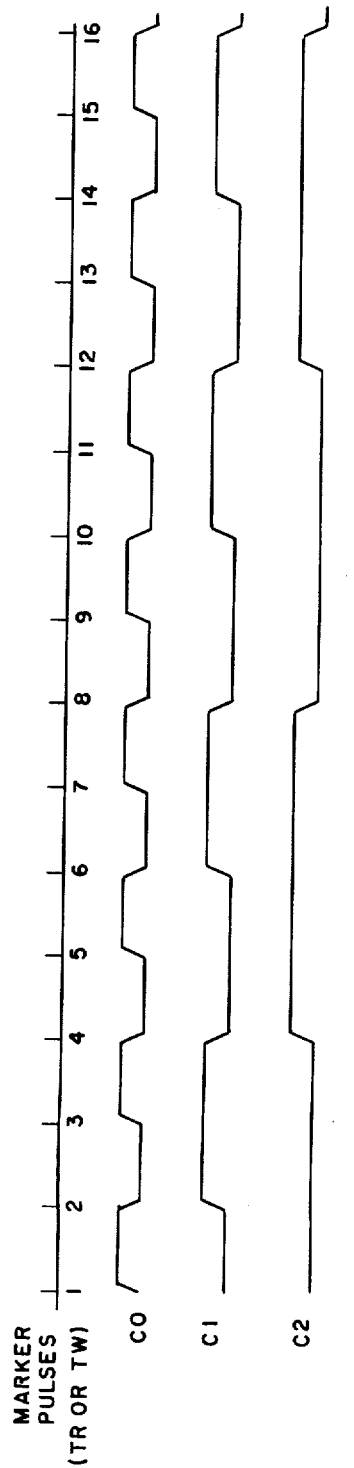
Figure 76:
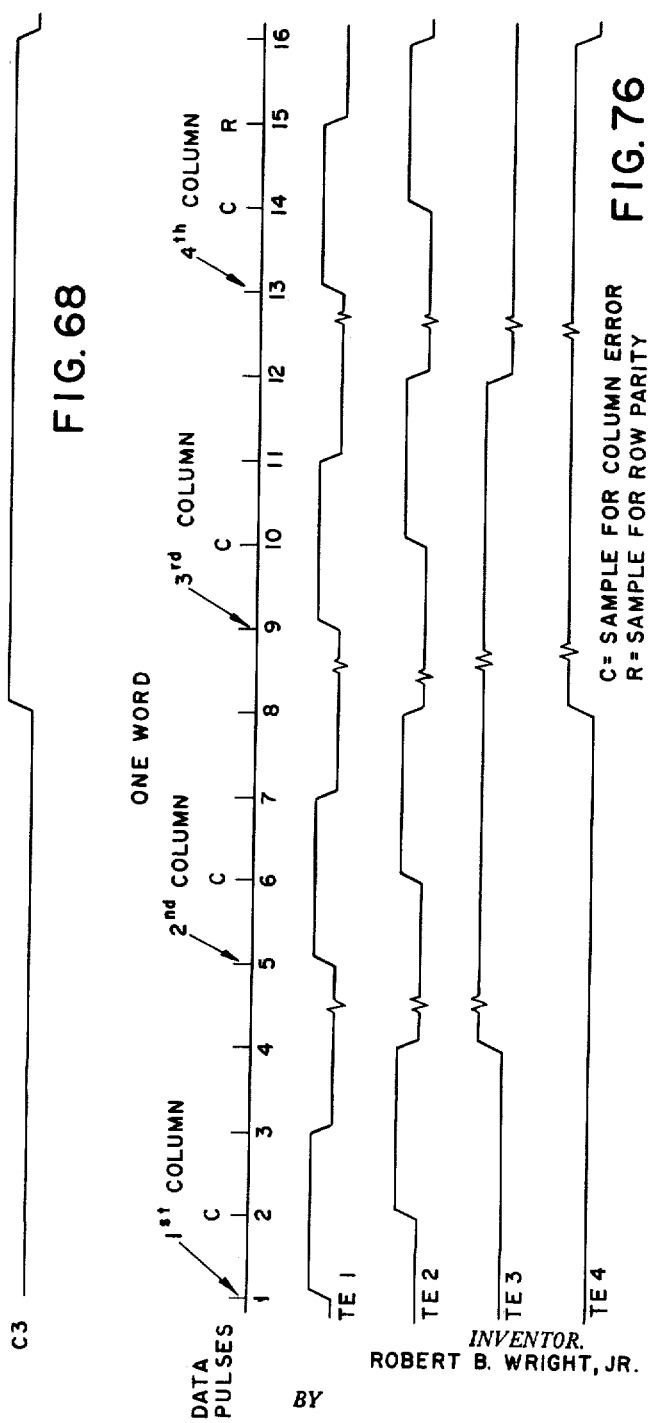
Figure 74:
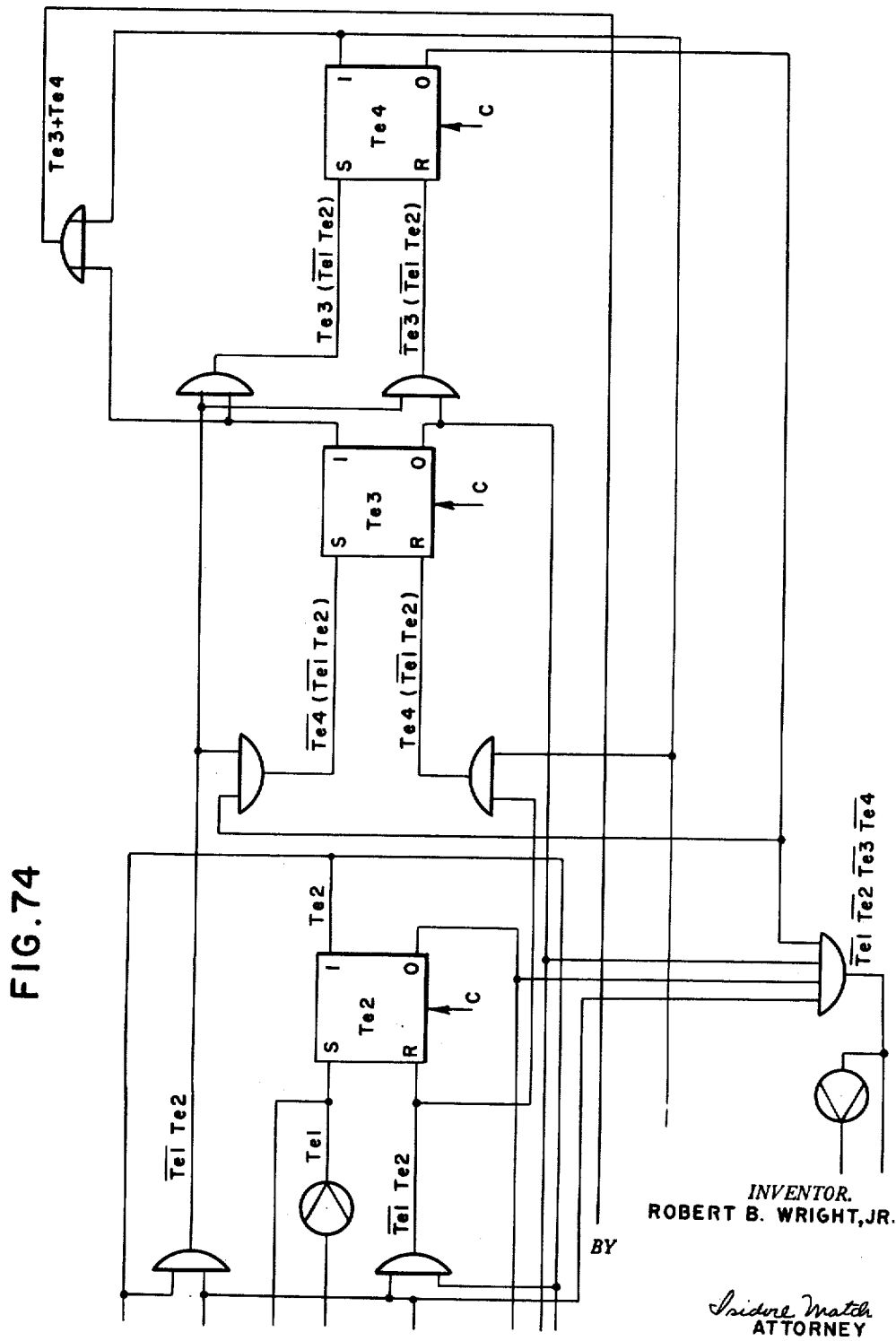
Figure 81:
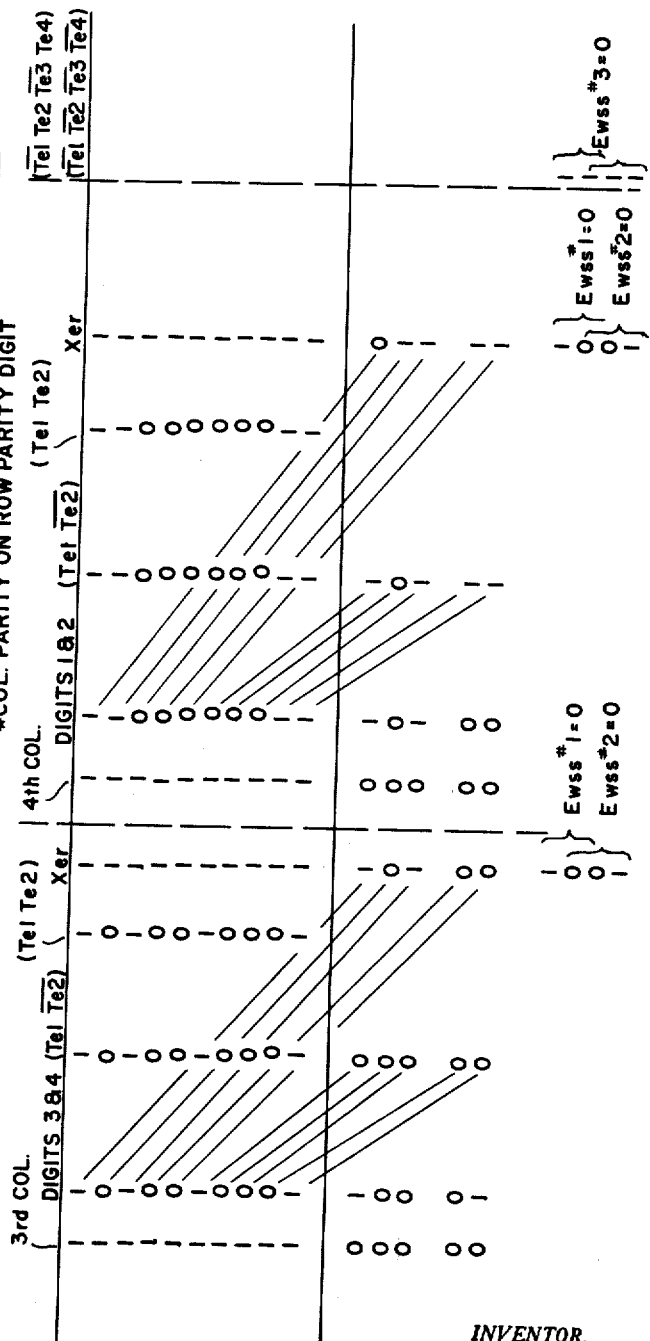
Figure 128:
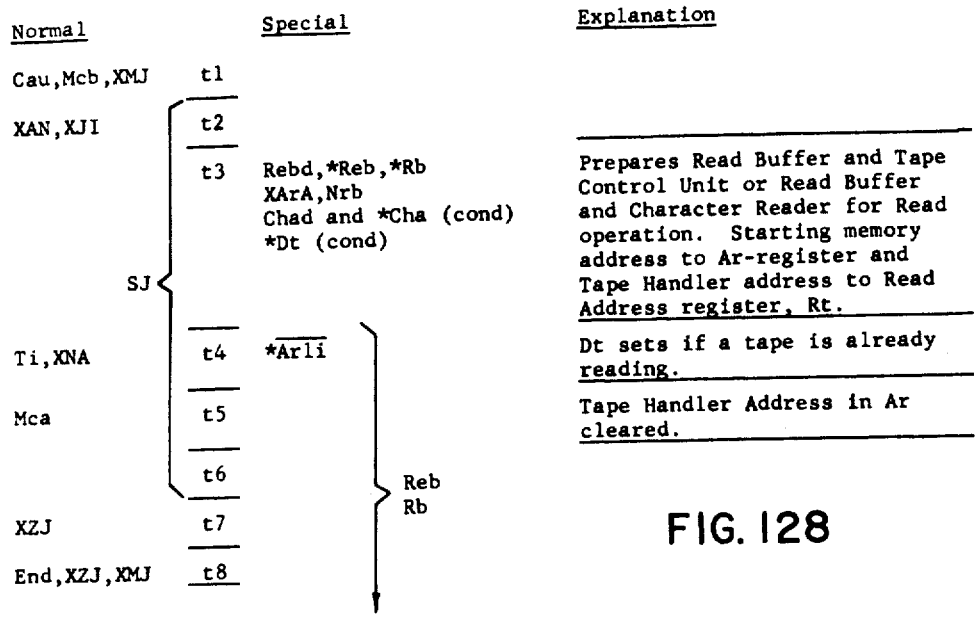
Figure 129:
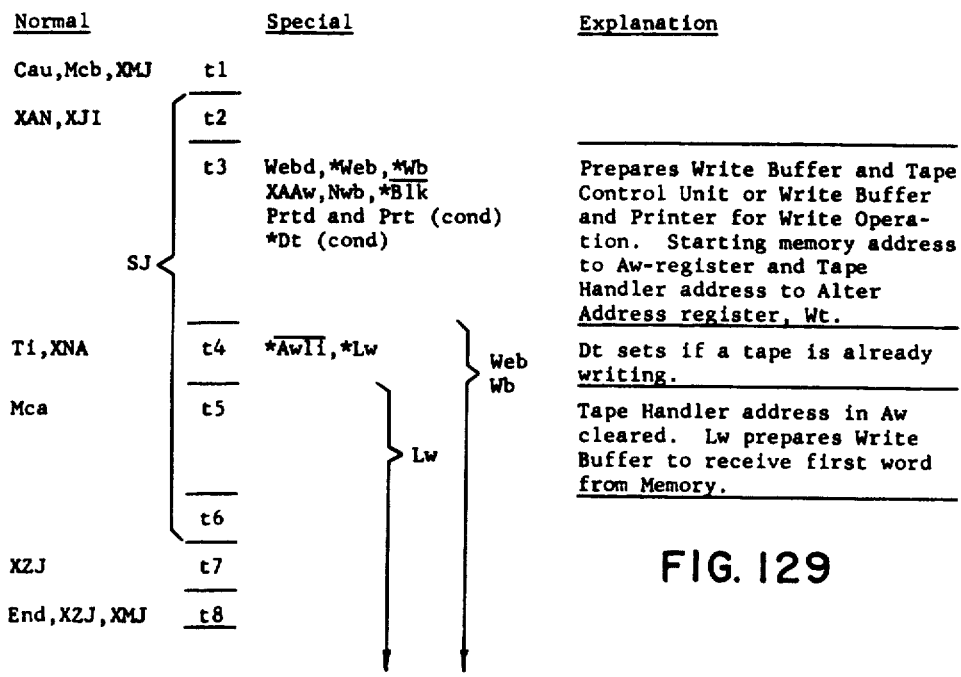
Figure 130:
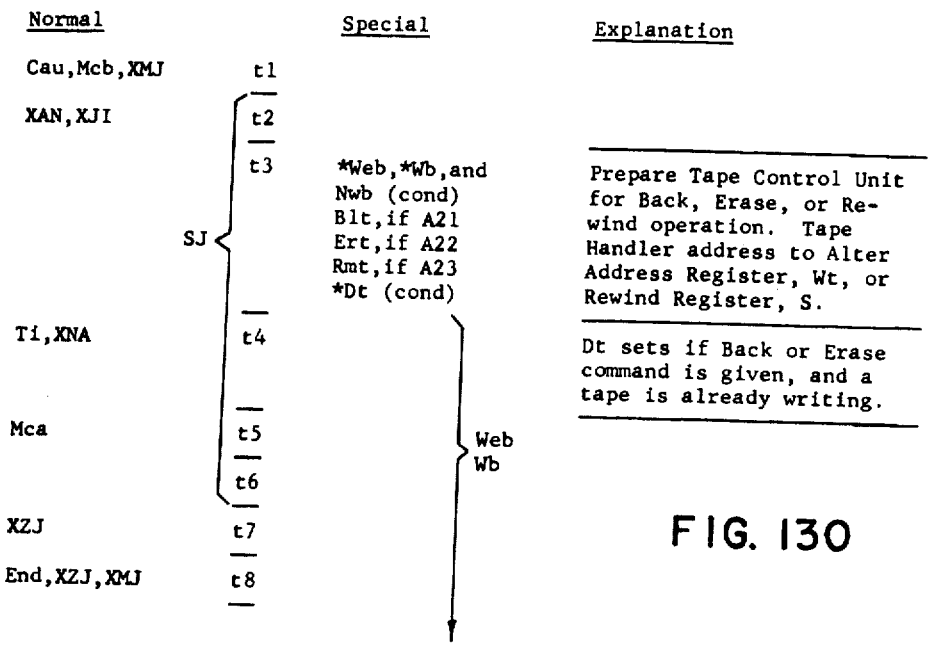
Figure 131:
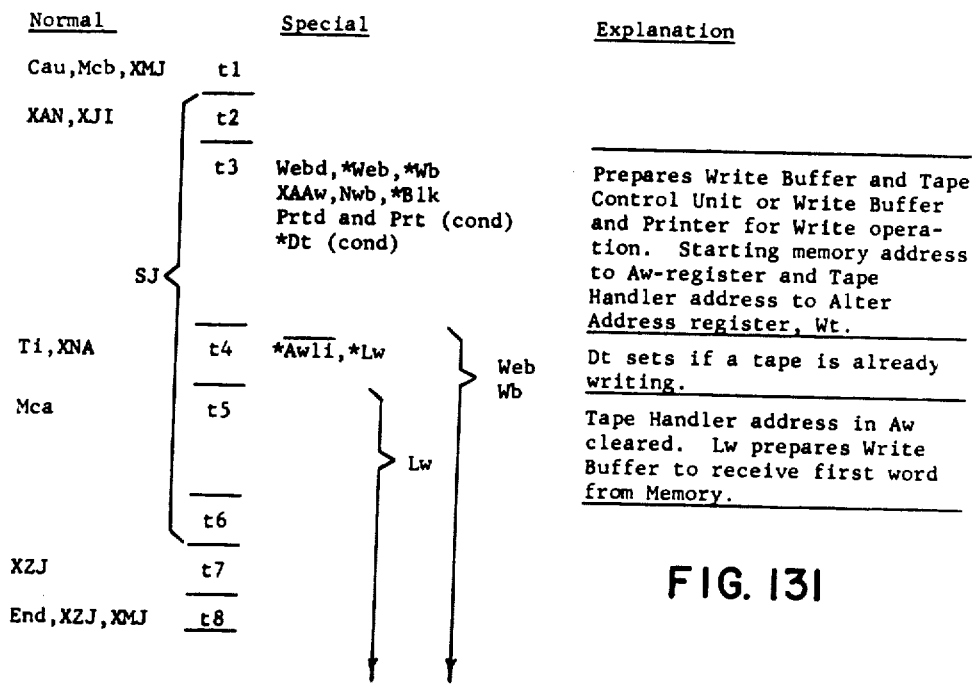

FIG. 8 provides circuit diagrams of two emitter followers useful in the system of FIG. 1, and illustrates the symbol employed to represent an emitter follower;

FIG. 9 is a circuit diagram of a register transfer circuit useful in the system of FIG. 1, and illustrates a symbol employed to represent the register transfer;

FIG. 10 is a circuit diagram of a register transfer interconnecting a pair of flip-flops;

FIG. 11 is a circuit diagram of a one-shot useful in the system of FIG. 1, and illustrates a symbol employed to represent the one-shot;

FIG. 12 is a block diagram of the data storage elements, the data transfer paths between these elements, and the major control elements of the system of FIG. 1;

FIGS. 13a and 13b provide a circuit diagram of the Central Console of the system;

FIG. 14 is a block diagram of the Write Buffer employed in the Multiplex Buffer of the system of FIG. 1;

FIGS. 15a and 15b taken together as in FIG. 15c is a block diagram of the clock circuit of the Tape Control System;

FIGS. 16 and 17 are schematic diagrams illustrating the scheme for writing data on the magnetic tape of the Tape Handlers;

FIG. 18 is a circuit diagram of a write driver useful in the Tape Control Unit;

FIG. 19 is a block diagram of the amplifiers employed in reading data from the magnetic tape of the Tape Handlers;

FIG. 20 is a circuit diagram of a read preamplifier useful in the Tape Handlers;

FIG. 21 is a circuit diagram of a read amplifier useful in the Tape Control Unit;

FIG. 22 is a block diagram of the Read Buffer employed in the Multiplex Buffer of the system of FIG. 1;

FIG. 23 is a block diagram of the circuits providing retiming for the data read from a magnetic tape;

FIG. 23a illustrates waveforms useful in explaining the operation of the data retiming circuits shown in FIG. 23;

FIG. 24 illustrates an arrangement of the interrelationship of the Tape Control Unit, the Tape Handlers, the Tape Buffers and the Central Processor;

FIG. 25 illustrates the layout of data on magnetic tape;

FIG. 26 illustrates the block marker arrangement on tape;

FIG. 27 is a diagram of the Tape Selection Panel;

FIG. 28 is a schematic diagram of the arrangement for indicating whether a single tape station is plural addressed;

FIGS. 29–34 taken together as in FIG. 35 is a diagram of the Tape Control Panel;

FIGS. 36–39 taken together as in FIG. 40 is a diagram illustrating the Tape Command Logic;

FIGS. 41–50 taken together as in FIG. 51 is a diagram of the Command Register Logic;

FIG. 52 is a timing diagram of the Read Control Operation;

FIG. 53 is a timing diagram of the Write Control Operation;

FIG. 54 is a timing diagram of the Backup Control Operation;

FIG. 55 is a timing diagram of the Erase Control Operation;

FIGS. 56–64 taken together as in FIG. 65 is a diagram illustrating the Block Marker Control and Alarm Logic;

FIG. 66 is a diagram of the Read Marker Channel Timing;

FIGS. 67a and 67b taken together as in FIG. 67c is a diagram of the Alter Marker Channel Timing;

FIG. 68 is a diagram illustrating the operation of a Marker Channel Timing Counter;

FIGS. 69–74 taken together as in FIG. 75 is a diagram illustrating the Echo Read Parity Check Logic;

FIG. 76 is a diagram illustrating the operation of the Echo Read Word Timing Counter;

FIG. 77 is a diagram illustrating the Echo Read Retiming Operation;

FIG. 78 is a diagram illustrating Echo Read Data Retiming;

FIG. 79 is a diagram illustrating the Echo Read Column Parity Check Operation;

FIGS. 80 and 81 taken together as in FIG. 82 is a diagram illustrating the Echo Read Row Parity Check Operation;

FIGS. 83–110 illustrate logical schematic diagrams of the logical circuits providing input signals to the flip-flops utilized in the system of the invention;

FIGS. 111–123 illustrate logical schematic diagrams of the logic circuits providing input signals to the one-shots utilized in the Tape Control System of the invention;

FIG. 124 illustrates logical schematic diagrams of the logic circuits providing logical combination signals in the Tape Control System of the invention;

FIG. 125 illustrates logical schematic diagrams of the logic signals providing designated logical combination signals in the Read Buffer;

FIG. 126 illustrates logical schematic diagrams of the logic circuits providing designated logical combination signals in the Write Buffer;

FIG. 127 illustrates logical schematic diagrams of the Write Buffer lines which are the outputs of the W$o$ flip-flop lines from Write Buffer;

FIG. 128 is a timing diagram illustrating Instruction 65 (Read Magnetic Tape);

FIG. 129 is a timing diagram illustrating Instruction 66 (Write Magnetic Tape);

FIG. 130 is a timing diagram illustrating Instruction 67 (Alter Magnetic Tape); and FIG. 131 is a timing diagram illustrating Instruction 68 (Write Blockettes on Magnetic Tape).

DATA PROCESSING SYSTEM—GENERAL

The Data Processing System of FIG. 1 is adapted to process data under operational control of a Central Processor 10. The lines interconnecting the various components illustrated in FIG. 1 represents symbolically paths of data and control communication.

The Central Processor responds to a plurality of distinct instructions, which are supplied thereto in the sequential order necessary to perform a particular data processing operation. A Control Console 11 provides an indicating and control station for the operator, whereby he has access to the system for modification of the order of execution of the instructions or for data revision. A Memory 12 stores data words which are to processed, data words which are the results of processing, and instruction words. The Central Processor communicates with the Memory to receive therefrom data words on which operations are to be performed and instruction words. Following certain data processing operations, the Central Processor transmits the resulting data words to the Memory for storage.

A P-Buffer 13, controlled by the Central Processor, temporarily stores data words being transferred from a Control Typewriter 14 or a Photoreader 15 to Memory and data words being transferred from Memory to the Control Typewriter. The Control Typewriter receives data words from the P-Buffer and types a visible representation of these words or punches on paper tape an encoded representative of these words. The Control Typewriter also transfers data words to the P-Buffer by reading encoded punched paper tape or upon depression of Control Typewriter keys in proper sequence. The Photoreader photoelectrically reads punched encoded paper tapes and transfers the electrical representations of the data thereon to the P-Buffer.

A Multiplex Buffer 16, indirectly controlled by the Central Processor, temporarily stores data being transferred from magnetic tape or from magnetically imprinted documents to Memory and data being transferred from Memory for recording on magnetic tape or for imprinting in visible representation. A Tape Control Unit 17 directs one of a plurality of Tape Handlers 18, 19, etc., to read data from the respective magnetic tape thereof and to deliver this data to the Multiplex Buffer. The Tape Control Unit also directs one of the Tape Handlers to write data provided by the Muliplex Buffer on the respective magnetic tape thereof.

A Sorter Control Unit 20 controls the reading of data borne by documents, such as bank checks, and directs the sorting of these documents into pockets of a Sorter 21. A Character Reader 22 senses magnetically imprinted information on these documents and delivers an encoded representation of this data to the Multiplex Buffer. The Central Processor delivers to the Sorter Control Unit data representing the pockets of Sorter 21 in order that the documents handled thereby may be appropriately sorted in accordance with the information thereon.

A Printer 23 receives data words from the Multiplex Buffer and prints a visible representation of these words.

Thus, the system of FIG. 1 processes data received from magnetic tape, documents, the Control Typewriter, or the Photoreader and communicates the results of the data processing by providing a visible record, by permanently storing the results on magnetic tape, by punching paper tape, or by sorting documents.

Data Representation

The Data Processing System of FIG. 1 is adapted to process data represented by the binary code. In the binary code, each element of information, termed a "bit," is represented by either a 1 or a 0. In the instant system a 1 is represented by a positive electrical signal and a 0 by a negative electrical signal. The fundamental unit of data for processing and communication is the data word. The data word comprises 28 bits.

SYSTEM CIRCUIT ELEMENTS

Circuits useful as elements of the system of FIG. 1 will now be described. The system will function with these elements or with other similar elements well-known in the art; therefore, this invention is not be considered as limited to the employment of the specific circuits shown.

The following circuits find general employment in the system: clock pulse generator, clock pulse driver, flip-flop, AND-gate, OR-gate, inverter, emitter follower, register transfer, and one-shot. Illustrated with the respective drawings of the circuit elements are symbols representative thereof. These symbols will be employed for simplicity in the description of the invention to follow.

In the figures for the circuit elements, specific values of the circuit components are shown. These values are not to be considered as limiting, and the circuit elements will often function satisfactorily with considerable variation from the values provided.

Clock Pulse Generator

Figure 2:
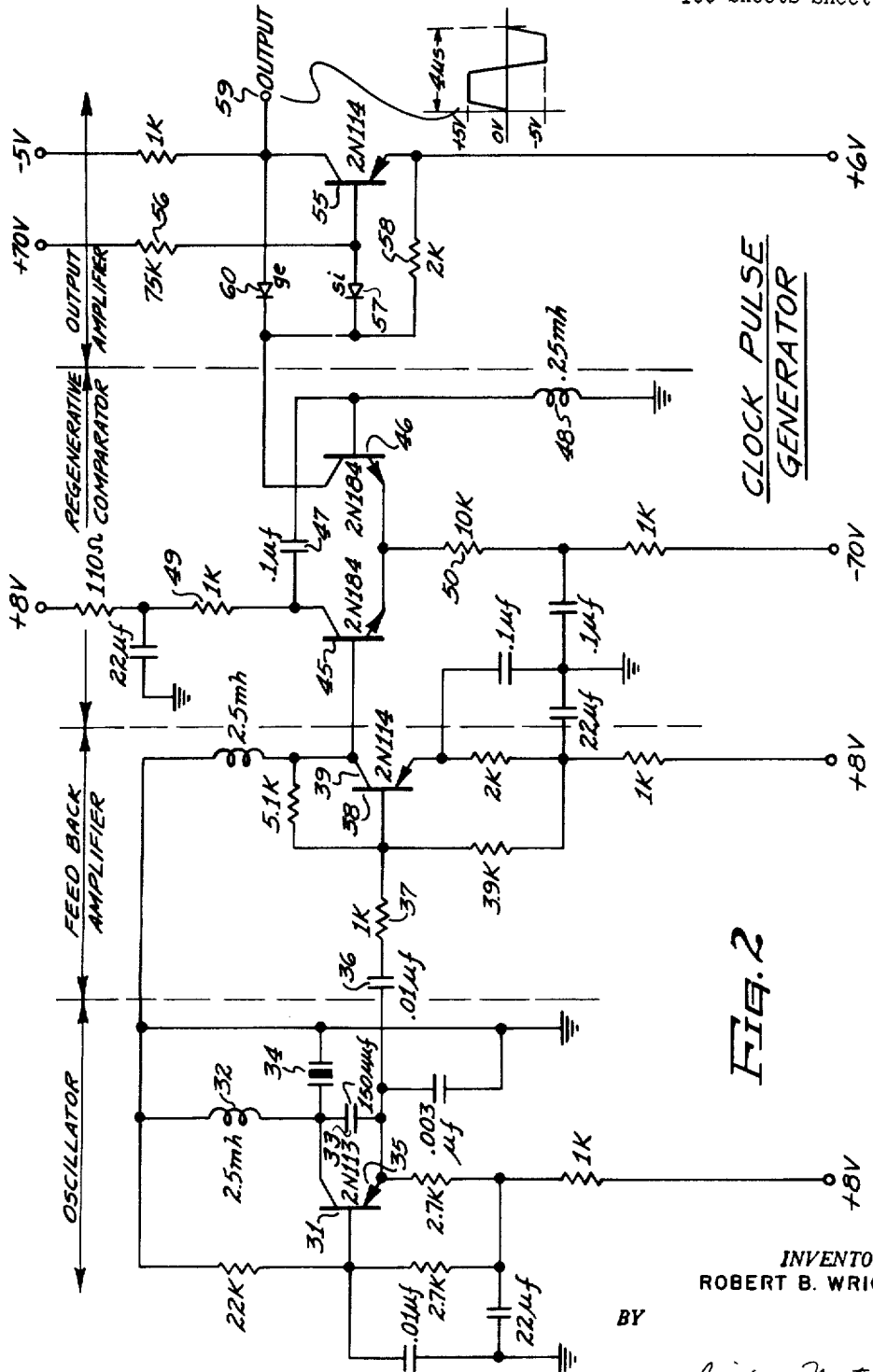
FIG. 2 is a circuit diagram of a clock pulse generator useful in the system in FIG. 1.

The clock pulse generator of FIG. 2 provides synchronizing signals for clock pulse drivers located throughout the system. The synchronizing signals are provided at a repetition rate of 250 kc. The clock pulse generator comprises the following four circuits connected in tandem: an oscillator, a feedback amplifier, a regenerative comparator, and an output amplifier.

The oscillator comprises a transistor 31 coupled to a resonant circuit comprising an inductor 32 and a capacitor 33. The approximate frequency of oscillation is determined by the resonant frequency of inductor 32 and capacitor 33. A crystal 34, coupled to the resonant circuit, locks the oscillator at the desired frequency. The sine wave output signal of the oscillator is taken from the emitter electrode 35 of transistor 31.

The output signal of the oscillator is transmitted through a capacitor 36 and a resistor 37 to the base electrode of transistor 38 of the feedback amplifier. The feedback amplifier has substantial voltage gain, whereby the output signal thereof, delivered at collector electrode 39, is a sine wave having an amplitude of approximately 1 volt peak-to-peak.

The output signal of the feedback amplifier is applied directly to the base electrode of transistor 45 of the regenerative comparator. The regenerative comparator is a bistable circuit delivering a substantially square wave in response to the received sine wave, and is provided for obtaining a waveform with a steep wavefront from the input signal. The regenerative comparator operates substantially as follows: Consider the portion of the cycle of operation when the input signal is negative with respect to ground, but is increasing positively. At this time transistor 45 is non-conducting and transistor 46 is conducting. In this stable state, the base electrode of transistor 46 is at 0 volts (v.), or ground. The collector electrode of transistor 45 is at +8 v., and capacitor 47 is charged to +8 v. The emitters of both of transistors 45 and 46 will be a fraction of a volt negative with respect to ground, since transistor 46 is conducting. As the input voltage applied to the collector electrode of transistor 45 increases positively and reaches 0 v., the emitter-base junction of transistor 45 becomes forward biased and collector current commences to flow therein. A sharp regenerative action thereupon ensues, with transistor 45 turning on sharply and transistor 46 turning off sharply. During this regenerative action, the negative swing at the collector electrode of transistor 45 is coupled through capacitor 47 to the base electrode of transistor 46. As the emitter current of transistor 46 decreases, the emitter voltage thereof becomes more negative, increasing the forward bias of transistor 45 and sustaining the regenerative action. The time constant of capacitor 47, inductor 48 and resistor 49 is adjusted so that the sharp negative pulse at the base electrode of transistor 46 terminates in about 2 microseconds.

So long as the input signal now remains positive, transistor 45 continues to conduct and transistor 46 remains non-conducting. After the input voltage has passed its positive peak value and is decreasing negatively, all switching transients have terminated and the base electrode of transistor 46 is again at 0 v. The emitter electrode of transistor 46 is only a fraction of a volt less than the positive voltage applied to the base electrode of transistor 45 and, therefore, is positive with respect to the base electrode of transistor 46 at this time. When the signal applied to transistor 45 decreases negatively and reaches 0 v., transistor 46 becomes forward biased and commences to conduct. As the emitter current of transistor 46 starts to increase, the increasing voltage drop across resistor 50 decreases the forward bias of transistor 45. As the emitter current of transistor 45 decreases, the collector current thereof decreases, allowing the collector voltage to swing sharply positive. The positive swing at the collector electrode of transistor 45 is coupled by capacitor 47 to the base electrode of transistor 46, causing a sharp regenerative action which cuts off transistor 45 very rapidly and turns on transistor 46 very rapidly. As the input voltage now continues in its negative half cycle, transistor 46 continues conducting and transistor 45 continues non-conducting.

When transistor 46 is conducting the emitter current thereof is relatively constant, so that square waves of current appear at the collector electrode thereof. Because of the regenerative action, the slope of the leading edge of the current waveform will depend but little on the amplitude of the input signal applied to the base electrode of transistor 45, but will depend primarily on the circuit parameters of the regenerative comparator.

The signal available at the collector electrode of transistor 46 is employed as the output signal of the regenerative comparator.

The output signal of the regenerative comparator is coupled to an output amplifier, which functions to isolate the regenerative comparator from the clock pulse generator load, while preserving the steep wavefront of the waveforms generated. A transistor 55 of the output amplifier and its associated circuit is adapted to receive the output signal of the regenerative comparator and to provide amplification thereof. When the collector electrode current of transistor 46 is zero, transistor 55 is maintained cut off by the current passing through resistor 56, silicon diode 57 and resistor 58. At this time the clock pulse generator output signal from terminal 59 is −5 v. When transistor 46 is conducting the potential at the collector electrode thereof is sufficiently negative to provide forward bias for transistor 55, which thereupon conducts. When transistor 55 conducts the potential at output terminal 59 is approximately +5 v. The combination of silicon diode 57 and germanium diode 60 prevents transistor 55 from saturating, thus insuring more rapid cut off of transistor 55 when transistor 46 is cut off.

An approximate waveshape of the output signal from terminal 59 is illustrated in the waveform immediately below output terminal 59.

Clock Pulse Driver

Figure 3:
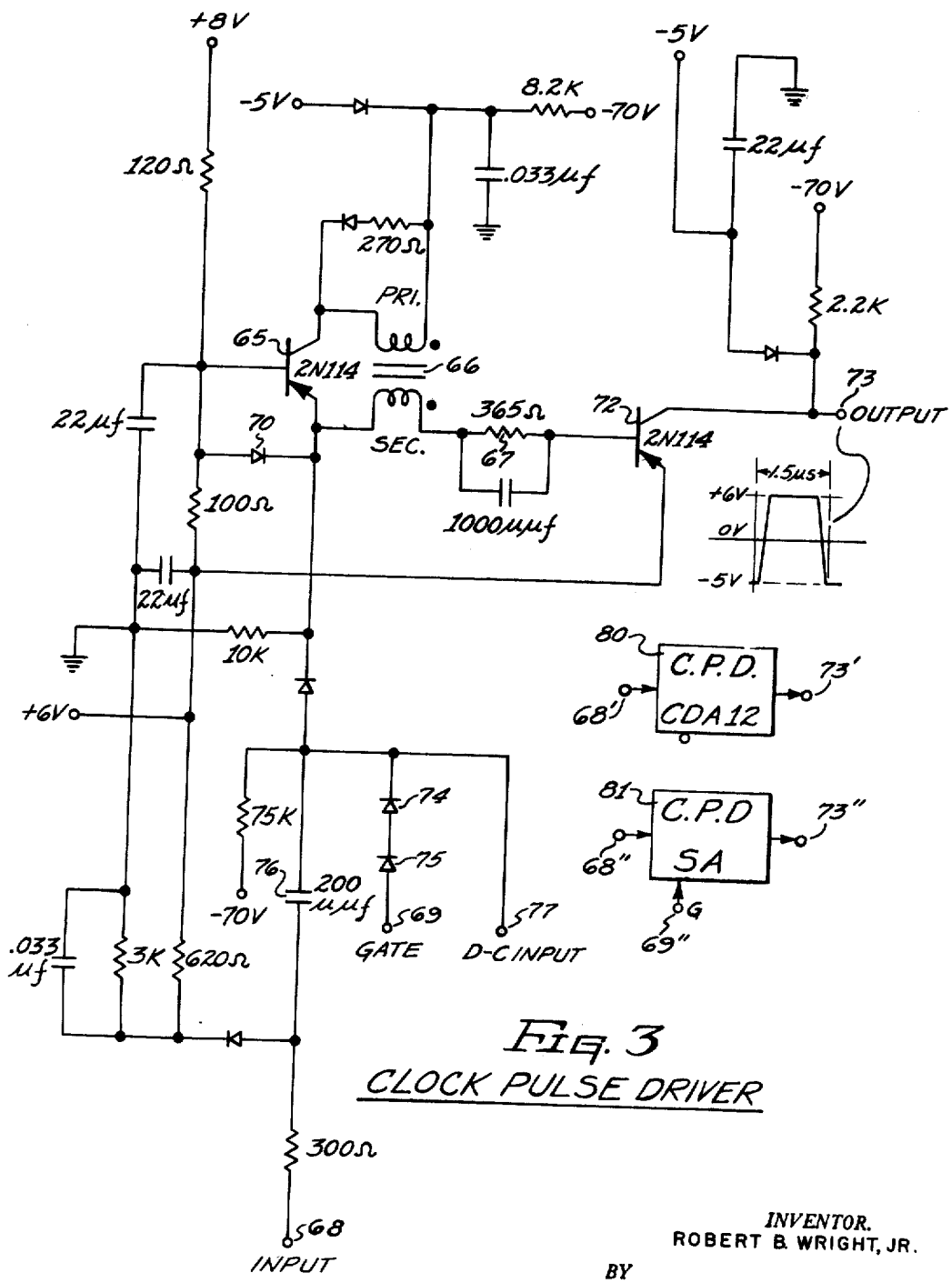
FIG. 3 is a circuit diagram of a clock pulse driver useful in the system of FIG. 1, and illustrates two symbols employed to represent the clock pulse driver.

The clock pulse driver of FIG. 3 provides clock pulse signals to drive other clock pulse drivers or for direct application to flip-flops and register transfers to control respectively the entry of data into flip-flops and the transfer of data between flip-flops. The clock pulse driver responds to positive trigger signals supplied by a clock pulse generator to generate corresponding clock pulses. The clock pulse driver may be gated to provide single clock pulses or clock pulses at the 250 kc. rate. When gated on, the clock pulse driver generates a clock pulse for each trigger signal received, but when gated off, no clock pulses are generated.

The clock pulse driver is basically a triggered blocking oscillator with output amplifier. A transistor 65, a transformer 66, a resistor 67, and associated biasing and power supply circuits, shown in FIG. 3, comprise the blocking oscillator portion of the clock pulse driver. A trigger signal supplied by the clock pulse generator is received at input terminal 68 and triggers the blocking oscillator to produce an output clock pulse. The trigger signal is only effective to trigger the blocking oscillator if the oscillator is not gated off by a negative voltage applied to gate terminal 69.

In the quiescent state, the base electrode of transistor 65 is at approximately +6.7 v., and transistor 65 is nonconducting due to the reverse bias applied thereto by the conduction of diode 70. The input trigger signals of the clock pulse generator have a peak-to-peak swing from −5 v. to +5 v., or a total excursion of about +10 v. When the gate input terminal 69 is enabled, a +6 v. signal is applied thereto. At this time the input trigger signal has sufficient amplitude to overcome the reverse bias applied to transistor 65.

The input trigger signal initiates the flow of a small emitter current in transistor 65. This, in turn, causes the flow of a small collector current through the primary winding of transformer 66. This increase in collector current in the primary winding of transformer 66 induces a voltage in the secondary winding thereof in a direction to apply a positive voltage to the emitter electrode of transistor 65. This induced voltage causes the emitter electrode to conduct more heavily. Thus, the circuit is highly regenerative and will quickly drive the transistor into saturation, wherein the impedance of the transistor between electrodes is substantially zero, and the entire applied voltage is developed across the transformer primary winding. The resulting large voltage developed across the secondary winding of transformer 66 saturates transistor 72 of the output amplifier, so that only resistor 67 limits the flow of emitter current in transistor 65. Since the total applied voltage appears across the primary winding of transformer 66, the collector current of transistor 65 rises linearly toward the maximum allowable value of collector current, as determined by the emitter current. The time for this current to rise to the maximum value is determined by the inductance of transformer 66.

When the collector current of transistor 65 reaches its maximum value, the resulting voltage induced in the transformer terminates. Another regenerative action takes place and the transistor cuts off rapidly.

When transistor 65 is conducting, transistor 72 conducts, and the clock pulse driver output signal, at terminal 73, is at approximately +6 v. When transistor 65 is non-conducting, transistor 72 is non-conducting, and the output signal from the clock pulse driver is clamped at −5 v. The clock pulse provided at terminal 73 is illustrated immediately below terminal 73.

When the clock pulse driver is gated off, by application of a −5 v. signal to terminal 69, a voltage drop of approximately 1 volt occurs across diodes 74 and 75. Thus, −4 v. is provided at the corresponding terminal of capacitor 76. The receipt of the input trigger signal, with swing of +10 v., will drive the emitter electrode of transistor 65 to only +6 v. Inasmuch as the base electrode of transistor 65 is at +6.7 v., the transistor will not conduct and a clock pulse will not be delivered. Therefore, only when the clock pulse driver is enabled by the application of an appropriate gating signal thereto, will output clock signals be provided thereby.

If the clock pulse driver is to operate continuously and to provide an output clock pulse at a continuous 250 kc. rate, a +6 v. D.-C. bias is applied to input terminal 77.

Two symbols, shown in FIG. 3, are employed to represent the clock pulse driver. Symbol 80 represents a continuous clock pulse driver. Input trigger signals are received from a clock pulse generator by the input lead on the left-hand side of the block. Output clock pulses are delivered continuously from the output lead on the right-hand side of the block. The symbol 81 represents a gated clock pulse driver. Input trigger signals are received at the left-hand terminal and gated output clock pulses are delivered at the right-hand terminal. The gating signal is applied to the terminal "G" at the bottom of the symbol. The G terminal represents the gate input terminal 69 of the clock pulse driver. So long as the gating signal is at the −5 v. level, no output clock pulses are delivered from the right-hand lead. When the gating signal is increased to +6 v., the clock pulse driver delivers a clock pulse for every input trigger signal received. The gating signal is identified by the "Gate-" prefix. Thus, the gating signal applied to the SA clock pulse driver is identified as the Gate-SA signal.

Generally clock pulse drivers and their respective output signals are identified in accordance with the function they perform. Thus, clock pulse drivers whose designations begin with the letter "C," such as clock pulse driver CDA12, drive flip-flops and other clock pulse drivers. Clock pulse drivers driving register transfers generally have designations beginning with the letters "S" or "X." The letter "S" denotes a clock pulse driver directing a serial shift of data. Thus, the clock pulse driver SA delivers the clock signal SA and provides a serial shift of the contents of the A-register. The letter "X" denotes a clock pulse driver directing a parallel shift, or transfer, of data. Thus, the clock pulse driver XAN provides a parallel transfer of data between the A-register and the N-register.

Flip-Flop

The flip-flop of FIG. 4 provides temporary storage of a data word bit or provides temporary storage of a control signal. Generally, when a flip-flop is employed to store a data bit it comprises one of an array of flip-flops denoted as a register. For example, in a register adapted to proivde temporary storage for a complete data word, 28 flip-flops are employed, one for each bit of the data word.

The flip-flop is a circuit adapted to operate in either one of two stable states, and to transfer from the state in which it is operating to the other stable state upon application of a trigger signal thereto. In one state of operation the flip-flop represents the binary 1 (1-state) and in the other state the binary 0 (0-state). The flip-flop circuit includes a pair of collector-coupled transistor amplifiers, comprising the respective transistors 101, 102. The coupled transistor amplifier pair is connected to a pair of grounded-emitter transistor output amplifiers, the output signals thereof representing respectively the binary numbers 1 and 0, according to the stable state in which the flip-flop is operating. The two output amplifiers are designated respectively the 1-output amplifier and the 0-output amplifier, and comprise the respective transistors 103 and 104.

The flip-flop is adapted to receive five input signals, as follows:

(a) A clock pulse signal, received at input terminals 105 and 105′, and supplied by a clock pulse driver, (b) An input logic signal for triggering the flip-flop to its 1-state, received at input terminal 106, and usually supplied by a logical gate, (c) An input logic signal for triggering the flip-flop to its 0-state, received at input terminal 107, and usually supplied by a logical gate, (d) An input signal for triggering the flip-flop to its 1-state, received at input terminal 108, and usually supplied by a register transfer circuit, and (e) An input signal for triggering the flip-flop to its 0-state, received at input terminal 109, and usually supplied by a register transfer circuit.

A flip-flop output signal representing the 1-state of the flip-flop is delivered at output terminal 110 and an output signal representing the 0-state of the flip-flop is delivered at output terminal 111.

The operation of the flip-flop will now be described. In both of the stable states of the flip-flop one of transistors 101 and 102 is conducting and the other is non-conducting. Assume that transistor 101 is conducting and transistor 102 is not conducting. When transistor 101 conducts its collector electrode voltage is approximately at +8 v. This voltage, when coupled to the base electrode of transistor 102 causes the potential thereof to be approximately +8.3 v. and maintains transistor 102 in its nonconducting state. The flip-flop will continue in this state until application of a positive voltage greater than +8 v. to the base electrode of transistor 101. Transistor 101 will momentarily cease conducting. When transistor 101 ceases conducting, the collector electrode potential thereof becomes momentarily more negative. This negative change is coupled through capacitor 114 to the base electrode of transistor 102, which will then commence conducting. The collector electrode potential of transistor 102 will begin rising, and this potential rise will be coupled by a capacitor 115 to the base electrode of transistor 101. The positive-going voltage coupled to the base electrode of transistor 101 tends to further decrease its tendency to conduct. This regenerative action continues until transistor 102 is fully conducting and transistor 101 is non-conducting. At this time the flip-flop has transferred from the state in which it was operating to the other stable state.

When transistor 101 is conducting and transistor 102 is non-conducting the flip-flop is in its defined 0-state, and when transistor 102 is conducting and transistor 101 is non-conducting the flip-flop is in its 1-state. Thus, the state of operation of the flip-flop represents a binary digit.

When the flip-flop is in its 0-state, the +8 v. of the collector electrode of transistor 101 is coupled to transistor 103 and maintains transistor 103 in a state of non-conduction. The signal provided at output terminal 110 at this time is at the −5 v. level. Inasmuch as the system logical elements and flip-flops respond to positive signals of approximately +6 v., the −5 v. delivered at output terminal 110 denotes a binary 0. Similarly, when transistor 101 is conducting, a negative voltage is coupled to transistor 104, so that transistor 104 conducts and delivers a +6 v. signal at output terminal 111. The elements of the system are adapted to respond to the +6 v. signal, and it is, therefore, denoted as a binary 1. Therefore, when the flip-flop is in the 0-state, a 0-output signal is provided by the 1-output terminal and a 1-output signal is provided by the 0-output terminal. Thus, system elements adapted to respond to the flip-flop 0-state will be enabled by the +6 v. signal delivered at terminal 111, whereas elements adapted to respond to the flip-flop 1-state will be disabled by the −5 v. signal delivered at terminal 110.

Conversely, when transistor 102 is conducting, so that the flip-flop is in its 1-state, a +6 v. signal, representing a binary 1, is supplied at terminal 110 and a −5 v. signal representing a binary 0, is supplied at terminal 111. Thus, the designation of output terminal 110 as a 1-output terminal indicates that when the flip-flop is in its 1-state, a binary 1-output signal is provided therefrom. The designation of terminal 111 as a 0-output terminal indicates that when the flip-flop is in its 0-state, a binary 1-output signal is provided therefrom.

Consider now the input signals which will trigger the flip-flop; that is, those signals which will transfer the flip-flop from the state in which it is operating to its other stable state. The signals applied to terminals 106 and 107 result from the logical combination of other data-representing signals. When a logical combination represents a binary 0, the resulting logic signal is approximately −5 v. When a logical combination represents a binary 1, the resulting logic signal is approximately +6 v. Inasmuch as +8 v. is applied to the emitter electrode of the one of the transistors 101 and 102 that is non-conducting, neither a 0-logic signal nor a 1-logic signal is adequate, alone, to trigger the flip-flop when applied to terminal 106 or 107.

The input logic signals applied to terminals 106 and 107 are coupled to the respective capacitors 116 and 117 and charge the corresponding capacitors to the logic voltage level. When a clock pulse is applied to terminals 105 and 105', the terminals will experience a positive voltage swing of approximately +11 v., as described in the previous section on the clock pulse driver. If a 1-logic signal is present at terminal 106 or terminal 107, the clock pulse signal is superposed thereon and momentarily drives the corresponding base electrode of transistors 101 and 102 to +17 v., a voltage sufficient to momentarily cause the transistor to stop conduction, if it is conducting, and, therefore, to change the state of the flip-flop. However, any one of terminals 106 and 107 which is receiving a 0-logic signal when the clock pulse occurs will cause a signal of but +6 v. to be applied to the base electrode of the corresponding flip-flop transistors, a signal insufficient to change the state of the flip-flop. This type of flip-flop triggering is known as clock pulse pedestal triggering and enables the flip-flops of the system to change their state in synchronism with the clock pulses. Between clock pulses, which occur no more frequently than every 4 microseconds, there is adequate time for the logic elements of the system to change their state and for the resulting logical combination signals to stabilize at the logic input terminals 106 and 107 of all flip-flops. Then when clock pulses are applied to any one of the flip-flops, the input logic signal levels will determine whether the flip-flop changes state. Since clock pulses are applied to both sides of the flip-flop simultaneously, only one of the logic inputs to the flip-flop is ordinarily permitted to be in the 1-state at any given time. If both logic inputs are in the 1-state, the clock pulse would attempt to turn off both transistors simultaneously and the flip-flop would not change its state. If both logic inputs are in the 0-state, the flip-flop does not change.

The diodes 119 and 120 isolate the input logic signal source from the flip-flop when the clock pulse occurs. The combination of the silicon and germanium diodes coupled to transistors 101 and 102 prevent saturation and are similar to those described for the clock pulse generator.

In addition to the input logic signal, which when enabled by a clock pulse, will trigger the flip-flop, a register transfer input signal of proper amplitude, applied to terminals 108 or 109 will trigger the flip-flop. The register transfer signal, usually provided by a register transfer circuit, consists of a logic signal with superposed clock pulse. Therefore, if the logic signal represents a binary 1, thereby having a +6 v. amplitude, the register transfer signal will be sufficient to trigger the flip-flop. The superposed logic and clock signal is provided in the register transfer circuit to be described later. Therefore, the signals applied to terminals 108 or 109 are independently triggering, since they are adapted to trigger the flip-flop without requiring the clock pulses applied to terminals 105 and 105'. Register transfer circuits are generally employed to transfer the state of one flip-flop to another flip-flop and are, therefore employed in transferring data between or within registers.

The register transfer input terminals are also employed for manually setting or resetting the flip-flop. A +12 v. signal is applied to the appropriate register transfer input terminal through a push-button or a switch. The +12 v. is adequate to transfer the flip-flop to the desired state.

Flips-flops are identified in accordance with the function they perform. For example, a typical flip-flop employed for control is identified as the C$wu$ flip-flop. The C$wu$ designation stands for "Count W up," and the C$wu$ flip-flop, when in the 1-state, increases the count of the W-counter by 1. A typical flip-flop employed for temporary storage of data is the A41 flip-flop. When the A41 flip-flop stores a binary 1, a +6 v. output signal is available at the 1-output terminal thereof. The flip-flop of FIG. 4 is identified as the A41 flip-flop, and its input and output terminals are identified with the corresponding input and output signals of the A41 flip-flop.

The symbol 122, shown in FIG. 4, is employed to represent a flip-flop. Symbol 122, in this instance, represents the A41 flip-flop.

The A41 flip-flop is employed to temporarily store the 1-bit of the 4th digit of the contents of the A-register. The five leads entering the left-hand side of the flip-flop symbol represent the five input terminals. The two upper input leads receive the 1-input signals and the two lower leads receive the 0-input signals. The central input lead receives the clock pulse signal.

The symbol indicates that the A41 flip-flop receives the clock signals of the B27 clock pulse driver. The first and fifth input leads to symbol 122 represent the respective register transfer input terminals 108 and 109. The notation #A41 opposite the first input lead, identifies the register transfer input signal adapted to trigger the A41 flip-flop to the 1-state. Correspondingly, the notation #$\overline{A41}$ opposite the fifth lead identifies the register transfer signal adapted to trigger the A41 flip-flop to the 0-state. Similarly, the notations *A41 and *$\overline{A41}$ identify the logic input signals adapted to trigger the A41 flip-flop to the respective 1 and 0-states. However, although the *A41 or the *$\overline{A41}$ signal may represent a binary 1, it will not change the state of the flip-flop until the clock pulse driver B27 supplies a clock pulse. If only register transfer signals are applied to a flip-flop, no clock pulse driver is connected thereto, whereupon the notation "n-c" is placed opposite the clock pulse input terminal.

The two leads leaving the right-hand side of symbol 122 represent the two output terminals. The upper output lead delivers the 1-output signal of the flip-flop and the lower output lead delivers the 0-output signal. The notations A41 and $\overline{A41}$ identify the respective 1-output and 0-output signals of the A41 flip-flop. Thus, the notation A41 has the dual function of identifying the A41 flip-flop and of identifying the 1-output signal thereof.

In the ensuing system description, a flip-flop in its 1-state is also said to be in the "set" state or in the "on" state. Conversely, a flip-flop in its 0-state is also said to be in the "reset" state or in the "off" state. When a flip-flop is transferred to its 1-state it will often be said to be "set" or to be turned "on." Conversely, when a flip-flop is transferred to its 0-state it may be said to be "reset" or to be "turned off."

AND-Gate

The AND-gate of FIG. 5 provides the logical operation of Conjunction for positive input signals applied thereto. In the system a binary 1 is represented by a signal of approximately +6 v. Therefore, the AND-gate provides an output signal of approximately +6 v., representing a binary 1, only when all of the input signals applied thereto represent binary 1's.

The AND-gate of FIG. 5 is illustrated, by way of example, as having three input terminals 126, 127 and 128, and a single output terminal 129. The AND-gates employed in the system are not limited to three input terminals, but may have from two input terminals to the maximum number necessary for the required Conjunctive operation.

A logic input signal applied to an input terminal of the AND-gate represents either a binary 0 or a binary 1, and is provided as a corresponding signal of −5 v. or +6 v. Current flows from a positive voltage source through resistor 130 and the diodes 131, 132 and 133 to respective terminals 126, 127 and 128. If any one of the input signals is at the −5 v. level, the corresponding diode will conduct and all other diodes of the AND-gate receiving +6 v. input signals will be back-biased and will not conduct. In such instance, the output signal from terminal 129 will be at −5 v. and represent a binary 0. Therefore, only when all input signals are at the +6 v. level will the output signal be at the +6 v. level.

The symbol 135, shown in FIG. 5, is employed to represent the AND-gate. Symbol 135 represents an AND-gate having three input terminals. The three input signals to the particular AND-gate shown are respectively denoted T$p$, T$q$ and T$s$. Therefore, the output signal is denoted $Tp\ Tq\ Ts$.

The expression $Tp\ Tq\ Ts$ is the logic expression for the Conjunctive, or AND, combination of the individual signals T$p$, T$q$ and T$s$. This form of expression is used in logical equations, which are also known as Boolean equations, to be employed hereinafter. The Conjunctive operation on any two signals, such as the T$p$ and T$q$ signals, is indicated by writing the two signal terms adjacent each other with no operator notation therebetween, or with the operator notation (·) between the two terms; as follows: $Tp \cdot Tq$. This expression is read as "T$p$ AND T$q$."

OR-Gate

The OR-gate of FIG. 6 provides the logical operation of Inclusive-Or for positive input signals applied thereto. The OR-gate provides an output signal of approximately +6 v., representing a binary 1, when any one or more of the input signals applied thereto represent binary 1's.

The OR-gate of FIG. 6 is illustrated, by way of example, as having three input terminal 140, 141 and 142 and a single output terminal 143. The OR-gates employed in the system are not limited to three input terminals, but may have from two input terminals to the maximum number necessary for the required Inclusive-Or operation.

A logic input signal applied to an input terminal of the OR-gate represents either a binary 0 or a binary 1, and is provided as a corresponding signal of −5 v. or +6 v. Current flows from the input terminals through the diodes 145, 146 and 147, and resistor 148 to a negative voltage source. If any one of the input signals is at the +6 v. level, the corresponding diode will conduct and all other diodes of the OR-gate receiving −5 v. input signals will be back-biased and will not conduct. In such instance, the output signal from terminal 143 will be at +6 v. and will represent a binary 1. Therefore, when any one or more of the input signals are at the +6 v. level the output signal will be at the +6 v. level.

The symbol 149, shown in FIG. 6, is employed to represent the OR-gate. Symbol 149 represents an OR-gate having three input terminals. The three input signals to the particular OR-gate shown are respectively denoted T$p$, T$q$ and T$s$. Therefore, the output signal is denoted $Tp+Tq+Ts$.

The expression $Tp+Tq+Ts$ is the logic expression for the Inclusive-Or, or OR, combination of the individual signals T$p$, T$q$ and T$s$. This form of expression is used in the logical equations to be employed hereinafter. The Inclusive-Or operation on any two signals, such as the T$p$ and T$q$ signals, is indicated by writing the two signal terms adjacent each other with the (+) operator notation therebetween; as follows: $Tp+Tq$. This expression is read as "T$p$ OR T$q$."

Inverter

The inverter circuit of FIG. 7 provides the logical operation of Inversion, or NOT, for an input signal applied thereto. The inverter is adapted to provide an output signal of approximately +6 v., representing a binary 1, when the input signal received thereby has a −5 v. level, representing a binary 0. Conversely, the inverter provides an output signal representing a binary 0 when the input signal represents a binary 1. The inverter supplies an additional output signal having the same logical significance as the input signal.

The inverter circuit of FIG. 7 comprises an emitter follower driving a grounded-emitter amplifier. The emitter follower portion of the inverter comprises a transistor 155 having its output signal level clamped to have a total excursion between the extremes of −3.5 v. and +3.5 v. The input signal is applied at terminal 156. The output signal of the emitter follower is taken from the emitter electrode of transistor 155. This signal is also available at terminal 157 as a true logical representation of the inverter input signal. The output signal of the emitter follower is coupled to the grounded-emitter amplifier comprising transistor 158.

To analyze the operation of the inverter assume, first, that a binary 0 input signal is applied to input terminal 156. With an input signal of −5 v. level applied to the base electrode of transistor 155, the emitter electrode of transistor 155 operates approximately at the −5 v. level. However, junction point 160 is clamped to a −3.5 v. At this time current flows from the positive potential source through resistor 161, diode 162, and resistor 163 to the −3.5 v. junction point 160. The value of voltage at the base electrode of transistor 158 is below the value of +6 v., so that transistor 158 conducts and supplies a +6 v. output signal at output terminal 165. Thus, the inverter delivers an output signal representing a binary 1 when the input signal thereto represents a binary 0.

Assume, now, that the input signal represents a binary 1. The application of a +6 v. signal to the base electrode of transistor 155 causes transistor 155 to cease conducting and establishes junction point 160 at the +3.5 v. level. The value of voltage at the base electrode of transistor 158 tends to go above +6 v., so that current flows through diode 166 and cuts off transistor 158. At this time the output signal at terminal 165 is at the −5 v. level. Thus, a binary 1 input signal to the inverter provides a binary 0 output signal from terminal 165.

Capacitor 167 functions to speed the response of the inverter when the inverter input signal level changes from −5 v. to +6 v. Capacitor 168 prevents bypassing of diode 162, and thereby prevents saturation of transistor 158.

The symbol 170, shown in FIG. 6, is employed to represent the inverter. By way of example, the input signal to the inverter is denoted as the S*ig* signal. The logically inverted output signal provided at terminal 165 of the inverter is designated as $\overline{\text{IS}ig}$. The output signal provided from terminal 157 is not logically inverted and is represented by the legend IS*ig*. Thus, the "true" output signal of an inverter is usually identified with the letter I affixed to the input signal term. The inverted output signal is similarly written, but is provided with a superscribing bar.

Emitter Follower

The emitter follower of FIG. 8 is employed in many parts of the logic networks of the system. The primary function of the emitter follower is to supply the input current requirements of a large chain of logical gates, which a flip-flop would be unable to directly drive. The specific locations of the emitter followers in the system will not be given in the description to follow. However, they may be employed following flip-flop output terminals or at other locations where large current requirements exist.

The emitter follower provides an output signal having the same logical sense as the input signal. That is, the emitter follower delivers a binary 1 output signal when the input signal represents a binary 1, and vice versa. Two types of emitter followers are shown in FIG. 8. The first type, comprising a PNP transistor 175, is identified as a PNP emitter follower. The second type, comprising the NPN transistor 176, is identified as an NPN emitter follower. Generally, the PNP emitter follower drives an AND-gate and the NPN emitter follower drives an OR-gate.

The symbol 178, shown in FIG. 8, is employed to represent the emitter follower. The output signal of the emitter follower bears the same identification as the input signal applied thereto.

Register Transfer

The register transfer shown in FIG. 9 provides for the direct transfer of data between a pair of flip-flops, under control of a gated clock pulse driver. Normally, if a first flip-flop (which may be termed a data-receiving flip-flop) is adapted to receive the data bit stored in a second flip-flop (which may be termed a data-transmitting flip-flop), the register transfer input terminals of the first flip-flop are connected through respective register transfers to the corresponding output terminals of the second flip-flop.

The register transfer circuit of FIG. 9 comprises eight register transfers and is adapted to transfer the contents of four data-transmitting flip-flops, storing a full data digit, to four data-receiving flip-flops, also adapted to store a full data digit. A register transfer circuit is connected between the 1-output terminal of each data-transmitting flip-flop and the register transfer 1-input terminal of the corresponding data-receiving flip-flop. A register transfer is also connected between the 0-output terminal of each data-transmitting flip-flop and the register transfer 0-input terminal of the corresponding data-receiving flip-flop. FIGURE 10 illustrates the connection of a register transfer between an output terminal of a data-transmitting flip-flop and the corresponding register transfer input terminal of a data-receiving flip-flop.

The operation of a typical register transfer 201 of FIG. 9 will now be described. Register transfer 201, which is also shown in FIG. 10, is connected between the 1-output terminal of the N21 flip-flop and the register transfer 1-input terminal of the N11 flip-flop. The N21 flip-flop 1-output terminal is connected to input terminal 202 of the register transfer circuit. Terminal 202 is connected to one end of resistors 203 and 204. The other end of resistor 203 is connected to a source of minus voltage. Resistor 203 provides collector resistance for the data-transmitting flip-flop output amplifier. Thus, the potential applied to input terminal 202 will be +6 v., when a binary 1 is applied thereto, and −5 v. when a binary 0 is applied thereto. This input signal is transferred through resistor 204 and a diode 205 to output terminal 208. A capacitor 206 is connected to the junction of resistor 204 and diode 205, and is adapted to be charged to the logic voltage level provided by the corresponding data-transmitting flip-flop. Generally, the output signal of a gated clock pulse driver is connected to input terminal 207. Output terminal 208 is connected to the corresponding register transfer input terminal of the data-receiving flip-flop. A resistor 209 functions to discharge any stray capacitance connected across the output terminal 208, thereby preventing spurious triggering of the data-receiving flip-flop.

As described in the previous section entitled "Flip-Flop," neither a −5 v. signal nor a +6 v. signal applied to the register transfer input terminal is sufficient to trigger the flip-flop. However, when a clock pulse is superposed on a +6 v. signal, the flip-flop can be triggered. Thus, if a clock pulse is delivered by gated clock driver SN when a binary 1-input signal is applied to input terminal 202, the superposed +6 v. and clock pulse delivered at terminal 208 will be adequate to trigger the data-receiving flip-flop.

The eight register transfers of FIG. 9 are adapted to transfer the entire contents of the second digit position of the N-register to the first digit position of the N-register upon receipt of the SN signal provided by the SN clock pulse driver. Inasmuch as a triggering output signal from a register transfer output terminal requires the simultaneous presence of a binary 1 from the corresponding data-transmitting flip-flop output terminal and a clock pulse at terminal 207, the register transfer output signal may be considered as representing a Conjunctive operation on the flip-flop input signal and the clock pulse. Therefore, the output signal delivered at terminal 208, for example, may be represented as:

$$\#N11 = SN\ N21$$

Correspondingly, the output signal delivered at terminal 210 may be represented as:

$$\#\overline{N11} = SN\ \overline{N21}$$

The output terminals of one or more register transfers may be connected to a single register transfer input terminal of a flip-flop. In such instance, the one of the register transfers which has a clock pulse applied thereto will transfer the contents of the corresponding data-transmitting flip-flop to the data-receiving flip-flop. An example of such a circuit is provided by the N11 flip-flop, which is adapted to receive the contents of the N21 flip-flop when the SN clock signal is applied to register transfers connecting the output terminals of the N21 flip-flop to the corresponding register transfer input terminals of the N11 flip-flop, or to receive the contents of the A11 flip-flop when the XAN clock signal is applied to register transfers connecting the output terminals of the A11 flip-flop to the corresponding register transfer input terminals of the N11 flip-flop. This plural input connection to the register transfer 1-input terminal of the N11 flip-flop is illustrated in FIG. 10.

Inasmuch as the plural register transfer connection to a flip-flop provides that an output signal from any one of the connected register transfers will trigger the data-receiving flip-flop, an Inclusive-Or logical operation is thereby provided for the output signals of the plurally-connected register transfers. Thus, the register transfer 1-input signal to the N11 flip-flop may be expressed as:

$$\#N11 = SN\ N21 + XAN\ A11$$

The output signals delivered by certain manually operated push buttons or switches are often directly connected to a flip-flop register input terminal which also has connected thereto one or more register transfers. Actuation of such a button or switch usually provides a +12 v. output signal, which is sufficient to trigger the data-receiving flip-flop. Therefore, this type of connection also provides an Inclusive-Or logical operation for the output signals of the plurally-connected register transfers and the buttons or switches. For example, the register transfer 0-input signal to the N11 flip-flop may be expressed as:

$$\#\overline{N11} = SN\ \overline{N21} + XAN\ \overline{A11} + Kcc$$

where Kcc is a +12 v. signal when certain buttons on the Control Console are depressed.

The symbol 212, shown in FIG. 9, is employed to represent the eight register transfers connecting the four flip-flops N24, N23, N22 and N21 to the corresponding ones of flip-flops N14, N13, N12 and N11. The arrow in symbol 212 denotes that upon receipt of a clock pulse, the entire contents of N2(i) are transferred to N1(i). Terminal 207', which is shown connected to symbol 212, illustrates that this data transfer is effected only when a clock pulse SN is received. Symbol 213 represents the four flip-flops, N2(i), which are adapted to store the second digit of the contents of the N-register. Symbol 214 represents the four flip-flops, N1(i), which are adapted to store the least significant digit of the N-register.

*One-Shot*

The monostable multivibrator, or one-shot, of FIG. 11 provides an output signal of predetermined duration. The duration of the output signal is usually equal to a non-integral number of clock periods.

The one-shot is a circuit adapted to operate normally in a stable state, but to transfer to an unstable state for a predetermined duration upon application of a trigger signal thereto. In one state of operation the one-shot represents the binary 1 (1-state) and in the other state the binary 0 (0-state). The one-shot circuit includes a pair of coupled transistor amplifiers comprising the respective transistors 220 and 221. The coupled transistor amplifier pair is connected to a grounded-emitter transistor output amplifier, the output signal thereof representing the 0-state of the one-shot. This output amplifier comprises a transistor 222.

The one-shot is adapted to receive two input signals, as follows: (a) a clock pulse signal, received at input terminal 223, and supplied by a clock pulse driver, and (b) an input logic signal, received at input terminal 224, and usually supplied by a logical gate.

The output signal, representing the 0-state of the one-shot, is delivered at output terminal 225.

The operation of the one-shot will now be described. In the stable state transistor 221 is conducting and transistor 220 is non-conducting. The current flowing through the resistor 228 provides sufficient reverse bias voltage to maintain transistor 220 non-conducting, whereas this bias voltage is divided by resistors 229 and 230 to permit preferential conduction of transistor 221. The base electrode of conducting transistor 221 is approximately at ground, so that the emitter electrodes of transistors 220 and 221 are held negative with respect to ground by only a small voltage. The collector electrode of transistor 221 is also close to 0 v., so that transistor 222 is forward biased and conducts. The conduction of transistor 222 when the one-shot is in the stable state provides an output signal at terminal 225 of +6 v., representing a binary 1.

In the stable state the collector electrode of transistor 220 is approximately at +70 v. Therefore, capacitor 232, which is connected between the collector of transistor 220 and the base of transistor 221, is charged to +70 v.

A transistor 233 serves to isolate transistor 220 from the input terminals of the one-shot. Normally, transistor 233 is non-conducting. The logic input signal applied to terminal 224 is either at the −5 v. level (binary 0) or at the +6 v. level (binary 1). Either level of the logic input signal is insufficient to trigger the one-shot to its unstable state. However, if a clock pulse is applied to terminal 223 when the logic input signal is at its +6 v. level the superposition of the two input signals is sufficient to drive transistor 233 into conduction. This momentary high positive signal, approximately +17 v., is applied to the base electrode of transistor 220, which thereupon commences conduction. When transistor 220 commences to conduct, the collector electrode thereof experiences a sudden potential drop. This potential drop is coupled through capacitor 232 to the base electrode of transistor 221. As the base electrode of transistor 221 swings negatively, the collector current thereof diminishes. The decrease in current flow of transistor 221 reduces the reverse bias applied to transistor 220, which conducts more heavily. Thus, a regenerative action ensues, and transistor 220 is transferred to the conducting state and transistor 221 is rendered non-conducting. Transistor 221 remains cutoff by the high reverse bias applied to its base electrode from capacitor 232.

When transistor 221 is non-conducting, transistor 222 is rendered non-conducting, and the voltage at the output terminal 225 drops to −5 v. Thus, when the one-shot is in its unstable state, its output signal represents a binary 0.

Capacitor 232 now commences to discharge through the path provided. The discharge time of capacitor 232 is determined by the RC-time constant of the circuit loop comprising, basically, capacitor 232, potentiometer 234 and resistor 235. The discharge time is also influenced by the parallel-connected capacitor 236 and any one or more of capacitors 237, 238 and 239, which may be connected to the "capacitor return" terminal 240. The discharge time may also be altered by providing an external capacitor between the "ext time" terminal 241 and terminal 240.

In the unstable state, the emitter electrode of transistor 221 is slightly below ground potential. The base electrode thereof is held below ground in accordance with the voltage across capacitor 232. Therefore, as capacitor 232 discharges, the base electrode of transistor 221 rises toward the potential of the emitter electrode. When the base electrode potential reaches the emitter electrode potential, transistor 221 commences conducting, and the one-shot returns to its stable state, where it remains until it is again triggered.

One-shots are identified in accordance with the function they perform, although all one-shot designations begin with the letter "Y." For example, the $Yb1$ designation refers to a one-shot which controls the time duration of the ringing of a bell. Normally only the 0-output signal is taken from the one-shot. That is, when the one-shot is triggered into its unstable state, the logic signal available at the output terminal of the one-shot represents a binary 0. In its stable state the one-shot output signal represents a binary 1. Thus, in effect, the one-shot output signal turns off when the one-shot is triggered. If desired, another output amplifier may be connected to the collector electrode of transistor 220 to provide an output signal representing the 1-state of the one-shot. Such an amplifier would provide a binary 1 when the one-shot was in its unstable state.

The symbol 244, shown in FIG. 11, is employed to represent the one-shot. Symbol 244, in this instance, represents the $Yb1$ one-shot. The two leads entering the left-hand side of symbol 244 represent the two inpute terminals. The upper input lead receives the logic input signal. The lower input lead receives the clock pulse signal. The symbol indicates that the $Yb1$ flip-flop receives the clock pulses provided by the CDA12 clock pulse driver. The notation *$Yb1$ opposite the upper input lead identifies the logic input signal. The lead leaving the right-hand side of symbol 244 represents the output terminal. The notation $\overline{Yb1}$ identifies the 0-output signal of the $Yb1$ one-shot. The duration of the unstable state of the flip-flop is also included within the symbol. Thus, the unstable state of the $Yb1$ flip-flop is indicated to be 15 ms.

*Register*

A register is adapted to provide temporary storage of data being processed or data being transferred between system components. The register comprises a plurality of flip-flops, one flip-flop for each bit of the data to be stored therein. Most registers of the system store a full data word and, therefore, comprise 28 flip-flops.

The flip-flops of a register are identified according to the register designation and the numerical significance of the data bits stored therein. Thus, a register flip-flop will be designated as the $Qmn$ flip-flop, where Q identifies the register, $m$ identifies the digit order of the bit stored, and $n$ identifies the decimal significance of the bit stored. For example, the J13 flip-flop stores the 4-bit of the least significant digit of the J-register contents. The 28 flip-flops of the J-register may be represented; as follows:

J-REGISTER

| | | | | | | |
|---|---|---|---|---|---|---|
| Jd (J74) | J64 | J54 | J44 | J34 | J24 | J14 |
| Js (J73) | J63 | J53 | J43 | J33 | J23 | J13 |
| Jm2 (J72) | J62 | J52 | J42 | J32 | J22 | J12 |
| Jm1 (J71) | J61 | J51 | J41 | J31 | J21 | J11 |

The most significant, or 7th, digit of the data word is stored in Jd, Js, Jm2 and Jm1. This set of flip-flops is also termed J74, J73, J72 and J71.

The data in most of the registers may be serially shifted from higher to lower order digit positions of the register. In such registers, the entire contents of a digit position are transferred by parallel shift to the next lower order digit position. The serial shifting of data in this manner is most often effected by register transfers connected between the flip-flops (see FIGS. 9 and 10 in the section "Register Transfer"). Data which is serially transferred by digits to successively lower order digit positions is said to be "shifted-down." If the flip-flops are interconnected to transfer the data to successively higher order digit positions, they are said to "shift-up" the data.

If the digit in the LSD position is directed to re-enter the register at the MSD position during a shift-down, the data is said to be "ring shifted-down." Conversely, if the MSD position digits enter the LSD position, the data is said to be "ring shifted-up."

Temporary signal storage is provided to permit a register flip-flop to change its state at the same time that its contents are being transmitted to another register flip-flop; i.e., during the serial shift of data in a register. This temporary signal storage is supplied by capacitors in the register transfers and in the flip-flop logic input circuits. These capacitors store the logic signal levels from the output terminals of a data-transmitting flip-flop prior to the occurrence of the clock signal that causes the data-transmitting flip-flop to change its state and the corresponding data-receiving flip-flop to receive the contents of the data-transmitting flip-flop. Thus, the register transfer capacitors 206 temporarily store the logic signal levels provided by the data-transmitting flip-flop. When the clock pulse is applied to the register transfer the contents of the data-transmitting flip-flop are held in capacitors 206 sufficiently long for the data-receiving flip-flop to respond thereto, while the data-transmitting flip-flop may simultaneously have the state thereof changed. Similarly, where the contents of one flip-flop are transmitted to another through logical gates, the flip-flop input capacitors 116 and 117 provide temporary storage for the input logic signal levels.

The terms LSD and MSD are intended to signify "least significant digit" and "most significant digit" respectively.

DATA PROCESSING SYSTEM—DETAILS

The Data Processing System is shown symbolically in FIG. 12 to illustrate the elements therein which store data, the paths of data transfer between these elements, and major control elements of the system.

Instruction words for data processing, and operand words which are to be processed are stored in the 4,000 word Core Memory during data processing operations. Temporary storage of data words is provided in the various registers of the system. Data is most often transferred between registers by means of register transfers, not shown in FIG. 12. Most registers are also adapted to shift the data therein by the employment of register transfers between digit positions, such as shown in FIG. 9.

The instruction word which directs the system operation is stored in the I-register 272. The I-register comprises two registers, a 2-digit C-register and a 4-digit A-register. The I-register stores the 6 least significant digits of an instruction word, these digits including the command portion and the address portion. The command portion is stored in the C-register and the address portion in the A-register. The command portion in the C-register controls the type of operation to be executed by the system. The address portion in the A-register usually indicates the memory location from which the operand words is to be received, or where a data word is to be stored. However, the address portion is also employed as a control function to supplement the command portion in controlling the type of operation to be executed. The memory location of the next instruction to be executed is stored in the 4-digit N-register 274. As execution of an instruction is nearing completion the next-instruction address stored in the N-register is transferred to the A-register, and this address provides the Memory Controls 242 with the information to obtain the next instruction from the Core Memory 243.

All data words received from the Core Memory or entered into the Core Memory must pass through the 7-digit M-register 245. Therefore, when an instruction is to be received from the Core Memory the A-register contents direct the Memory Controls to obtain the instruction from the location then indicated in the A-register. This instruction is first transferred to the M-register and then to the 7-digit J-register 271. From the J-register the 6 least significant digits of the instruction word are transferred to the I-register and the instruction is then executed. Operand words needed by the instruction are obtained from the Core Memory by the same process; that is, by a first transfer to the M-register under control of the address portion of the instruction word in the A-register and then by a transfer to the J-register.

Arithmetic operations, sorting operations, comparison operations, etc., on operand words are performed primarily by employing the Arithmetic Unit 276, the L-register 273, and the R-register. The L-register and R-register are both 7-digit registers and each stores a complete data word. The L and R-registers are employed together when data processing is performed on double-precision words, and when so employed are designated as the FULL-register. The R-register is usually employed when processing single data words. The Arithmetic Unit is adapted to perform the operation of addition or subtraction on a pair of words received simultaneously from the J-register and the R-register or on data received simultaneously from the A-register and the B-register 270. When the contents of J and R are received by the Arithmetic Unit the output signals thereof are entered into the R-register, if single numeric words are being processed, and into the FULL-register if double-precision words are being processed.

A data word in the R-register may be transferred to the M-register for storage in the Core Memory at the location designated by the A-register contents.

The 4-digit B-register is employed to modify the address portion of the instruction word in the A-register. This modification is performed by adding the B-register contents to the A-register contents in the Arithmetic Unit, and by entering the output signals of the Arithmetic Unit into the A-register.

The Ar-register 268 and the Aw-register 269 store memory addresses during respective Multiplex Buffer read and write operations and are adapted to enter the address into the A-register when the Multiplex Buffer is to transfer a word to the Core Memory or to receive a word therefrom.

The modulo-3 of all words received by the J-register from the Core Memory is compared against the mod-bits of these words by the J-mod-generator 277, which accumulates the modulo-3 of a word as it ring shifts in the J-register. The V-mod-generator of the Arithmetic Unit accumulates the modulo-3 of the Arithmetic Unit output signals in order to apply the appropriate mod-bits to this word.

The Ar, Aw, B, J, I, L, N, and R-registers, the Arithmetic Unit, and the J-mod-generator comprise the Central Processor of FIG. 1. The Memory Controls, Core Memory, and M-register comprise the Memory 12 of FIG. 1.

The Central Processor receives data from the Control Typewriter, the Photoreader, the Tape Handlers, and the Character Reader, and transmits data to the Tape Handlers, the Printer, the Control Typewriter, and the Sorter.

The 7-digit P-register 247, which is a part of the P-Buffer, temporarily stores a data word being transferred from the Control Typewriter or from the Photoreader to Memory. The P-register also temporarily stores a data word being transferred from Memory to the Control Typewriter. In so exchanging data with the Memory, the P-Buffer is controlled by the Central Processor and its mode of operation is initiated by the contents of the A-register, which sets the P-Buffer Controls 246. The P-Buffer, when directed by the Control Typewriter, coordinates the typing out of the contents of the B, I, L, N, P, and R-registers by the Control Typewriter. The control Typewriter and the P-Buffer also cooperate in entering data words directly into the I-register and the R-register.

The R$b$-register 248 and the W$b$-register 250 form a part of the Multiplex Buffer and are controlled by the Multiplex Buffer Controls 249. The 7-digit R$b$-register temporarily stores a data word being transferred from magnetic tape or the Sorter Control Unit to Memory. The 7-digit W$b$-register temporarily stores a data word being transferred from Memory to magnetic tape or to the Printer.

Data Processing Operations

The command portions of the instruction word may have any one of 52 bit configurations, each configuration representing a different one of 52 decimal numbers. Each command portion number directs a fundamentally different data processing operation of the system. The system executes the commands of a succession of instruction words to process data. This succession of instruction words is termed a "program." In any program many, or all, of the 52 fundamental operations are executed one or more times to process the received data.

COMPONENT DETAILS AND OPERATION

The internal circuit structures of the components of the system, the circuit configurations interconnecting the components, and a description of the operation of the system follow hereinafter. The component structures and interconnecting configurations comprise novel assemblages of the previously described clock pulse drivers, flip-flops, AND-gates, OR-gates, inverters, emitter followers, register transfers, and one-shots to perform the functions of the Data Processing System. The connective relationship between these circuit elements can usually be described by logic expressions of the type illustrated in the foregoing sections "AND-gate," "OR-gate," and "Register Transfer."

The Logical Schematic Diagram

Generally, two or more output signals from flip-flops, one-shots, inverters, and clock pulse drivers and the signals provided by certain switches and push buttons are combined logically by AND-gates, OR-gates, and register transfer circuits to provide input signals to other flip-flops, one-shots, and inverters and to provide gating signals for clock pulse drivers. Thus, the two logic input signals to a flip-flop (FIG. 4) are usually the output signals of respective logical chains of AND-gates and OR-gates, which receive output signals provided by other flip-flops, and by one-shots, inverters, and certain switches and push buttons. These logical chains may be described and illustrated by logical expressions, which are actually logical schematic diagrams representing the logical and structural interconnection of the chain providing these two input signals to the flip-flop. Similarly the two register transfer input signals to a flip-flop are usually the signals provided by a tree of interconnected register transfers and switches or push buttons, wherein the register transfers receive output signals provided by other flip-flops and by clock pulse drivers. The remaining input signal is received directly from a clock pulse driver. (If no logic input signals are provided at the flip-flop input terminals, no clock pulse driver is necessary.)

The one-shot receives an input logic signal from a logical chain of AND-gates and OR-gates, which receive output signals provided by other one-shots, and by flip-flops, inverters, and certain switches and push buttons. Therefore, the logical chain delivering the logical input signal to a one-shot may also be illustrated by a logical schematic diagram.

In a similar manner the logical circuits providing input signals to inverters and gating signals to clock pulse drivers may be illustrated by logical schematic diagrams.

In the logical circuits illustrated by the following types of logical schematic diagrams, the logical functions of Conjunction are implemented by AND-gates and the logical functions of Inclusive-OR are implemented by OR-gates.

In the logical circuits illustrated by flip-flop input diagrams for logical circuits applying signals to register transfer input terminals of flip-flops, the logical functions of Conjunction are implemented by register transfers and the logical functions of Inclusive-OR are implemented by Plural input connections, as described in the preceding "Register Transfer" section.

Control Console

The Control Console provides an indicating and control station for the operator, whereby he has access to the system for modification of the sequence of execution of the instructions or for data revision. FIGS. 13a and b illustrate those portions of the Control Console which are related to this invention and includes the controls for enabling the opertaor to modify the sequence of execution of the instructions and the controls for starting or halting data processing in the system. The Control Console primarily directs the Central Processor, which, in turn, enables controlling the remainer of the Data Processing System.

Two types of signals are delivered by the Control Console and may be termed respectively "logic level signals" and "pre-emptive signals." Logic level signals are intended to have the same effect as the 0 or 1-output signals of a flip-flop and, therefore, are at similar voltage levels. Thus, a logic level signal which represents a binary 1 merely enables a flip-flop, when it is applied to an input logic terminal thereof, and the flip-flop requires the further application of a clock pulse to be set or reset.

Clear Controls

Selected components of the system, or the entire system, may be cleared by closing the appropriate clear button or clear switch. Accidental closure of any one of these buttons while the system is processing data by automatically executing instructions in sequence would cause errors, and would seriously interfere with the data processing operation. Therefore, a protective switch is provided, which must be unlocked, before these clear controls are effective. This protective switch is the KEY switch 325, which is normally locked in its open position when the system is processing data. When it is desired to enable one of the clear buttons, the KEY switch is unlocked. Unlocking KEY switch 325 causes actuation of a relay 326. When relay 326 is actuated, arms 327 and 328 thereof contact their upper terminals, causing the Key output signal, which in the locked state of the KEY switch represents a −7.5 v. binary 0, to represent a +6 v. binary 1. Simultaneously, the Key 2 signal, which in the locked state of the KEY switch represents a binary 1, now represents a binary 0. Arm 328, which in the locked state of the KEY switch causes −7.5 v. to be applied to the upper terminals of clear buttons 329, 330, 331, 332, and 333, in the unlocked state of the KEY switch contacts its upper terminal and applies +12 v. to the upper terminals of the clear buttons 329–333. Thus, each of buttons 329–333 is enabled, and when the movable arm thereof contacts the respective upper terminal, the output signal delivered thereby will represent a +12 v. binary 1.

With the KEY switch unlocked the clear buttons are effective; as follows: the TOTAL CLEAR button 329, when in its upper position, causes the K$tcc$ signal to issue, which clears the entire data processing system, including the Central Processor, P-Buffer, Multiplex Buffer, and Tape Control Unit; the COMPUTER CLEAR button 330, when in its upper position, causes the K$ccc$ signal to issue, which clears the Central Processor; the CONTROL TYPEWRITER CLEAR button 331, when in its upper position, causes the K$pcc$ signal to issue, which clears the P-Buffer; the EXTERNAL CLEAR button, when in its upper position, causes the K$ec$ signal to issue, which clears the Multiplex Buffer and Tape Control Unit; and, the ALERT RESET button, when in its upper position, causes the K$ra$ signal to issue, which clears all alarm and sub-alarm flip-flops in the system.

Starting Controls

The COMPUTE button 335, the SINGLE-CYCLE button 336, and the RECYCLE button 337 will each cause the Central Processor to execute one or more instructions.

Closure of the COMPUTE button by moving the arm thereof to contact the lower terminal, causes the K$cb$ signal, which is normally in the 1-state, to enter the 0-state, and causes the K$bc$ signal, which is normally in the 0-state, to enter the 1-state. This change of state of the K$cb$ and K$bc$ signals is effective to reset the halt flip-flops, H$t$1 and H$t$2, and to place the system in the normal data processing mode.

Closure of the SINGLE-CYCLE button by moving the arm thereof to contact the lower terminal, causes the K$sb$ signal, which is normally in the 1-state, to enter the 0-state, and causes the K$bc$ signal to enter the 1-state. This change of state of the K$sb$ and K$bc$ signals is effective to cause the Central Processor to execute the instruction then in the I-register, and to halt immediately thereafter with the next sequential instruction in the I-register.

Neither the COMPUTE button nor the SINGLE-CYCLE button is effective if the KEY switch is locked, inasmuch as the Key signal would be in the 0-state, and would prevent the K$bc$ signal from entering the 1-state.

Closure of the RECYCLE button by moving the arm thereof to contact the upper terminal, causes the K$ry$1 signal, which is normally in the 0-state, to enter the 1-state, and causes the K$ry$2 signal, which is normally in the 1-state, to enter the 0-state. This change of state of the K$ry$1 and K$ry$2 signals is effective to cause the Central Processor to repeatedly execute an instruction in the I-register (see section "Recycle"). The RECYCLE button is ineffective if the KEY switch is locked, inasmuch as the K$ey$2 signal is in the 1-state, thereby preventing the K$ry$2 signal from entering the 0-state.

Multiplex Buffer

The Multiplex Buffer provides an intermediate storage function for data words being transferred from Memory to a Tape Handler for storage on magnetic tape or to the Printer, and for data being transferred from a Tape Handler or from the Character Reader to Memory. The Multiplex Buffer temporarily stores data during these transfers to accommodate the relatively slow rate of the Tape Handler, Printer, and Character Reader action to the relatively fast rate of the Memory and its controlling Central Processor.

The Multiplex Buffer comprises a Write Buffer, a Read Buffer, and a clock circuit, each of which will be described separately in succeeding sections.

Write Buffer

The Write Buffer temporarily stores data words being transferred from Memory to a Tape Handler for storage on magnetic tape or to the Printer. A succeeding section "Write Buffer Operations" provides details of the operation of the Write Buffer in effecting the following types of data transfer:

(a) The writing of one block or 100 data words on magnetic tape from consecutive memory locations;

(b) the printing of one block of 100 data words by the Printer from consecutive memory locations;

(c) the writing on magnetic tape of one block of 100 data words comprising five blockettes of 20 words, wherein the five blockettes are taken from five respective groups of memory locations, each group comprising 20 consecutive memory locations; and (d) the printing by the Printer of one block of 100 data words comprising five blockettes of 20 words, wherein the five blockettes are taken from five respective groups of memory locations, each group comprising 20 consecutive memory locations.

Each of these types of data transfer is initiated by an appropriate programmed instruction (66 or 68) executed in the Central Processor, but continued and carried to completion under control of the Write Buffer.

The Write Buffer comprises a register for temporarily storing the data being transferred through the Write Buffer, register transfer and logic circuits for transferring data into and through the register, clock pulse drivers for controlling the timing of the Write Buffer, counters, and flip-flops employed as control signal sources. FIGURE 14 illustrates symbolically the elements of the Write Buffer which store data, the paths of data transfer between these elements, and certain control elements.

The 7-digit W$b$-register 601 and the 3-digit W$a$-register 602 temporarily store the data being transferred through the Write Buffer.

The contents of the W$b$3–W$b$1 flip-flops of the W$b$-register are shifted-up upon application of the SE$b$1/4 clock signal to register transfers which connect the W$b$1–W$b$3 digit positions of the W$b$-register. The contents of the W$b$3 flip-flops are transferred to the corresponding W$b$4 flip-flops upon application of the SW$b$1/4 clock signal to register transfers which connect the output terminals of the W$b$3 flip-flops to corresponding input terminals of the W$b$4 flip-flops. The contents of the W$b$7–W$b$4 flip-flops are shifted-up upon application of the S$wb$5/7 clock signal to register transfers which connect the W$b$7–W$b$4 digit positions of the W$b$-register. Therefore, the entire contents of the W$b$-register are shifted-up by the simultaneous issuance of the SW$b$1/4 and S$wb$5/7 signals.

The content of the W$b$7 flip-flops are transferred to the corresponding W$b$4 flip-fiops upon application of the SW$b$7–4 clock signal to register transfers which connect the output terminals of the W$b$7 flip-flops to corresponding input terminals of the W$b$4 flip-flops. Therefore, the contents of the W$b$7–W$b$4 digit positions are ring shifted-up by the simultaneous issuance of the SW$b$5/7 and SW$b$7–4 signals.

The W$b$-register flip-flops are adapted to receive, by parallel shift, the contents of the corresponding Memory M-register flip-flops upon application of the XMW$b$ clock signal to register transfers which connect output terminals of the M flip-flops to corresponding input terminals of the W$b$ flip-flops. The W$b$ flip-flops, however, receive only the 1-output signals of the corresponding M-register flip-flops, since the W$b$-register is cleared before each transfer of a data word thereto from Memory.

The contents of the W$b$7 flip-flops may be transferred to the corresponding W$a$1 flip-flops of the W$a$-register and to the row parity generator circuit 603.

The contents of the W$a$3–W$a$1 flip-flops of the W$a$-register are shifted-up upon application of the S$wa$1 clock signal to register transfers which connect the W$a$3–W$a$1 digit positions of the W$a$-register. The W$a$1 flip-flops are adapted to receive the contents of the corresponding W$b$7 flip-flops upon application of the S$wa$1 clock signal to register transfers which connect the output terminals of the W$b$7 flip-flops to corresponding input terminals of the W$a$1 flip-flops. The contents of the W$a$3 flip-flops may be transferred to the W$o$6–W$o$9 flip-flops, for subsequent transfer to magnetic tape or to the Printer. The contents of the W$a$3 flip-flops may also be transferred to the P$wr$ flip-flops for subsequent transfer to magnetic tape or to the Printer.

The W$o$1–W$o$10 flip-flops hold two digits and their corresponding column parity bits for energizing corresponding write drivers for storage of data in a single transverse recording position on magnetic tape. The contents of the W$o$1–W$o$4 flip-flops and the W$o$6–W$o$9 flip-flops may also be transferred to the Printer. The column parity bit for the digit in the W$o$4–W$o$1 flip-flops is stored in the W$o$5 flip-flop. The column parity bit for the digit in the W$o$9–W$o$6 flip-flops is stored in the W$o$10 flip-flop.

Only 0's are written on magnetic tape. A 0 is written whenever the corresponding W$o$ flip-flop changes state. Therefore, whenever data is to be transferred from the Write Buffer to magnetic tape, the write zeroes circuits 605 and 606 provide the input signals to the corresponding W$o$1–4 and W$o$6–9 flip-flops. The write zeroes circuit 605 comprises the circuits illustrated by the logical schematic diagrams for the logic input terminals of the W$o$1–4 flip-flops. Whenever a digit is to be transferred from the P$wr$ flip-flops to the corresponding W$o$1–4 flip-flops, for storage on magnetic tape, the write zeroes circuit 605 samples the contents of P$wr$ flip-flops and the contents of the corresponding W$o$1–4 flip-flops and changes the state of those W$o$1–4 flip-flops for which the corresponding P$wr$ flip-flops store a binary 0. Similarly, when data is to be written on magnetic tape, the write zero circuit 606 changes the state of those W$o$6–9 flip-flops for which the corresponding W$a$3 flip-flops store a 0.

Additionally, when data is to be written on magnetic tape, the W$o$5 and W$o$10 flip-flops have their corresponding states changed whenever the column parity bit to be transmitted thereby represents a 0. Column parity generator 607 samples the bits in P$wr$ to determine whether the bit to be inserted into W$o$5 should be a 0 and, therefore, that the state of W$o$5 should be changed. If an even number of 0's is stored in P$wr$, column parity generator 607 issues a signal to change the state of the W$o$5 flip-flop. Similarly, column parity generator 608 samples the contents of the W$a$3 flip-flops to determine whether the W$o$10 flip-flop should have the state thereof changed.

When data is to be transferred from the Write Buffer to the Printer, the digit contents of the P$wr$ flip-flops and the W$a$3 flip-flops are transferred directly to the respective W$o$1–W$o$4 and W$o$6–W$o$9 flip-flops by application of the SW$op$ clock signal to register transfers which connect the output terminals of the P$wr$ flip-flops to corresponding input terminals of the W$o$4–W$o$1 flip-flops and to register transfers which connect the output terminals of the W$a$3 flip-flops to corresponding input terminals of the W$o$9–W$o$6 flip-flops.

The P$wr$ flip-flops 610 comprise a single digit register for providing temporary storage of certain digits to be transferred from the W$a$3-register to magnetic tape or to the Printer, and for accumulating the row parity bits of the word stored in the W$b$-register. The P$wr$ flip-flops are adapted to receive the contents of the corresponding W$a$3 flip-flops upon application of the SW$a$2 clock signal to register transfers which connect the output terminals of the W$a$3 flip-flops to corresponding input terminals of the P$wr$ flip-flops. Row parity generator 603 samples the bits in the W$b$7 flip-flops in order to accumulate row parity for the word in the W$b$-register.

A T$w$-counter 611, which comprises the T$w$1–T$w$6 flip-flops and which operates in 64 discrete states, is the source for fine timing and control of the shifting operations executed in the Write Buffer. A W$bk$-counter 612, which comprises the W$bk$1, W$bk$2, and W$bk$3 flip-flops and which operates in 8 discrete states, directs the number of data words transferred during a Write Buffer operation.

Other Write Buffer flip-flops are employed primarily to perform control functions. The B$bf$ flip-flop signals that the first word of a block of data has been transferred to the Write Buffer and that the Write Buffer should commence its sequence of operations to write this first word and the remainder of the block onto magnetic tape or transfer the block to the Printer. The B$bf$ flip-flop is also employed for terminating the transfer of a block of data words to the Printer. The E*ws* flip-flop functions as an alarm to notify the Central Processor that a particular malfunction in transferring data from Memory to the Write Buffer has taken place. The L*w* flip-flop, when set, demands that the Central Processor perform an operation to transfer a word from Memory to the Write Buffer. The P*rt* flip-flop aids in controlling the Write Buffer when data is being transferred to the Printer. The W*b* flip-flop, when on, indicates that one of the Tape Handlers is presently engaged in receiving a block of data from Memory through the Write Buffer. The W*bf* flip-flop is turned on when the Write Buffer receives a data word from Memory, to indicate that the Write Buffer is loaded and that the contents thereof are ready to be transferred to magnetic tape or to the Printer. The W*eb* flip-flop, when on, indicates that the Write Buffer is busy transferring data from Memory to magnetic tape or to the Printer.

CLOCK CIRCUIT

The clock circuit of the Tape Control unit shown in FIGS. 15*a–c* provides clock pulse signals for application to flip-flops to control the entry of data into flip-flops and the transfer of data between flip-flops. The clock pulse drivers of the clock circuit may be gated to provide single clock pulses or clock pulses at a 250 kc. rate, or may be operated continuously. When gated "ON," the clock pulse driver generates a clock pulse for each trigger signal received, but when gated "OFF," no clock pulses are generated.

The clock pulse generator has been previously described in connection with FIG. 2. The clock pulse generator supplies trigger signals at a 250 kc. repetition rate for a continuous clock pulse driver which in turn provides output pulses at 250 kc. rate. The output of the latter type clock pulse driver from the Central Processor is applied to clock pulse driver CDM shown in FIGS. 15*a–15c*. Clock pulse driver CDM also delivers clock pulses at the 250 kc. rate.

In FIGS. 15*a*, *b*, *c*, it is seen that to enable clock pulse driver CD1, CD2 and CD3, there is required the +6 volt gated input. When drivers CD1, CD2 and CD3 are enabled thereby, the clock drivers deliver clock pulses at the 250 kc. rate to synchronize the flip-flops and one-shots associated therewith as shown.

Clock drivers T*w*, T*r*, X*r*1, X*r*2 and X*r*3 are enabled when their gated input terms come true. For example, clock pulse driver T*w* delivers a clock pulse when the F*am* W*b* Y*dw* Q2*W* term is true. Accordingly, the flip-flops associated with these drivers are synchronously switched from one state to the complementary state only at the times that the drivers are enabled.

Tape Handler

The Tape Handler is adapted to write on magnetic tape the data received from the Write Buffer or to read the data stored on magnetic tape and to deliver this data to the Multiplex Buffer. The Tape Handler is also adapted to erase the data stored on the magnetic tape thereof. The Tape Handler is also adapted to drive the magnetic tap in the forward direction, for reading or writing and in the backward direction for rewinding. The Tape Handler will also erase a certain portion of the information stored on the magnetic tape. Tape Handlers are well-known in the art and, therefore, will not be described in detail.

FIGURES 16 and 17 illustrate the scheme for storing data on magnetic tape and for reading the data therefrom. Data is stored on magnetic tape 640 in groups of data words, which are designated as data blocks 641. Each data block comprises 100 data words wherein each data word comprises eight tape digits. Each tape digit comprises five bits, four bits being the system code for a digit to be processed. The fifth bit of the tape digit is the column parity bit for the tape digit. Seven of the eight tape digits of each tape data word include the seven digits of the data word to be processed in the system and the seven corresponding column parity bits. The eighth tape digit contains the five row parity bits for the tape data word.

Data is stored on the magnetic tape in 10 parallel tracks spaced across the tape, and extending parallel to the length of the tape. Ten bits are stored on a line substantially perpendicular to the length of the tape in the 10 tape tracks, which are numbered 1–10. The line on which the ten bits are stored perpendicularly to the length of the tape is termed a transverse recording position. The four data bits of one digit are stored in tracks 1–4 and the corresponding column parity bit in track 5. The four data bits of another digit are stored in tracks 6–9 and the corresponding column parity bit in track 10. Therefore, two tape digits are stored side-by-side in a transverse recording position.

A full tape data word is stored in four adjacent traverse recording positions, so that a data block of 100 words comprises 400 transverse recording positions. As shown in FIG. 17, the row parity digit and the 6th, 4th, and 2nd tape digits of the tape data word are stored in tracks 1–5 and the 7th, 5th, 3rd, and 1st tape digits are stored in tracks 6–10. The spacing between transverse recording positions and the speed of the tape are adjusted so that a transverse recording position is recorded or read approximately once during each 16 clock periods. Therefore, the reading or writing of a complete data word occurs in approximately 64 clock periods.

A plurality of writing heads 643, one opposite each track, are adapted to write data on the magnetic tape in the corresponding track. During the writing process, current is passed continuously through the write head in a direction to magnetize to saturation the corresponding track in a direction parallel to the length of the tape. The direction of this write head current depends on the data to be written. Only 0-bits are stored on magnetic tape. A 0-bit is denoted by a reversal in the direction of saturation in a track. Therefore, whenever a writing head is to write a 0, the current in the winding thereof is reversed. A 1-bit is represented by the absence of any change of magnetic field direction in a transverse recording position.

A plurality of reading heads 642, one opposite each track, are adapted to sense the magnetic field provided by the corresponding track and to deliver an output pulse whenever a 0-bit is sensed. Where a 1-bit is represented, no output signal is delivered by the corresponding read head.

The individual data bits and the representation in which they are stored are illustrated in FIG. 17. The arrows indicate the magnetic saturation of a track in the direction indicated. Thus, at the transverse recording position for the 4th digit, the 1st, 3rd, and 4th tracks have the saturation direction therein reversed, whereas the 2nd and 5th tracks have the saturation direction unchanged. Consequently, the column parity bit for the 4th digit is a 1 and the four data bits in tracks 4–1 are respectively 0010. The table below illustrates the data word represented in FIG. 17.

DATA DIGITS ON MAGNETIC TAPE (FIG. 17)

| Row Parity Digit | 7th | 6th | 5th | 4th | 3rd | 2nd | 1st |
|---|---|---|---|---|---|---|---|
| 0 | 1 | 1 | 0 | 1 | 0 | 0 | 1 |
| 1 | 0 | 0 | 0 | 0 | 0 | 0 | 0 |
| 0 | 0 | 1 | 0 | 0 | 0 | 0 | 0 |
| 1 | 1 | 0 | 1 | 1 | 1 | 0 | 0 |
| 0 | 0 | 0 | 1 | 0 | 1 | 0 | 1 |

The bits below the horizontal ruled line and to the right of the vertical ruled line are the data bits. The top row of bits are the column parity bits for the corresponding digits. The bits in the 2nd, 3rd, 4th, and 5th rows of the left-hand column are the row parity bits for the corresponding rows. The bit in the first row of the left-hand column is the column parity bit for that digit. No row parity bit is provided for the first row.

A block marker track provides indicia thereon for notifying the Write Buffer of the area on the magnetic tape wherein a data block is to be written and for notifying the Read Buffer of the location of the data block. Three block markers are employed, designated respectively as the α-block marker, β-block marker, and γ-block marker. Each different block marker comprises a different number of recorded 0's. A block marker analyzer 644 (FIG. 17) receives the signals provided by the read head 643', which detects the magnetic field of the block marker track. In response to the signals received, the block marker analyzer provides a plurality of output signals identifying the respective block markers. Thus, if data is to be read from tape, the β-block marker, when sensed, will cause the block marker analyzer to deliver the synchronizing R$sy$ signal and the γ-block marker, when sensed, will cause the block marker analyzer to deliver the R$ed$ signal. Similarly, if data is to be written on the tape, when the block marker analyzer senses the α-block marker, the W$sy$ signal will be delivered and when the analyzer senses the γ-block marker signal, the W$ed$ signal will be delivered. The α and β signals are used to denote the beginning of the block for the respective write and read operations. The γ-block marker is used to denote the end of the block in order to terminate a read or write operation.

Only one Tape Handler may be reading and one Tape Handler writing at any given time, inasmuch as the Read Buffer can only receive data from one Tape Handler and the Write Buffer can only deliver data to one Tape Handler. The address of the Tape Handler which is writing data is stored in the W$t$ flip-flops (FIG. 110) of the Tape Control Unit. In response to the Tape Handler address stored in the W$t$ flip-flops, the corresponding N$a(i)$ signal (FIG. 126) issues to actuate one of the relays shown in FIG. 18, to couple the 10 write drivers to the corresponding write heads 642 of the addressed Tape Handler. Thus, if Tape Handler #2 is addressed by the W$t$ flip-flops, the signal N$a2$ will issue and couple the 10 write drivers to the 10 write heads 642 of the second Tape Handler.

The address of the Tape Handler which is reading data is stored in the R$t$ flip-flops (FIG. 102). In response to the Tape Handler address stored in the R$t$ flip-flops, the corresponding N$r(i)$ signal (FIG. 125) issues to enable the output gates of the read preamplifiers (FIG. 19) of the addressed Tape Handler. Thus, if Tape Handler #4 is addressed by the R$t$ flip-flops, the signal N$r4$ will issue and enable the 10 read preamplifiers, corresponding to the 10 data tracks of the fourth Tape Handler.

Each of the 10 write heads 642 of the addressed Tape Handler is coupled to a respective one of 10 write drivers (FIG. 18) through appropriate relays 653, 654, etc. actuated by the corresponding N$a(i)$ signals. Ten read preamplifiers 660, 661, 662, etc., corresponding to data tracks 1–10, are provided for each Tape Handler and are coupled to the corresponding read heads 643, 643', 643", etc., thereof (FIG. 19). The read preamplifiers of a particular Tape Handler are enabled by the corresponding N$r(i)$ signal only when that Tape Handler is addressed. The read preamplifiers of all the Tape Handlers for a given track number are coupled to a common read amplifier 663, by connecting to an input OR-gate of the read amplifier.

A read preamplifier (FIG. 20) is permanently connected to the output winding of each read head in a Tape Handler. Input terminals 665 and 666 are connected directly to the output winding of a read head 643. The signal applied to terminals 665 and 666 is coupled to the respective base electrodes of transistors 667 and 668. Transistors 667 and 668 and their associated circuits comprise a difference amplifier. The output signal of the difference amplifier is taken from the collector electrode 670 of transistor 668. As described previously, only 0's are recorded as magnetic changes in the tape track. Therefore, successive 0's will induce voltages of opposite polarity in the output winding of the corresponding read head. These voltages will appear as pulses of opposite polarity at input terminals 665 and 666 and, consequently, will be amplified and appear as pulses of opposite polarity at collector electrode 670. Thus, the output signal of the difference amplifier delivered at collector electrode 670 will be a series of alternately positive and negative pulses, each pulse occurring when a 0 is read by the corresponding read head.

The output signal of the difference amplifier is coupled through an emitter follower comprising transistor 671 to a variable gain amplifier circuit comprising transistors 672 and 673 and their associated circuits. A potentiometer 674 is provided to adjust the gain of the variable gain amplifier to compensate for variations in read head output levels and for variations in the overall gain of the amplifier chain. The output signal of the variable gain amplifier is taken from the emitter electrode 675 of transistor 673. The alternately positive and negative polarity pulses at emitter electrode 675 each has an amplitude of approximately 1 v.

Figure 38:
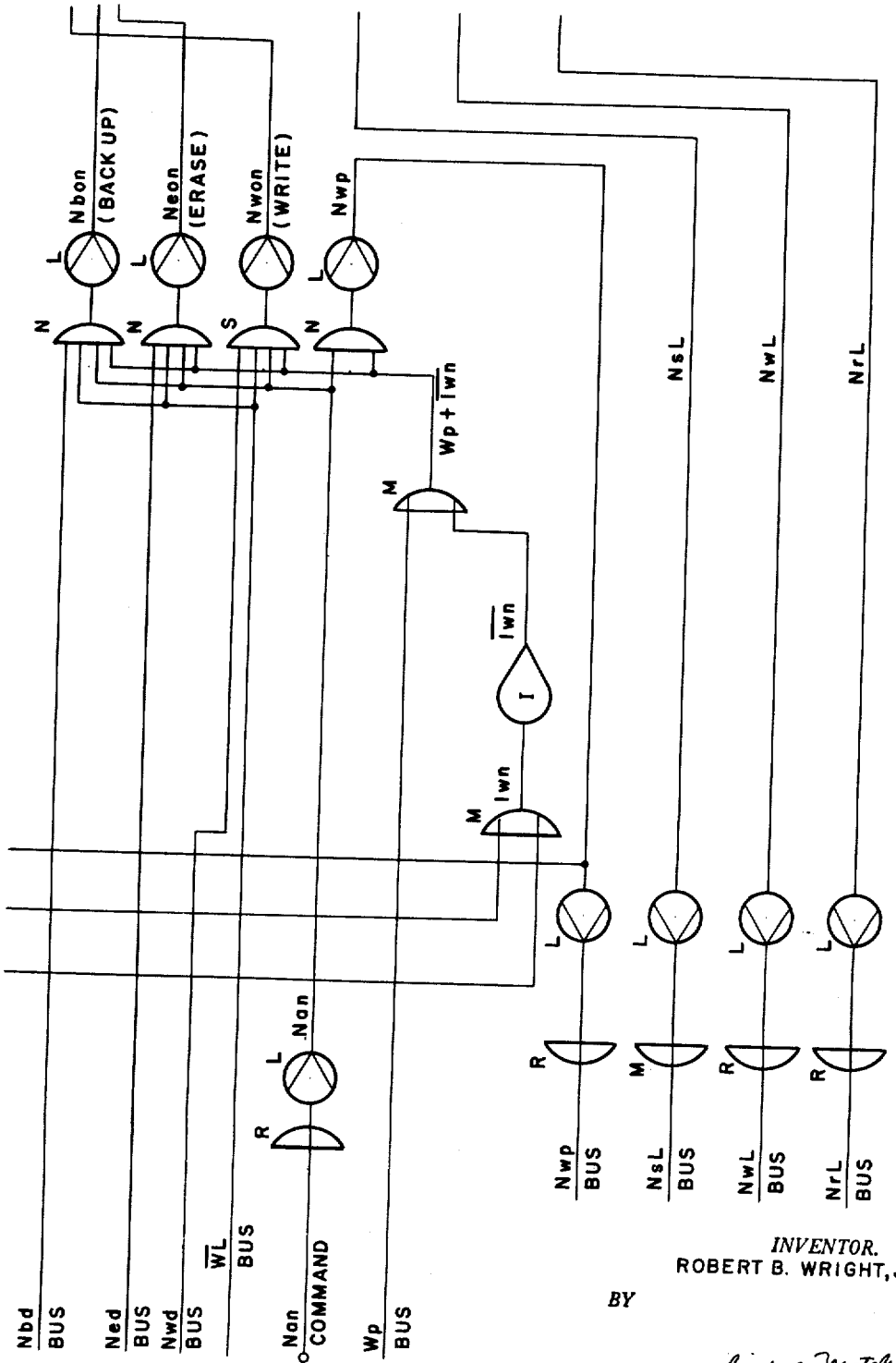
Figure 39:
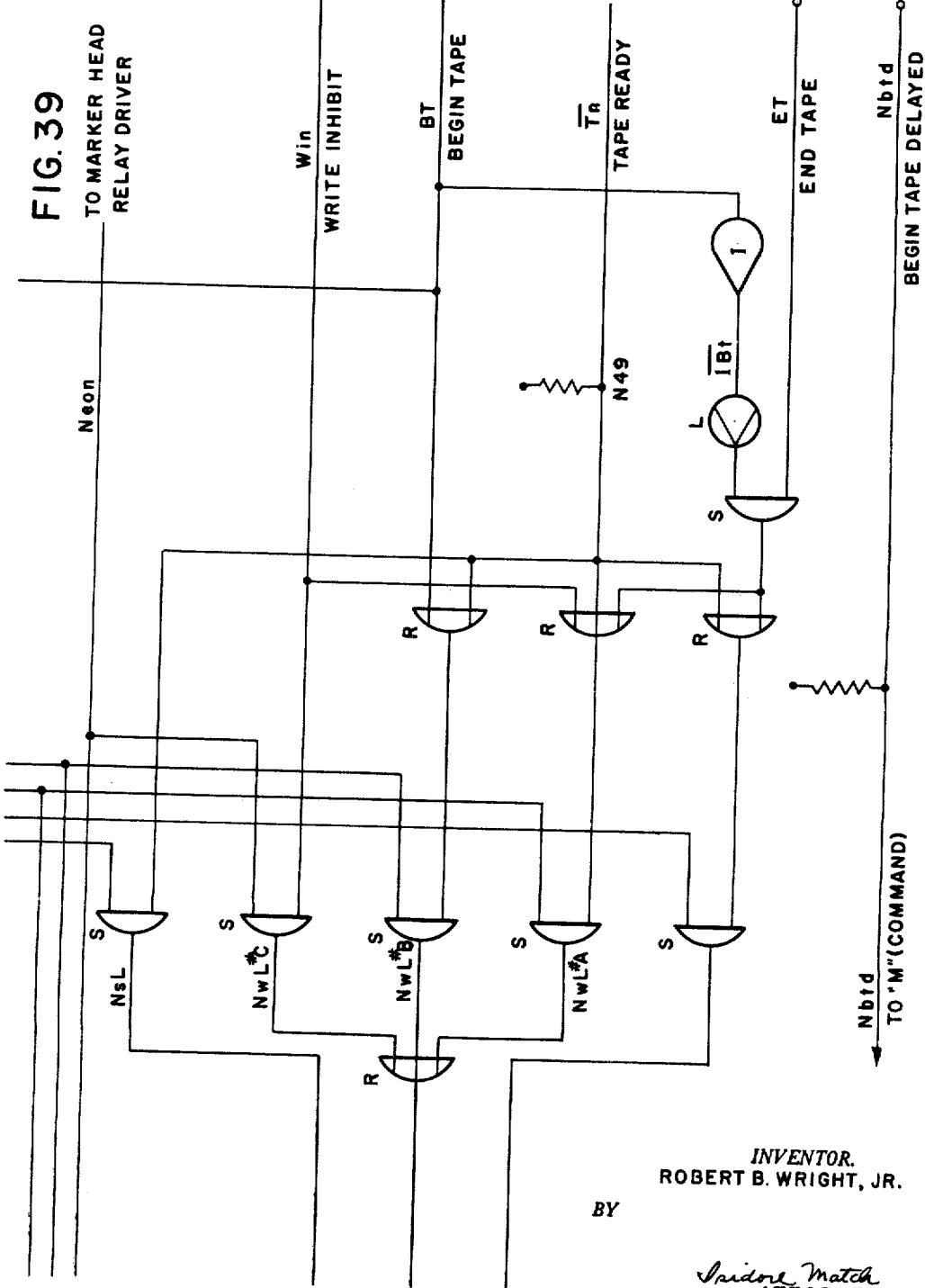
Figure 43:
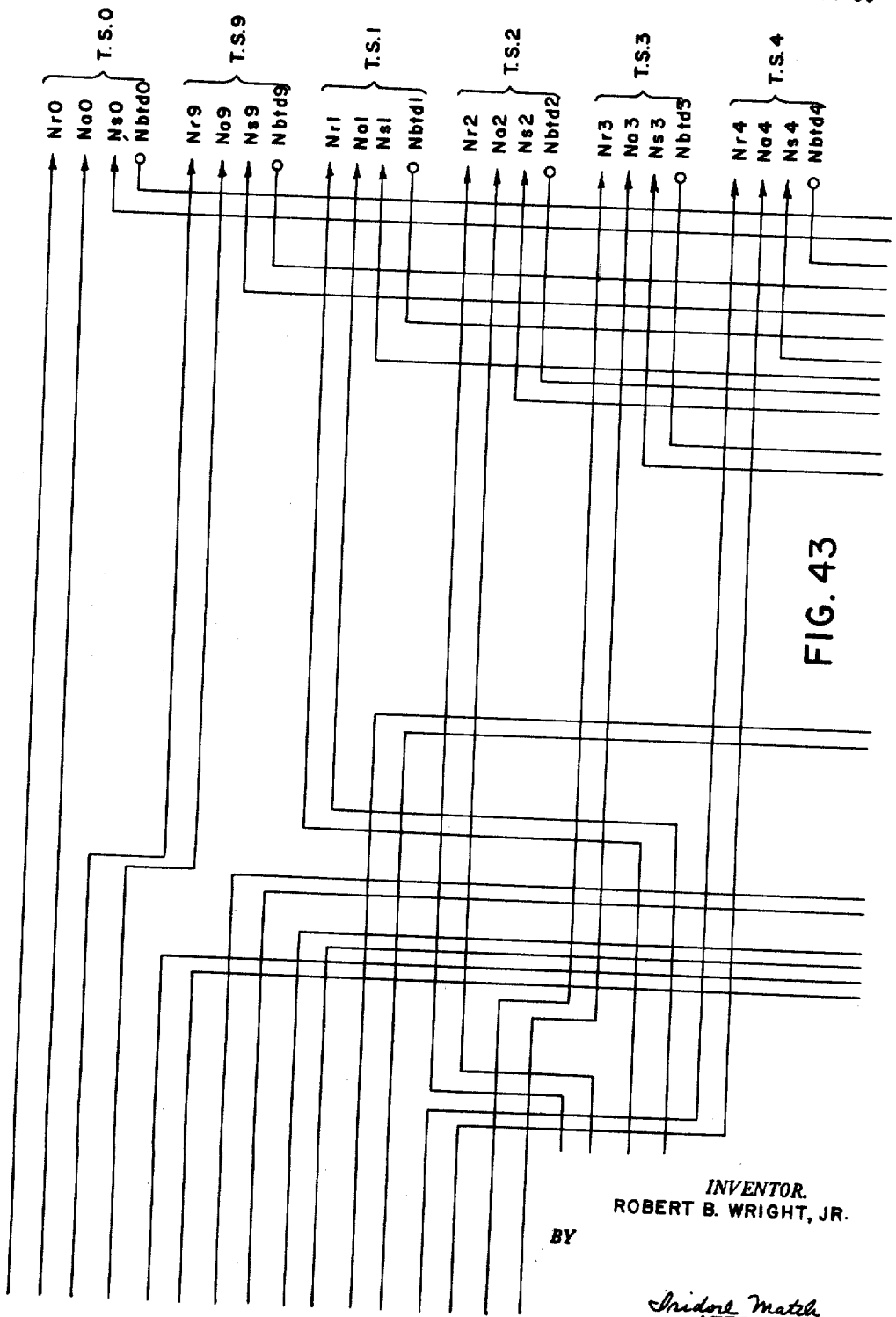
Figure 44:
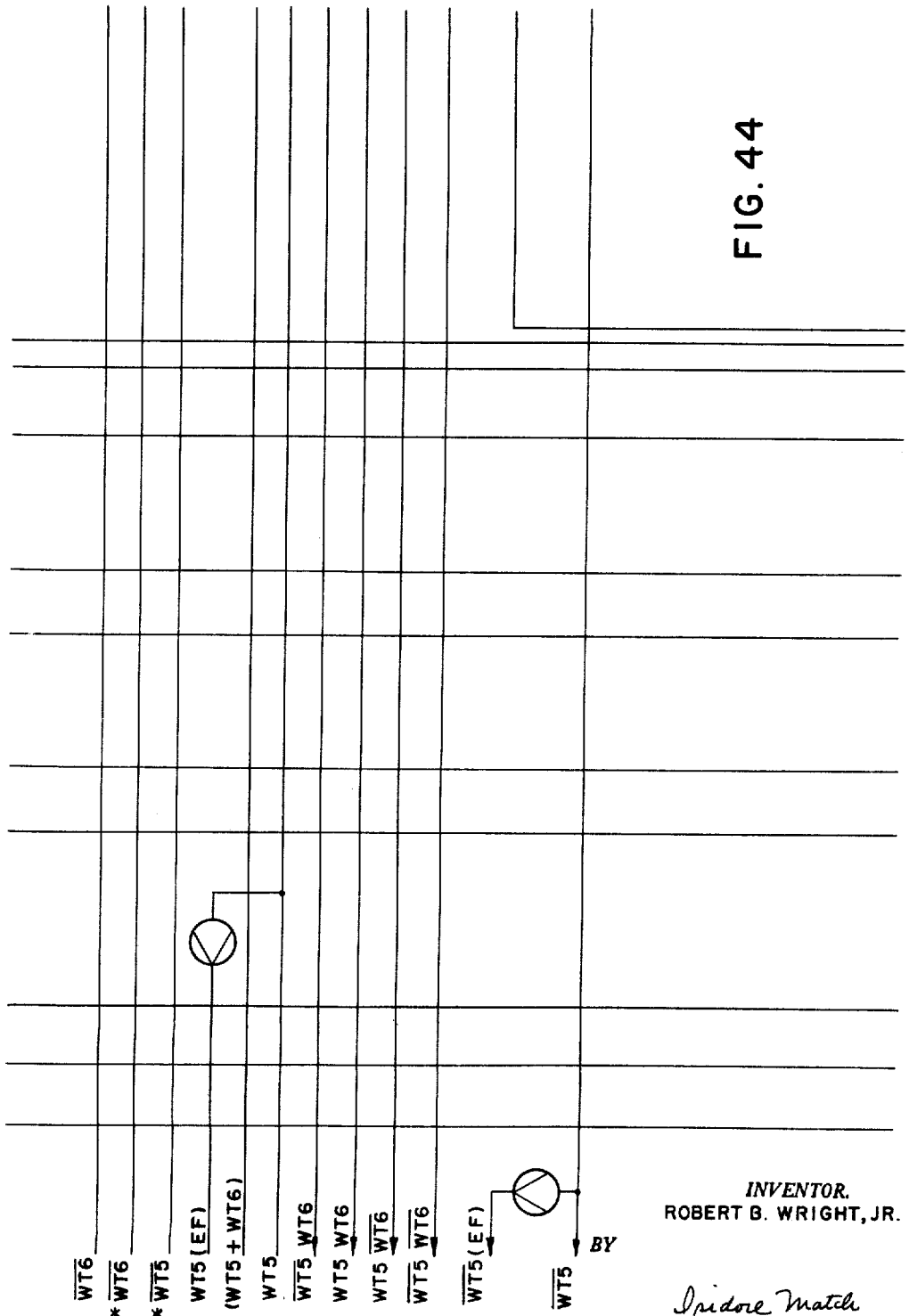
Figure 45:
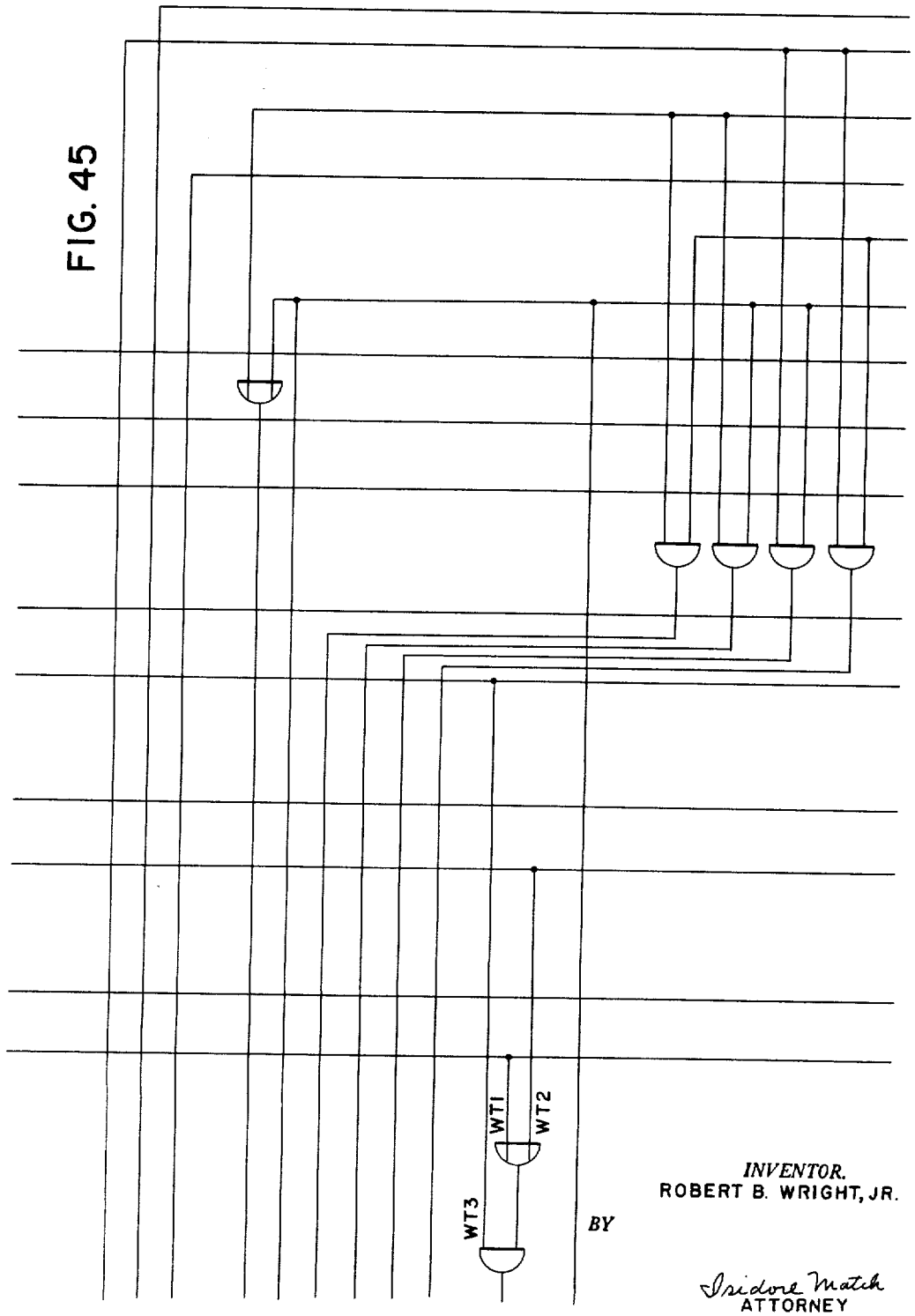
Figure 46:
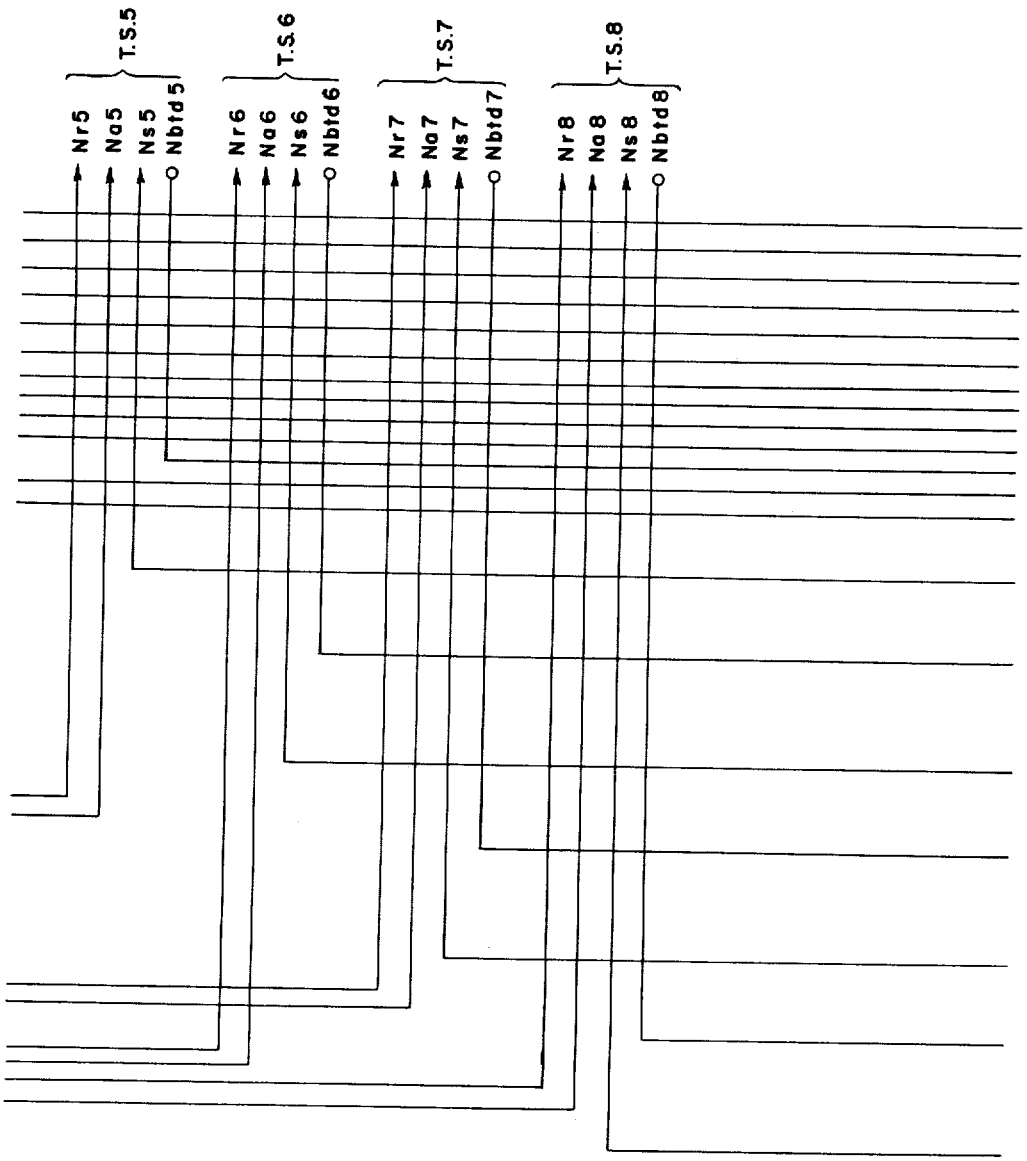
Figure 47:
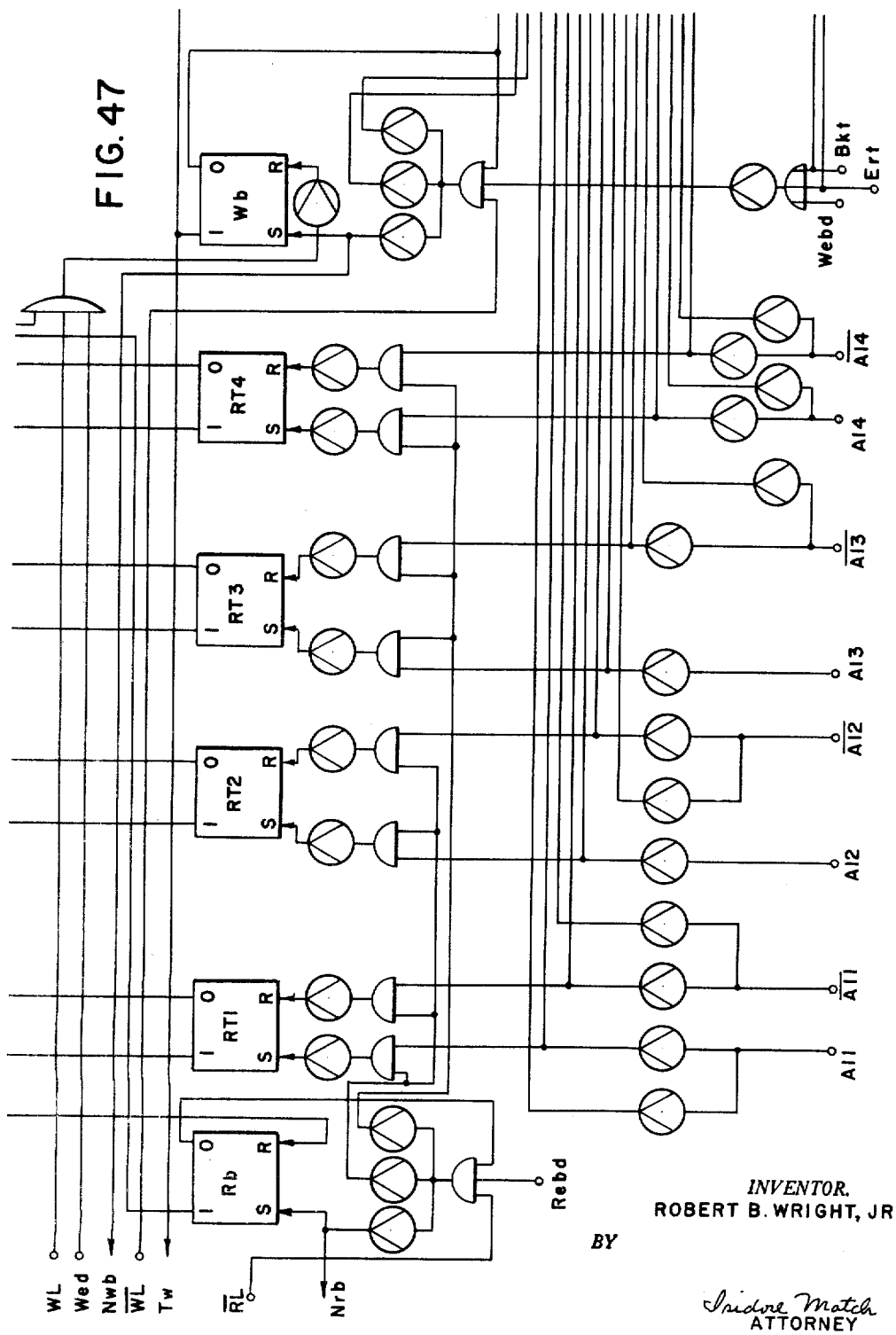
Figure 48:
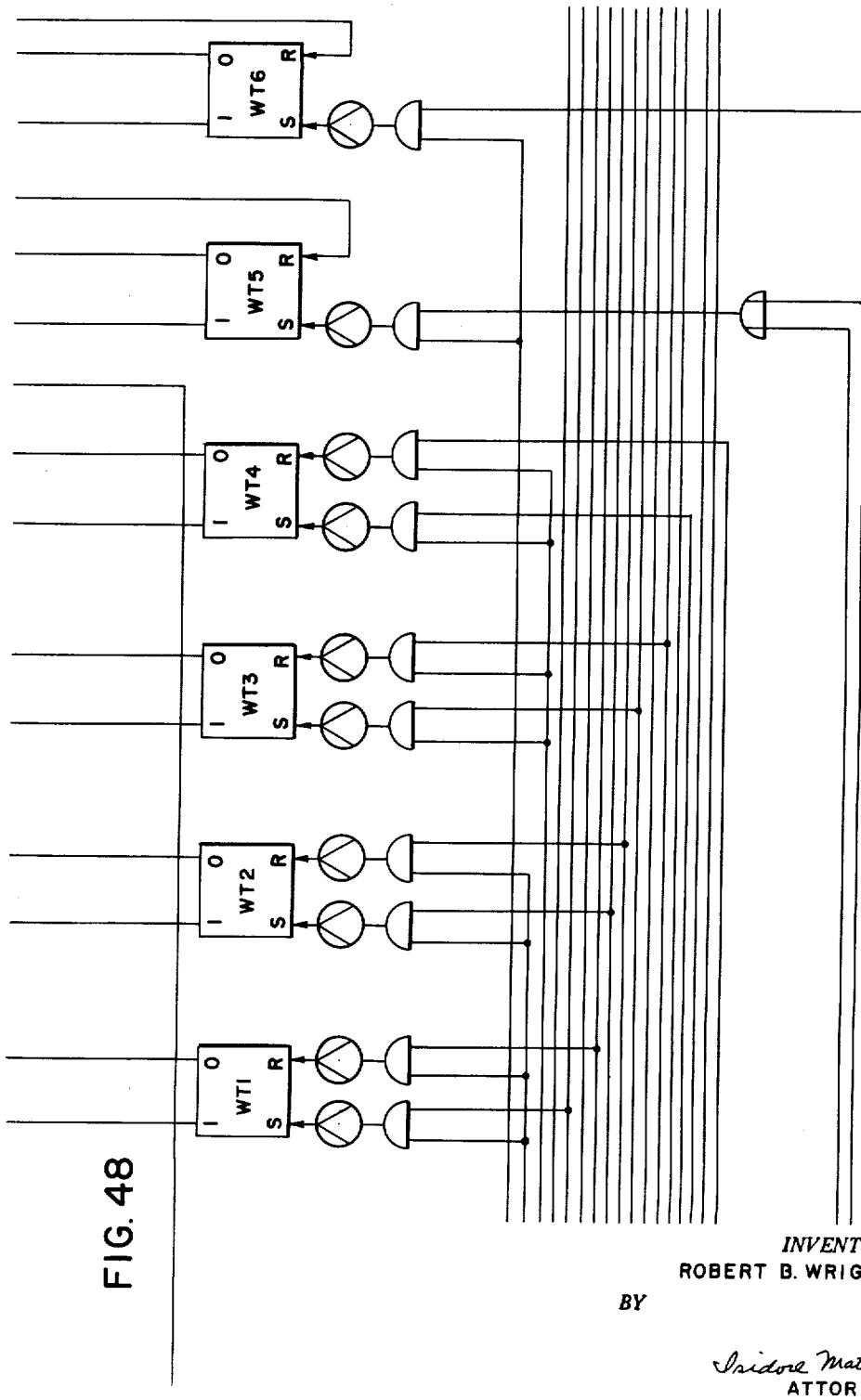
Figure 49:
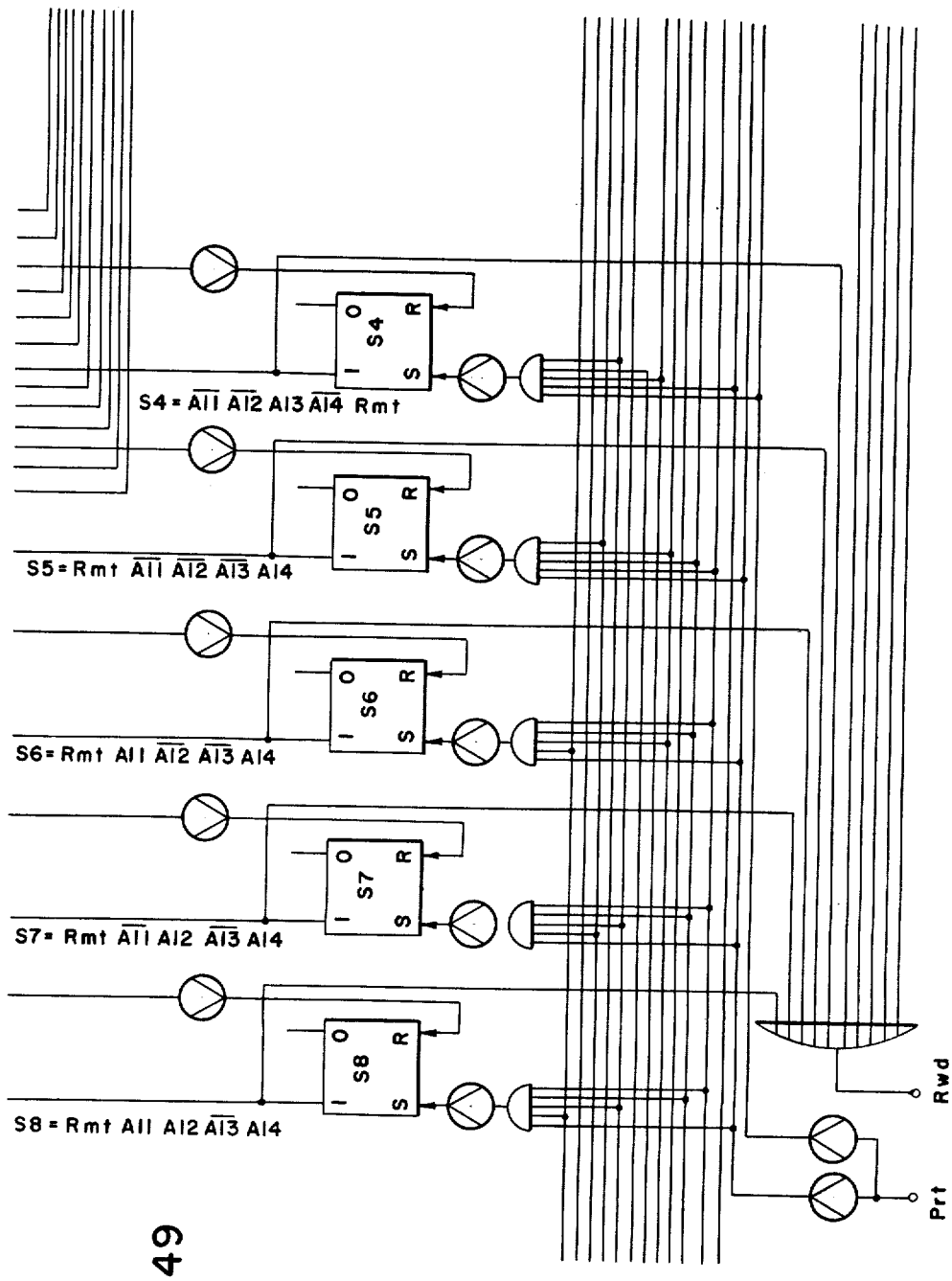

The output signal of transistor 673 is applied to one input terminal 676 of an AND-gate 677. Normally, AND-gate 677 is disabled by a −5 v. signal applied to its other input terminal 678. However, when a Tape Handler is addressed to read data, the corresponding N$r(i)$ signal is transferred to its 1-state and enables the corresponding read preamplifier output AND-gate 677. For example, the read preamplifier illustrated in FIG. 38 is in Tape Handler #4, so that when Tape Handler #4 is addressed to read a block of data from its magnetic tape, the signal N$r4$ enters the 1-state, thereby enabling AND-gate 677. With AND-gate 677 enabled, the signal delivered by transistor 673 is coupled to the preamplifier output terminal 679.

The output signal delivered by a read preamplifier is designated as the signal DRO($i$). For example, the output signal DRO9 of FIG. 20 designates the output signal of a read preamplifier connected to read the data stored in track 9 of a Tape Handler. The output terminals of all read preamplifiers which read data from like-numbered data tracks are connected to the input OR-gate of a single read amplifier (FIG. 19). However, only the read preamplifiers of the addressed Tape Handler will deliver signals to the corresponding read amplifier.

There will be explained hereinbelow, the Echo Read operation in the Tape Control System. This is an operation where data being written on tape can substantially concurrently be read to be checked for proper row and column parity.

In order to provide an input to an echo read amplifier during the writing operation, the DEO output from the preamplifier is required therefor. Such output is provided from AND-gate 677a. One input to gate 677a is the voltage appearing at input terminal 676. The other input to gate 677a is the N$won$ signal which is true, i.e., at the upper logic level, when a writing operation is in progress. Thus, when N$won$ is true, output DEO is provided from the preamplifier for input to an echo read amplifier which may suitably be the same as the read amplifier of FIG. 21.

A write driver (FIG. 18) is provided for each of the W$o$ flip-flops of the Write Buffer. The write driver couples the W$o$ flip-flops to the corresponding write heads, of the Tape Handler that is presently writing data on magnetic tape. The exemplary write driver of FIG. 18 responds to the state of the W$o3$ flip-flop to record corresponding data on track 3 of the magnetic tape of the addressed Tape Handler. The write driver transmits sufficient current through the winding of the corresponding write head to saturate track 3 of the magnetic tape in a direction determined by the W$o3$ flip-flop.

Assume that the Wo3 flip-flop is in the 1-state. A +6 v. signal is applied to the base electrode of transistor 649 and a −5 v. signal to the base electrode of transistor 650. Transistor 649 and 650 function as emitter followers and therefore provide at the corresponding emitter electrodes thereof the respective +6 v. and −5 v. signals. Transistors 651 and 652 have the emitter electrodes thereof grounded. Therefore, the +6 v. coupled through a resistor to the base electrode of transistor 651 causes this transistor to be cut off, and the −5 v. coupled through a resistor to the base electrode of transistor 652 causes this transistor to conduct. Therefore, the collector electrode of transistor 651 will be negative with respect to that of transistor 652 and current will flow from junction 657 through the connected write head winding to junction 656.

Conversely, if the Wo3 flip-flop is in the 0-state, current will flow from junction 656 through the connected write head winding to junction 657.

The Tape Handler address stored in the W$t$-register directs the issuance of the corresponding N$a(i)$ signal, which actuates the corresponding one of relays 653, 654, etc. When one of relays 653, 654, etc. is actuated, the winding of the corresponding read head 642, 642′, etc. receives the current provided by the write driver and magnetizes to saturation the adjacent tape track in a direction controlled by the state of the corresponding Wo flip-flop.

The F$tr$ read amplifier receives the output signals delivered by the enabled read preamplifier connected thereto (FIG. 19) and converts these signals into form suitable for transmission to the R$a$-register of the Read Buffer (FIG. 22).

The read amplifiers are denoted by the inclusive symbols F$tr$1–10, and are adapted to receive the data read from the correspondingly numbered tape tracks of the Tape Handler reading data. A single read amplifier is provided in the Tape Control Unit for like numbered tape tracks of all the Tape Handlers. Thus, as shown in FIG. 19, each read preamplifier coupled to receive the data read from track 9 of the corresponding Tape Handler is connected to the single F$tr$9 read amplifier. However, only the read preamplifier of the Tape Handler then reading data, is enabled by the corresponding N$r(i)$ logical combination signal, as directed by the R$t$-register.

In the F$tr$ read amplifier, shown in detail in FIG. 21, an input OR-gate 701 is connected to receive the output signals of the corresponding read preamplifiers. The output terminals 679 (FIG. 20) of approximately one-half of the corresponding read preamplifiers are connected directly to input terminal 702 and the output terminals of the remaining corresponding read preamplifiers are connected directly to input terminal 703.

The signal received by the read amplifier has pulses, due to binary 0's recorded on tape, which are approximately 1 volt in amplitude and either positive or negative in polarity. It is the function of the read amplifier to convert each of these pulses to the conventional voltage level for data processing. Additionally, the read amplifier will reject spurious and other noise signals received thereby which do not satisfy predetermined criteria of amplitude and duration. The circuits of the read amplifier following OR-gate 701 are adapted to sense the received signal to determine if the signal contains a pulse whose amplitude is greater than a predetermined value and whose length is greater than a predetermined duration. If the received signal satisfies these criteria, the read amplifier will deliver an output signal representing a binary 0. If such a signal is not received, the read amplifier delivers a signal representing a binary 1.

The input signal is first applied to the base electrode of a transistor 705 of a feedback amplifier, designed for stable gain. The feedback amplifier comprises transistors 705 and 706 and their associated circuitry. In the feedback amplifier output signal, taken from the emitter electrode of transistor 706, the pulses representing binary 0's have an amplitude of approximately 7.5 v. This output signal is applied to the base electrode of a transistor 708, which, with transistor 709 and associated circuitry, comprises a threshold detector circuit. This threshold detector provides an output signal only when the input signal applied thereto exceeds a predetermined positive voltage level. Conversely, transistors 710 and 711 and their associated circuitry comprise a threshold detector which provides an output signal only when the signal applied thereto is less than a predetermined negative voltage level.

The output signals of both threshold detectors are applied to the base electrode of transistor 714 of a transistor amplifier. The output signal of transistor 714 is applied to a following amplifier comprising transistor 715. The output signal delivered by transistor 715 is applied to a pulse duration detector circuit, comprising transistor 716. The pulse duration detector provides an output signal only when the signal applied thereto exceeds a predetermined duration. The output signal of the pulse duration detector is applied to the base electrode of a transistor 717 of a flip-flop 718.

Flip-flop 718 comprises the transistors 717 and 719 and associated circuitry. This flip-flop is similar to that described previously and illustrated in FIG. 4. The output signals delivered by flip-flop 718 represent the data read by the corresponding read head. If no 0-bit has been read from tape, the flip-flop 718 delivers a 1-output signal at its output terminal 721. If, however, a 0-bit has been read from tape, flip-flop 718 delivers a 0-output signal at its terminal 722. Transistors 723 and 724 amplify the flip-flop output signals and provide the corresponding output signals of terminals 721 and 722. Whenever all five bits of a complete tape digit have been transferred from five read amplifiers to the Read Buffer, the flip-flops 718 of these five read amplifiers are preset to the 1-state by the clock signal X$r$1 or X$r$2, applied to input terminal 725. The clock signal X$r$1 presets the F$tr$1–F$tr$5 read amplifiers and the clock signal X$r$2 presets the F$tr$6–F$tr$10 read amplifiers. Thus, immediately following receipt of a tape digit by the Read Buffer from a group of five read amplifiers, the flip-flops of these read amplifiers are set to the 1-state, and remain in the 1-state, unless a 0-bit is read from the corresponding tape tracks.

The response of the read amplifier to the signals delivered by transistor 706 will now be described. The circuits will first be analyzed under quiescent conditions; that is, in the absence of any pulses delivered by transistor 706. The base electrode of transistor 708 is at ground potential (0 v.) and transistor 708 is enabled to conduct by current flowing through a resistor 727. Therefore, the emitter electrode of transistor 709, which is connected to the emitter electrode of transistor 708, is approximately at 0 v. The base electrode of transistor 709 is maintained at approximately +1.4 v. by current flow through diodes 728 and 729, so that transistor 709 is held non-conducting. Thus, the output transistor 709 of the positive threshold detector is non-conducting in the quiescent state. Transistor 711 is normally conducing and the base electrode thereof is maintained at the −1.4 v. level by current flow through diodes 730 and 731. Therefore, the emitter electrode of transistor 710, which is connected to the emitter electrode of transistor 711, is held at −1.4 v. Transistor 710 is consequently cut off due to the 0 v. potential applied to the base electrode thereof from the emitter electrode of transistor 708. Thus, the output transistor 710 of the negative threshold detector is non-conducting in the quiescent state.

Transistor 714 is normally cut off and transistor 715 is normally conducting heavily because of the corresponding bias voltages applied thereto. With transistor 715 conducting heavily, the −5 v. signal delivered by the collector electrode thereof is applied to the base electrode of the transistor 716. Since the emitter electrode of transistor 716 is grounded, this transistor is held cut off in the quiescent state. The presetting of flip-flop 718 to the 1-state, renders transistor 717 normally conducting and transistor 719 normally cut off. The level of the emitter electrode of transistor 717 is maintained at +8 v.

Consider now the appliction of a pulse to the base electrode of transistor 708. If the pulse is positive, the voltage thereof will be coupled through the emitter electrode of transistor 708 to the emitter electrode of transistor 709. Transistor 709 will thereupon commence conducting if this pulse exceeds +1.4 v. When transistor 709 conducts, the emitter electrode thereof is clamped to +1.4 v., so that transistor 708 is forced into non-conduction. If the pulse applied to transistor 708 is negative, the voltage thereof is coupled through the emitter electrode of transistor 708 to the base electrode of transistor 710. Transistor 710 will thereupon commence conducting if this pulse is more negative than −1.4 v., and will, in turn, cut off transistor 711, whose base electrode is maintained at −1.4 v. Therefore, if the input pulse exceeds 1.4 v. in amplitude one of the two threshold detector output transistors 709 or 710 commences conducting.

The conduction of transistors 709 or 710 provides a voltage at the collector electrodes thereof which is sufficiently positive with respect to the −7.5 v. bias on the emitter electrode of transistor 714 to cause transistor 714 to commence conducting. The conduction of transistor 714 causes application of an approximately −7.5 v. signal to the base electrode of transistor 715, which thereupon ceases conduction.

When transistor 715 ceases conduction, the −5 v. output signal thereof is removed from the collector electrode of transistor 716, and capacitor 733 commences charging positively through resistor 734. Capacitor 733 will charge positively from −5 v. until it reaches 0 volts, whereupon transistor 716 commences conducting. The time required for capacitor 733 to charge to 0 volts from its original −5 v. level is approximately 4 microseconds. If the amplitude of the input pulse does not exceed 1.4 v. for 4 microseconds, or greater, transistor 715 commences conducting once again before the capacitor 733 can charge to the 0 v. level. Conduction of transistor 715 discharges capacitor 733, so that transistor 716 does not become conducting. Therefore, capacitor 733, resistor 734, and transistor 716 constitute a pulse duration detector, providing an output signal only if the input signal applied thereto exceeds 4 microseconds in duration. Therefore, the read amplifier will not respond to extremely short duration pulses even though they be of high level of amplitude, but will respond to pulses provided by a binary 0 on the magnetic tape, since the binary 0 produces a pulse of about 25 microseconds duration.

When transistor 716 conducts, the collector electrode thereof is established at approximately 0 v., and capacitor 735 charges to +6 v. When the read amplifier input pulse decreases and transistor 715 once again commences conducting, transistor 716 cuts off. The collector electrode of transistor 716 thereupon rises to the +8 v. level, causing a signal having a +14 v. level to be coupled to the base electrode of transistor 717. This +14 v. signal cuts off transistor 717, and flip-flop 718 transfers to the 0-state, where it remains until once again present to the 1-state by the clock signal X$r$1 or X$r$2.

Thus, the flip-flop of the F$tr$ read amplifier is preset to the 1-state after each digit has been read from tape and is transferred to the 0-state only if an input pulse of satisfactory amplitude and duration is received by the read amplifier.

Read Buffer

The Read Buffer temporarily stores data being transferred from a Tape Handler or the Character Reader to Memory. A succeeding section "Read Buffer Operations" provides details of the operation of the Read Buffer in effecting the following types of data transfer:

(a) The storing in consecutive memory locations of one block of 100 data words from magnetic tape, and (b) The storing in consecutive memory locations of one line of data read from a document by the Character Reader.

Each of these types of data transfer is initiated by an appropriate programmed instruction (65), executed in the Central Processor, but continued and carried to completion under control of the Read Buffer.

The Read Buffer comprises a register for temporarily storing the data being transferred through the Read Buffer, register transfer and logic circuits for transferring data into and through the reigster, clock pulse drivers for controlling the timing of the Read Buffer, a counter, and flip-flops employed as control signal sources. Fig 22 illustrates symbolically the elements of the Read Buffer which store data, the paths of data transfer between these elements, and certain control elements.

The 4-digit R$a$-register 740 and the 7-digit R$b$-register 741 temporarily store the data being transferred through the Read Buffer.

The contents of the R$a$4–R$a$1 flip-flops of the R$a$-register are shifted-up upon application of the SR$a$ clock signal to register transfers which connect the R$a$1–R$a$4 digit positions of the R$a$-register. The R$a$1 flip-flops are adapted to receive the contents of the corresponding R$in$1–R$in$4 flip-flops upon application of the SR$a$ clock signal to register transfers which connect the output terminals of the R$in$1–R$in$4 flip-flops to corresponding input terminals of the R$a$1 flip-flops. The R$a$4 flip-flops are adapted to receive the corresponding Crd4–Crd1 output signals of the Sorter Control Unit (FIG. 1) upon application of the ($Tr1$ $\overline{Tr3}$ $Cha$) signal to logical gates which connect output terminals of the Sorter Control Unit to corresponding input terminals of the R$a$4 flip-flops. The contents of the R$a$4 flip-flops may be transmitted to the R$b$1 or R$b$7 flip-flops of the R$b$-register.

The contents of the R$b$6–R$b$1 flip-flops of the R$b$-register are shifted-up upon application of the SR$b$ clock signal to register transfers which connect the R$b$6–R$b$1 digit positions of the R$b$-register. The contents of the R$b$6 flip-flops are transferred to the corresponding R$b$7 flip-flops upon application of the ($Tr2$ $\overline{Tr4}$ $\overline{Tr5}$ $\overline{Cha}$) signal to logical gates which connect the output terminals of the R$b$6 flip-flops to corresponding input terminals of the R$b$7 flip-flops. The R$b$1 flip-flops are adapted to receive the contents of the corresponding R$a$4 flip-flops upon application of the SR$b$ clock signal to register transfers which connect the output terminals of the R$a$4 flip-flops to corresponding input terminals of the R$b$1 flip-flops. The R$b$7 flip-flops are adapted to receive the contents of the corresponding R$a$4 flip-flops upon application of the R$p$1 logical combination signal to logical gates which connect the output terminals of the R$a$4 flip-flops to corresponding input terminals of the R$b$7 flip-flops. The contents of the R$b$-register may be transmitted by parallel shift to the M-register. In this parallel shift only the 1-output signals of the R$b$ flip-flops are applied to the corresponding M flip-flops. The contents of the R$b$7 flip-flops may be transmitted to the row parity check circuit 743.

The R$in$6–R$in$10 flip-flops comprise one tape digit input register for the Read Buffer and receive the tape digits read from tracks 6–10 of the magnetic tape of the Tape Handler reading data. The R$in$6–R$in$10 flip-flops are adapted to receive the contents of the flip-flops of the corresponding F$tr$6–F$tr$10 read amplifiers upon application of the ($Rds2$ $Dsy2$) signal to logical gates which connect the output terminals of the F$tr$6–F$tr$10 amplifiers to corresponding input terminals of the R$in$6–R$in$10 flip-flops. The contents of the R$in$6–10 flip-flops are adapted to be transferred to the corresponding R$in$1–5 flip-flops.

The R$in$1–R$in$5 flip-flops comprise the other tape digit input register for the Read Buffer and are adapted to receive the tape digits read from tracks 1–5 of the magnetic tape of the Tape Handler reading data. The $Rin1$–$Rin5$ flip-flops are adapted to receive the contents of the flip-flops of the corresponding $Ftr1$–$Ftr5$ read amplifiers upon application of the ($Rds1$ $Dsy1$) signal to logical gates which connect the output terminals of the $Ftr1$–$Ftr5$ amplifiers to corresponding input terminals of the $Rin1$–$Rin5$ flip-flops. The $Rin1$–$Rin5$ flip-flops are also adapted to receive the contents of the corresponding $Rin6$–$Rin10$ flip-flops upon application of the SR$in$ clock signal to register transfers which connect the output terminals of the $Rin6$–$Rin10$ flip-flops to corresponding input terminals of the $Rin1$–$Rin5$ flip-flops. The contents of the $Rin1$–$Rin4$ flip-flops may be transferred to the column parity check circuit 744.

The row parity check circuit 743 samples the contents of the $Rb7$ flip-flops to determine if each set of the eight bits of like bit order in the word received from tape contains an odd number of 0's. The column parity check circuit 744 samples the contents of the $Rin1$–$Rin5$ flip-flops to determine if the five bits of each tape digit received has an odd number of 0's. If a parity error is detected by the row parity check circuit 743 or the column parity check circuit 744, the E$rs$ flip-flop 745 is set.

A T$r$-counter 746, which comprises the T$r1$–T$r5$ flip-flops and which operates in 17 discrete states, is the source for fine timing and control of the shifting operations executed in the Read Buffer.

Other Read Buffer flip-flops are employed primarily to perform control functions. The C$fs$ flip-flop directs the Read Buffer to read a line of data from one document. The C$ha$ flip-flop aids in controlling the Read Buffer when data is being transferred thereto from the Character Reader. The C$su$ flip-flop denotes the failure to read any data from a tape block during a Read Buffer operation, and is employed when the Character Reader is transferring data to the Read Buffer to aid in controlling the T$r$-counter. The D$sy1$, $2$, H$af$, and R$ds1$, $2$ flip-flops are employed in the data retiming circuit, illustrated in FIG. 23, to gate the digits received by the read amplifiers from each tape half to the corresponding one of the Read Buffer digit input registers R$in1$–$5$ and R$in6$–$10$. The E$oc$ flip-flop is employed when the Character Reader is supplying data to the Read Buffer to signal that the end of the line of data has been reached by the Character Reader. The R$b$ flip-flop, when on, indicates that one of the Tape Handlers is presently engaged in transferring a block of data to the Memory through the Read Buffer. (The R$b$ flip-flop is actually in the Tape Control Unit, but is illustrated in FIG. 22 for purposes of clarity of the description.) The R$eb$ flip-flop, when on, indicates that the Read Buffer is busy receiving data from a Tape Handler or from the Character Reader. The U$r$ flip-flop, when set, demands that the Central Processor perform an operation to transfer the word in the R$b$-register to Memory.

The Y$td1$ and Y$td2$ one-shots function in the data retiming circuit to control the amount of magnetic tape skew which will be tolerated.

LOGIC EQUATIONS $*AA = (Naw + Nbw) [(\overline{Wt5} \ \overline{Wt6}) \ Esy + (Wt5 \ Wt6)]$
$+ (Nbw + Ncw) [(\overline{Wt5} \ \overline{Wt6})\overline{Wsy}] + (Naw + Ncw)$
$[(\overline{Wt5} \ \overline{Wt6})\overline{Esy} \ Wsy] + Esy \ (Nbw + Ncw \ Wt5) \ \overline{CaL}$
$+ Naw \ \overline{Esy} \ (Wt5 + Wt6) \ \overline{CaL}$
$Atd = SL + RL + WL$
$Bta = \overline{Trn} \ Bt$
$*Bts = Webd$
$*\overline{Bts} = Te1$
$\#Bts = KSBts$
$\#\overline{Bts} = Ktb + KRBts$
$*C0r = \overline{C0r} \ (C0r + C1r + C2r + C3r) + [\overline{Ymr} \ \overline{Y10r}]$
$*\overline{C0r} = [C0r(\overline{IY10r} + Q1r)]$ $\#C0r = KSC0r$
$\#\overline{C0r} = Ktb + KRC0r$
$*C1r = [C0r \ (\overline{IY10r} + Q1r)] \ \overline{C1r}$
$*\overline{C1r} = [\overline{Ymr} \ \overline{Y10r}] + C0r \ C1r$
$\#C1r = KSC1r$
$\#\overline{C1r} = Ktb + KRC1r$
$*C2r = Q1r \ C0r \ C1r \ \overline{C2r}$
$*\overline{C2r} = [\overline{Ymr} \ \overline{Y10r}] + (C0r \ C1r \ C2r)$
$\#C2r = KSC2r$
$\#\overline{C2r} = Ktb + KRC2r$
$*C3r = Q1r \ (C0r \ C1r \ C2r) \ \overline{C3r}$
$*\overline{C3r} = [\overline{Ymr} \ \overline{Y10r}] + (C0r \ C1r \ C2r) \ C3r$
$\#C3r = KSC3r$
$\#\overline{C3r} = Ktb + KRC3r$
$*C0w = \overline{C0w} \ (C1w + C2w + C3w) + [\overline{Ymw} \ \overline{Y10w}]$
$*\overline{C0w} = C0w \ (\overline{IY10w} + Q1w)$
$\#C0w = KSC0w$
$\#\overline{C0w} = Ktb + KRC0w$
$*C1w = [C0w \ (\overline{IY10w} + Q1w)] \ \overline{C1w}$
$*\overline{C1w} = [\overline{Ymw} \ \overline{Y10w}] + C0w \ C1w$
$\#C1w = KSC1w$
$\#\overline{C1w} = Ktb + KRC1w$
$*C2w = Q1w \ C0w \ C1w \ \overline{C2w}$
$*\overline{C2w} = [\overline{Ymw} \ \overline{Y10w}] + [(C0w \ C1w)C2w]$
$\#C2w = KSC2w$
$\#\overline{C2w} = Ktb + KRC2w$
$*C3w = Q1w \ [(C0w \ C1w)C2w] \ \overline{C3w}$
$*\overline{C3w} = [\overline{Ymw} \ \overline{Y10w}] + [(C0w \ C1w)C2w] \ C3w$
$\#C3w = KSC3w$
$\#\overline{C3w} = Ktb + KRC3w$
$CaL = \overline{CaL}$ (from N Rack switch) $+ -5$ volts
$Cpd = (Per4 + Per5)(\overline{Per4} + \overline{Per5})$
$Cpe = Per1 \ Per2 \ Per3 + \overline{Per1} \ Per2 \ \overline{Per3} + \overline{Per1} \ \overline{Per2} \ Per3$
$+ Per1 \ \overline{Per2} \ \overline{Per3}$
$Cpo = \overline{Per1} \ \overline{Per2} \ \overline{Per3} + \overline{Per1} \ Per2 \ Per3 + Per1 \ \overline{Per2} \ Per3$
$+ Per1 \ Per2 \ \overline{Per3}$
$Cps = (\overline{Per4} + Per5)(Per4 + \overline{Per5})$
$DHR = \overline{Di} \ Nwon$
$*Di = [Ncw \ (\overline{Wt5} \ Wt6)]$
$*\overline{Di} = Ncw \ \overline{Wt6}$
$DRI = Nron$
$*Dtu = NWL + NSL + NRL$
$*\overline{Dtu} = KRA$
$\#Dtu = KSDtu$
$\#\overline{Dtu} = KRDtu$
$*Edsy = (Fed \ \overline{Edsy})$
$*\overline{Edsy} = (Te1 \ Te2)$
$\#Edsy = KSEdsy$
$\#\overline{Edsy} = Ktb + KREdsy$
$*Esy = Nbw \ [\overline{Wt5} + (Wt5 \ \overline{Wt6})]$
$*\overline{Esy} = WL + Naw \ \overline{Wt6} + Ncw \ \overline{Wt5} \ Wsy$
$\#Esy = KSEsy$
$\#\overline{Esy} = Ktb + KREsy$
$Ewss = Cpe \ Cps \ Te2 + Cpo \ Cpd \ Te2 + (\overline{Per1} + \overline{Per2}$
$\overline{Per3} + \overline{Per4})\overline{Te1} \ Te2 \ \overline{Tc3} \ Te4 + Bts \ Wed$
$*Fam = \overline{Mca} \ \overline{Fam} \ \overline{Q2w} \ \overline{Q1w} \ Q2w \ \overline{Ysdw}$
$*\overline{Fam} = Fam$
$\#Fam = KSFam$
$\#\overline{Fam} = Ktb + KRFam$ $*Fed = (\overline{Fer1} + \overline{Fer2} + \overline{Fer3} + \overline{Fer4} + \overline{Fer5} + \overline{Fer6} + \overline{Fer7}$
$+ \overline{Fer8} + \overline{Fer9} + \overline{Fer10}) \ Esy \ \overline{Fed} \ (\overline{Wt5} \ \overline{Wt6}) \ \overline{Di}$
$*\overline{Fed} = (Te1 \ Te2)$
$\#Fed = KSFed$
$\#\overline{Fed} = Ktb + KRFed$
$*Fer = Xer$
$*\overline{Fer} = DEO$

*Frm=$\overline{Mra}$ $\overline{Frm}$
*$\overline{Frm}$=Frm
Frm=KSFrm
$\overline{Frm}$=Ktb+KRFrm
*Ftr1=Xr1
*$\overline{Ftr1}$=DRO
IBt=Bt
INrp=Nrp
INwp=Nwp
Irn=Nsn+Nwp
Isn=Nrp+Nwp+Bt
Iwn=Nsn+Nrn
*IY10r=$\overline{Y10r}$
*IY10w=$\overline{Y10w}$
Ktb=Ker+Ktcc
*Mea=Tw
*$\overline{Mea}$=DEO
*Mra=DRO
*$\overline{Mra}$=Tr
Na0=$\overline{Wt1}$ $\overline{Wt2}$ $\overline{Wt3}$ $\overline{Wt4}$ Wb
Na1=Wt1 $\overline{Wt2}$ $\overline{Wt3}$ $\overline{Wt4}$ Wb
Na2=$\overline{Wt1}$ Wt2 $\overline{Wt3}$ $\overline{Wt4}$ Wb
Na3=Wt1 Wt2 $\overline{Wt3}$ $\overline{Wt4}$ Wb
Na4=$\overline{Wt1}$ $\overline{Wt2}$ Wt3 $\overline{Wt4}$ Wb
Na5=$\overline{Wt1}$ $\overline{Wt2}$ $\overline{Wt3}$ Wt4 Wb
Na6=Wt1 $\overline{Wt2}$ $\overline{Wt3}$ Wt4 Wb
Na7=$\overline{Wt1}$ Wt2 $\overline{Wt3}$ Wt4 Wb
Na8=Wt1 Wt2 $\overline{Wt3}$ Wt4 Wb
Na9=$\overline{Wt1}$ $\overline{Wt2}$ Wt3 Wt4 Wb
Naw=(Q2w Fam)(C2w $\overline{C3w}$)
Nbd=Wt5+($\overline{Wt5}$ Wt6)
Nbr=Q2r C3r (C1r+C2r)($\overline{C1r}$+$\overline{C2r}$)
Nbtd=Beginning Of Tape Delayed Signal
Nbw=(Q2w Fam) C3w (C1w+C2w)($\overline{C1w}$+$\overline{C2w}$)
Ncr=Q2r $\overline{C3r}$ $\overline{C2r}$ $\overline{C1r}$ $\overline{C0r}$
Ncw=(Q2w Fam)($\overline{C3w}$ $\overline{C2w}$ $\overline{C1w}$ $\overline{C0w}$)
Ned=($\overline{Wt5}$ Wt6) $\overline{Ysdw}$
Neon=Ned $\overline{WL}$ [Wp+$\overline{I}$($\overline{Iwn}$)] Nan
Nr0=$\overline{Rt1}$ $\overline{Rt2}$ $\overline{Rt3}$ $\overline{Rt4}$ Rb
Nr1=Rt1 $\overline{Rt2}$ $\overline{Rt3}$ $\overline{Rt4}$ Rb
Nr2=$\overline{Rt1}$ Rt2 $\overline{Rt3}$ $\overline{Rt4}$ Rb
Nr3=Rt1 Rt2 $\overline{Rt3}$ $\overline{Rt4}$ Rb
Nr4=$\overline{Rt1}$ $\overline{Rt2}$ Rt3 $\overline{Rt4}$ Rb
Nr5=$\overline{Rt1}$ $\overline{Rt2}$ $\overline{Rt3}$ Rt4 Rb
Nr6=Rt1 $\overline{Rt2}$ $\overline{Rt3}$ Rt4 Rb
Nr7=$\overline{Rt1}$ Rt2 $\overline{Rt3}$ Rt4 Rb
Nr8=Rt1 Rt2 $\overline{Rt3}$ Rt4 Rb
Nr9=$\overline{Rt1}$ $\overline{Rt2}$ Rt3 Rt4 Rb
Nrb=Rebd $\overline{RL}$ $\overline{Rb}$
NrL=Nron ($\overline{IBt}$ Et+Tn)
Nron=$\overline{RL}$ Nrn [Rp+$\overline{I}$($\overline{Nsn}$+$\overline{Nwp}$)]
Nrp=Nrn [Rp+$\overline{I}$($\overline{Nsn}$+$\overline{Nwp}$)]
NSL=Nson $\overline{Tn}$
Nson=Nsn $\overline{Isn}$
Nwb=[(Webd+Ert+Bkt)$\overline{WL}$ $\overline{Wb}$]
Nwd=($\overline{Wt5}$ $\overline{Wt6}$)
NwL=Nwon (Win+$\overline{Tn}$+$\overline{IBt}$ Et)+Nbon (Bt+$\overline{Tn}$)+Neon (Bt+Win)
Nwon=Nwd Nan $\overline{WL}$ [Wp+$\overline{I}$($\overline{Nsn}$+$\overline{Nrn}$)]
Nwp=Nan [Wp+$\overline{I}$($\overline{Nsn}$+$\overline{Nrn}$)]
*Per1=[(Fer1+Te2)(Fer6+$\overline{Te2}$)Te1] $\overline{Per1}$
*$\overline{Per1}$=[(Fer1+Te2)(Fer6+$\overline{Te2}$)Te1] Per1+($\overline{Te1}$ $\overline{Te2}$ $\overline{Te3}$ $\overline{Te4}$)
Per1=KSPer1
$\overline{Per1}$=Ktb+KRPer1
*Per2=[(Fer2+Te2)(Fer7+$\overline{Te2}$)Te1] $\overline{Per2}$

*Per2=[(Fer2+Te2)(Fer7+$\overline{Te2}$)Te1] Per2
  +($\overline{Te1}$ $\overline{Te2}$ $\overline{Te3}$ $\overline{Te4}$)
Per2=KSPer2
$\overline{Per2}$=Ktb+KRPer2
*Per3=[(Fer3+Te2)(Fer8+$\overline{Te2}$)Te1] $\overline{Per3}$
*$\overline{Per3}$=[(Fer3+Te2)(Fer8+$\overline{Te2}$)Te1]Per3
  +($\overline{Te1}$ $\overline{Te2}$ $\overline{Te3}$ $\overline{Te4}$)
Per3=KSPer3
$\overline{Per3}$=Ktb+KRPer3
*Per4=[(Fer4+Te2)(Fer9+$\overline{Te2}$)Te1] $\overline{Per4}$
*$\overline{Per4}$=[(Fer4+Te2)(Fer9+$\overline{Te2}$)Te1] Per4
  +($\overline{Te1}$ $\overline{Te2}$ $\overline{Te3}$ $\overline{Te4}$)
Per4=KSPer4
$\overline{Per4}$=Ktb+KRPer4
*Per5=[(Fer5+Te2)(Fer10+$\overline{Te2}$)Te1] $\overline{Per5}$
*$\overline{Per5}$=[(Fer5+Te2)(Fer10+$\overline{Te2}$)Te1] Per5
  ($\overline{Te1}$ $\overline{Te2}$ $\overline{Te3}$ $\overline{Te4}$)
Per5=KSPer5
$\overline{Per5}$=Ktb+KRPer5
*Q1r=IY10r Frm $\overline{Q2r}$
*$\overline{Q1r}$=Q2r
Q1r=KSQ1r
$\overline{Q1r}$=Ktb+KRQ1r
*Q2r=$\overline{Q2r}$ $\overline{Ymr}$ Q1r
*$\overline{Q2r}$=Q2r (C0r+C1r+C2r+C3r)+$\overline{Rb}$
Q2r=KSQ2r
$\overline{Q2r}$=Ktb+KRQ2r
*Q1w=IY10w Fam $\overline{Q2w}$
*$\overline{Q1w}$=Q2w
Q1w=KSQ1w
$\overline{Q1w}$=Ktb+KRQ1w
*Q2w=$\overline{Q2w}$ $\overline{Ymw}$ Q1w
*$\overline{Q2w}$=(Q2w Fam)
Q2w=KSQ2w
$\overline{Q2w}$=Ktb+KRQ2w
*Rb=Nrb
*$\overline{Rb}$=Ncr $\overline{Ysdr}$ $\overline{Q1r}$+Rt3 (Rt1+Rt2)
Rb=KSRb
$\overline{Rb}$=Ktb+KRRb
Rdb=(SL+RL+WL)=Atd
Red=$\overline{Rb}$ Q2r
Rev=$\overline{WL}$ Nbd Nan $\overline{Iwn}$
*RL=Nr1+Rp [(Nbr Rsy)+(Ncr $\overline{Rsy}$)]
*$\overline{RL}$=KRA+KRAR
RL=KSRb
$\overline{RL}$=Ktb+KRRb
*Rp=INrp
*$\overline{Rp}$=$\overline{INrp}$
Rp=KSRp
$\overline{Rp}$=Ktb+KRRp
*Rsy=Nbr
*$\overline{Rsy}$=Red
Rsy=KSRsy
$\overline{Rsy}$=Ktb+KRRsy
*Rt1=Nrb A11
*$\overline{Rt1}$=Nrb $\overline{A11}$
Rt1=KSRt1
$\overline{Rt1}$=Ktb+KRRt1
*Rt2=Nrb A12
*$\overline{Rt2}$=Nrb $\overline{A12}$
Rt2=KSRt2
$\overline{Rt2}$=Ktb+KRRt2
*Rt3=Nrb A13
*$\overline{Rt3}$=Nrb $\overline{A13}$
Rt3=KSRt3
$\overline{Rt3}$=Ktb+KRRt3

$*Rt4 = Nrb\ A14$
$*\overline{Rt4} = Nrb\ \overline{A14}$
$\#Rt4 = KSRt4$
$\#\overline{Rt4} = Ktb + KRRt4$
$Rwd = S1+S2+S3+S4+S5+S6+S7+S8+S9+S0$
$*S0 = Rmt\ \overline{A11}\ \overline{A12}\ \overline{A13}\ \overline{A14}$
$*\overline{S0} = NBtd0$
$\#S0 = KSS0$
$\#\overline{S0} = Ktb + KRS0$
$*S1 = Rmt\ A11\ \overline{A12}\ \overline{A13}\ \overline{A14}$
$*\overline{S1} = NBtd1$
$\#S1 = KSS1$
$\#\overline{S1} = Ktb + KRS1$
$*S2 = Rmt\ \overline{A11}\ A12\ \overline{A13}\ \overline{A14}$
$*\overline{S2} = NBtd2$
$\#S2 = KSS2$
$\#\overline{S2} = Ktb + KRS2$
$*S3 = Rmt\ A11\ A12\ \overline{A13}\ \overline{A14}$
$*\overline{S3} = NBtd3$
$\#S3 = KSS3$
$\#\overline{S3} = Ktb + KRS3$
$*S4 = Rmt\ \overline{A11}\ \overline{A12}\ A13\ \overline{A14}$
$*\overline{S4} = NBtd4$
$\#S4 = KSS4$
$\#\overline{S4} = Ktb + KRS4$
$*S5 = Rmt\ \overline{A11}\ \overline{A12}\ \overline{A13}\ A14$
$*\overline{S5} = NBtd5$
$\#S5 = KSS5$
$\#\overline{S5} = Ktb + KRS5$
$*S6 = Rmt\ A11\ \overline{A12}\ \overline{A13}\ A14$
$*\overline{S6} = NBtd6$
$\#S6 = KSS6$
$\#\overline{S6} = Ktb + KRS6$
$*S7 = Rmt\ \overline{A11}\ A12\ \overline{A13}\ A14$
$*\overline{S7} = NBtd7$
$\#S7 = KSS7$
$\#\overline{S7} = Ktb + KRS7$
$*S8 = Rmt\ A11\ A12\ \overline{A13}\ A14$
$*\overline{S8} = NBtd8$
$\#S8 = KSS8$
$\#\overline{S8} = Ktb + KRS8$
$*S9 = Rmt\ \overline{A11}\ \overline{A12}\ A13\ A14$
$*\overline{S9} = NBtd9$
$\#S9 = KSS9$
$\#\overline{S9} = Ktb + KRS9$
$*SL = NSL$
$*\overline{SL} = KRA$
$\#SL = KSSL$
$\#\overline{SL} = Ktb + KRSL$
$*Te1 = Edsy\ \overline{Yed}\ \overline{Te1} + \overline{Esy}\ \overline{Te2}\ (Te3 + Te4)$
$*\overline{Te1} = Te2$
$\#Te1 = KSTe1$
$\#\overline{Te1} = Ktb + KRTe1$
$*Te2 = Te1$
$*\overline{Te2} = (\overline{Te1}\ Te2)$
$\#Te2 = KSTe2$
$\#\overline{Te2} = Ktb + KRTe2$
$*Te3 = \overline{Te4}\ (\overline{Te1}\ Te2)$
$*\overline{Te3} = Te4\ (\overline{Te1}\ Te2)$
$\#Te3 = KSTe3$
$\#\overline{Te3} = Ktb + KRTe3$
$*Te4 = Te3\ (\overline{Te1}\ Te2)$
$*\overline{Te4} = \overline{Te3}\ (\overline{Te1}\ Te2)$
$\#Te4 = KSTe4$
$\#\overline{Te4} = Ktb + KRTe4$
$*Tr = Frm\ Rb\ \overline{Ydr}\ \overline{Q2r}$
$*Tw = Fam\ Wb\ \overline{Ydw}\ \overline{Q2w}$ $*Wb = Nwb$
$*\overline{Wb} = WL + Wt3\ (Wt1 + Wt2) + Wed$
$\#Wb = KSWb$
$\#\overline{Wb} = Ktb + KRWb$
$Wb1 = Wo1$
$\overline{Wb1} = \overline{Wo1}$
$Wb2 = Wo2$
$\overline{Wb2} = \overline{Wo2}$
$Wb3 = Wo3$
$\overline{Wb3} = \overline{Wo3}$
$Wb4 = Wo4$
$\overline{Wb4} = \overline{Wo4}$
$Wb5 = Wo5$
$\overline{Wb5} = \overline{Wo5}$
$Wb6 = Wo6$
$\overline{Wb6} = \overline{Wo6}$
$Wb7 = Wo7$
$\overline{Wb7} = \overline{Wo7}$
$Wb8 = Wo8$
$\overline{Wb8} = \overline{Wo8}$
$Wb9 = Wo9$
$\overline{Wb9} = \overline{Wo9}$
$Wb10 = Wo10$
$\overline{Wb10} = \overline{Wo10}$
$Wed = Ncw\ (\overline{Wt5}\ \overline{Wt6})\overline{UaL} + [Naw(Wt5\ \overline{Wt6})]$
$*WL = NWL + Wp\ AA$
$*\overline{WL} = KRA + KRAR$
$\#WL = KSWL$
$\#\overline{WL} = Ktb + KRWL$
$*Wp = INwp$
$*\overline{Wp} = \overline{INwp}$
$\#Wp = KSWp$
$\#\overline{Wp} = Ktb + KRWp$
$*Wsy = Naw(\overline{Wt5}\ \overline{Wt6}) + [Ncw(\overline{Wt5}\ Wt6)]$
$*\overline{Wsy} = Ncw\ \overline{Wt6} + WL$
$\#Wsy = KSWsy$
$\#\overline{Wsy} = Ktb + KRWsy$
$*Wt1 = Nwb\ A11$
$*\overline{Wt1} = Nwb\ \overline{A11}$
$\#Wt1 = KSWt1$
$\#\overline{Wt1} = Ktb + KRWt1$
$*Wt2 = Nwb\ A12$
$*\overline{Wt2} = Nwb\ \overline{A12}$
$\#Wt2 = KSWt2$
$\#\overline{Wt2} = Ktb + KRWt2$
$*Wt3 = Nwb\ A13$
$*\overline{Wt3} = Nwb\ \overline{A13}$
$\#Wt3 = KSWt3$
$\#\overline{Wt3} = Ktb + KRWt3$
$*Wt4 = Nmb\ A14$
$*\overline{Wt4} = Nwb\ \overline{A14}$
$\#Wt4 = KSWt4$
$\#\overline{Wt4} = Ktb + KRWt4$
$*Wt5 = \overline{Wb}(Ert + Bkt)$
$*\overline{Wt5} = Ncw(Wt5\ Wt6) + WL + [Naw(Wt5\ \overline{Wt6})]$
$\#Wt5 = KSWt5$
$\#\overline{Wt5} = Ktb + KRWt5$
$*Wt6 = \overline{Wb}\ Ert$
$*\overline{Wt6} = [Ncw(\overline{Wt5}\ Wt6)] + WL$
$\#Wt6 = KSWt6$
$\#\overline{Wt6} = Ktb + KRWt6$
$Xer = (Te1\ Te2) + \overline{Esy} + (Wt5 + Wt6)$
$*Xr1 = (Rds1\ Dsy1) + \overline{Rsy}$
$*Xr2 = (Rds2\ Dsy2) + \overline{Rsy}$
$*Y10r = [\overline{Y60r}](+6)$
$*Y10w = [\overline{Y60w}](+6)$
$*Y60r = \overline{Ymr}\ \overline{Y10r}$
$*Y60w = \overline{Ymw}\ \overline{Y10w}$

*$Ydr = Nrp\ Rp$
*$Ydw = Nwp\ \overline{Wp} + [Ncw(\overline{Wt5}\ Wt6)]$
$Yed = (Fed\ \overline{Edsy})$
*$Ymr = \overline{IY10r}$
*$Ymw = \overline{IY10w}$
*$Ysdr = Ncr\ Q1r$
*$Ysdw = Q1w\ Q2w(\overline{C3w}\ \overline{C2w}\ \overline{C1w}\ \overline{C0w})\overline{Wt5}$
$\qquad\qquad + Q1w\ Q2w\ Wt5(C2w\ \overline{C3w})$

EXPLANATION OF EQUATIONS AND LOGIC TERMS

There follows below an explanation of the logic terms and the terms comprising the equations in the tape control system.

AA (Emitter Follower), FIG. 124

$1*AA = (Naw + Nbw)[(\overline{Wt5}\ \overline{Wt6})\ Esy + (Wt5\ Wt6)]$

This term is an input to the alter alarm and employed to detect four logic error conditions; viz., an alpha following a beta during the write mode operation; an alpha as the first block marker detected during the erase operation; the occurrence of two consecutive betas during the write mode of operation and the occurrence of beta as a first block marker detected during the erase mode operation.

$2*AA = (Nbw + Ncw)[(\overline{Wt5}\ \overline{Wt6})\ \overline{Wsy}]$

This term detects two logic error conditions; viz., a beta prior to an alpha during the write mode of operation and a gamma prior to an alpha during the write mode of operation.

$3*AA = (Naw + Ncw)[(\overline{Wt5}\ \overline{Wt6})\ \overline{Esy}\ Wsy]$

During the write mode of operation, the occurrence of two consecutive alphas or a gamma prior to a beta is detected by this term.

$4*AA = Esy\ (Nbw + Ncw\ Wt5)\ \overline{Cal}$

The occurrence of two consecutive betas or a beta prior to a gamma when the tape is in reverse motion is detected by this term.

$5*AA = Naw\ \overline{Wsy}\ (Wt5 + Wt6)\ \overline{Cal}$

This term is employed to detect two error conditions; viz., an alpha prior to a beta when the tape is in reverse motion or whether the tape is in forward motion instead of reverse motion during the erase mode of operation.

A-Register, Least Significant Digit (A11–A14, Four Flip-Flops in Central Processor), FIGS. 83a, b, c, and d Atd (Any Tape Difficulty), FIG. 124

This signal is the OR'd term of the SL (rewind alarm), RL (read alarm) and WL (write alarm).

Bkt (Backup Command From Central Processor)

This is a signal to command a backup operation of one block and is applied as a set input to flip-flops Wb (Nwb) and Wt5.

Figure 84:
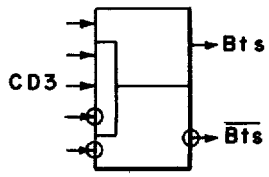

Bts (Flip-Flop), FIG. 84

This flip-flop senses whether information has been written on tape. Accordingly, it senses blank tape and also functions as the echo error flip-flop.

$1*Bts = Webd$

Flip-Flop Bts is switched to its set output by the write command Webd from the Central Processor.

$1*\overline{Bts} = Te1$

Flip-flop Bts is switched to its reset state during an echo read operation after flip-flop Te1 of the echo read timing counter is switched to its set state.

C0r–C3r (Read Marker Counter Flip-Flops), FIGS. 85a, b, c, and d

In this counter upon the detection of a first marker pulse, flip-flop C0r is switched to its set state to preset the counter to the $\overline{C3r}\ \overline{C2r}\ \overline{C1r}\ C0r$ setting. If a marker pulse occurs during the doublet window time, the counter cycles. At the 16th count it resumes the 0000 setting.

C0w–C3w (Write Marker Counter Flip-Flops), FIGS. 86a, b, c, and d

The operation of this counter is analogous to the operation of the C0r–C3r counter.

CaL (Calibrate Mode Signal), FIG. 124

The system is placed in the Calibrate mode by placing the Calibrate switch in the proper position. In another position of the Calibrate switch, the Cal (not calibrate signal) is generated.

Cpd (Emitter Follower), FIG. 124

$Cpd = (Per4 + Per5)(\overline{Per4} + \overline{Per5})$

This term is used in the echo read column parity operation to determine whether the Per4 and Per5 flip-flops are in disagreement.

Cpe (Emitter Follower), FIG. 124

$Cpe = Per1\ Per2\ Per3 + \overline{Per1}\ Per2\ \overline{Per3} + \overline{Per1}\ \overline{Per2}\ Per3 + Per1\ \overline{Per2}\ \overline{Per3}$ This term is true when there are no zero settings in the Per1–Per3 flip-flops or when there are two zero settings in these flip-flops.

Cpo (Emitter Follower), FIG. 124

$Cpo = \overline{Per1}\ \overline{Per2}\ \overline{Per3} + \overline{Per1}\ Per2\ Per3 + Per1\ \overline{Per2}\ Per3 + Per1\ Per2\ \overline{Per3}$ This term is true when there are either all zeros in the Per1–Per3 flip-flops or when there is one zero in these flip-flops.

Cps (Emitter Follower), FIG. 124

$Cps = (\overline{Per4} + \overline{Per5})(Per4 + \overline{Per5})$

When this term is true, the outputs of flip-flops Per4 and Per5 are in agreement.

DEI (Data Echo Buss), FIG. 124

$DEI = Nbon + Nwon$

The data echo input is true during a write command in the alter mode of operation or during a backup command in the alter mode of operation.

DHR (Data Head Relay), FIG. 124

$DHR = \overline{Di}\ Nwon$

This term is true during a write order in the alter mode operation (Nwon) provided that the data inhibit flip-flop is at its reset state (Di).

Figure 87:
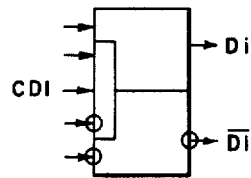

Di (Data Inhibit Flip-Flop), FIG. 87

*$Di = Ncw\ (\overline{Wt5}\ Wt6)$

The data inhibit flip-flop is switched to its set state when the second gamma marker is detected in the Erase mode of operation. The set output of the data inhibit flip-flop provides input to the Xer clock driver which presets the echo read data amplifiers.

*$\overline{Di} = Ncw\ \overline{Wt6}$

After the flip-flop Wt6 is switched to its reset state at the detection of the second gamma in the Erase operation during reverse movement, flip-flop Di is switched to its reset state.

DRI (Data Read Input Buss), FIG. 124

$DRI = Nron$

This term is true during a read order (Nron).

Figure 90:
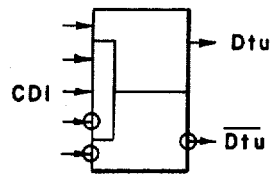

Dtu (Disabled Tape Unit Flip-Flop), FIG. 90

*$Dtu = NWL + NSL + NRL$

This flip-flop is switched to its set state upon the occurrence of an operational malfunction of a tape handler to set an alarm.

*$\overline{Dtu}=KRA$

Flip-flop D*tu* is switched to its reset state by the clear alert reset line from the control console of the Central Processor.

Figure 91:
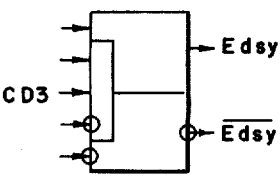
Figure 101J:
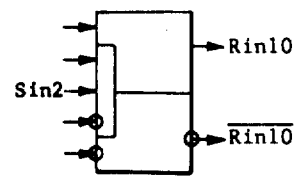
Figure 101I:
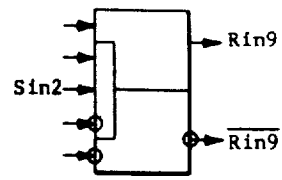
Figure 101H:
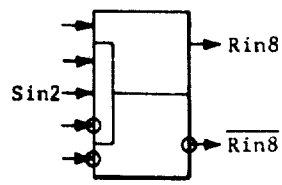
Figure 101G:
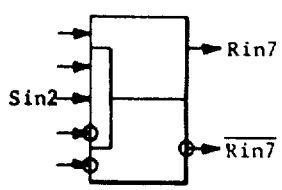

E*dsy* (Echo Delay Synchronizing Flip-Flop), FIG. 91

*$Edsy = Fed\ \overline{Edsy}$

This flip-flop is switched to its set state when a bit is detected in a column and appears in one of the echo read amplifiers F*er*1–F*er*10 during the write operation ($\overline{Wt5}\ \overline{Wt6}$).

*$\overline{Edsy}=Te1\ Te2$

Flip-flop E*dsy* is switched to its reset state at T*e*1 T*e*2 time of the echo timing counter.

E*rt* (Erase Command Line)

The Erase command is a signal from the Central Processor to command erasure of the block markers for one block. It provides input to the W*b*, W*t*5 and W*t*6 flip-flops.

ESY (Echo Synchronization Flip-Flop), FIG. 92

*$Esy=Nbw[\overline{Wt5}+(Wt5\ \overline{Wt6})]$

This flip-flop is switched to its set state upon the detection of a beta marker during a write operation ($Nbw\ \overline{Wt5}$) or upon the detection of a beta marker during the backup operation ($Nbw\ Wt5\ \overline{Wt6}$).

*$\overline{Esy}=WL+Naw\ \overline{Wt6}+Ncw\ \overline{Wt5}\ Wsy$

The echo synchronization flip-flop is switched to its reset state upon the occurrence of a write alarm (WL) or upon detection of the alpha marker during a backup operation ($Naw\ \overline{Wt6}$) or upon the detection of a second gamma marker during the Erase operation when the tape again moves forward ($Ncw\ \overline{Wt5}\ Wsy$).

E*wss* (Emitter Follower), FIG. 124

$Ewss=Cpe\ Cps\ Te2+Cpo\ Cpd\ Te2+(\overline{Per1}+\overline{Per2}+\overline{Per3}+\overline{Per4})\ Te1\ Te2\ Te3\ Te4+Bts\ Wed$ The echo read parity error alarm provides input to the tape write alarm flip-flop E*ws* in the Tape Write Buffer. The output of this emitter follower is at the upper logic level when there are present an even number of zeros (C*pe Cps*) at T*e*2 time or an even number of zeros (C*po Cpd*) at T*e*2 time or there is a zero detected in the P*er*1–P*er*4 flip-flops during the $\overline{Te1}\ \overline{Te2}\ \overline{Te3}\ \overline{Te4}$ setting of the T*e* counter or blank tape is sensed (B*ts*) whereby E*wss* is true at the end of a block (W*ed*).

F*am* (Flip-Flop), FIG. 93

*$Fam=\overline{Mea}\ \overline{Fam}\ \overline{Q2w}+\overline{Q1w}\ Q2w\ \overline{Ysdw}$ The alter marker control flip-flop F*am* retimes pulses as inputs to the alter marker counter when the first marker bit (binary zero) is detected during the echo check ($\overline{Mea}\ \overline{Fam}\ \overline{Q2w}$) or to enable the T*w* clock driver at the end of an alter operation (Q2*w*) when one-shot Y*sdw* switches back to its stable state. Flip-flop F*am* is time-shared for retiming pulses as inputs to the alter marker counter and for use during stopping operations.

*$\overline{Fam}=Fam$

Flip-flop F*am* is switched to its reset state after it has been at its set output for one CD1 clock time.

F*ed* (Echo Read Data Retiming Flip-Flop), FIG. 94

*$Fed=(\overline{Fer1}+\overline{Fer2}+\overline{Fer3}+\overline{Fer4}+\overline{Fer5}+\overline{Fer6}+\overline{Fer7}+\overline{Fer8}+\overline{Fer9}+\overline{Fer10})\ Esy\ \overline{Fed}\ (\overline{Wt5}\ \overline{Wt6})\ \overline{Di}$ This flip-flop is switched to its set state upon the detection of a data bit in the echo read amplifiers during the write operation ($\overline{Wt5}\ \overline{Wt6}$) provided that the data inhibit flip-flop is at its reset state ($\overline{Di}$) and provided that the echo synchronization flip-flop is in its set state (E*sy*).

*$\overline{Fed}=Te1\ Te2$

This flip-flop is switched to its reset state at the T*e*1 T*e*2 setting of the T*e* counter.

F*er*1–F*cr*10 (Data Amplifiers For Echo Read Parity Check)

*$Fer=Xer$

These data amplifiers are used in the echo read parity checking logic and are switched to their set or preset states by clock driver X*er*.

*$\overline{Fer}=DEO$

These amplifiers are switched to their reset states by respective data echo outputs from the corresponding preamplifiers.

F*rm* (Read Marker Control Flip-Flop), FIG. 95

*$Frm=\overline{Mra}\ \overline{Frm}$

The read marker control flip-flop retimes pulses as input to the read marker counter and is also time-shared during stopping operations. Flip-flop F*rm* is switched to its set state upon the detection of a zero bit in the marker channel.

*$\overline{Frm}=Frm$

Flip-flop F*rm* remains in its set state for the duration of a CD1 clock time.

F*tr*1–F*tr*10 (Data Amplifiers)

*$Ftr=Xr1$

These flip-flops are switched to their set or preset states by clock driver X*r*1.

*$\overline{Ftr}=DRO$

These flip-flops are switched to their reset states by the data read output (DRO) of the preamplifiers.

IN*rp* (Read Priority Inverter), FIG. 124

$INrp=Nrp$

The read priority inverter provides the input to switch the R*t* flip-flops to their set states.

IN*wp* (Write Priority Inverter), FIG. 124

$INwp=Nwp$

The write priority inverter provides input to switch the W*p* flip-flop to its set state.

I*rn* (Priority Term), FIG. 124

$Irn=Nsn+Nwp$

The term I*rn* is true either when a rewind command line is active or when a write priority is established.

I*sn* (Priority Term), FIG. 124

$Isn=Nrp+Nwp+Bt$

The I*sn* term is true either during a read priority (N*rp*) or a write priority (N*wp*) or at B*t* (Beginning of Tape).

I*wn* (Priority Term), FIG. 124

$Iwn=Nsn+Nrn$

The term I*wn* is true either when a rewind command line is active (N*sn*) or when a read command line is active (N*rn*).

IY10*r* (Read Double Detection Window Inverter), FIG. 124

*$IY10r=\overline{Y10r}$

This term is the inverted output of one-shot Y10*r*.

IY10*w* (Alter Doublet Detection Window Inverter), FIG. 124

*$IY10w=\overline{Y10w}$

This term is the inverted output of one-shot Y10*w*.

KRA, KRAR (Manual Signal)

These signals are the alert reset and the maintenance alert reset provided by manual clear lines from the console of the Central Processor.

43

K*tb* (Manual Signal)

This is a clear total buffer manual signal which comes from the Tape Buffer unit.

M*ea* (Amplifier)

This amplifier has inserted thereinto the detected echo marker channel input. It is switched to its set or preset state by clock driver T*w*.

M*ra* (Amplifier)

This amplifier has inserted thereinto the detected read marker. It is switched to its set or preset state by clock driver T*r*.

N*a*0–N*a*9 (Alter Command Line Signals), FIG. 126

The alter command lines to the tape handler are transmitted via the station selector panel. These lines are energized by various settings in the W*t*1–W*t*4 flip-flops provided that flip-flop W*b*, the write busy flip-flop, is in its set state.

N*aw* (Alpha Marker), FIG. 124

$Naw = (Q2w\ Fam)(C2w\ \overline{C3w})$

The alpha marker is generated during the alter operation when the alter marker counter is in the $C2w\ \overline{C3w}$ setting provided that flip-flop Q2*w* and flip-flop F*am* are in their set states.

N*bd* (Reverse Command Signal), FIG. 124

$Nbd = Wt5 + (\overline{Wt5}\ Wt6)$

This signal is true when flip-flop W*t*5 is in its set state (backup operation) and during the Erase operation ($\overline{Wt5}\ Wt6$). The reverse command signal goes to the tape transport.

N*br* (Beta Marker During Read Operation), FIG. 124

$Nbr = Q2r\ C3r\ (C1r + C2r)(\overline{C1r} + \overline{C2r})$

The beta marker signal N*br* is generated at chosen settings of the C0*r*–C3*r* flip-flops of the read marker counter provided that flip-flop Q2*r* is in its set state.

N*btd*1–N*btd*10 (Delayed Reading of Tape)

These delayed beginning of tape signals provide reset inputs to the S1–S10 flip-flops. These signals insure that tape movement ceases in a rewind operation prior to the initiation of any forward movement of tape.

N*bw* (Beta Marker During Alter Operation), FIG. 124

$Nbw = (Q2w\ Fam)\ C3w\ (C1w + C2w)(\overline{C1w} + \overline{C2w})$

This signal is analogous to the beta marker N*br* in the read operation, the difference being that the presence of F*am* is a necessary condition to generate N*bw*.

N*cr* (Gamma Marker In Read Operation), FIG. 124

$Ncr = \overline{Q2r}\ \overline{C3r}\ \overline{C2r}\ \overline{C1r}\ \overline{C0r}$ The gamma marker signal is generated in the read operation at the 0000 setting of the C0*r*–C3*r* flip-flops provided that flip-flop Q2*r* is in its set state.

N*cw* (Gamma Marker In Alter Operation), FIG. 124

$Ncw = (Q2w\ Fam)(\overline{C3w}\ \overline{C2w}\ \overline{C1w}\ \overline{C0w})$ The gamma marker is generated in the alter operation at the 0000 setting of the C0*w*–C3*w* flip-flops provided that flip-flops Q2*w* and F*am* are in their set states.

N*ed* (Erase Relay Signal), FIG. 124

$Ned = (\overline{Wt5}\ Wt6)\ \overline{Ysdw}$

This signal represents the second portion of an erase operation and is a command to close the erase relays. This signal is true during the erase operation ($\overline{Wt5}\ Wt6$), after one-shot $\overline{Ysdw}$ switches back to its stable state.

N*eon* (Erase Command Buss), FIG. 124

$Neon = Ned\ \overline{WL}\ (Wp + Iwn)\ Nan$

This signal is true when there is an erase command

44

(N*ed*) during an alter order (N*an*) either when there is an alter priority established or provided that there is neither a read nor a rewind order which is active. The absence of an alter alarm ($\overline{WL}$) is a necessary condition for this signal to go true.

N*r*0–N*r*9 (Read Command Lines), FIG. 125

The read command lines to tape handlers 1–10 are transmitted via the station selector panel. The lines are energized by various combinations of the R*t*1–R*t*4 flip-flops provided that the read busy flip-flop (R*b*) is in its set state.

N*rb* (Read Signal), FIG. 124

$Nrb = Rebd\ \overline{RL}\ \overline{Rb}$

This signal initiates and sustains a read operation. It issues upon the generation of a read command signal R*ebd* from the Central Processor provided that the read alarm flip-flop is in its reset state ($\overline{RL}$).

N*rL* (Read Alarm Buss), FIG. 124

$Nrl = Nron\ (\overline{TBt}\ Et + \overline{Tn})$

The signal on the read alarm buss is true during a read operation (N*ron*) if there is a read operation which moves the tape to the end of tape position ($\overline{TBt}\ Et$) or if there is no tape on the tape handler ($\overline{Tn}$). The read alarm buss is one input to the flip-flop RL and when true indicates that a read command cannot be performed by the address transport.

N*ron* (Read Order), FIG. 124

$Nron = \overline{RL}\ Nrn\ [Rp + \overline{I(Nsn + Nwp)}]$

The N*ron* signal issues where there is a read command selection which is active (N*rn*) and there is priority established either by the set output of the read priority flip-flop R*p* or the system cannot be in the alter mode of operation ($\overline{INwp}$) or there cannot be a rewind command active ($\overline{INsn}$). The absence of a read alarm ($\overline{RL}$) is a necessary condition for the N*ron* signal to come true.

N*rp* (Read Priority Signal), FIG. 124

$Nrp = Nrn\ [Rp + \overline{I(Nsn + Nwp)}]$

This signal is similar to the N*ron* signal except that $\overline{RL}$ is not a necessary condition for its issuance.

NSL1–NSL10

$NSL = Nson\ \overline{Tn}$

The rewind alarm signals provide inputs to the SL flip-flops from the tape transports 1–10 via the station selector panel. During rewind operation, NSL is provided by "no tape" ($\overline{Tn}$).

N*son* (Rewind Command Buss), FIG. 124

$Nson = Nsn\ \overline{Isn}$

The N*son* signal is true if a rewind flip-flop is in its set state to provide N*sn*, provided that there is presently no read priority or no alter priority or no beginning of tape signal ($\overline{Isn}$).

N*wb* (Write Signal), FIG. 124

$Nwb = [(Webd + Ert + Bkt)\ \overline{WL}\ \overline{Wb}]$

This signal initiates and sustains an alter operation. It is true when either the write or erase or backup commands are received from the Central Processor provided that there is no alter alarm ($\overline{WL}$) and provided that the alter busy flip-flop W*b* is in its reset state ($\overline{Wb}$).

N*wd* (Write Operation), FIG. 124

$Nwd = (\overline{Wt5}\ \overline{Wt6})$

This signal represents a write operation ($\overline{Wt5}\ \overline{Wt6}$).

N*wL* (Write Alarm Buss), FIG. 124

$NwL = Nwon\ (Win + \overline{Tn} + \overline{TBt}\ Et) + Nbon\ (Bt + \overline{Tn})$
$+ Neon\ (Bt + Win)$ The write alarm buss provides one input to the right alarm flip-flop (WL) to indicate that an alter command cannot be performed by the addressed transport. The NwL term is true during a write operation when the write inhibit signal is true (Win) or there is no tape on the handler ($\overline{Tn}$) or if there is a write operation which moves the tape to the end of tape position ($\overline{IBt}$ Et). The NwL signal is also true during a backup operation (Nbon) when the signal Bt is true or when there is no tape on the tape handler ($\overline{Tn}$) and is also true during an erase operation (Neon) when the Bt signal is true or when the write inhibit signal is true (Win).

Nwon (Write Operation Buss), FIG. 124

Nwon=Nwd Nan WL [Wp+$\overline{I(Nsn+Nrn)}$]

The Nwon signal is provided when the write mode of operation (Nwd) and the alter command selection (Nan) occur in coincidence, provided that there is no write alarm ($\overline{WL}$) and provided that either the write priority flip-flop Wp is in its set state (Wp) or provided that there is no rewind command selection and no read command selection [$\overline{I(Nsn+Nrn)}$].

Nwp (Write Priority Buss), FIG. 124

Nwp=Nan [Wp+$\overline{I(Nsn+Nrn)}$]

The write priority buss provides input to the Wp flip-flop indicating that an alter command has been accepted. The Nwp signal is true during an alter command selection provided that the write priority flip-flop is in its set state (Wp) or provided that there is neither a rewind command selection ($\overline{INsn}$) nor a read command selection ($\overline{INrn}$).

Per1–Per5 (Echo Parity Check Flip-Flops), FIGS. 96a, b, c, d and e

These flip-flops sample the Fer1–Fer10 amplifiers and are then decoded at chosen settings of the Te counter for proper column and row parity.

Q1r, Q2r (Read Channel Marker Detection Timing Flip-Flops), FIGS. 97a and b

The read channel marker detection timing flip-flop Q1r indicates the beginning of the read marker count for the C0r–C3r counter.

When flip-flop Q2r is in its set state, this indicates the end of the read marker count. The set state of flip-flop Q2r is utilized to sample the contents of the marker counter.

Q1w, Q2w (Echo Channel Marker Detection Timing Flip-Flops), FIGS. 98a and b.

The set state of flip-flop Q1w is utilized to indicate the beginning of the echo marker count for the C0w–C3w counter.

The set state of the Q2w flip-flop indicates the end of the echo marker count and is utilized to sample the content of the C0w–C3w counter.

Rb (Read Busy Flip-Flop), FIG. 99

*Rb=Nrb

The set state of the read busy flip-flop indicates that a read command is to be executed on a transport.

*$\overline{Rb}$=Ncr $\overline{Ysdr}$ Q1r+Rt3 (Rt1+Rt2)

The read busy flip-flop Rb is switched to its reset state upon the detection of a gamma marker (Ncr) in the read operation after the read stop delay one-shot has switched back to its stable state ($\overline{Ysdr}$) at the end of the marker count, i.e., when Q1r has been switched to its reset state by Q2r. Flip-flop Rb is also switched to its reset state at the Rt3 (Rt1+Rt2) setting of the Rt flip-flops, i.e., when the setting is for one in which a tape station designation does not exist.

Rdb (Relay Driver)

Rdb=(SL+RL+WL)=Atd

The alarm bell relay driver rings the alarm bell on the receipt of the Atd signal, viz., the occurrence of a rewind or a read or a write alarm.

Rebd (Line Driver)

This line driver drives the Reb flip-flop and is a necessary element to generate the Nrb signal which switches the read busy flip-flop to its set state. Effectively, the Nrb signal causes the switching of flip-flop Rb to its set state when the Read Buffer is conditioned to accept read input.

Red (Emitter Follower), FIG. 124

Red=$\overline{Rb}$ Q2r

The Red signal represents the end of a read operation.

Rev (Reverse Command)

Rev=$\overline{WL}$ Nbd Nan $\overline{Iwn}$, FIG. 124

The reverse command to the tape handler is true during a backup or reverse operation (Nbd), provided that there is an alter command selection (Nan), provided that there is no write alarm ($\overline{WL}$) and provided that there is not a read command selection or a rewind command selection ($\overline{Iwn}$).

RL (Read Alarm Flip-Flop), FIG. 107a

RL=NrL+Rp [(Nbr Rsy)+Ncr $\overline{Rsy}$)]

The read alarm flip-flop RL is switched to its set state if the read alarm line is active because of mechanical difficulties (NrL) or if during a read priority (Rp) there are detected two consecutive beta markers (Nbr Rsy) or there are detected two consecutive gamma markers (Ncr $\overline{Rsy}$).

*$\overline{RL}$=KRA+KRAR

The read alarm flip-flop is switched to its reset state by the clear, alert reset lines from the console of the Central Processor.

Rp (Read Priority Flip-Flop), FIG. 108a

*Rp=INrp

The read priority flip-flop is switched to its set state if there is a read selection and there is not active a rewind selection or a write priority. The read priority flip-flop indicates whether the read operation has been accepted on the tape transport.

*$\overline{Rp}$=$\overline{INrp}$

The read priority flip-flop is switched to its reset state when the Nrp signal is not true.

Rsy (Read Synchronization Flip-Flop), FIG. 109a

*Rsy=Nbr

The read synchronization flip-flop indicates the beta position of a block which is to be read and permits reception of data from read amplifiers into the Ftr flip-flops. It is switched to its set state upon the detection of the beta marker (Nbr).

*$\overline{Rsy}$=Red

The read synchronization flip-flop is switched to its reset state upon the ending of the read operation (Red).

Rt1–Rt4 (Read Address Register Flip-Flops), FIGS. 102a, b, c, and d

These flip-flops hold the address of the read operation (as given on the console of the Central Processor as "last read"). They are switched to their set states by the read command (Nrb) and the setting in the least significant digit of the A-register of the Central Processor (A11–A14 flip-flops).

Rwd (Rewind Signal), FIG. 124

Rwd=S1+S2+S3+S4+S5+S6+S7+S8+S9+S0

The rewind signal issues from an OR gate and is the summation of the S flip-flop outputs. The Rwd signal indicates that one of the tapes is rewinding.

S0–S9 (Rewind Flip-Flops), FIGS. 103a–j

*S0–S9=Rmt (A11–A14 setting)

The rewind flip-flops (S0–S9) are switched to their respective set states in accordance with the setting of the least significant digit in the A-register (A11–A14 flip-flops). The R$mt$ signal is the rewind magnetic tape line which carries the instructions to set the rewind control flip-flops.

*$\overline{S0}$-$\overline{S9}$=Nbtd0-Nbtd9

The rewind control flip-flops are switched to their reset states by the beginning of tape delay signal (N$btdn$).

SL (Rewind Alarm Flip-Flop), FIG. 107c
*SL=NSL

The rewind alarm flip-flop is switched to its set state upon the activation of the rewind alarm line (NSL).

*$\overline{SL}$=KRA

The rewind alarm flip-flop is switched to its reset state by the KRA signal.

T$e$1–T$e$4 (Flip-Flops, Echo Read Timer), FIGS. 104a–d

The echo read timing flip-flops control the timing sequence during the echo read parity check operation.

T$r$ (Read Marker Gated Clock Driver), FIGS. 15a–c

*T$r$=Frm Rb $\overline{Ydr}$ $\overline{Q2r}$

The read marker gated clock driver supplies gated clock pulses to the C$r$0–C$r$3 marker counter; single clock pulses are gated upon the reception of the read marker.

T$w$ (Write Marker Gated Clock Driver), FIGS. 15a–c

*T$w$=Fam Wb $\overline{Ydw}$ $\overline{Q2w}$

The write marker gated clock driver supplies gated clock pulses to the C0$w$–C3$w$ marker counter; single clock pulses are gated upon the reception of a write marker.

W$b$ (Write Busy Flip-Flop), FIG. 105
*W$b$=Nwb

The write busy flip-flop is switched to its set state by the N$wb$ signal, i.e., the signal that initiates and sustains a write operation.

*$\overline{Wb}$=WL+Wt3 (Wt1+Wt2)+Wed

The write busy flip-flop is switched to its reset state upon the occurrence of the write alarm (WL) or when the W$t$ flip-flops have the setting W$t$3 (W$t$1+W$t$2), i.e., a setting for which there is no designated tape station, or by the W$ed$ signal which represents the end of a write operation.

W$b$1–W$b$10 (Head Drivers), FIG. 127

The write buss head drivers feed the outputs of the W$o$ flip-flop lines to the write heads through the head relays.

W$ed$=Ncw ($\overline{Wt5}$ $\overline{Wt6}$) $\overline{CaL}$+[Naw (W$t$5 $\overline{Wt6}$)], FIG. 124

The W$ed$ signal issues upon the detection of a gamma marker during the write operation ($\overline{Wt5}$ $\overline{Wt6}$) provided that the system is not in calibrate (C$aL$) or upon the detection of the alpha marker in the backup operation [Naw (W$t$5 $\overline{Wt6}$)].

W$ebd$ (Write Command Signal)

The write busy line driver triggers on a write buffer signal command to write; it provides an input to flip-flop W$b$.

WL (Right Alarm Flip-Flop), FIG. 107b
WL=NwL+WpAA

The alter alarm flip-flop is switched to its set state when alter commands are addressed to disabled transports or when echo markers are received out of sequence (AA).

$\overline{WL}$=KRA+KRAR

The write alarm flip-flop is switched to its reset state by the KRA or the KRAR signal.

W$o$1–W$o$10, $\overline{Wo1}$–$\overline{Wo10}$ (Signals)

The write buffer lines are the outputs of the W$o$ flip-flop lines from the Tape Buffer unit.

W$p$ (Write Priority Flip-Flop), FIG. 108b
*W$p$=INwp

The write priority flip-flop is switched to its set state when the N$wp$ signal is true.

*$\overline{Wp}$=$\overline{INwp}$

The write priority flip-flop is switched to its reset state when the N$wp$ signal is false.

W$sy$ (Write Synchronization Flip-Flop), FIG. 109b
*W$sy$=Naw ($\overline{Wt5}$ $\overline{Wt6}$)+[Ncw ($\overline{Wt5}$ W$t$6)]

The write synchronization flip-flop is switched to its set state upon the detection of a gamma marker during the write operation ($\overline{Wt5}$ $\overline{Wt6}$) or upon the detection of the second gamma (Ncw) during reverse movement in the erase operation ($\overline{Wt5}$ $\overline{Wt6}$).

*$\overline{Wsy}$=Ncw $\overline{Wt6}$+WL

The write synchronization flip-flop is switched to its reset state upon the detection of the second gamma during the erase operation when the tape resumes movement in the forward direction or when a write alarm is present (WL). This flip-flop determines begin-write operation; and is time shared for block marker error detection.

W$t$1–W$t$4 (Alternate Address Register Flip-Flops), FIGS. 110a, b, c, and d

The alter address register flip-flops hold the address of the tape transport for any alter operation. They are set by an alter command (Nwb) and the least significant digit of the A-register (A11–A14 flip-flops of the Central Processor).

W$t$5 (Alter Command Storage Flip-Flop), FIG. 110e
*W$t$5=$\overline{Wb}$ (E$rt$+B$kt$)

Flip-flop W$t$5 is switched to its set state at the beginning of the erase operation (E$rt$) or the backup operation (B$kt$) provided that flip-flop W$b$ is in its reset state.

*$\overline{Wt5}$=Ncw (W$t$5 W$t$6)+WL+Naw (W$t$5 $\overline{Wt6}$)

Flip-flop W$t$5 is switched to its reset state upon the detection of the first gamma marker (Ncw) at the beginning of the erase operation (W$t$5 W$t$6) or when a write alarm is present (WL) or upon the detection of the alpha marker (Naw) at the end of the backup operation (W$t$5 $\overline{Wt6}$).

W$t$6 (Alter Command Storage Flip-Flop), FIG. 110f
*W$t$6=$\overline{Wb}$ E$rt$

Flip-flop W$t$6 is switched to its set state at the beginning of the erase operation upon reception of the erase command (E$rt$) provided that the write busy flip-flop is in its reset state ($\overline{Wb}$).

*$\overline{Wt6}$=Ncw ($\overline{Wt5}$ W$t$6)+WL

Flip-flop W$t$6 is switched to its reset state upon the detection of the second gamma marker (Ncw) during reverse movement of tape in the erase operation ($\overline{Wt5}$ W$t$6) or when a write alarm exists (WL).

X$er$ (Clock Driver), FIGS. 15a–c
X$er$=(T$e$1 T$e$2)+$\overline{Esy}$+(W$t$5+W$t$6)

Clock Driver X$er$ is enabled at (T$e$1 T$e$2) time to preset the echo read amplifiers F$er$1–F$er$10. It is enabled when flip-flop E$sy$ is at its reset state and is also enabled during the backup or erase operations (W$t$5+W$t$6).

X$r$1, X$r$2 (Clock Drivers), FIGS. 15a–c

These clock drivers transfer the first and second halves of the preset read amplifier outputs and preset the F*cr* amplifiers after proper retiming of data.

$*Xr1 = (Rds1\ Dsy1) + \overline{Rsy}$
$*Xr2 = (Rds2\ Dsy2) + \overline{Rsy}$

During the data read operation, the F*tr* read data amplifiers are asynchronously switched to their reset states by signals from the reading transport. The outputs of the F*tr* amplifiers are sent to the Read Buffer and there they are retimed. Signals $(Rds1\ Dsy1)$ and $(Rds2\ Dsy2)$ are sent from the Read Buffer to preset or clear the F*tr* amplifiers with the X*r1* and X*r2* clock driver pulses. The X*r1* and X*r2* clock drivers are always clearing the F*tr* amplifiers when there is no read, i.e., $\overline{Rsy}$.

Figure 111:
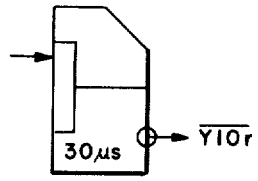

Y10*r* (One-Shot), FIG. 111

One-shot Y10*r* creates a sample time for the presence of a pulse doublet with an approximate duration of 64 microseconds for the read marker.

Figure 113:
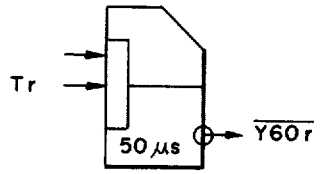

Y60*r* (One-Shot), FIG. 113

The read marker doublet detection delay one-shot Y60*r* provides a delayed start to the switching of one-shot Y10*r* to its astable state.

Figure 112:
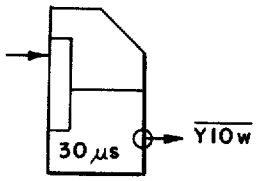

Y10*w* (One-Shot), FIG. 112

One-hot Y10*w* creates a sample time for the presence of a pulse doublet with an approximate duration of 64 microseconds for the echo marker.

Figure 114:
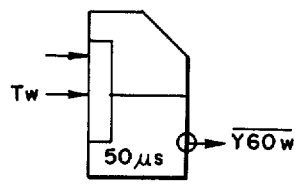

Y60*w* (One Shot), FIG. 114

The echo marker doublet detection delay one-shot Y60*w* provides a delay start to one-shot Y10*w*.

Figure 115:
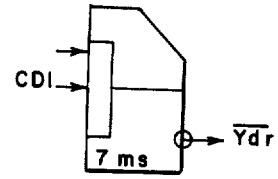

Y*dr* (One-Shot), FIG. 115

The read inhibit marker one-shot Y*dr* inhibits marker counter operation while a tape transport is starting up.

Figure 116:
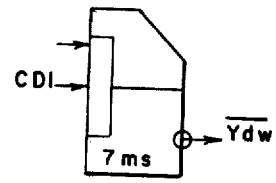

Y*dw* (One-Shot), FIG. 116

The echo inhibit marker one-shot Y*dw* inhibits marker counter operation while a tape transport is starting up.

Figure 117:
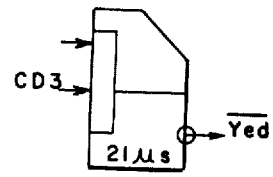

Y*ed* (One-Shot), FIG. 117

The Y*ed* one-shot provides skew delay for data retiming.

Figure 118:
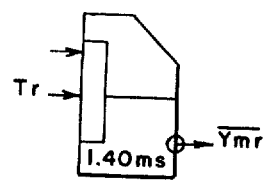

Y*mr* (One-Shot), FIG. 118

The Y*mr* one-shot provides operating time for the read marker counter.

Figure 119:
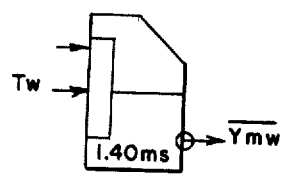
Figure 122:
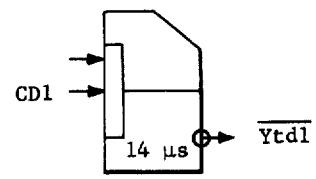
Figure 123:
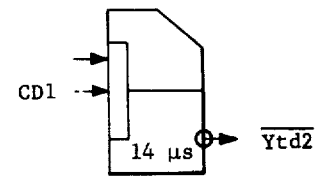

Y*mw* (One-Shot), FIG. 119

The one-shot Y*mw* provides operating time for the echo marker counter.

Figure 120:
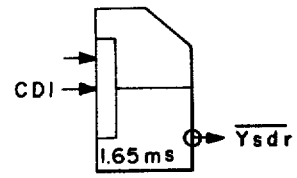

Y*sdr* (One-Shot), FIG. 120

The Y*sdr* one-shot provides a stop delay at the end of a read operation.

Figure 121:
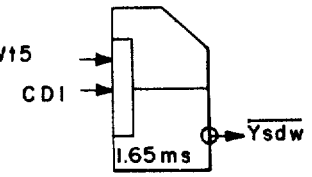

Y*sdw* (One-Shot), FIG. 121

This one-shot provides a stop delay during alter operations.

Instruction 65: Read Magnetic Tape or Character Reader (RMT), FIG. 128: The Multiplex Buffer is directed to start reading one block of data from magnetic tape or to start reading one line of data from a document.

Instruction 66: Write Magnetic Tape or Load Printer (WMT): The Multiplex Buffer is directed to start writing one block of data onto magnetic tape or to start transmitting one block of data to the Printer (FIG. 129).

Instruction 67: Alter Magnetic Tape (AMT), FIG. 130: The magnetic tape of a Tape Handler is caused to reverse, to be erased or rewind.

Instruction 68: Write Blockettes on Magnetic Tape or Load Printer (WMB), FIG. 131: The Multiplex Buffer is directed to start writing 5 blockettes of data onto magnetic tape, or to start transmitting 5 blockettes of data to the Printer.

TAPE CONTROL UNIT

As has been stated above, the Central Processor performs the function of controlled data processing and is under direct control of the operational program. The data to be processed is stored by one of two media: magnetic core storage memory or magnetic tape. The use of magnetic tape requires tape handlers which transport the magnetic tape across the read and write heads, and which are controlled under the direction of the Central Processor. The tape control unit reacts to the commands of the Central Processor as well as to conditions of the magnetic tape and the tape handlers.

The use of magentic tapes is accomplished by a time multiplex scheme, employing the use of two separate buffers: the Read Magnetic Tape buffer and the Write Magnetic Tape buffer. These buffers enable the time multiplexing where there is a reading of or a writing on magnetic tape operation. The Buffers are controlled by the Tape Control Unit and the Central Processor.

The operation of up to ten tape handlers is controlled by the Tape Control Unit. In this system, there is stipulated the requirement that no more than one tape handler may be reading at one time and that no more than one tape handler may be writing at one time. The operation of rewinding a magnetic tape may occur simultaneously on any or all tape handlers.

The Central Processor has a single instruction which commands the Tape Control Unit to read a magnetic tape on a specific tape handler. This instruction is RMT, read magnetic tape (Instruction 65). The specific tape handler is not selected by the Central Processor but rather a tape station is selected as specified by the configuration in the least significant digit of the A-register of the Central Processor. Tape stations are zero through nine, the selection of a tape station being accomplished by coding the configuration of the tape station desired as follows. In the block diagram of FIG. 24 there is shown the arrangement of the interrelationship of the Tape Control Unit, the Tape Handlers, the Tape Buffers and the Central Processor.

To insure that operation of the tape handler is performed with discrete considerations, a logic priority scheme is employed. The order of logic priority is:

(1) Current operation (the operation presently in progress).
(2) Rewind operation.
(3) Read operation.
(4) Alter operation.

The operation of magnetic tape in a write mode of operation is one of three alternatives of the alter operation; moreover, the write alternative may have two possibilities.

The RMT instruction, write magnetic tape (Instruction 66, FIG. 129), will cause the writing of the data of 100 consecutive memory addresses. The initial address is specified as a modulo-20 address and the least significant digit thereof contains a desired tape station code. The WMB, write magnetic blockettes tape (Instruction 68, FIG. 131), causes a writing of data from five discrete blockettes of 20 words each. Both of these instructions are the write alternative of the Alter Operation mode.

The BMT instruction, back magnetic tape one block (Instruction 67, FIG. 130), is another alter operation alternative. This instruction results in the command from the Central Processor to back the magnetic tape at a specific tape station; this station is specified by the code in the least significant digit of the A-register of the Central Processor.

The EMT instruction, erase magnetic tape block markers (Instruction 67, FIG. 130), is the third alter operation alternative. This command from the Central Processor to the tape control unit serves to cause the erasing of the block markers of an incorrect block.

The RWD instruction, rewind magnetic tape (Instruction 67) is employed to rewind the magnetic tape on the tape handler.

Data to be written on the magnetic tape is entered from the memory to the Write Buffer where the format and parity requirements are satisfied. The data is then provided to the Tape Control Unit which in turn employs the use of the address specified by the setting in the least significant digit of the A-register to actuate the selected tape handler. Data read from the magnetic tape is detected by the read preamplifiers and the read amplifiers from whence the data is presented to the Read Tape Buffer to be accumulated until it is in the format required for entry into the memory. The specific tape station selected by the Central Processor enables the Tape Control Unit to logically select a specific set of read preamplifiers associated with the tape handler which is selected.

The magnetic tape which is utilized may suitably be of a ¾-inch width and may be divided into eleven 0.025-inch channels with a 0.0625-inch spacing center to center. Ten of the channels are utilized to record two binary-coded decimal digits plus an odd parity bit in parallel. Each word may be composed of seven digits. These digits are recorded on tape in four linear columns. The words may be recorded in groups of 100 to comprise a data block. FIG. 25 illustrates the layout of data on magnetic tape, and FIG. 26 illustrates the block marker arrangement on tape.

The eleventh block marker channel indicates the begin-write point (alpha), the begin-read point (beta) and the stop point (gamma) positions for each block. These markers are suitably prerecorded on the tape by use of an off-line device referred to as a tape editor before the tape is put to operational use in the system. The sum of the maximum stop and start distances determines the spacing between an alpha and a gamma of the preceding block. Beta follows alpha by a distance less than the inter-head spacing. All data for a given block is recorded between the beta and gamma block markers.

In the write mode of operation, alpha indicates that the tape has reached operating speed (this is true when alpha is sensed by the read head) and that the write heads are at the beginning of the block. Beta indicates when the read head gaps are approaching the beginning of the block. Gamma indicates the end of the block and terminates the order execution.

The read heads are blanked during all inter-block spaces by beta and gamma. This blanking is necessary to prevent the discontinuities inherent in the recording method employed from being read as legitimate data.

A non-return-to-zero form of recording is utilized whereby binary zero bits are indicated by a flux reversal in either direction and binary one bits are indicated by no change. The tape is saturated in either polarity between recorded zero bits. Upon reading, zero bits are detected as voltage pulses of amplitudes proportional to the time derivative of flux change at the read head gap as it traverses the tape at constant speed. No information is carried in the sense of the change of the flux or its resultant pulse but only in the fact that a change indicates a zero bit. No change is either a one bit or the absence of information.

An odd zero parity is utilized and the code 1111 is accordingly forbidden. Each column contains at least two binary zero bits and hence at least two pulses are detected. The first pulse detected in each line causes the retiming of the data and the resetting of the read amplifiers. In this way binary one bits are distinguished from the absence of data without recourse to a separate clock channel.

Tape Handler

The tape handler utilized in this system may suitably be one such as the FR 400 digital tape handler manufactured by the Ampex Corporation, Redwood City, California. There are 11 magnetic read heads and 11 magnetic write heads in the head assembly of this tape handler and it has a capacity of about 3600 feet of 0.001-inch magnetic tape which is ¾ inch wide. The speed of tape movement is 60 inches per second in either forward or reverse direction. Two capstans are included in the tape handler which are capable of accelerating the tape movement from the resting position to full operating speed within less than five milliseconds in a tape travel distance under 0.2 inch.

The tape mounting reels with their high inertia are isolated from the head area through multiloop tension arms (servo-idler arms). These arms also serve as tension sensing devices which operate mechanical servo-switches which in turn drive the reel motors to restore the arm position. Both capstans are belt driven from a single synchronized motor. A forward or reverse command engages the tape to one capstan or the other for tape motion.

Safety features incorporated in the tape handler include a threading door interlock and sensing arm limit switches. The threading door interlock prevents or stops tape motion if the door over the capstans is opened. The sensing arm limit switches interrupt operation if the sensing arms move outward so much as to threaten malfunction of the equipment. Tape motion does not resume when the cover door is closed or when the sensing arm limit switches have been de-actuated, and motion can only be restored by another command signal.

A head assembly in a tape handler consists of two tape guides, a write head stack, a read head stack, a hinged shield, a base plate and a head cover. The tape drive system comprises a main cast-plate on which are mounted the two capstans with their associated actuators and head assembly.

Two tape sensing posts, one located at the top of the main plate and the other at the bottom provide tape sensing means to signal End of Tape and Beginning of Tape. These posts provide two insulated sections. The lower section is connected to chassis ground and if contact is made between that section and upper section by the use of metallized tape, an end of tape relay is energized to cause the halting of tape motion.

Included in the tape handler is a control buffer which delays countermanding commands sufficiently to permit the tape handler to recover from the effects of one command before proceeding to the next command or to ignore the countermanding command depending on the sequence of the commands. Accordingly, the control buffer provides a 3.5 to 4.0 millisecond delay to any "start" command and an 0.4 to 0.8 millisecond delay to any "stop" command. The control buffer essentially consists of two identical channels with each containing an amplifier and a Schmitt trigger. One channel is used for forward commands, the other for reverse commands. Power for the control buffer is derived from external source capable of providing +70 volts D.C. and −5 volts D.C. at about 17 milliamperes. The delay is provided by the hysteresis between the two trigger levels in the Schmitt trigger circuit.

Upper logic level signals to the tape handler, viz., Forward, Reverse and Rewind cause tape movement therein to be effected.

Station Selection

Included in the system is a tape selector panel which contains a number of switches corresponding to the amount of tape handlers being utilized. In FIG. 27, there is shown a simplified diagram of the tape selection arrangement; the terms $Nrn$ $Nsn$ $Nwn$ known thereon are the priority commands for a chosen operation wherein $n$ is any number from one to zero. Thus, for example, $Nrn$ indicates a read priority, $Nwn$ indicates an alter priority and $Nsn$ indicates a rewind priority.

Provided on the panel are a plurality of rotary switches, one for each tape handler. The four $Rt$ flip-flops and the four $Wt$ flip-flops contain the setting of the least significant digit of the A-register during the read operation and the write operation respectively. The rewind flip-flops are S0–S1.

In operation if it is assumed that tape handler number 5 is to be operated at tape station number 2 the $Nr5$ $Na5$ and $Ns5$ lines are connected to position number 2 on the rotary switches. The fourth switch indicates that position number 2 is connected at one end to a source of 275 volts D.C. through a resistor and to ground through a parallel combination of a neon lamp and a resistor. The values of the resistors are so chosen that normally the neon does not light up with this arrangement. A fifth rotary switch is connected at position 2 to a Nixie power supply.

Thus, if it is desired to employ Tape Handler 5 as tape station number 2, the selector switch for Tape Handler 5 is placed at position number 2, commands $Nrn$, $Nwn$, $Nsn$ are then decoded when the respective actions are commanded of the tape handler. The neon connected in the circuit of switch number 4 is not ignited when only one switch is at a specific position. If two or more switches are at a common position (as will be further explained), the voltage across the neons (two or more dropping resistors are consequently in parallel) is sufficient to ignite those which are connected in common. The Nixie indicator will indicate a two for Tape Handler 5.

Redundant Tape Station Selection Indication

In the event that the rotary switches for two discrete tape handlers are placed at the same position, i.e., they are both selected for the same tape station number, the neon lamps shown in FIG. 28 will be double addressed and accordingly, there will be sufficient voltage thereacross to ignite them. Thus, in FIG. 28 there is shown a neon lamp in the circuit wherein station 1 is selected for one tape handler and station 10 is selected for the other tape handler. In this situation neither neon lamp will light up. Let it be assumed now that by error both tape handlers 1 and 10 are selected as station 1. This situation will cause the anode of neon 1 to be connected to the 275 volt B+ source through the parallel arrangement of the two B+ resistors whereby sufficient voltage will be provided across. Neon 1 to effect its ignition. Neon 10 is disconnected from the circuit in this case.

Tape Control Panel

In the tape control panel (FIGS. 29–35), D.C. voltages are suitably supplied from the Central Processor to actuate logic therein and to actuate relays K1, K2 and K3.

In the operation of the panel, transistor Q1 is conductive since its emitter electrode is connected to ground potential on the D.C. ground bus and its base electrode is at a voltage which is negative with respect to ground because of resistor R12. The collector of transistor Q1 is connected to −20 volts through relay K2 and resistor R2.

The conduction of transistor Q1 causes the energization of relay K2 with the consequent switching thereof of its contacts from the normal quiescent position to the position that the contacts assume when relay K2 is in the energized state. Accordingly, the latch release solenoid L1 is disconnected from the 115 volts A.C. source. The closing of the S1 power switch to apply 115 volts A.C. to transformer T1 will cause the illumination of the power lamp DS1.

Depending upon the position of switch S4 REMOTE-LOCAL, lamp DS3 will be illuminated to indicate READY when switch S4 is in the REMOTE position. Lamp DS2 is illuminated to indicate that switch S4 is in the LOCAL position and lamp DS4 is also illuminated when switch S4 is in the latter position to indicate NOT READY.

If it is assumed that there is no magnetic tape loaded on the tape handler, the servo-follower arms in the tape handler are permitted to move to their extreme positions. When this occurs, the term $\overline{Tn}$ is generated and +6 volts are applied to the base of transistor Q1 from pin A of jack J2 through diode CR1 whereby transistor Q1 is rendered non-conductive to deenergize relay K2 and to provide $\overline{Tn}$ signal to pin X of jack 1.

The deenergization of relay K2 causes 115 volts A.C. to be applied to the latch release solenoid L1 whereby the forward reverse and rewind push buttons, viz., B(FWD), C(REV), and D(REWD), are released. If the REMOTE-LOCAL switch S4 is in the REMOTE position, DS4 the NOT READY lamp is illuminated. If the magnetic tape is loaded on the tape handler and the metallized leader on the tape is not shorting the sensing post on the handler to provide the level $Bt$ (Beginning of Tape is true, $Bt$ is a positive level of +6 volts), transistor Q1 is in its conductive state whereby relay K2 is energized, etc. In this situation, the base of transistor Q2 is initially at +8 volts and its emitter is at +6 volts whereby it is at cutoff. When the metallized leader shorts the sensing post to generate the $Bt$ signal, the base electrode of transistor Q2 is rendered negative with respect to the emitter electrode whereby transistor Q2 conducts to provide at its collector, approximately +6 volts. A +6 volt output at the collector of transistor Q2 causes the application of +6 volts to the base of transistor Q1 through diode CR3 whereby transistor Q1 is rendered non-conductive and relay K2 is thereby deenergized, etc. The +6 volts generated at the collector of transistor Q2 appears at pin V of jack J1 and the +6 volts is applied through a diode CR10 poled in the reverse direction, the anode of diode CR10 being connected to a −7.5 volt source through a capacitor C4 whereby capacitor C4 is permitted to charge for a given period to provide a time delay. Accordingly, there appears at pin F of jack J1, the $NBtd$ signal (Beginning of Tape Delay). As will be seen, with the delay provided by this arrangement, i.e., the period of $NBtd$, there is enabled switching of the rewind flip-flops S0–S9 to their reset states (they are in their set states during a rewind operation). This insures that tape movement in the reverse direction during a rewind operation is halted before the rewind flip-flops are switched to their reset states and thereby avoids any breaking of the tape that might occur by preventing the sudden insertion of a new command to move tape in the forward direction.

If the situation is assumed where the tape is mounted on the tape handler and the metallized leader is not shorting the sensing posts of the tape handler whereby the term $Bt$ is not true, then the base of transistor Q2 is at +8 volts whereby transistor Q2 is non-conductive and the voltage at the collector of transistor Q2 is clamped to −7.5 volts. Accordingly, −7.5 volts is provided at jack J1, pin V and at jack J1, pin F.

In the situations where the magnetic tape is loaded on the tape handler and where the signal $Bt$ is either generated or not generated as described hereinabove, the term $Et$ (End of Tape) is not true, i.e., the sensing post for the end of the tape is not shorted. When the term $Et$ is not true, the base of transistor Q3 is at +8 volts as determined by resistors R11 and R12, and since the emitter of transistor Q3 is at +6 volts, transistor Q3 is non-conductive. The collector electrode of transistor Q3 is clamped to −7.5 volts by diode CR16. The −7.5 volts at the collector of transistor Q3 is applied to the base electrode of transistor Q1 through diode CR2 whereby transistor Q1 is conductive and consequently relay K2 is energized to maintain the latch release solenoid L1 closed. The −7.5 volts at collector of transistor Q3 appears at pin W of jack J1 as $\overline{Et}$.

This condition is maintained until the tape on the tape handler has been wound onto the take-up reel such that the metallized leader at the end of the tape shorts the sensing post. When this occurs, the base electrode of transistor Q3 is rendered negative with respect to its emitter electrode whereby transistor Q3 conducts and +6 volts appears at the collector thereof. This +6 volts appears at pin W of jack J1 as the E*t* signal and is also applied to the base electrode of transistor Q1 through diode CR2 to render transistor Q1 non-conductive. Consequently, relay K2 is deenergized and the latch release solenoid L1 is released.

Diodes CR1, CR2, and CR3 form a three term OR-gate whose input terms are $\overline{Tn}$, E*t*, and B*t* respectively. These three conditions cause the releasing of the latch release solenoid L1. The effect of this action, when switch S4 is in the LOCAL position, is to terminate operation when either the end of the tape has reached a sensing post position or when the tape has broken or thrown a loop such that one or both of the tape handler servo-follower arms have moved to their extreme position.

Tape handler activity can be initiated by four commands, viz., stop (STOP), forward (FWD), reverse (REV) and rewind (REWD). If switch S4 is in the LOCAL position, control voltages are applied directly to the tape handler by utilizing switch S5 and the buttons associated therewith for designating particular commands. In the event that switch S4 is in the REMOTE position, then logic inputs at pins S, T, U, for F*wd*, R*ev*, R*ewd* control tape handler activity through the contacts of switch S4.

Switch S5 is mechanically interlocked so that the following conditions exist. No two conditions of forward (F*wd*), reverse (R*ev*) or rewind (R*ewd*) may be simultaneously active. The interlocking feature provided by this switch is as follows:

A. Stop will release all other activities—stop does not latch itself.
B. F*wd* will release R*ev* and F*wd* will latch.
C. R*ev* will release F*wd* and R*ev* will latch.
D. R*ewd* will release either F*wd* or R*ev*. R*ewd* will latch. Neither F*wd* or R*ev* will release R*ewd*.

When the system is in the LOCAL mode of operation, i.e., the contacts of switch S4 are as shown in the LOCAL position, the depressing of button B (FWD) will provide an upper voltage level, the depressing of button C (REV) will provide an upper voltage level and the pressing of button A (STOP) will provide a lower voltage level.

When the rewind button D (REWD) is pressed, a counter-clockwise rotation voltage is applied to the tape reel. This is accomplished by the connection of the contacts of relay K1 of the local control panel as shown in FIGS. 29–35 to ground potential. This connection to ground potential is normally applied to the control of the take-up reel via the contacts of relay K1 when relay K1 is in the unenergized state. However, the appearance of a potential at pin N of jack J2 causes the energization of relay K1 with a consequent switching of its contacts whereby there is provided ground potential to the control of the reel to cause the rewinding of the tape thereon.

When switch S4 is in the REMOTE mode of operation, the control levels are transferred to the buffer of the tape handler which provides a start and stop initiate pulses as well as providing a start and stop delay. The switch S5 is ineffective when switch S4 is in the REMOTE position other than to provide the STOP signal to the tape handler.

When switch S4 is in the REMOTE position and it may be desired to execute a write operation or to inhibit writing, depressing of a WRITE push button (not shown but symbolized by the switch S2) will cause a circuit to be completed through relay K3 from ground through relay K3, resistor R3, the closed contacts of switch S2, the closed contacts of switch S3 to the M pin on jack J1. This will cause the switching of the contacts of relay K3 to provide current to the write head relays. In this connection, it is to be noted that lamp DS5 is illuminated when the contacts of relay K3 are in the position they assume when relay K3 is in the unenergized state. With the switching of the contacts of relay K3 upon its energization, lamp DS5 is extinguished. The energization of relay K3 serves to lock the relay and to supply a closed circuit path of −20 volts D.C. to the head relays. In this operation the W*in* term (Write inhibit) goes from +8 volts to −7.5 volts upon the switching of the contacts of relay K3 due to the latter's energization.

In the WRITE INHIBIT operation, when switch S3 is closed the relay K3 cannot be energized and lamp DS5 remains illuminated. It is to be noted that when switch S4 is in the REMOTE position, the READY lamp DS3 or the NOT READY lamp DS4 will be illuminated depending upon the position of the contacts of relay K2, i.e., whenever transistor Q1 is caused to be rendered non-conductive by the $\overline{Tn}$, B*t* or E*t* terms and relay K2 consequently is in the deenergized state.

*Beginning of Tape Advance*

In a previous section, there has been explained how the generation of the NB*td* term assures that the tape motion in the reverse direction is halted prior to the switching to the reset states of the S flip-flops to insure that a new command to move the tape in the forward direction will commence from a stationary position of the tape whereby the possibility of tape snapping due to sudden enertial changes is substantially eliminated. It is recalled that the signal NB*td* is generated, when during the rewind operation the metallized leader shorts the sensing post.

The tape can be caused to move in the forward direction, in accordance with the equation $$Fwd = Nron + Nwon + Bta$$

wherein N*ron* indicates a read priority, N*won* indicates a write priority. The B*ta* term (Beginning of Tape Advance) is a gate condition to move the magnetic tape off the metalized leader after a rewind operation or when the tape is being initially loaded on the tape handler. The B*ta* is provided whenever the signal B*t* is being provided.

Since I*rn* = N*sn* + N*wp*, when a rewind operation ceases whereby the S flip-flops are switched to their reset states, N*sn* is no longer true whereby I*rn* is no longer true. Thus, in accordance with the equation $Bta = \overline{Irn} \, Bt$, i.e., B*ta* becomes true when I*rn* is not true ($\overline{Irn}$), this occurring when the S flip-flops have been switched to the reset state by NB*td*. The activation of the forward command in accordance with the equation $FWD = Bta$ will cause the magnetic tape to be moved in the forward direction until the metal leader does not short the sensing post whereby the signal B*t* is no longer true.

The significance of B*ta* signal can be understood if it is realized if I*rn* were true when B*t* came true the possibility would exist that the forward pinch roller in the tape handler would be pulled in while the tape was being rewound or moving in a reverse direction. This would cause a sudden inertial change whereby tape would tend to be moved forward off the leader and thereby could cause the tape to be snapped. By insuring that the tape cannot move forward until the B*ta* signal is generated, it is made certain that I*rn* is not true at the time that B*t* is true, and thus the possibility of a sudden reverse to forward motion change in the movement in the tape is prevented. The signal B*ta* accordingly forces the metallized leader to move off the sensing post after a rewind operation has been completed or when tape is initially being loaded. The F*wd* command is of course a signal to the tape handler to cause the initiation of forward tape movement.

TAPE HANDLER LOGIC PRIORITY
(FIGS. 36–40)

In the system of this invention, a logic priority is established in the following order:

(1) Current
(2) Rewind
(3) Read
(4) Alter

For example, if a Tape Handler in which a write operation is proceeding receives an instruction to conduct a read operation and then before completion of the write operation it is instructed to rewind, the read and rewind commands are held. Upon completion of the write operation, there will first be accomplished a rewind operation and then a read operation will occur.

The logic which implements such priority is as follows for a read command:

$$\text{Read } (Nrp) = Nrn \ \overline{RL} \ (\overline{Irn} + Rp)$$

In the latter equation $Nrn$ is the read command line from the Tape Control Unit, $\overline{RL}$ is the reset state of the read alarm flip-flop (no read alarm can be occurring), $Rp$ is the set state of the read priority flip-flop and $Irn$ is the true output of an inverter $(Irn = Nsn + Nwp)$ wherein $Nsn$ is the rewind command line and $Nwp$ is the write priority signal. It is seen that $\overline{Irn}$, the false output of the inverter, is at the lower logical level when either an alter operation (write, backup, erase) is in progress or a rewind order is waiting. Thus, it is seen that a read priority is inhibited by a current alter order or a waiting rewind order. The equation for $Nrp$ can also be written as $Nrp = Nan \ [Rp + \overline{I(Nsn + Nwp)}]$.

Similarly the alter priority $$Nwp = Nan \ \overline{WL} \ (\overline{Iwn} + Wp)$$

or $Nan \ [Wp + \overline{I(Nsn + Nrn)}]$ wherein $Iwn = Nsn + Nrn$. It is seen from the $Nwp$ equation that a write order is inhibited if a read command and a rewind command are waiting. $\overline{WL}$ is the reset state of the write alarm flip-flop.

The rewind order $= Sn \ \overline{Isn}$ wherein $Isn = Nrp + Nwp$. Thus, the rewind order will take place unless a read or alter order is already in progress. It is to be noted that whereas in the case of the read and write orders, read and write priority flip-flops $Rp$ and $Wp$ are respectively required to establish the particular priority, in the rewind order such "lock-up" flip-flop is not required since a rewind order has first priority in any case.

ADDRESS LOGIC
(FIGS. 41–51)

Address Logic (Read)

The Read Magnetic Tape operation is initiated with the issuing of the read command, i.e., the $Rebd$ signal from the Central Processor.

When the $Rebd$ signal issues, the $Nrb$ signal is generated to direct the transfer of the designated Tape Handler address from the least significant digit position of the A-register in the Central Processor to the $Rt$-register of the Tape Control System. Signal $Nrb$ which equals $Rebd \ \overline{RL} \ \overline{Rb}$ is consequently generated. Flip-flops $Rb$ and $RL$ are in their reset states at this time. The $Nrb$ term switches $Rb$ to its set output and the $Nrb$ term together with the settings in the A11–A14 flip-flops cause the setting in these flip-flops, i.e., the least significant digit of the A-register to be transferred to $Rt1$–$Rt4$ flip-flops. The address from A11–A14 identifies the tape handler in which the tape transport is to be used. In the table below, there is set forth the settings of the A14–A11 flip-flops for the addressing of each of ten transports.

| Tape Station | A Register Configuration |
|---|---|
| 0 | $\overline{A11} \ \overline{A12} \ \overline{A13} \ \overline{A14}$ |
| 1 | $A11 \ \overline{A12} \ \overline{A13} \ \overline{A14}$ |
| 2 | $\overline{A11} \ A12 \ \overline{A13} \ \overline{A14}$ |
| 3 | $A11 \ A12 \ \overline{A13} \ A14$ |
| 4 | $\overline{A11} \ \overline{A12} \ A13 \ \overline{A14}$ |
| 5 | $\overline{A11} \ \overline{A12} \ \overline{A13} \ A14$ |
| 6 | $A11 \ \overline{A12} \ \overline{A13} \ A14$ |
| 7 | $\overline{A11} \ A12 \ \overline{A13} \ A14$ |
| 8 | $A11 \ A12 \ \overline{A13} \ A14$ |
| 9 | $\overline{A11} \ \overline{A12} \ A13 \ A14$ |

The $Rb$ flip-flop output and the outputs of the $Rt1$–$Rt4$ flip-flops are logically decoded into ten unique read address lines $NR0$–$NR9$, the selected line being determined at the transport selection panel. If a transport is addressed by any of $NR0$–$NR9$ lines and there is no read operation in progress, a return line from the transport, $NRP$, switches $Rp$ to its set output and holds priority for the read operation on that transport until that read operation is completed. In this connection, $*Rp = INRp$ wherein $Nrp = Nrn \ [Rp + \overline{I(Nsn + Nwp)}]$. In the latter equation, $Nrn$ is the signal on one of the lines $Nr0$–$Nr9$ and $\overline{I(Nsn + Nwp)}$ is the false inverter output resulting from $\overline{Nsn + Nwp}$. This signifies that for $INrp$ to be true, there cannot be active for the selected tape transport either a rewind command $Nan$ or a write priority $Nwp$ as will be further explained hereinbelow. $INrp$ is the true inverter output resulting from $Nrp$. With the switching of $Rp$ to its set state by $INrp$, the read priority, i.e., the signal of the $Nrp$ line is now maintained in accordance with the equation $Nrp = Nrn \ Rp$.

Forward motion of the tape transport is now provided in accordance with the equation $$Fwd = Nron + Nwon + Bta$$

In this latter equation in the read mode, $Nron$ results from the read command and an acceptable priority. Thus, $Nron = \overline{RL} \ Nrn \ [Rp + \overline{I(Nsn + Nwp)}]$. It is seen from the latter equation that $Nron$ is dependent upon certain distinct conditions, viz., there must be no read alarm $\overline{RL}$ (RL, the read alarm flip, has to be in its reset state), there must be present the command selection $Nrn$ and there must be a read priority established by $Rp$.

Before the tape transport starts and for a few milliseconds thereafter, one-shot $Ydr$ is switched to its astable state by $Nrp \ Rp$. This insures that the marker channel will not be sensitive to transients while the transport is starting up. This is understood when it is noted that $\overline{Ydr}$ is a necessary element in the input term to $Tr$, the gated clock driver which is a necessary logic component in the Read Marker Counter Timing as will be further explained hereinbelow.

When the beta marker $Nbr$ is detected from the moving tape (the derivation of $Nbr$ is set forth in the explanation of Channel Marker Counter), the read synchronization flip-flop $Rsy$ is switched to its set state, thereby permitting the reception of data from the read amplifiers. Upon the detection of gamma, the $Ysdr$ one-shot multivibrator is switched to its astable state, thereby permitting control of a delayed stop, i.e., delaying the generation of $Ncr$, the end of block command until it switches back to its stable state.

At the end of the block, the $Rb$ and $Rp$ flip-flops are reset. However, $Rt1$–$Rt4$ flip-flops retain their respective settings until the next read command R*ebd* issues or a total clear is effected by the K*tb* signal.

Reference can now be made to FIG. 52 which is a timing diagram of the waveforms of flip-flop outputs and logic terms pertinent to the Read Control operation. In this figure, the times chosen are nominal. It is seen that the set output of R*b* is generated at the trailing edge of R*ebd* and simultaneously the contents of the A11–A14 flip-flops are transferred to the R*t*1–R*t*4 flip-flops. One-shot Y*dr* is switched to its astable state and remains thereat for seven milliseconds at which time it is switched back to its stable state. The N*r*0–N*r*9 lines are energized and R*p* is switched to its set output by IN*rp*. The N*br* signal is generated at beta and N*cr* is the delayed signal representing gamma. The read synchronization flip-flop R*sy* is in its set state between the generation of the N*br* and N*cr* signals and data is read during the time that flip-flop R*sy* is at its set output state. The astable period of Y*sdr* causes the delay of the issuance of the N*cr* signal, the latter not being generated until Y*sdr* switches back to its stable state.

It is to be noted that R*b* is in its set state until the N*cr* signal issues at which time R*b* is switched to its reset state by $N_{cr} \overline{Y_{sdr}} \overline{Q_{1r}}$, i.e., the stable output of $\overline{Y_{sdr}}$ and the reset output of Q1*r*. The N*rn* signal on the selected N*r*0–N*r*9 line falls upon the switching of R*b* to its reset state and R*p* is switched to its reset state by $\overline{IN_{rp}}$ thereby removing the priority of the read operation.

Alter Address (Write)

The alter mode of operation of the Tape Control System is initiated by the alter command N*wb* from the Central Processor. Since $N_{wb} = [(W_{ebd} + E_{rt} + B_{kt}) \overline{WL} \overline{Wb}]$, it is seen that this command includes three components, viz., write (W*ebd*), backup (B*kt*) and erase (E*rt*). The combination $\overline{WL} \overline{Wb}$ is a necessary element of the N*wb* equation, i.e., there cannot be a write alarm or a write operation in progress. If the command is write, the equation includes $W_{ebd} \overline{WL} \overline{Wb}$.

With the generation of N*wb*, W*b* is switched to its set state thereby. Also, the contents of the A11–A14 flip-flops are transferred into the W*t*1–W*t*4 flip-flops respectively by N*wb* A11–A14 terms. Flip-flops W*t*5 and W*t*6 have to be in their reset states during a write operation. Accordingly, the signal N*wd* which equals $\overline{Wt5} \overline{Wt6}$ represents a write operation decision. The contents of the W*t*1–W*t*4 flops together with W*b* energize one of the N*a*0–N*a*9 lines to the Write Buffer to provide the N*an* term.

With the issuing of N*an*, the N*wp* signal is generated in accordance with the equation, $$N_{wp} = N_{an} [W_p + \overline{I(N_{sn} + N_{rn})}]$$

In this latter equation since $\overline{IN_{sn}}$ indicates the absence of a rewind command and $\overline{IN_{rn}}$ signifies the absence of a read priority command, when N*wp* is generated, the true inverted output of N*wp*, i.e., IN*wp* switches W*p* to its set state. The term N*an* W*p* now establishes a write priority.

The one-shot Y*dw* is switched to its astable state simultaneously with the switching of W*p* to its set state by $N_{wp} \overline{W_p}$ to inhibit the alter marker counter from operating until the transport has started.

It is recalled that N*wd* represents $\overline{Wt5} \overline{Wt6}$. The N*wd* term is utilized in the generation of the N*won* signal which equals $N_{wd} N_{an} \overline{WL}[W_p + \overline{I(N_{sn} + N_{rn})}]$. Forward motion of the tape is now provided in accordance with the equation, $F_{wd} = N_{ron} + N_{won} + B_{ta}$.

After the transport is up to speed and Y*dw* has switched to its stable state, and at the detection of an alpha marker, the N*aw* signal issues (to be explained below), the $\overline{Wt5} \overline{Wt6} N_{aw}$ term switching the write synchronization flip-flop W*sy* to its set state. The set output of W*sy* is utilized to condition the Write Buffer for a tape writing operation.

During the forward movement of tape when the beta marker N*bw* is detected, the echo synchronization flip-flop E*sy* is switched to its set state by $N_{bw} \overline{Wt5}$. The flip flop E*sy* is switched to its set state by $N_{bw} \overline{Wt5}$. The function of flip-flop E*sy* will be explained hereinbelow in connection with the description of the Echo Check operation.

Upon the detection of a gamma marker, one-shot Y*sdw* is switched to its astable state by $$Q1_W Q2_w \overline{(C3_w C2_w C1_w C0_w)} \overline{Wt5}$$

for a nominal 1.65 milliseconds whereby the generation of N*cw*, the tape stop command in the write operation, is delayed until one-shot Y*sdw* switches back to its stable state.

With the generation of the N*cw* signal, flip-flop W*sy* is switched to its reset state by $\overline{N_{cw}} \overline{Wt6}$, flip-flop E*sy* is switched to its reset state by $N_{cw} \overline{Wt5} W_{sy}$ and flip-flop W*b* is switched to its reset state by W*ed*, W*ed* being generated by $N_{cw} \overline{Wt5} \overline{Wt6} C_{a1}$ wherein C*a*1 is the Not Calibrate Mode signal from the tape transport. With the switching of W*b* to its reset state, the signal on the selected N*a*0–N*a*9 line falls. Accordingly, with the absence of N*an*, N*wp* is no longer true. Thus, $\overline{IN_{wp}}$ switches flip R*p* to its reset state. The setting in the W*t*1–W*t*4 flip-flops are not changed until the next write command W*ebd* issues from the Central Processor or a total clear is effected by the K*tb* signal.

The write mode of operation can now be reviewed in conjunction with the waveforms included in the timing diagram of FIG. 53. In this figure, it is seen that with the issuance of the W*ebd*, i.e., the write command from the Central Processor, W*b* is switched to its set output state and stays thereat until the generation of W*ed* at the issuance of N*cw* when it is switched to its reset state. The chosen combination of W*t*1–W*t*4 flip-flops are switched to their set states by N*wb* A11–A14 and remain thereat. W*t*5 and W*t*6 remain at their reset states during this mode of operation.

The N*a*0–N*a*9 lines are high when W*b* is in its set state and N*wd* which represents $\overline{Wt5} \overline{Wt6}$ is at the upper logic level throughout this mode. W*p* is switched to its set state once N*wp* is generated and maintains a write priority until W*b* is switched to its reset output state.

The astable period of one-shot Y*dw* prevents the detection of noise from the tape during its starting up period. The tape movement continues until N*cw*, the tape stop command is generated. In such movement, at the detection of alpha, i.e., the generation of N*aw*, the tape write buffers receive the signal indicating that tape is ready to be written on, since the W*sy* write synchronization flip-flop is switched to its set state at this time. At the detection of beta, i.e., N*bw*, E*sy*, the echo check synchronization flip-flop, is switched to its set state. Flip-flops W*sy* and E*sy* are not switched to their reset states until N*cw* is generated. The one-shot Y*sdw* is switched to its astable state at the detection of gamma to delay the generation of N*cw* for a nominal 1.65 milliseconds.

Alter Address (Backup)

This mode of operation is initiated by the issuance of the B*kt* command from the Central Processor. The issuance of B*kt* effects the generation of the N*wb* signal by $B_{kt} \overline{WL} \overline{Wb}$. The term $B_{kt} \overline{Wb}$ also switches flip-flop W*t*5 to its set state.

The W*t*1–W*t*4 flip-flops have transferred to them the setting in the A11–A14 flip-flops by the N*wb* A11–A14 term and an N*a*0–N*a*9 line, selected in accordance with a chosen W*t*1–W*t*4 W*b* combination, rises to the upper voltage logic level.

The backup decision signal N*bd* is caused to be generated by W*t*5 whereby the reverse command R*ev* to the tape transports can be initiated in accordance with the equation $Rev = \overline{WL} \; Nbd \; Nan \; \overline{Iwn}$. The latter equation shows that reverse motion is caused if the backup mode (N$bd$) and the alter command selection N$an$ are true provided that there is not a read command selection or a rewind command selection ($\overline{Iwn}$) and provided that there is no write alarm ($\overline{WL}$). In this latter connection $Iwn = Nsn + Nrn$. Accordingly, $\overline{Iwn}$ is true when there is neither a rewind command nor a read priority which is active.

Similar to the write operation, N$wp$ is generated in accordance with the equation $$Nwp = Nan \; [Wp + \overline{I(Nsn+Nrn)}]$$

The latter equation shows that N$wp$ is generated if the alter command selection is true (N$an$) and there is no active read or rewind command. The N$wp$ signal passed through an inverter provides at the true output of the inverter, the signal IN$wp$ which switches W$p$ to its set state and N$wp$ then remains true because of the N$an$ W$p$ combination. Thus, a write priority is maintained throughout this mode of operation. The one-shot Y$dw$ is switched to its astable state by $Nwp \; \overline{Wp}$, such astable state being for a period such that the marker channel is not sensitive to transients while the tape transport is starting up, as has been explained hereinabove in connection with the read operation.

The tape, moving in the reverse direction, first encounters a gamma marker, which has no effect since to switch W$t$5 to its reset state there is required $$Ncw \; Wt5 \; Wt6$$

However, in this situation W$t$6 is in its reset state, since the erase command E$rt$ is required to switch it to its set state.

At the encountering of the beta marker in the reverse movement of the tape, the echo synchronization flip-flop E$sy$ is switched to its set state (as will be explained in the Alarm and Control Logic Section) by $Nbw \; Wt5 \; \overline{Wt6}$. At the detection of the alpha marker N$aw$ during movement of tape, one-shot Y$sdw$ is switched to its astable state to delay the generation of the end of block command. With the generation of N$aw$, the W$ed$ signal is caused to issue by $Naw \; Wt5 \; \overline{Wt6}$ and W$b$ is switched to its reset state by W$ed$. With W$b$ in its reset state, the signal on the selected N$a$0–N$a$9 line falls so that N$an$ is no longer true whereby tape movement halts. The W$t$1–W$t$4 flip-flops retain their setting until the next write command W$ebd$ is given or a total clear is effected by K$tb$ from the closing of the appropriate switches on the Control Console.

In FIG. 54 there is shown a timing diagram of the waveforms pertinent to the backup mode of operation. In this figure, it is seen that with the issuance of the backup command B$kt$, W$b$ is switched to its set state and the contents of the A11–A14 flip-flops are transferred to the W$t$1–W$t$4 flip-flops by N$wb$. W$b$ is switched to its reset state by W$ed$ at the generation of N$aw$ but the setting in the W$t$1–W$t$4 flip-flops remains unchanged. W$t$5 is also switched to its set state by the backup command B$kt$ and stays thereat until it is switched to its reset state upon the generation of N$aw$. W$t$6 remains at its reset state throughout the operation. N$an$ is generated by the W$t$1–W$t$4 W$b$ combination and remains high until W$b$ is switched to its reset state. N$bd$ is caused to be issued by W$t$5 and is present until W$t$5 is switched to its reset state by the N$aw$ signal.

One-shot Y$dw$ is switched to its astable state once N$an$ is generated and remains thereat for seven milliseconds. The transport starts when the R$ev$ command comes true and stops after N$an$ falls.

In the marker channel, the detection of the gamma marker has no effect. The detection of the beta marker causes E$sy$ to be switched to its set state, E$sy$ being switched to its reset state at the detection of the alpha marker by $Naw \; \overline{Wt6}$. The detection of the alpha marker causes Y$sdw$ to be switched to its astable state for a period of 1.65 milliseconds at which time N$aw$ is generated, the N$aw$ term being a necessary element in the term for generating W$ed$ to switch W$b$ to its reset state. It is to be noted that in the event that flip-flop W$sy$ was in is set state at the beginning of the backup mode of operation, it is switched to its reset state at the detection of the gamma marker by $Ncw \; \overline{Wt6}$.

*Alter Address (Erase Block Markers)*

This mode of operation requires the issuance of the erase command signal E$rt$ from the Central Processor. The presence of E$rt$ causes the generation of the N$wb$ signal by the $Ert \; \overline{WL} \; \overline{Wb}$ term. The $Ert \; \overline{Wb}$ term switches flip-flops W$t$5 and W$t$6 to their set states.

The W$t$1–W$t$4 flip-flops have transferred to them the contents of the A11–A14 flip-flops by the N$wb$ A11–A14 term and the upper logic level voltage signal appears on an N$a$0–N$a$9 line selected in accordance with a chosen W$t$1–W$t$4 W$b$ combination to provide the N$an$ signal.

The backup decision signal N$bd$ is caused to be generated by W$t$5 whereby the reverse command R$ev$ to the tape transports can be initiated in accordance with the equation $Rev = \overline{WL} \; Nbd \; Nan \; \overline{Iwn}$ as previously explained. N$wp$ is generated to provide In$wp$ which switches W$p$ to its set state to provide a write priority. The one-shot Y$dw$ is switched to its astable state by $Nwp \; \overline{Wp}$.

The tape, moving in the reverse direction, first encounters a gamma marker, N$cw$, and the $Ncw \; Wt5 \; Wt6$ term switches flip-flop W$t$5 to its reset state. Consequently, the erase command signal N$ed$ is caused to be generated by the $\overline{Wt5} \; Wt6 \; \overline{Ysdw}$ term. The generation of N$ed$ causes the relay driver to energize the Erase Marker Relay in the selected tape handler thereby providing current to erase the block marker. In this connection it is to be noted that one-shot Y$sdw$ is switched to its astable state by $Q1w \; Q2w \; \overline{C3w} \; \overline{C2w} \; \overline{C1w} \; \overline{C0w} \; \overline{Wt5}$ at the time that W$t$5 is switched to its reset state and remains thereat for 1.65 milliseconds. This effects the delay of the activating of erase current for the astable period of one-shot Y$sdw$. The erase relay is then maintained energized for the duration of the block and the beta and alpha markers.

When the beta marker is encountered, the N$bw$ signal is generated and the echo synchronization flip-flop E$sy$ is switched to its set state by $Nbw \; \overline{Wt5}$. When the second gamma marker is generated, signifying the end of the immediately preceding data block, the write synchronization flip-flop W$sy$ is switched to its set state by the $Ncw \; (\overline{Wt5} \; Wt6)$ term. Flip-flops E$sy$ and W$sy$ are utilized in the erase mode of operation to detect proper block marker sequence, flip-flop E$sy$ being switched to its reset state by $Ncw \; \overline{Wt5}$ and flip-flop W$sy$ being switched to its reset state by $Ncw \; \overline{Wt6}$ (after $\overline{Wt6}$ is switched to its reset state as described hereinbelow).

Upon the detection of the second gamma, one-shot Y$sdw$ is switched to its astable state by $$Q1w \; Q2w \; (\overline{C3w} \; \overline{C2w} \; \overline{C1w} \; \overline{C0w}) \; \overline{Wt5}$$

to delay the generation of the N$cw$ signal. At this time the data inhibit flip-flop D$i$ is switched to its set output state by $Ncw \; (\overline{Wt5} \; Wt6)$ and the erase command signal N$ed$ falls since $\overline{Ysdr}$ is in its astable state (lower logic level). When $\overline{Ysdr}$ switches back to its stable state, flip-flop F$am$ is switched to its set state by $\overline{Q1w} \; Q2w \; \overline{Ysdw}$ and the N$cw$ signal is generated by $$Q2w \; Fam \; (\overline{C3w} \; \overline{C2w} \; \overline{C1w} \; \overline{C0w})$$

Flip-flop W$t$6 is now switched to its reset state by $Ncw$ $\overline{Wt5}$ $Wt6$. With flip-flops $Wt5$ and $Wt6$ both in their reset states, $Nbd$ falls, whereby the reverse command $Rev$ is no longer true and tape transport movement halts.

It is recalled that $Nwd = \overline{Wt5}$ $\overline{Wt6}$. Thus at the time that tape movement halts, $Nwon$ is true $$(Nwon = Nwd\ Nan\ \overline{WL}\ Wp)$$

since $Nan$ is still true as $Wb$ is still in its set state and $Wp$ is still in its set state. Consequently, the Forward command $Fwd$, which equals $Nwon$, goes true and tape movement commences in a forward direction. In its forward movement, the first marker to be encountered is the second gamma that was encountered during the reverse movement. Accordingly, $Ncw$ is generated so that $Ysdw$ is switched to its astable state by $$Q1w\ Q2w\ \overline{C3w}\ \overline{C2w}\ \overline{C1w}\ \overline{C0w}\ \overline{Wt5}$$

When $Ysdw$ switches back to its stable state the delayed $Ncw$ signal issues. Consequently, the $Wed$ signal is caused to be generated by the $Ncw\ \overline{Wt5}\ \overline{Wt6}\ \overline{Cal}$ term; the $Wed$ term switching flip-flop $Wb$ to its reset state.

Flip-flop $Di$ is switched to its reset state by $Ncw\ \overline{Wt6}$.

With $Wb$ in its reset state the signal on the selected $Na0-Na9$ line, i.e., $Nan$, falls whereby forward tape movement halts and $Nwp$ also falls whereby $\overline{INwp}$ switches $Rp$ to its reset state. As previously explained, the setting of the $Wt1-Wt4$ flip-flops remains unchanged.

Reference is now made to FIG. 55 which illustrates the timing of the erase operation. Upon the receipt of the $Ert$ signal from the Central Processor, flip-flop $Wb$ is switched to its set state and remains thereat until switched to its reset state by $Wed$. The contents of the $A11-A14$ flip-flops of the A register are transferred to the $Wt1-Wt4$ flip-flops which thereafter are not changed throughout the operation. $Wt5$ is switched to its set state by $Ert\ \overline{Wb}$ and remains thereat until it is switched to its reset state when the first gamma marker $Ncw$ is detected during reverse movement of the tape. $Wt6$ is also switched to its set state by $Ert\ \overline{Wb}$ and is then not switched to its reset state until the second gamma marker is detected during reverse movement of the tape. $Nan$ is generated by the $Wb\ Rt1-Rt4$ term and falls when $Wb$ is switched to its reset state. $Nbd$ is first generated by $Wt5$ and is then maintained by $\overline{Wt5}\ Wt6$, it falling when $Wt6$ is switched to its reset state. The $Ned$ signal is generated when $Wt5$ is switched to its reset state by the $\overline{Wt5}\ Wt6\ \overline{Ysdw}$ term and falls when $Ysdw$ is switched to its astable state at the detection of the second gamma marker during reverse movement of tape. $Nwd$ is generated when $Wt6$ is switched to its reset state by $\overline{Wt5}\ \overline{Wt6}$. $Wp$ is switched to its set state when $Nwp$ goes true, i.e., with $Nan$, and when $Nan$ falls $Wp$ is switched to its reset state by $\overline{INwp}$.

One-shot $Ydw$ is switched to its astable state by $Nwp\ \overline{Wp}$ and remains thereat for seven milliseconds. When $Rev$, the reverse command goes true, reverse tape movement commences and continues until after the delayed $Ncw$ is generated upon the detection of the second gamma marker whereupon reverse tape movement comes to a halt due to the switching of $Wt6$ to its reset state whereby $Nbd$ falls and $Rev$ is no longer true. After a delay of $3+$ milliseconds, as provided by the buffer in the tape handler, forward tape movement commences since $Nwon$ is true $(Nwon = Nwd\ Nan\ \overline{WL}\ Wp)$.

When the second delayed gamma signal $Ncw$ issues, $Wed$ is generated by $Ncw\ \overline{Wt5}\ \overline{Wt6}\ \overline{CaL}$ to switch $Wb$ to its reset output whereby the $Nan$ signal falls and $Nwon$ is no longer true. Thereupon forward tape movement halts. Flip-flop $Wsy$ is switched to its set state at the generation of the second $Ncw$ signal by $Ncw\ \overline{Wt5}\ Wt6$ and stays thereat until it is switched to its reset state by $Ncw\ \overline{Wt6}$ when the delayed $Ncw$ is generated during forward movement. Flip-flop $Esy$ is switched to its set state upon detection of the beta marker during reverse tape movement and remains in its set state until the $Ncw$ signal is generated during forward movement at which time it is switched to its reset state by $Ncw\ \overline{Wt5}\ Wsy$. One-shot $Ysdw$ is of course switched to its astable state for 1.65 milliseconds at the detection of a gamma marker, provided that flip-flop $Wt5$ is in its reset state. Flip-flop $Di$ is switched to its set state when the second delayed gamma marker $Ncw$ is generated during reverse tape movement and then is switched to its reset state upon the generation of the $Ncw$ signal during forward tape movement since at this time $Wt6$ is in its reset state.

Alter Address (Rewind)

This operation requires the rewind command $Rmt$ from the Central Processor. The rewind address logic includes ten flip-flops, $S0-S9$, i.e., one for each addressable tape transport. Upon the receipt of the rewind command, the setting of the $A11-A14$ flip-flops is decoded by $Rmt$ to switch one of the $S0-S9$ flip-flops to its set state thereby providing the $Sn$ signal and providing a selected line $Ns0-Ns9$ to the transport selection panel, i.e., the signal $Nsn$.

If the transport is not busy or if a prior operation is terminating, the transport begins rewinding. When the beginning of tape is sensed, the $NBtd0$ signal (Beginning of Tape Delayed) issues and the $Sn$ signal falls by the switching of the selected $S0-S9$ flip-flop from its set to its reset state whereby $Nsn$ is no longer true.

ALARM AND CONTROL LOGIC
(FIGS. 56-65)

In the tape control system of this invention, alarm conditions may be due to a mechanical failure such as a tape break, etc., or due to a logic error, such as a block marker misread, for example.

The alarm logic in the system functions in three modes of operation, viz., read, alter and rewind. The alarm control flip-flops are $RL$ for read, $WL$ for alter and $SL$ for rewind. The flip-flops are OR-gated together as terms comprising the $Atd$ signal which provides a peripheral alarm to the Central Processor. The peripheral alarm may actuate a buzzer or other suitable indicating device.

An order to a "not ready" transport results in (a) cancellation of the order, (b) actuation of an alarm buzzer, (c) notification to the Central Processor, (d) freezing of the address of the transport concerned in the appropriate register. At each tape transport station there are three lines $Nr1$, $Nw1$, and $Ns1$ which are activated by "not ready" monitor signals.

Read Alarm

The Read Alarm flip-flop $RL$ is switched to its set state by any read command ($Rebd$) which cannot be executed. However, it is not so switched if the read command is given while a read operation is in progress. A transport ordered to read will cause the activation of $Nr1$ when:

(a) The transport is removed for disconnection and for repair.
(b) The power is off.
(c) There is no tape on the machine.
(d) The tape is broken.
(e) The end of tape is reached.
(f) The control is switched to manual, or
(g) The cabinet door is open.

The activation of line $Nr1$ switches flip-flop $RL$ to its set state whereby the peripheral alarm is provided.

The read alarm flip-flop $RL$ is switched to its set state if the read synchronizing flip-flop $Rsy$ is at its set state and a beta marker is detected, i.e., the block markers are not in proper sequence. Flip-flop $RL$ is switched to its set state in this situation by the $Rp\ Nbr\ Rsy$ term. Similarly, if flip-flop $Rsy$ is in its reset state and a gamma marker is detected which also indicates that block markers are not in their proper sequence, flip-flop RL is switched to its set state by the $Rp\ Ncr\ \overline{Rsy}$ term.

Alter Alarm

The Alter Alarm flip-flop WL is switched to its set state by any alter command which cannot be executed. However, this alarm flip-flop is not switched to its set state if an alter command is given while an alter operation is in progress. Flip-flop WL will be switched to its set state if an alter command is received and one of the following conditions is true:

(a) The addressed transport is not turned on.
(b) The door is open or the interlock is not bypassed.
(c) A tape is broken or the tape is not mounted.
(d) The write relays are in the write-inhibit states.
(e) The tape is at the end-of-tape or not-ready state.
(f) The tape is mounted but the servo-idler arms of the tape handler are not released.

The above set forth conditions will cause the activation of the $Nw1$ line which switches flip-flop WL to its set state.

Prior to discussing the actuation of the alter alarm flip-flop WL when logic errors occur, there are reviewed below the functions of the echo synchronization flip-flop $Esy$ and the write synchronization flip-flop $Wsy$ with regard to their utilization in the Alter Alarm logic.

The $Esy$ flip-flop is time-shared during alter operations to detect out-of-sequence markers during any alter operation if:

(1) During a write operation, flip-flop $Esy$ is at its set state and the alpha or beta marker is detected; flip-flop $Esy$ is at its reset state and a gamma marker is detected.
(2) During a backup operation, flip-flop $Esy$ is in its set state and a gamma marker is detected; flip-flop $Esy$ is in its reset state and an alpha marker is detected.
(3) During an erase operation, flip-flop $Esy$ is in its set state and a beta marker is detected; flip-flop $Esy$ is in its reset state and an alpha marker is detected.

The flip-flop $Wsy$ is time-shared during alter operations to detect out-of-sequence block markers during alter operations if:

(1) During a write operation, flip-flop $Wsy$ is in its set state, flip-flop $Esy$ is in its reset state, and an alpha or a gamma marker is detected; flip-flop $Wsy$ is in its reset state and a beta or a gamma is detected.
(2) During an erase operation, flip-flop $Wsy$ is in its set state and an alpha or a beta marker is detected; flip-flop $Wsy$ is in its reset state and a gamma marker is detected.

It is noted that the term to switch flip-flop WL to its set state when a logic error occurs is $WpAA$, the set output of flip-flop $Wp$ being included to insure that actual operation has been initiated.

Referring now to the input equation for AA, the first term therein, viz., $$(Naw + Nbw)\ [(\overline{Wt5}\ \overline{Wt6}\ Esy + Wt5\ Wt6)]$$

is employed to detect four error conditions:

(1) The detection of an alpha marker following a beta marker during the write mode of operation, $$(Naw\ \overline{Wt5}\ \overline{Wt6}\ Esy)$$

(2) The detection of an alpha marker as the first block marker during the erase mode of operation, $$(Naw\ Wt5\ Wt6)$$

(3) The detection of two consecutive beta markers during the write mode of operation, $(Nbw\ \overline{Wt5}\ \overline{Wt6}\ Esy)$.

(4) The detection of a beta marker as the first block marker during the erase mode of operation, $$(Nbw\ Wt5\ Wt6)$$

The second term in the *AA equation, viz., $$(Nbw + Ncw)\ \overline{Wt5}\ \overline{Wt6}\ \overline{Wsy}$$

is employed to detect the following error conditions:

(1) The detection of a beta marker prior to the detection of an alpha marker during the write mode of operation, $(Nbw\ \overline{Wt5}\ \overline{Wt6}\ \overline{Wsy})$.
(2) The detection of a gamma marker prior to the detection of an alpha marker during the write mode of operation, $(Ncw\ \overline{Wt5}\ \overline{Wt6}\ \overline{Wsy})$.

The third term of the equation, viz., $$(Naw + Ncw)\ \overline{Wt5}\ \overline{Wt6}\ \overline{Esy}\ Wsy$$

is utilized to detect the following error conditions:

(1) The detection of two consecutive alpha markers during the write mode of operation, $$(Naw\ \overline{Wt5}\ \overline{Wt6}\ \overline{Esy}\ Wsy)$$

(2) The detection of a gamma marker prior to the detection of a beta marker during the write mode of operation, $(Ncw\ \overline{Wt5}\ \overline{Wt6}\ \overline{Esy}\ Wsy)$.

The fourth term of the equation, viz., $$Esy\ (Nbw + Ncw\ Wt5)\ \overline{CaL}$$

is utilized to detect the following error conditions:

(1) The occurrence of two consecutive beta markers, $(Esy\ Nbw\ \overline{CaL})$.
(2) The detection of a beta marker prior to the detection of a gamma marker when the tape is in reverse motion, $(Esy\ Ncw\ Wt5\ \overline{CaL})$.

In both of these terms the element $\overline{CaL}$ is included so that for these terms to be true the system cannot be in the calibrate mode of operation.

The fifth term of the equation, viz., $$Naw\ \overline{Esy}\ (Wt5 + Wt6)\ \overline{CaL}$$

is utilized to detect the following error conditions.

(1) The occurrence of an alpha marker prior to the occurrence of a beta marker during reverse motion of the tape, $(Naw\ \overline{Esy}\ Wt5\ \overline{CaL})$.
(2) Forward motion instead of reverse motion during the erase mode operation $(Naw\ \overline{Esy}\ Wt6\ \overline{CaL})$. For the above terms to be true, the system cannot be in the calibrate mode of operation $(\overline{CaL})$.

Rewind Alarm

The Rewind Alarm flip-flop SL is switched to its set output by the actuation of $Ns1$ when the remind command cannot be executed. However, flip-flop SL is not so switched if a rewind command is given and the transport is already in the beginning-of-tape condition. The switching term for flip-flop SL is $NsL$ which is a bussed function of any rewind difficulty encountered by any tape handler as determined by $$NsL = NsL1 + NsL2 + \ldots NsL9 + NsL10$$

Flip-flop SL is switched to its state by any of the following conditions:

(a) The addressed transport is not turned on.
(b) The door is open or the interlock is not bypassed.
(c) The tape is broken or the tape is not mounted.
(d) The tape is mounted but the servo-idler arms in the tape handler are not released.
(e) The tape is in the not-ready state.

The lines $NsL1–NsL10$ are routed individually from each tape station and are OR-gated to switch flip-flop SL to its set state.

DATA FLOW LOGIC

Read

The read logic of the tape control system contains the following elements; the $Ftr1$–$Ftr10$ read amplifiers and the $Xr1$ and $Xr2$ transfer preset gated clock drivers ($Xr1$ synchronizes the outputs of flip-flops $Frt1$–$Frt5$ and clock driver $Xr2$ synchronizes the outputs of amplifiers $Frt6$–$Frt10$).

The $Ftr$ read data amplifiers are asynchronously switched to the reset states by signals from the reading transport. The outputs of the $Ftr$ amplifiers are sent to the tape buffer in the Central Processor where they are retimed. Signals $Rds1$, $Dsy1$, $Rds2$ and $Dsy2$ are sent from the tape buffer to preset or clear the $Ftr$ amplifiers with the $Xr1$ and $Xr2$ clock drivers.

The $Xr1$ and $Xr2$ clock drivers are always clearing the $Ftr$ amplifiers when there is no read operation ($\overline{Rsy}$). In this connection it is to be noted that $\overline{Rsy}$ is a necessary element in the equations to the input of both clock drivers $Xr1$ and $Xr2$.

When the beta markers in the marker channel are detected, i.e., when the $Nbr$ signal issues and $Rsy$, the read synchronization flip-flop is switched to its set state to permit reception of data from the read amplifiers, flip-flop $Rds1$ is switched to its set state by $$(\overline{Ftr1} + \overline{Ftr2} + \overline{Ftr3} + \overline{Ftr4} + \overline{Ftr5})\ \overline{Dsy1}\ \overline{Rds1}$$

One-shot $\overline{Ytd1}$ is a one-shot in the Read Buffer which controls the amount of magnetic tape skew that is tolerated by the dated retiming circuit. Thus, flip-flop $Dsy1$ is switched to its set state by $Rds1\ \overline{Ytd1}\ \overline{Dsy1}\ Rsy$. When the $Dsy1\ Rds1$ gated combination is true, $Xr1$ is generated. Similarly, flip-flop $Rds2$ is switched to its set state by $(\overline{Ftr6} + \overline{Ftr7} + \overline{Ftr8} + \overline{Ftr9} + \overline{Ftr10})\ \overline{Dsy2}\ \overline{Rds2}$, flip-flop $Dsy2$ is switched to its set output by $$Rds2\ \overline{Ytd2}\ \overline{Dsy2}\ Rsy$$

and $Xr2$ is generated by $Dsy2\ Rds2$. Clock drivers $Xr1$ and $Xr2$, depending upon whether read amplifiers $Ftr1$–$5$ or $Ftr6$–$10$ are involved, switch the $Ftr$ flip-flops to their preset states. The settings in the $Ftr$ flip-flops are utilized to transfer the contents therein to the $Rin1$–$Rin10$ flip-flops in the Read Buffer and the information from the tape is read into the system.

Upon the detection of a gamma, i.e., $Ncr$, one-shot $Ysdr$ is switched to its astable state by $Ncr\ Q1r$ (the operation of $Q1r$ is explained below in the section which describes the Block Marker Counter Logic). The astable period of $Ysdr$ permits the control of a delayed stop, i.e., the delaying of the generation of $Ncr$, the end of block command.

$Rb$, the read busy flip-flop, is switched to its reset state at the end of a block by $Ncr\ \overline{Ysdr}\ \overline{Q1r}$. Upon such switching, the signal falls on the actuated $Nr0$–$9$ line whereby $\overline{INrp}$ switches $Rp$ to its reset state. The $Red$ signal is generated by $\overline{Rb}\ Q2r$ which is used in controlling the Read Buffer.

The setting in the $Rt1$–$Rt4$ flip-flops is not changed until the issuing of the next $Rebd$ signal, i.e., the next read command is given, or a total clear is effected by $Ktb$.

BLOCK MARKER COUNTER LOGIC
(FIGS. 56–65)

As has been described above, block markers are placed on the tape to identify the data areas thereon. In order to determine the position of the heads in respect to the data block, the marker pulses (alpha, beta, gamma) are detected from the tape, counted and gated. A separate and redundant code is used for each marker which permits the gain or loss of at least one bit in each case without causing an error. Signals are derived from these counters as follows: in read operations a beta marker is represented by $Nbr$ and a gamma marker is represented by $Ncr$; in alter operations an alpha marker is represented by $Naw$, a beta marker is represented by $Nbw$ and a gamma marker is represented by $Ncw$.

Read Marker Counter

In the reading of magnetic tape, there need only be considered the beta marker (Beginning of Data Read) and the gamma marker (End of Data Read) for the direction of the data to the tape buffer from the read heads. However, the block markers must occur in the order of beta–gamma; the alpha marker is not identified.

The read head corresponding to the marker channel on the tape is cabled to a read preamplifier. This output is designated as $DRO11$ Data Read Out 11), since the number 11 channel on the tape is utilized and is directed to the read amplifier $Mra$.

After a read command ($Rebd$) from the Central Processor has been received, the marker counter determines the proper tape position and signals are provided to the tape buffer accordingly. The marker counter develops two logic signals: $Nbr$, representing beta or begin read, and $Ncr$, representing gamma or end of block.

During movement of tape, when the first marker channel pulse is detected, provided that $DRO$ is present, the output of the preamplifier is applied to the read amplifier for the marker channel. The latter is switched thereby from its preset state to its reset state to provide $\overline{Mra}$. The term $\overline{Mra}\ \overline{Frm}$ switches flip-flop $Frm$ to its set state, flip-flop $Frm$ being the read marker control flip-flop which retimes pulses as an input to the read marker counter. The tape read clock driver $Tr$ is now enabled by the input term $Frm\ Rb\ \overline{Ydr}\ \overline{Q2r}$ wherein $Rb$ has been produced by $Nrb$ as explained above in the description of the read operation, and $\overline{Ydr}$ is the stable ouput of the read inhibit marker one-shot. Flip-flop $Q2r$ is the read channel marker detection timing flip-flop which indicates the end of the read marker count and samples a marker counter. Flip-flop $Q2r$ is switched to its reset state by $\overline{Rb}$ or $Ktb$ and remains threat thereat for the time that pulses are being counted.

To assure that the pulses to be counted are, in fact, the marker pulses, a doublet detection window is employed. Since this window exists in a period of about 50 microseconds to 80 microseconds after the first $Tr$ clock pulse, it renders improbable the possibility of counting two successive noise pulses.

The operation of the doublet window arrangement is as follows. At the occurrence of the $Tr$ clock pulse, one-shot $Y60r$ is switched to its astable state by $\overline{Ymr},\ \overline{Y10r}$. The marker timing counter which comprises flip-flops $C0r$–$C3r$ is simultaneously switched to the 0001 setting, i.e., $\overline{C3r}\ \overline{C2r}\ \overline{C1r}\ C0r$ by the $\overline{Ymr}\ \overline{Y10r}$ signal. After a nominal 50 microsecond delay, the astable period of one-shot $Y60r$, $Y60r$ switches back to its stable state and one-shot $Y10r$ is switched to its astable state asynchronously by $\overline{Y10r}$. Accordingly, the inverted output of $Y10r$ during its astable state, i.e., $IY10r$ is at the upper logic level for a nominal 30 microseconds (doublet window period). To insure that markers are being counted, the next marker pulse must occur during the upper level voltage output period of $IY10r$ (a nominal 64 microseconds from the time of the occurrence of the first marker pulse).

The flip-flop $Frm$ is switched back to its reset state by the $Frm$ term and the marker amplifier $Mra$ is switched to its preset state by the $Tr$ clock pulse.

If a second marker pulse is detected during the astable period of one-shot $Y10r$, i.e., during $IY10r$, read amplifier $Mra$ is switched to its reset state whereby the flip-flop $Frm$ is switched to its set state by $\overline{Mra}\ \overline{Frm}$ and clock driver $Tr$ is enabled by the term $Frm\ Rb\ \overline{Ybr}\ \overline{Q2r}$ as occurs with the detection of the first marker pulse. Accordingly, the $C0r$–$C3r$ counter will assume the 0010, i.e., $\overline{C3r}\ \overline{C2r}\ C1r\ \overline{C0r}$ setting.

One-shot $Ymr$ is switched to its astable state by $\overline{IY10r}$ during the time of the doublet window, one-shot $Ymr$ being synchronized by clock driver T$r$. Flip-flop Q1$r$ is also switched to its set state during the time of $\overline{IY10r}$ by $\overline{Frm}$ $\overline{Q2r}$. Flip-flop Q1$r$ remains in its set state until the sample of the count is required at which time Q1$r$ is switched to its reset state by Q2$r$ as will be further explained hereinbelow.

The marker counter comprising flip-flops C0$r$–C3$r$ is a straight scale of 16 binary counter. The clock input to the C0$r$–C3$r$ flip-flops is the T$r$ clock driver. Since the first pulse of the marker is effectively lost by virtue of the doublet window detection scheme, the counter is held at the static count of $\overline{C3r}$ $\overline{C2r}$ $\overline{C1r}$ C0$r$. Upon the detection of the second marker pulse with the consequent setting of the counter to the $\overline{C3r}$ $\overline{C2r}$ C1$r$ $\overline{C0r}$ setting, the counter cycles. The following table indicates the counter setting as pulses are sequentially detected.

| | Marker Pulses | C3r C3w | C2r C2w | C1r C1w | C0r C0w | Logic Node |
|---|---|---|---|---|---|---|
| Begin | | X | X | X | X | |
| | 1 | 0 | 0 | 0 | 1 | |
| | 2 | 0 | 0 | 1 | 0 | |
| | 3 | 0 | 0 | 1 | 1 | |
| | 4 | 0 | 1 | 0 | 0 | |
| | 5 | 0 | 1 | 0 | 1 | Naw |
| | 6 | 0 | 1 | 1 | 0 | |
| | 7 | 0 | 1 | 1 | 1 | |
| | 8 | 1 | 0 | 0 | 0 | |
| | 9 | 1 | 0 | 0 | 1 | |
| | 10 | 1 | 0 | 1 | 0 | |
| | 11 | 1 | 0 | 1 | 1 | Nbw or Nbr |
| | 12 | 1 | 1 | 0 | 0 | |
| | 13 | 1 | 1 | 0 | 1 | |
| | 14 | 1 | 1 | 1 | 0 | |
| | 15 | 1 | 1 | 1 | 1 | |
| | 16 | 0 | 0 | 0 | 0 | Ncw or Ncr |
| | 17 | Not counted | | | | |
| | 18 | | | | | |

Upon the detection of the 16th consecutive pulse, the counter assumes the 0000 setting. If more than 16 sequentially occurring marker pulses are detected, the counter is held at the 0000 setting since flip-flops C1$r$, C2$r$ and C3$r$ are maintained in their reset states by the $\overline{Ymr}$ $\overline{Y10r}$ term. The set output of Q1$r$ is provided as an AND element in the set input terms of C2$r$ and C3$r$ but not in the set input term of C1$r$ because the counter must count the clock pulse that opens the marker window.

If a marker pulse does not appear in a doublet window, the one-shot Y$mr$ is not switched to its astable state and the counter remains in the 0001, i.e., the $$\overline{C3r}\ \overline{C2r}\ \overline{C1r}\ C0r$$

configuration until doublet detection proceeds again after the detection of a first marker pulse.

When the one-shot Y$mr$ (nominal 2 milliseconds) switches to its stable state denoting that all marker pulses have been detected, flip-flop Q2$r$ is switched to its set state by $\overline{Q2r}$ $\overline{Ymr}$ Q1$r$. At this time flip-flops Q1$r$ and Q2$r$ provide the sample time for the beta marker N$br$ and the gamma marker N$cr$.

N$br$ equals Q2$r$ C3$r$ (C1$r$+C2$r$)$(\overline{C1r}+\overline{C2r})$ representing counts of 10, 11, 12 or 13 marker pulses.

The gamma signal N$cr$ is generated in the following manner: when one-shot Y$mr$ switches to its stable state, flip-flop Q2$r$ is switched to its set state and the count appearing in the C0$r$–C3$r$ flip-flops is 0000; the one-shot Y$sdr$ (nominal 1.65 milliseconds) is switched to its astable state, thereby delaying the generation of N$cr$. The Y$sdr$ one-shot provides a delay in the addressed transport stop signal in the forward direction. This is necessary since the tape transports which are utilized have stopping distances shorter than their starting distances.

When one-shot Y$sdr$ switches to its stable state, the N$cr$ $\overline{Ysdr}$ $\overline{Q1r}$ term switches the ready busy flip-flop R$b$ to its reset state, and flip-flop Q2$r$ is then switched to its reset state by $\overline{Rb}$. $\overline{Rb}$ Q2$r$ signifies the end of a read operation, viz., the signal R$ed$. The signal N$cr$ is high for a nominal 1.65 milliseconds and is equal to $$Q2r\ \overline{C3r}\ \overline{C2r}\ \overline{C1r}\ \overline{C0r}$$

representing a 0000 count of 16 or more marker pulses.

Reference is now made to FIG. 66, the timing diagram of the waveforms of the pertinent flip-flops and other signals during the read marker channel timing. It is seen that with the generation of the first $\overline{Mra}$ pulse, flip-flop F$rm$ is switched to its set state. F$rm$ issues to activate clock driver T$r$. One-shot Y60$r$ is switched to its astable state and stays thereat for 50 microseconds. When Y60$r$ switches back to its stable state, one-shot Y10$r$ is switched to its astable state, the waveform for IY10$r$ being the inversion of the waveform for one-shot Y10$r$. At the occurrence of the clock pulse T$r$ during the upper level period of IY10$r$, one-shot Y$mr$ is switched to its astable state. Simultaneously, flip-flop Q1$r$ is switched to its set state. It is seen that IY10$r$ is the doublet window of 30 microseconds in which the second $\overline{Mra}$ pulse has to occur and that the astable period of one-shot Y$mr$ is 1.40 milliseconds, the interval during which time the count takes place. The C0$r$–C3$r$ counter is caused to cycle once the second $\overline{Mra}$ pulse occurs, such cycling being timed by clock pulses provided by clock driver T$r$. At the end of its astable period, $\overline{Ymr}$ switches to its stable state and flip-flop Q2$r$ is thereby switched to its set state, Q2$r$ then switching flip-flop Q1$r$ to its reset state. If at the time that one-shot Y$mr$ switches to its stable state the setting in the C0$r$–C3$r$ counter is C3$r$(C1$r$+C2$r$)$(\overline{C1r}+\overline{C2r})$, the N$br$ signal issues. If the count in the counter is 0000, the gamma has been detected. If the gamma signal issues, one-shot Y$sdr$ is switched to its astable state for a nominal 1.65 milliseconds at which time a delayed N$cr$ signal is generated to cause a switching of the read busy flip-flop R$b$ to its reset output state.

In the event that flip-flop Q2$r$ is switched to its set output state after a beta marker has been detected, it is switched to its reset output by $$Q2r(C0r+C1r+C2r+C3r)$$

If the flip-flop Q2$r$ is switched to its set output state when a gamma marker is detected, it remains in its set state until flip-flop R$b$ is switched to its reset state at which time it is switched to its reset state.

Alter Marker Counter

The Alter Marker Counter operation is similar to that of the read marker counter operation except that all three block markers are identified and the delay one-shot Y$sdw$ is utilized in a different manner. When the alter command is received and the data gates are high, the alter marker counter determines the proper tape position whereby the control logic and tape buffer are accordingly actuated.

The alter marker developes three logic signals; N$aw$ representing an alpha marker (begin write); N$bw$, representing a beta marker (begin echo read); and N$cw$ representing a gamma marker (end of block). The alter marker counter is utilized in the echo check operation.

When echo channel marker pulses are present, the first detected pulse switches the read marker amplifier M$ea$ asynchronously to its reset state (amplifier M$ea$ is the alter marker counterpart of the read amplifier M$ra$). The $\overline{Mea}$ output is retimed and the $\overline{Mea}$ $\overline{Fam}$ $\overline{Q2w}$ term switches flip-flop F$am$, the alter operation counterpart of F$rm$, to its set state. The F$am$ term is now utilized to switch flip-flop F$am$ to its reset state and the F$am$ W$b$ $\overline{Ydw}$ $\overline{Q2w}$ term enables clock driver T$w$ (clock driver T*w* is the counterpart in the alter operation of clock driver T*r* in the read operation).

One-shot Y60*w* is switched to its astable state upon the occurrence of the first T*w* clock pulse by $\overline{Ymw}\ \overline{Y10w}$ and the C0*w*–C3*w* flip-flops. The alter operation counterpart of the read marker counter are placed in the $\overline{C3w}\ \overline{C2w}\ \overline{C1w}$ C0*w* setting by $\overline{Ymw}\ \overline{Y10w}$, i.e., the 0001 setting of these flip-flops. After a nominal 50 microsecond delay, one-shot Y60*w* switches to its stable state and asynchronously switches one-shot Y10*w* to its astable state for a nominal 30 microseconds whereby the inverted astable output of Y10*w* i.e., 1Y10*w* is at the upper logic level. The M*ea* echo read amplifier is switched to its set state by the T*w* clock driver.

If a second marker pulse appears during the astable period of Y10*w*, that is, 64 microseconds after the first marker pulse, the marker amplifier M*ea* is again switched to its reset state. Flip-flop F*am* is again switched to its set state by $\overline{Mea}\ \overline{Fam}\ \overline{Q2w}$ and clock driver T*w* is enabled by the term F*am* W*b* $\overline{Ydw}\ \overline{Q2w}$ whereby the marker counter assumes the $\overline{C3w}\ \overline{C2w}$ C1*w* $\overline{C0w}$ setting, i.e., the 0010 count. Now, one-shot Y*mw* is switched to its astable state upon the occurrence of the second T*w* pulse by $\overline{IY10w}$, the astable period of Y*mw* being the time that the count takes place. Further pulses, which are detected now will count up in the C0*w*–C3*w* marker counter and marker pulses in excess of 16 will leave the counter in the 0000 configuration similar to the operation of the read marker counter.

If a marker pulse does not appear during the astable period of one-shot Y10*w*, i.e., in the doublet window, the one-shot Y*mw* is not switched to its astable state since clock driver T*w* is not enabled and the counter will not progress beyond 0001 setting.

The alter marker counter generation of the alpha, beta, and gamma signals, viz., signals N*aw*, N*bw* and N*cw* respectively is closely associated with the alter command which is being executed and the operation is controlled by the alter mode flip-flops W*t*5 and W*t*6.

The alter marker counter generates a signal N*aw* in the following manner: When the Y*mw* one-shot (nominal time, 2 milliseconds) switches to its stable state denoting that sufficient time has elapsed for the counter to have detected pulses, flip-flop Q2*w* is switched to its set state by $\overline{Q2w}\ \overline{Ymw}\ \overline{Q1w}$, flip-flop Q1*w* having been switched to its set state by $\overline{IY10w}$ F*am* $\overline{Q2w}$. The gated combination is then, N*aw*=Q2*w* F*am* C2*w* $\overline{C3w}$. This represents a count of 4 to 7 marker pulses.

The alter marker counter generates the N*bw* signal in the following manner: When one-shot Y*mw* switches to its stable state, flip-flop Q2*w* is switched to its set state and the gated combination is then $$Nbw = (Q2w\ Fam\ C3w)\ (C1w+C2w)\ (\overline{C1w}+\overline{C2w})$$

This combination represents counts of 10 to 13 marker pulses.

The N*cw* signal is generated when Y*mr* switches to its stable state and flip-flop Q2*w* is switched to its set state.

Since N*cw*=Q2*w* F*am* $\overline{C3w}\ \overline{C2w}\ \overline{C1w}\ \overline{C0w}$, there is represented a 0000 count in the alter marker counter.

Because the stop delay one-shot Y*sdw* must position the tape between the gamma marker and the alpha marker in the forward direction of tape movement and between the alpha marker and the gamma marker in the reverse direction of tape movement, one-shot Y*sdw* is switched to its astable state by either $$Q1w\ Q2w\ (\overline{C3w}\ \overline{C2w}\ \overline{C1w}\ \overline{C0w})\ \overline{Wt5}$$

i.e., when the alter marker counter is in the 0000 setting, or by the term Q1*w* Q2*w* W*t*5 (C2*w* $\overline{C3w}$), i.e., when the alter marker counter contains a count of from 4 to 7.

Reference is now made to FIGS. 67*a*–*c* wherein there is shown a diagram of marker channel timing in the alter operation.

In this diagram it is seen that the $\overline{Mea}$ marker pulses are detected every 64 microseconds. The generation of $\overline{Mea}$ causes the switching of F*am* to its set state whereby the clock driver T*w* is enabled. Y60*w* is switched to its astable state (50 microseconds) at T*w* pulse time, by $\overline{Ymw}\ \overline{Y10w}$ and $\overline{Y10w}$ is switched asynchronously to its astable state when Y60*w* returns to its stable state. During the astable period of $\overline{Y10w}$, or when its inverted output of $\overline{IY10w}$ is at the upper logic level, if a T*w* pulse is generated due to the detection of a second marker pulse $\overline{Mea}\ \overline{Ymw}$ is switched to its astable state for a period (1.40 milliseconds) which encompasses the time for the C0*w*–C3*w* counter to cycle.

The Q1*w* flip-flop is switched to its set state by F*am* $\overline{IY10w}\ \overline{Q2w}$ and stays thereat until Q2*w* is switched to its set state when $\overline{Ymw}$ returns to its stable state, whereupon Q1*w* is switched to its reset state by Q2*w*. In the C0*w*–C3*w* counter, C0*w* is first switched to its set state and then the counter assumes the $\overline{C3w}\ \overline{C2w}$ C1*w* $\overline{C0w}$ setting when the second marker pulse is detected. Q2*w* is switched to its reset state when F*am* is switched to its set state at the alpha, beta or gamma points. In this connection *F*am*=$\overline{Q1w}$ Q2*w* $\overline{Ysdw}$. During a write operation Y*sdw* is not switched to its astable state upon the detection of alpha or beta but at the detection of gamma. During a backup operation it is switched to its astable state upon the detection of alpha, and during the erase operation it is switched to its reset state upon the detection of the second gamma.

In FIG. 68, wherein there is shown a timing diagram of the operation of a marker channel counter (C0*r*–C3*r* or C0*w*–C3*w*), it is seen that the waveforms of the four flip-flops comprising the counter are those of a straight scale of 16 binary counter. Thus, upon the occurrence of each clock driver pulse, T*r* or T*w*, the counter is stepped once and at the 16th pulse it has completely cycled and assumes an initial 0000 setting.

ECHO READ (FIGS. 69–75)

Provision is made in the tape control system of this invention to provide logic which enables the performing of an echo parity check on data which has just been written on tape. Logic is contained in the echo check arrangement to retime data and decode data for column and row parity and to provide an alarm in the event that a parity error exists.

During a writing operation, data is read off the tape as written as the tape passes under the read head adjacent the write head and is checked for parity. The parity check is controlled by the echo read logic.

Data which is written is inspected by an echo read arrangement of error detection. This detection scheme does not compare the written data with original data but instead reads the data to insure that the parity is correct. This echo read arrangement requires the use of the beta marker to enable the read gate for the echo read and also employs a single read timing means for the data. Both column and row parity are checked.

When a write command is transmitted to the Central Processor, the N*won* signal is caused to be generated. The N*won* signal is also gated to the DEI echo input busses on the read preamplifiers whereby the output of the preamplifiers appears on the data echo output busses DEO. These busses are terminated at the reset inputs of the F*er*1–F*er*10 amplifiers, the latter comprising the echo read register. The DEO lines are OR gated to detect the occurrence of the first pulse in a row, this first pulse serving to retime or clock the individual rows. The echo synchronization flip-flop E*sy* is switched to its set state when data is read during the write operation.

The data inserted into the F*er*1–F*er*10 amplifiers must be retimed because of skew and asynchronism considerations. Accordingly, the echo read data retiming flip-flop Fed is switched to its set state in accordance with the equation $$*Fed = (\overline{Fer1} + \overline{Fer2} + \overline{Fer3} + \overline{Fer4} + \overline{Fer5} + \overline{Fer6}$$
$$+ \overline{Fer7} + \overline{Fer8} + \overline{Fer9} + \overline{Fer10}) \ Esy \ \overline{Fed} \ \overline{Wt5} \ \overline{Wt6} \ \overline{Di}$$

In this latter equation the Fer1–10 elements, of course, indicate detection of a flux change on tape, $\overline{Wt5} \ \overline{Wt6}$ indicates a write operation and $\overline{Di}$ is necessary so that during the reverse movement of tape in the erase mode of operation, the echo read arrangement is not enabled.

When flip-flop Fed, the echo read data retiming flip-flop is switched to its set state, flip-flop Edsy the echo synchronization delay flip-flop is switched to its set state by $Fed \ \overline{Edsy}$. Simultaneously, the echo delay one-shot Yed is switched to its astable state for a period of about 21 microseconds, such astable state thereby permitting all of the data to be inserted into the Fer amplifiers prior to their sampling.

When one-shot Yed switches back to its stable state, the Te counter (Timing Echo) commences to cycle. In the table set forth below, there is included a listing of the set and reset states of the flip-flops of the Te counter, viz, flip-flops Te1–Te4 upon the reception of successive sequentially occurring data pulses, i.e., clock pulses.

ECHO-READ WORK TIMING COUNTER

| Data Pulses | | Te1 | Te2 | Te3 | Te4 | |
|---|---|---|---|---|---|---|
| Begin | | | | | | |
| | | 0 | 0 | 0 | 0 | |
| 1st Column | | 1 | 0 | 0 | 0 | |
| | | 1 | 1 | 0 | 0 | ← ⓒ Sample For Echo-Read Parity Error (Column Error) |
| | | 0 | 1 | 0 | 0 | |
| | | 0 | 0 | 1 | 0 | |
| 2nd Column | | 1 | 0 | 1 | 0 | |
| | | 1 | 1 | 1 | 0 | ← ⓒ |
| | | 0 | 1 | 1 | 0 | |
| ONE TAPE WORD | 3rd Column | 0 | 0 | 1 | 1 | |
| | | 1 | 0 | 1 | 1 | |
| | | 1 | 1 | 1 | 1 | ← ⓒ |
| | | 0 | 1 | 1 | 1 | |
| | | 0 | 0 | 0 | 1 | |
| 4th Column | | 1 | 0 | 0 | 1 | |
| | | 1 | 1 | 0 | 1 | ← ⓒ |
| | | 0 | 1 | 0 | 1 | ← ⓒ Sample For Row Parity |
| End | | 0 | 0 | 0 | 0 | |
| Begin | | | | | | |

It is seen that the Te counter is not a straight binary counter. Thus, if it is assumed that flip-flops Te4–Te1 are in their reset states whereby their initial setting is 0000, upon the reception of the first data pulse flip-flop Te1 is switched to its set state by $Edsy \ \overline{Yed} \ \overline{Te1}$. At the occurrence of the second pulse, flip-flop Te2 is switched to its set state by flip-flop Te1. However, flip-flop Te1 remains in its set state. At the occurrence of the third data pulse, flip-flop Te1 is switched to its reset state by Te2 and flip-flop Te2 remains in its set state. At the occurrence of the fourth data pulse, flip-flop Te2 is switched to its reset state by $\overline{Te1} \ Te2$ and flip-flop Te3 is switched to its set state by $\overline{Te4} \ \overline{Te1} \ Te2$. The counter remain at the 0010 setting of these flip-flops until flip-flop Te1 is again switched to its set state, this hold count feature enabling a row parity consideration of the words as they are read from tape as will be explained further hereinbelow.

At the time that the term Te1 Te2 is true, that is, upon the reception of the second data pulse, flip-flop Fed is switched to its reset state and flip-flop Edsy is also switched to its reset state by this term. Thereafter, upon the receipt of a data pulse in the second column of the word, flip-flop Te1 is switched to its set state output by $Edsy \ \overline{Yed} \ \overline{Te1}$. Flip-flop Te3 remains in its set state since flip-flop Te4 is in its reset state. The second data pulse in the second column causes flip-flop Te2 to be switched to its set state by Te1, flip-flops Te1 and Te3 remaining in their set states since flip-flop Te2 and flip-flop Te4 are in their reset states. Upon reception of the third data pulse in the second column, flip-flop Te1 is switched to its reset state by Te2, flip-flop Te2 remains in its set state since Te1 is in its set state and flip-flop Te3 remains in the set state since Te4 is in its reset state. At the reception of the fourth data pulse in the second column, flip-flop Te1 remains in its reset state, flip-flop Te2 is switched to its reset state by $\overline{Te1} \ Te2$, flip-flop Te3 remains in its set state since Te4 is still in its reset state and flip-flop Te4 is switched to its set state by $Te3 \ \overline{Te1} \ Te2$.

This count now holds until the next $\overline{Fer}$ pulse is detected, i.e., the first data pulse in the third column of the word, whereupon flip-flop Te1 is switched to its set state. Flip-flop Te2 stays in its reset state; Te1 is at its reset state and Te3 and Te4 remain in their set states since they both require Te2 to switch them to their reset states respectively. Upon the reception of the second data pulse in the third column, flip-flop Te2 is switched to its set state by flip-flop Te1. When the third pulse is received in the third column, flip-flop Te1 is switched to its reset state by Te2, the setting in the remaining flip-flops Te1, Te2 and Te3 being unchanged.

Upon the reception of the fourth data pulse in the third column, flip-flops Te2 and Te3 are switched to their reset states by $\overline{Te1} \ Te2$ and $Te4 \ \overline{Te1} \ Te2$ respectively.

This latter setting now holds in the counter until the first pulse of the fourth column is received whereupon Te1 is switched to its set output. A second pulse switches flip-flop Te2 to its set state with Te1. A third pulse switches Te1 to its reset state with Te2 and the fourth pulse switches Te2 to its reset state with $\overline{Te1} \ Te2$ and switches Te4 to its reset state with $\overline{Te3} \ \overline{Te1} \ Te2$.

It is to be noted that the Fer flip-flops are normally and quiescently in their set states, i.e., their output is at the upper logic level, and that the outputs from the preamplifiers switch them to their reset states. The Fer flip-flops are switched back to their set states by the clock driver Xer. The enabling equation of the Xer clock driver is $Xer = Te1 \ Te2 + \overline{Esy} + (Wt5 + Wt6)$. The Fer flip-flops are switched to their set states in accordance with the equation $Fer = Xer$. The latter equation signifies that Xer clock switches an echo read amplifier to its set state when it is in its reset state. During the write operation, clock driver Xer is enabled by the term Te1 Te2 and during the backup or erase operations, the clock driver Xer is enabled by either Wt5 or Wt6 respectively. Clock driver Xer is always enabled by the reset state of the echo synchronization flip-flop ($\overline{Esy}$).

Reference is now made to FIG. 78 wherein there is shown a timing diagram of the waveforms of flip-flops etc., pertinent to the echo read data retiming operation.

In the first waveform in the FIG. 78 there is shown the skew time which can be tolerated in the system. Such skew is attributable to circuit delays and physical skew due to read-write head azimuth misalignment. The echo synchronization flip-flop Esy is shown in its set state, it having been switched thereto when the beta marker Nbw was detected. Now, with the reception of the first Fern signal, provided that it is during the write operation ($\overline{Wt5} \ \overline{Wt6}$), flip-flop Fed is switched to its set state and remains thereat until the Te1 Te2 setting is reached in the echo read timing counter. Flip-flop Edsy is switched to its set state by $Fed \ \overline{Edsy}$ and is then switched to its reset state simultaneously with the switching to the reset state of flip-flop Fed.

At the time that flip-flop Edsy is switched to its set state, one-shot Yed is switched to its astable state for 21 microseconds at which time it switches back to its stable state. With one-shot Yed at its stable state, the Te1–Te4 counter is actuated to cycle in accordance with the operation as explained hereinabove and at Te1 Te2 time the Xer clock driver is enabled to switch the Fer flip-flops to their respective preset states. This cycle is repeated for each of the four columns of a word. The data pulses which cause the T$e$ counter to cycle are provided from the CD3 clock driver.

The $\overline{Esy}$ $\overline{Tc2}$ ($Te3+Te4$) term in the equation to the set input of T$e1$ is utilized to switch T$e1$ to its set state in those situations where the gama marker is detected at the end of a block wherein the last word did not comprise four columns. The detected gamma marker causes the switching to the reset state of flip-flop E$sy$. If this term were not included, the T$e$ counter would not be left in the 0000 setting. The $\overline{Esy}$ $\overline{Tc2}$ ($Te3+Te4$) term accordingly insures that the T$e$ counter cycles completely so that it is in the 0000 setting for the echo read operation of the first column of the first word in the next succeeding block.

FIG. 76 is a diagram illustrating the waveforms of the T$e$ counter during the detection of a word, and FIG. 77 depicts the Echo Read Retiming operation.

PARITY CHECK IN ECHO READ OPERATION
(FIGS. 69–74, 79–82)

In this operation five flip-flops, viz., P$er1$–P$er5$ are employed to store the results of the row parity checking. The F$er1$–F$er5$ flip-flops are sampled by the P$er1$–P$er5$ flip-flops at the T$e1$ $\overline{Tc2}$ setting of the T$c$ counter and the P$er$ flip-flops are complemented on every binary "1" or P$ern$. The F$er6$–F$er10$ flip-flops are sampled by the P$er1$–P$er5$ flip-flops at the T$e1$ T$e2$ setting of the T$e$ counter and then the F$er6$–F$er10$ flip-flops are switched to their set states by the X$er$ clock driver in preparation for the next column of data.

The following equations for the set and reset inputs of flip-flop P$er1$ are typical for the five P$er$ flip-flops.

\*$Per1 = [(Fer1+Te2) \ (Fer6+\overline{Tc2}) \ Te1] \ \overline{Per1}$

\*$\overline{Per1} = [(Fer1+Tc2) \ \text{A}Fer6+\overline{Tc2}) \ Te1]$
$\overline{Per1}+\overline{Te1} \ \overline{Tc2} \ \overline{Tc3} \ \overline{Tc4}$ It is seen that T$e1$ is always a necessary element in the equation. At T$e1$ $\overline{Tc2}$ time, flip-flop P$er1$ is switched to its set state by F$er1$ if it is in its reset state and is switched to its reset state by F$er1$ if it is in its set state. Similarly, at T$e1$ T$e2$ time, flip-flop P$er1$ is switched to its state by F$er6$ if P$er7$ is in its reset state and is switched to its reset state by F$er6$ if P$er1$ is at its set state.

Reference is now made to FIGS. 80–82 for explaining an example of the parity checking of one word. It is of course to be realized that the initial setting of the P$er$ flip-flops is 00000 since either the K$tb$ signal switches all of them to their reset states, or they are in such setting as the result of completed parity check operation. It is seen that data enters the F$er1$–F$er10$ amplifiers where it is retimed and at T$e1$ $\overline{Tc2}$ time, all "ones" are required to complement the state of the P$er1$–P$er5$ flip-flops. The F$er1$–F$er5$ amplifiers are sampled at time T$e1$ $\overline{Tc2}$ and the F$er6$–F$er10$ amplifiers are sampled at time T$e1$ $\overline{Tc2}$. Thus, at T$e1$ $\overline{Tc2}$ time, flip-flop P$er5$ is switched to its set state by F$er5$. At T$e1$ T$c2$ time flip-flop P$er5$ which is in its set state is switched to its reset state by F$er10$. Thus, at the end of the first column of data, flip-flop P$er5$ is zero, i.e., it is in its reset state. The F$er$ amplifiers are preset to the one state by clock driver X$er$ at T$e1$ T$c2$ time preparatory to reading the next column from the tape. In the second column, F$er5$ is switched to its reset state i.e., it is a binary zero ($\overline{Fer5}$). Since F$er5$ is necessary to switch flip-flop P$er5$ to its set state, in the second column the state of the P$er5$ flip-flop remains unchanged. However, at T$e1$ T$e2$ time, F$er10$ which is in its set state causes the switching of flip-flop P$er5$ to its set state.

In the third column flip-flop F$er5$ is in its set state whereby flip-flop P$er5$ is switched to its reset state thereby at T$e1$ $\overline{Tc2}$ time and F$er10$, which is in its set state, causes the switching back of P$er5$ from its reset state to its set state at T$e1$ T$e2$ time. In the fourth column, flip-flop F$er5$ is in its reset state ($\overline{Fer5}$) whereby at T$e1$ $\overline{Tc2}$ time, the setting of flip-flop P$er5$ remains the same, i.e., its set state and at T$e1$ T$e2$ time, flip-flop P$er5$ is switched to its reset state since flip-flop F$er10$ is in its set state.

It is thus seen that the P$er$ flop-flops sample each word eight times during which sampling each of the eight digits are inspected in turn. In this system, the parity system is chosen to be an odd number of zeroes. Accordingly, the P$er1$–P$er4$ flip-flops will complement an odd number of times if the row parity is correct. The $\overline{Te1}$ $\overline{Te2}$ $\overline{Te3}$ $\overline{Te4}$ term in the equations to the respective reset inputs of the P$er$ flip-flops insures that these flip-flops are all switched to their reset states prior to a parity check, and since the initial setting of the P$er1$–P$er4$ flip-flops is 0000, their setting should be 1111 after four columns of data have been sampled if the row parity is correct. The row parity error is indicated if any of the P$er1$–P$er4$ flip-flops is in the zero state. If such a parity error does exist, the E$wss$ signal is generated by ($\overline{Per1}+\overline{Per2}+\overline{Per3}+\overline{Per4}$). The E$wss$ term is an emitter follower output which comes true when a parity error exists and is an input to switch to its set state, the sub-alarm flip-flop E$ws$ in the Write Buffer.

Column parity is sampled in each column of a word at T$e2$ time by decoding the P$er$ flip-flops into four signals, viz., C$pe$, C$po$, C$pd$ and C$ps$. In the equation for generating C$pe$ the first term therein, P$er1$ P$er2$ P$er3$, indicates all binary ones, i.e., no zeroes. The second term $\overline{Per1}$ P$er2$ $\overline{Per3}$ indicates an even number of zeroes. The third and fourth terms P$er1$ $\overline{Per2}$ $\overline{Per3}$ indicate, respectively, even numbers of zeroes.

In the equation for generating C$po$, the first term therein $\overline{Per1}$ $\overline{Per2}$ $\overline{Per3}$ indicates all zeroes. The next term in the equation, $\overline{Per1}$ P$er2$ P$er3$, indicates one zero the third term therein, P$er1$ $\overline{Per2}$ P$er3$, indicates one zero and the fourth term therein, P$er1$ P$er2$ $\overline{Per3}$ indicates one zero.

The C$ps$ term is true when either the condition $\overline{Per4}$ $\overline{Per5}$ or the condition P$er4$ P$er5$ exists, i.e., when there is agreement in the setting of the P$er4$ and P$er5$ flip-flops. The term C$pd$ is true when either the $\overline{Per4}$ P$er5$ or P$er4$ $\overline{Per5}$ conditions exist, i.e., when the setting of the P$er4$ and P$er5$ flip-flops are in disagreement. A column parity errors exists, i.e., E$wss$ is generated to set the E$ws$ alarm flip-flop when the conditions C$pe$ C$ps$ T$e2$ or C$po$ C$pd$ T$e2$ are true. In the first of these conditions, since C$pe$ indicates an even number of zeroes and since C$ps$ indicates agreement between the P$er4$ and P$er5$ flip-flops, the total setting of P$er$ flip-flops must add up to an even number of zeroes, i.e., either two or four. In the C$po$ C$pd$ T$e2$ term since C$po$ indicates an odd number of zeroes and since C$pd$ indicates disagreement between the P$er4$ and P$er5$ flip-flops, here again the C$po$ C$pd$ combination indicates an even number of zeroes, i.e., either two or four.

Coincident with the echo read operation, it may be desired to determine whether a good "write" has been made. Such criterion can be readily determined by setting the echo read amplifiers to a relatively low gain as compared with the gain of the read amplifiers during the ordinary read operation. In this manner, data written on tape which is satisfactorily detected by low gain echo read amplifiers fulfills such criterion.

BLANK TAPE DETECTION

Provision is made in this invention to provide an error alarm at the end of a block if a blank tape has been placed on a tape transport and has not been written upon or if a write operation has been attempted without data being echo-read.

In this operation, the blank tape sensing flip-flop B$ts$ is switched to its set state upon the receipt of the write command W$ebd$ from the Central Processor. To switch flip-flop B$ts$ to its reset state there is required T$e1$. It is recalled that to switch T$e1$ to its set state, there is required a signal $\overline{Fcrn}$. In the event that no $\overline{Fcrn}$ signal issues from the Fer1–Fer10 flip-flops during the write operation, Te1 is not switched to its set state. Thus, if the flip-flop Bts remains in its set state, after the Wed signal issues upon the detection of a gamma marker, there is an indication either that the tape is blank or that if data has been written on the tape, it has not been echo read. Accordingly, the reset state of flip-flop Bts at the end of the block shows that the echo-read counter Te1–Te4 has at least begun one cycle since *$\overline{Bts}$=Te1.

It is to be noted that the Bts Wed term causes the generation of Ewss which in turn causes the setting of the alarm flip-flop Ews in the Tape Buffer. The inclusion of the Wed element in the latter term insures that the alarm flip-flop Ews is not switched to its set state until the end of block has been reached on the tape since Wed is generated upon the detection of the gamma marker (Ncw).

On Line Calibration

The block marker bits, viz., alpha, beta and gamma, are normally pre-recorded on blank tape by a separate off-line unit. In the event that pre-edited tapes are not readily available, the calibrate mode of operation effects the recording of block markers on the tape by employing a special program for the Central Processor.

When the Central Processor is switched to the calibrate mode by an appropriate switching arrangement and a write command issues a write operation is initiated in the tape control as usual. Switching means (not shown) is provided on a tape handler to switch a tape channel into operative association with a write control flip-flop in the Write Buffer.

In other words, the Wcbd signal issues and a write priority is established similar to the course of events that ensue in the normal write operation. Accordingly, the block marker pulses are echo checked for correct sequence and the proper number of flux changes, such checking requiring the use of the counter comprising the C9w–C3w flip-flops, one-shots Ymw, Y10w, and Y60w etc., and flip-flops Wsy and Esy.

In this operation the tape has to maintain a forward motion during and after the echo reading of gamma markers. It is recalled that in the normal write operation, flip-flop Wb is switched to its reset state by the Wed term, the equation for Wed being Wed=Ncw $\overline{W15}$ $\overline{W16}$ $\overline{CaL}$. In the latter equation it is seen that for the term Wed to issue the system cannot be in the calibrate mode ($\overline{CaL}$). Thus, the Wed signal does not issue during the calibrate mode of operation and the tape is maintained in forward movement even after gamma markers are detected. However, in the event that an error is encountered in the block markers, the write alarm flip-flop WL is switched to its set state by the WpAA term for the same reasons as set forth in the explanation of the AA equation. Flip-flop WL, of course, functions to provide a peripheral alarm to the system.

It is seen that the $\overline{CaL}$ element is included in all terms indicating reverse movement of the tape such as the reverse *AA terms, Wed, etc., thus, insuring that the calibrate mode of operation can only function during a forward tape movement.

While there have been described what are considered to be the preferred embodiments of this invention, it will be obvious to those skilled in the art that various changes and modifications may be made therein without departing from the invention and it is, therefore, aimed in the appended claims to cover all such changes and modifications as fall within the spirit and scope of the information.

What is claimed as new and desired to be secured by Letters Patent of the United States is:

1. For use with a data storage means employing a longitudinal data storage member, wherein elements of data are stored on said member in a plurality of data rows oriented parallel to the length of said member, said elements being stored in a plurality of discrete regions spaced apart along the length of said member, wherein said data elements are further disposed in each of said regions in a plurality of data columns oriented transversely to the length of said member, a predetermined number of adjacent data columns storing all of the elements of a data word, and wherein said member is provided with an additional data row oriented parallel to the length of said member for storing first and second data markers denoting respectively the beginning and ending of each of said regions, the combination comprising: writing means responsive to input signals for recording said data markers in said additional data row, means for generating a first control signal when said markers are to be recorded in said additional data row and for generating a second control signal when markers for a predetermined one of said regions are to be erased; a signal source coupled to said writing means and responsive to said first control signal for supplying said input signals to said writing means; means coupled to said signal source and responsive to said first control signal for maintaining therefrom the continued supply of said input signals following the writing of said second data markers; first reading means for sensing the markers stored in said additional row and for delivering marker signals representing the markers sensed thereby when relative motion is provided between said member and said first reading means; erasing means for erasing said markers in response to an actuating signal received thereby; means responsive to said second control signal for providing relative motion between said member and said first reading means; erase initiating means coupled to receive said marker signals and responsive to the first one of said marker signals received corresponding to said predetermined region for generating a third control signal; an actuating signal generator responsive to a first signal received thereby for generating said actuating signal and responsive to a succeeding second signal received thereby for terminating said actuating signal; means coupling said third control signal to said actuating signal generator, whereby said actuating signal is generated; means coupling said actuating signal to said erasing means; erase terminating means coupled to receive said marker signals and responsive to one of said marker signals received following said first marker signal for generating a fourth control signal; means coupling said fourth control signal to said actuating signal generator, whereby said actuating signal is terminated; second reading means for reading said data columns in sequence and delivering successive signal sets, each signal set representing the data elements stored in a corresponding data column; a multiple state device for assuming cyclically and in sequence a plurality of different settings, said different settings including a group of hold settings equal in number to said predetermined number of columns storing all of the elements of a data word, said multiple state device remaining in each of said hold settings until after said second reading means delivers the next one of said signal sets; means responsive to said settings of said multiple state device for delivering corresponding output signals, means coupled to said multiple state device and responsive to each one of said signal sets for transferring said multiple state device from the one of said hold settings which it is assuming to the next sequential one of said settings; and means coupled to said multiple state device and responsive to each one of said output signals representing one of said next sequential settings for transferring said multiple state device in sequence through the ones of said settings following said one next sequential setting and into the next succeeding one of said hold settings.

2. For use with a data storage means employing a longitudinal data storage member, wherein elements of data are stored on said member in parallel data columns oriented transversely to the length of said member, wherein a predetermined number of adjacent data columns store all of the elements of a data word, and wherein said data storage means reads said data columns in sequence and delivers successive signal sets, each signal set representing the data elements stored in a corresponding data column; a timing device for delivering output signals to control the temporal relationship of operations performed on said signal sets by data processing apparatus, comprising: a multiple state device for assuming cyclically and in sequence a plurality of different settings, said plurality of different settings including a group of hold settings equal in number to said predetermined number, said multiple state device remaining in each of said hold settings until after said data storage means delivers the next one of said signal sets; means responsive to said settings of said multiple state device for delivering corresponding output signals; means coupled to said multiple state device and responsive to each one of said signal sets for transferring said multiple state device from the one of said hold settings which it is assuming to the next sequential one of said settings; and means coupled to said multiple state device and responsive to each one of said output signals representing one of said next sequential settings for transferring said multiple state device in sequence through the ones of said settings following said one next sequential setting and into the next succeeding one of said hold settings.

3. Timing apparatus for operating in response to input signals received thereby comprising; a multiple state device for assuming cyclically and in sequence a plurality of different settings, said plurality of different settings including a group of hold settings, said multiple state device remaining in each of said hold settings until after the next one of said input signals is received, means responsive to said settings of said multiple state device for delivering corresponding output signals, means coupled to said multiple state device and responsive to each one of said input signals for transferring said multiple state device from the one of said hold settings which it is assuming to the next sequential one of said settings, and means coupled to said multiple state device and responsive to each one of said output signals representing one of said next sequential settings for transferring said multiple state device in sequence through the ones of said settings following said one next sequential setting and into the next succeeding one of said hold settings.

4. A counter for counting in response to input signals received thereby comprising: a first plurality of bistable devices, each of said bistable devices being adapted to operate in either one of two stable states, the aggregation of all of the states of said bistable devices representing the count of said counter, said bistable devices being interconnected for changing states and providing cyclically and in sequence a second plurality of different state aggregations, said second plurality of state aggregations including a group of hold aggregations wherein no one of said bistable devices can change state until after the next one of said input signals is received; means responsive to the states of said bistable devices for delivering output signals representing the corresponding state aggregations; means coupled to one of said bistable devices and responsive to each one of said input signals for transferring one of said bistable devices into a predetermined one of said states, and controlling means responsive to the one of said output signals representing said state aggregations next following each of said hold aggregations for changing the states of said bistable devices to provide in sequence the following different state aggregations and the next succeeding hold aggregation, said controlling means transferring said one bistable device into the other state thereof.

5. A data storage system for supplying information to a data processing apparatus comprising: a magnetic tape storage device including a magnetic tape wherein elements of data are stored on said tape in prallel data columns oriented transversely to the length of said tape, wherein a predetermined number of adjacent data columns store all of the elements of a data word, and further including means for reading said data columns in sequence and delivering successive signal sets, each signal set representing the data elements stored in a corresponding data column; a multiple state device for assuming cyclically and in sequence a plurality of different settings, said plurality of different settings including a group of hold settings equal in number to said predetermined number, said multiple state device remaining in each of said hold settings until after said magnetic tape storage device delivers the next one of said signal sets; means responsive to said settings of said multiple state device for delivering corresponding output signals; means coupled to said multiple state device and responsive to each one of said signal sets for transferring said multiple state device from the one of said hold settings which it is assuming to the next one of said settings; means coupled to said multiple state device and responsive to each one of said output signals representing one of said next sequential settings for transferring said multiple state device in sequence through the ones of said settings following said one next sequential setting and into the next succeeding one of said hold settings; and means responsive to said output signals for controlling the temporal relationship of operations performed on said signal sets by said data processing apparatus.

6. For use with a data storage means employing a longitudinal data storage member, wherein elements of data are stored on said member in a plurality of data rows oriented parallel to the length of said member, said etements being stored in a plurality of discrete regions spaced apart along the length of said member; wherein first and second type data markers are stored on said member in an additional data row oriented parallel to the length of said member, one of said first type data markers being stored in said additional row at the corresponding end of each of said regions and one of said second type data markers being stored in said additional row at the other end of each of said regions; wherein reading means is disposed proximate said additional data row for sensing the markers stored therein and for delivering marker signals representing the markers sensed thereby when relative motion is provided between said member and said reading means; and wherein erasing means is disposed proximate said additional data row for erasing the markers therein in response to an actuating signal received thereby; the combination comprising: means for generating a first control signal when said markers for a predetermined one of said regions are to be erased; means responsive to said first control signal for providing relative motion between said member and said reading means; erase initiating means coupled to receive said marker signals and responsive to the first one of said morker signals received corresponding to said predetermined region for generating a second control signal; an actuating signal generator responsive to a first signal received thereby for generating said actuating signal and responsive to a succeeding second signal received thereby for terminating said actuating signal; means coupling said second control signal to said actuating signal generator, whereby said actuating signal is generated; means coupling said actuating signal to said erasing means; erase terminating means coupled to receive said marker signals and responsive to one of said marker signals received following said first marker signal for generating a third control signal; and means coupling said third control signal to said actuating signal generator, whereby said actuating signal is terminated.

7. Apparatus for preventing the recognition of information stored in blocks comprising: a magnetic tape storage device including a magnetic tape wherein elements of data are stored on said tape in a plurality of data rows oriented parallel to the length of said tape, said elements being stored in a plurality of spaced apart blocks along said tape, said device including first reading means disposed proximate said data rows for sensing the elements of data stored in said data rows and for delivering output data signals when a predetermined forward relative motion is provided between said tape and said first reading means, said tape being provided with first and second type data markers stored thereon in an additional data row oriented parallel to the length of said tape, said device including second reading means disposed proximate said additional data row for sensing the markers stored therein and for delivering marker signals representing the markers sensed thereby, one of said first type markers being stored in said additional row at the corresponding end of each of said blocks and one of said second type markers being stored in said additional row at the other end of each of said blocks, said second reading means sensing first said first type marker and next said second type marker for each of said blocks when said predetermined forward relative motion is provided; said device further including erasing means disposed proximate said additional data row for erasing markers therein in response to an actuating signal received thereby; means for generating a first control signal when said markers for a predetermined one of said blocks are to be erased; means responsive to said first control signal for providing relative motion between said tape and said reading means opposite in direction to said predetermined forward relative motion; erase initiating means coupled to receive said marker signals and responsive to the one of said marker signals representing the second type marker for said predetermined block for generating a second control signal; an actuating signal generator responsive to a first signal received thereby for generating said actuating signal and responsive to a succeeding second signal received thereby for terminating said actuating signal; means coupling said second control signal to said actuating signal generator, whereby said actuating signal is generated; means coupling said actuating signal to said erasing means; erase terminating means coupled to receive said marker signals and responsive to the marker signal representing a second type marker next following said one marker signal for generating a third control signal; means coupling said third control signal to said actuating signal generator, whereby said actuating signal is terminated; and means responsive to said third control signal for changing the relative motion between said tape and said reading means to said predetermined forward relative motion.

8. For use with a data storage means employing a longitudinal data storage member, wherein elements of data are stored on said member in a plurality of data rows oriented parallel to the length of said member, said elements being stored in a plurality of discrete regions spaced apart along the length of said member, and wherein said member is provided with an additional data row oriented parallel to the length of said member for storing first and second data markers denoting respectively the beginning and ending of each of said regions, the combination comprising: writing means responsive to input signals for recording said data markers in said additional data row, means for generating a control signal when said markers are to be recorded in said additional data row, a signal source coupled to said writing means and responsive to said control signal for supplying said input signals to said writing means, and means coupled to said signal source and responsive to said control signal for maintaining therefrom the continued supply of said input signals following the writing of said second data markers.

9. A system for storing information in blocks comprising: a magnetic tape storage device including a magnetic tape wherein elements of data are stored on said tape in a plurality of data rows oriented parallel to the length of said tape, said elements being stored in a plurality of spaced apart blocks along said tape, wherein said tape is provided with an additional data row oriented parallel to the length of said tape, and further including writing means disposed proximate said tape and responsive to input signals for recording corresponding data in said additional data row when relative motion is provided between said tape and said writing means; means for generating a control signal when data is to be recorded by said writing means; a controllable signal source coupled to said writing means and responsive to said control signal for supplying to said writing means input signals representing first and second data markers; means responsive to said control signal and coupled to control said signal source to supply said input signals representing said first and second data markers when said writing means is respectively opposite said tape immediately preceding one of said blocks and opposite said tape immediately following one of said blocks; and means coupled to said signal source and responsive to said control signal for maintaining therefrom the continued supply of said input signals following the writing of data corresponding to input signals representing said second data markers.

References Cited in the file of this patent

UNITED STATES PATENTS

| | | |
|---|---|---|
| 2,939,116 | Burns | May 31, 1960 |
| 2,977,047 | Bloch | Mar. 28, 1961 |
| 2,978,678 | Winger | Apr. 4, 1961 |

UNITED STATES PATENT OFFICE
CERTIFICATE OF CORRECTION

Patent No. 3,159,819                               December 1, 1964

Robert B. Wright, Jr.

It is hereby certified that error appears in the above numbered patent requiring correction and that the said Letters Patent should read as corrected below.

Column 9, line 52, for "providel" read -- provided --; column 11, line 2, after "therefore" insert a comma; column 17, line 38, for "inpute" read -- input --; column 18, line 69, for "words" read -- word --; column 20, line 6, for "control" read -- Control --; column 24, line 35, for "Wo5" read -- W05 --; line 38, for "Wo10" read -- W010 --; column 25, line 49, for "Ydw Q2W" read -- $\overline{Ydw}$ $\overline{Q2W}$ --; line 61, for "tap" read -- tape --; column 31, line 65, for "present" read -- preset --; column 34, line 63, for "$\overline{Q2w}$ $\overline{Q1w}$" read -- $\overline{Q2w}$ + $\overline{Q1w}$ --; column 36, line 1, for "*Per2" read -- *$\overline{Per2}$ --; line 21, for "($\overline{Te1}$ $\overline{Te2}$ $\overline{Te3}$ $\overline{Te4}$)" read -- +($\overline{Te1}$ $\overline{Te2}$ $\overline{Te3}$ $\overline{Te4}$) --; column 38, line 54, for "Nmb $\underline{A14}$" read -- Nwb A14 --; column 40, line 13, for "Cal" read -- $\overline{Cal}$ --; Column 41, line 40, for "$\overline{Per4}$) Te1 Te2 Te3" read -- +$\overline{Per4}$) $\overline{Te1}$ Te2 $\overline{Te3}$ --; line 67, for "$\overline{Fer8}$" read -- +$\overline{Fer8}$ --; column 42, line 61, for "Double" read -- Doublet --; column 43, line 41, for "$\underline{D}$elayed Reading" read -- Delayed Beginning --; line 54, for "$\overline{Q2r}$" read -- Q2r --; column 44, line 21, for "Nr1" read -- NrL --; column 45, line 13, for "Nan WL" read -- Nan $\overline{WL}$ --; column 49, line 26, for "One-hot" read -- One-shot --; line 32, for "delay" read -- delayed --; column 54, line 5, for "$\overline{Tn}$ signal to pin X of jack 1." read -- the $\overline{Tn}$ signal to pin X of jack J1. --; column 59, line 46, for "Wt5" read -- $\overline{Wt5}$ --; column 60, line 19, for "Ncw" read -- Ncw --; line 22, for "Cal" read -- $\overline{Cal}$ --; column 62, line 28, for "Inwp" read -- INwp --; column 68, line 14, for "DR011 Data" read -- DR011 (Data --; line 35, for "one-shot Flip flop" read -- one-shot. Flip-flop --; line 39, strike out "threat"; column 72, line 14, for "Mea Ymw" read -- Mea, Ymw --; column 75, line 38, for "AFer6+$\overline{Te2}$)" read -- (Fer6+$\overline{Te2}$) --; line 44, for "its state" read -- its set state --; line 45, for "if Per7" read -- if Per1 --; line 58, for "$\overline{Te2}$" read -- Te2 --; column 79, line 64, for "one" read -- ones --; column 80, line 3, for "jncluding" read -- including --; line 55, for "morker" read -- marker --.

Signed and sealed this 24th day of May 1966.

(SEAL)
Attest:

ERNEST W. SWIDER
Attesting Officer

EDWARD J. BRENNER
Commissioner of Patents